April 12, 1960

F. A. FOSS
HIGH SPEED LISTER WITH AUTOMATIC
VERIFICATION OF LISTING ACCURACY 2,932,249

Filed Nov. 13, 1957

INVENTOR.
FRED. A. FOSS

BY John A. Harvey

ATTORNEY

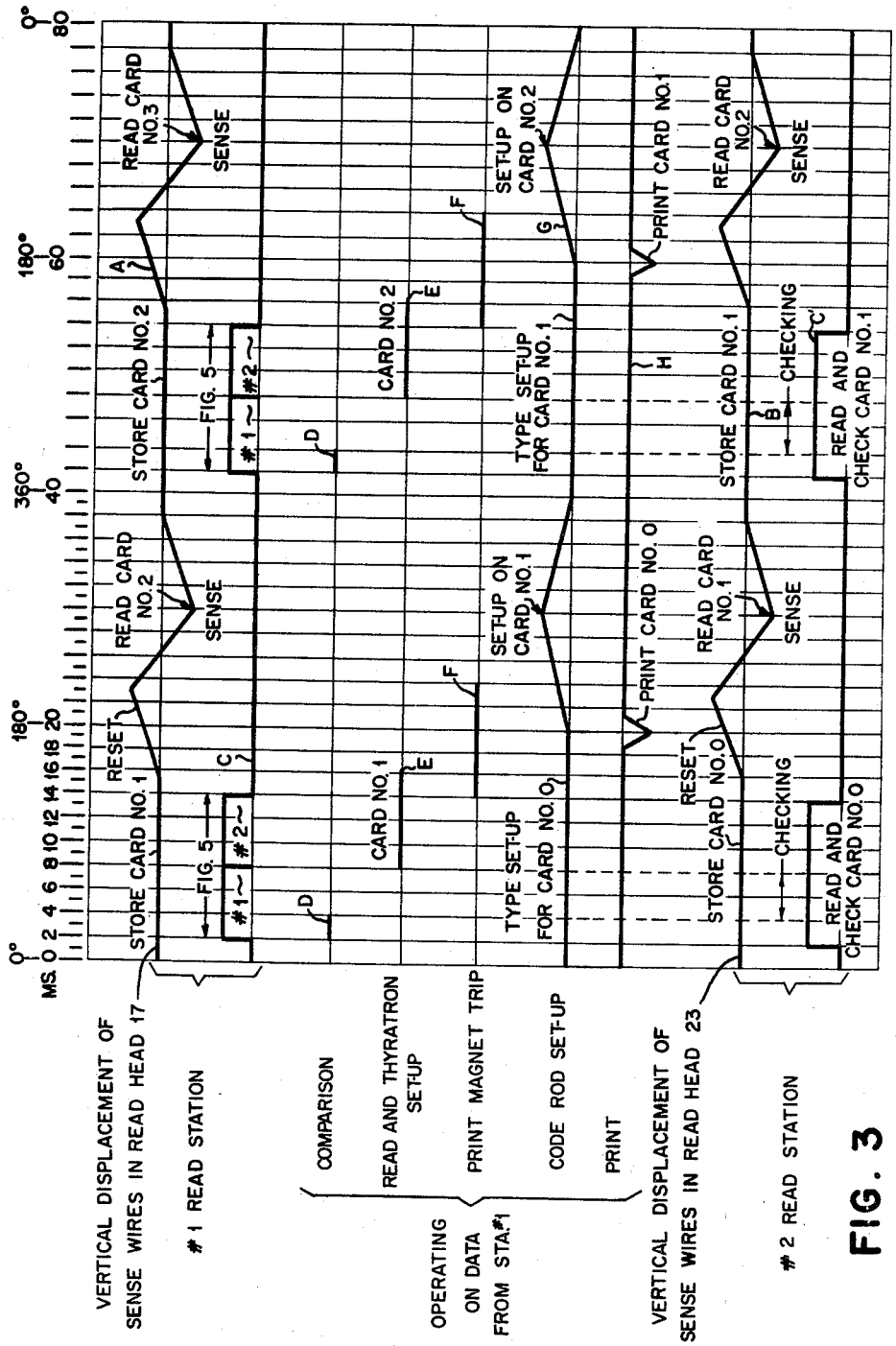

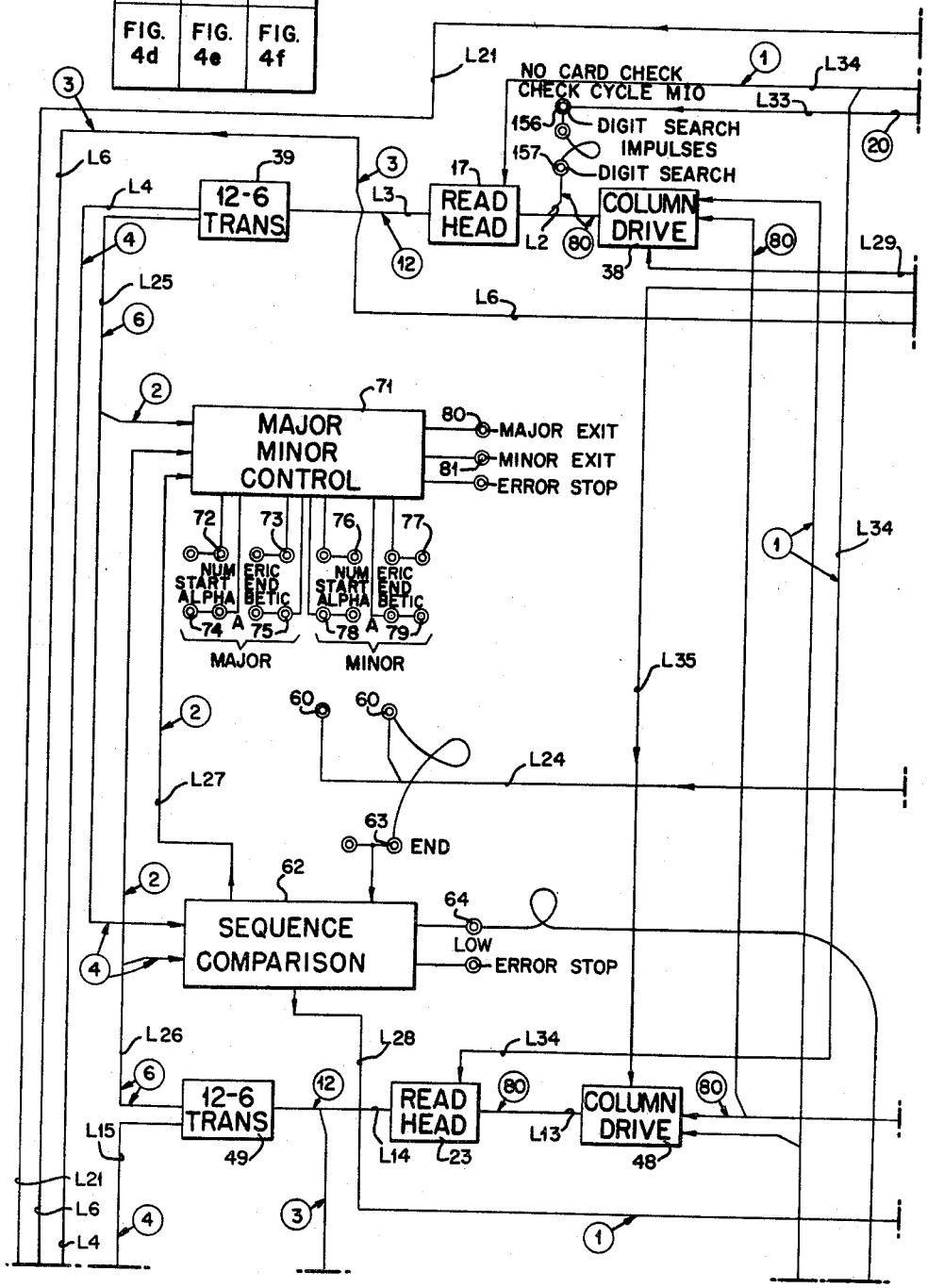

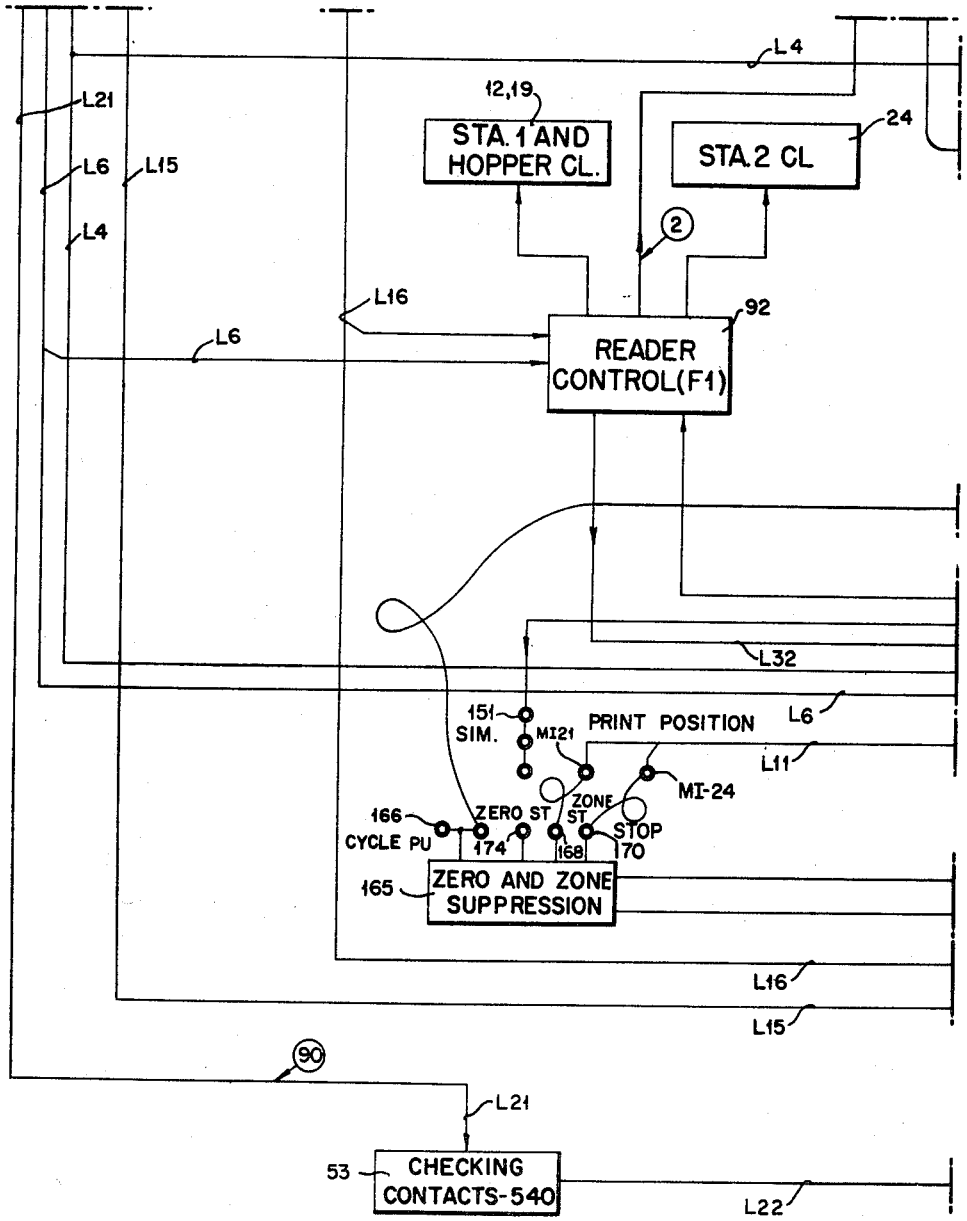
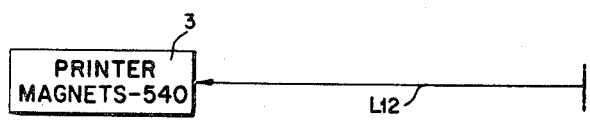
FIG. 4d

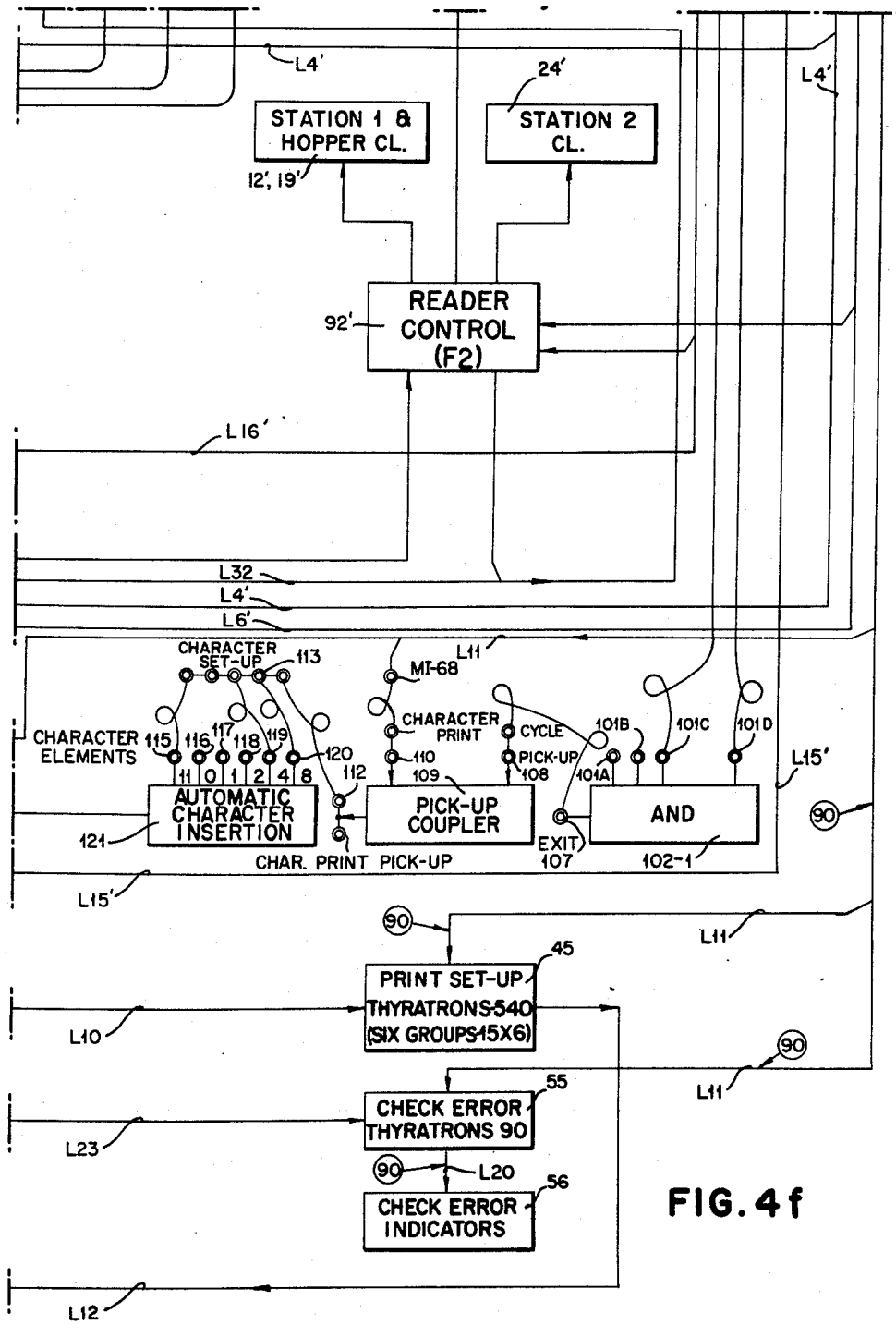

April 12, 1960
F. A. FOSS
2,932,249
HIGH SPEED LISTER WITH AUTOMATIC
VERIFICATION OF LISTING ACCURACY
Filed Nov. 13, 1957
61 Sheets-Sheet 11
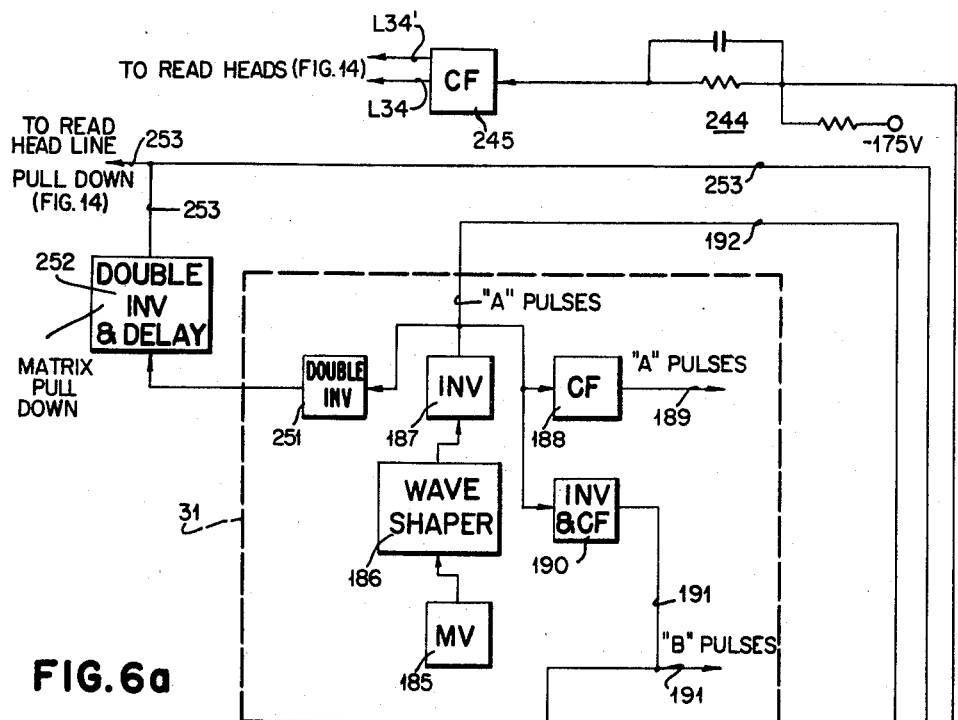
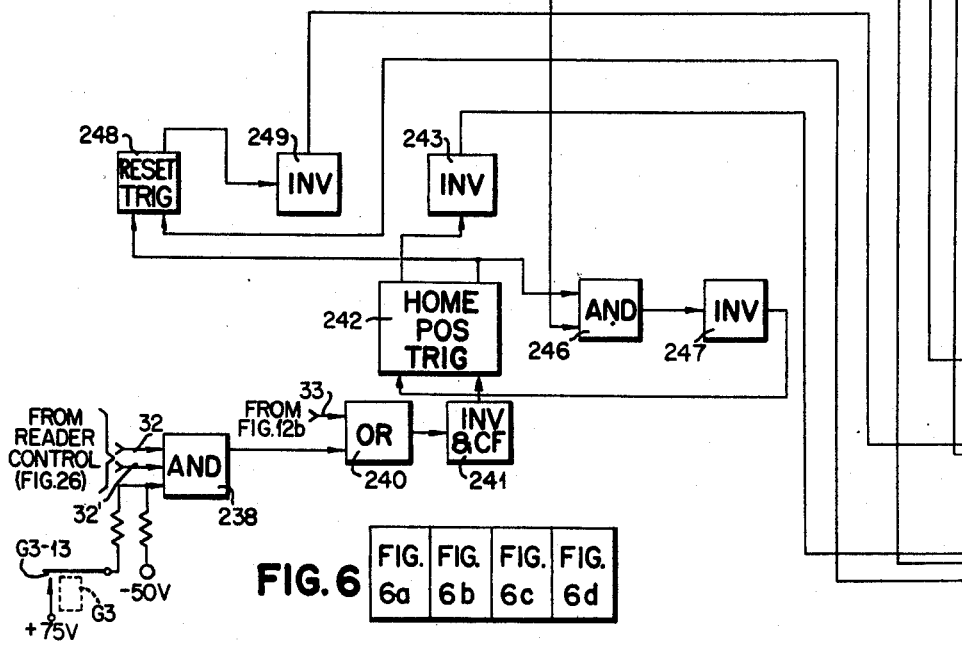

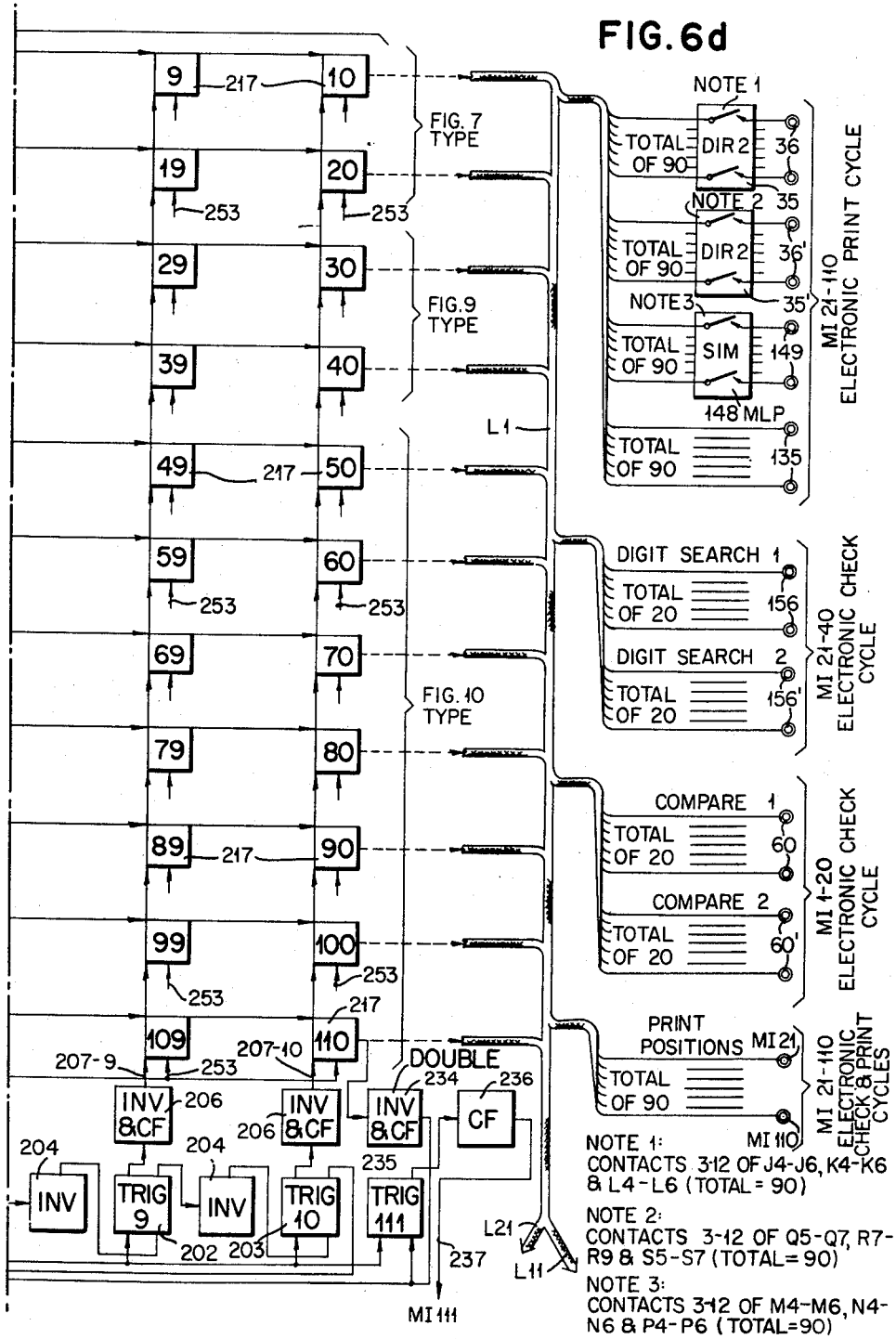

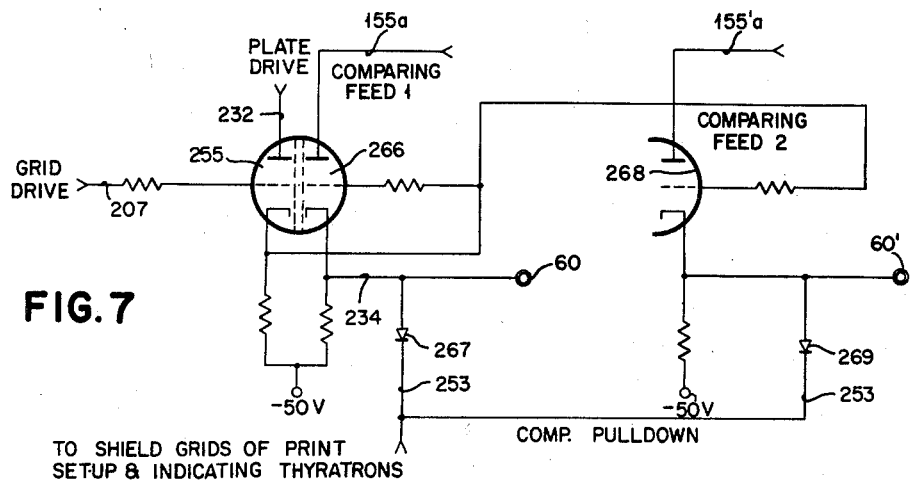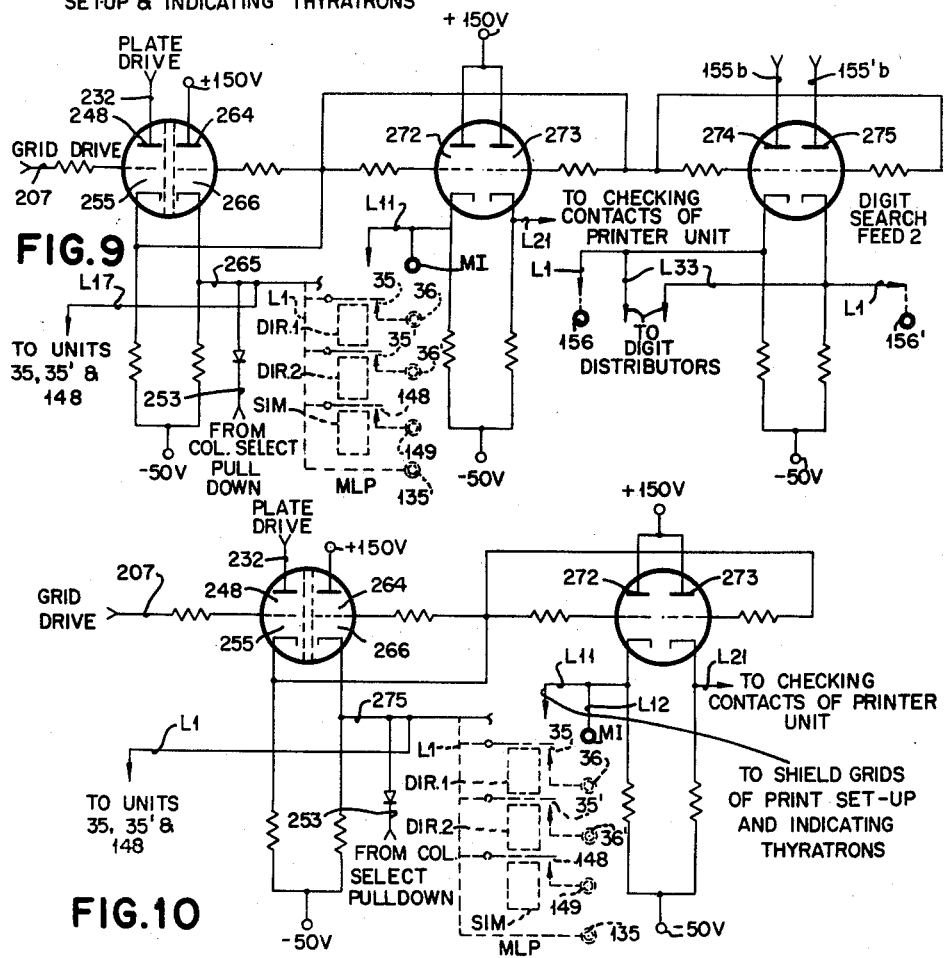

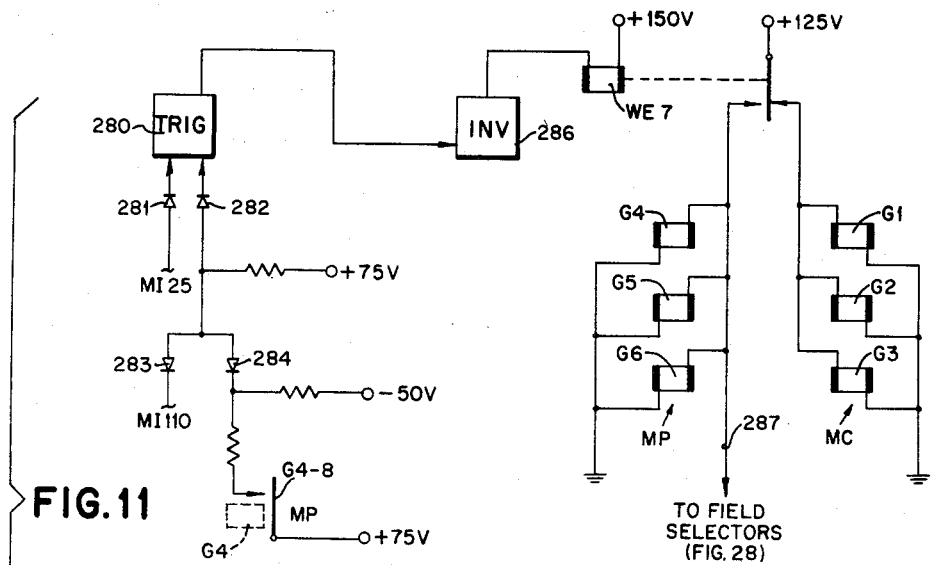
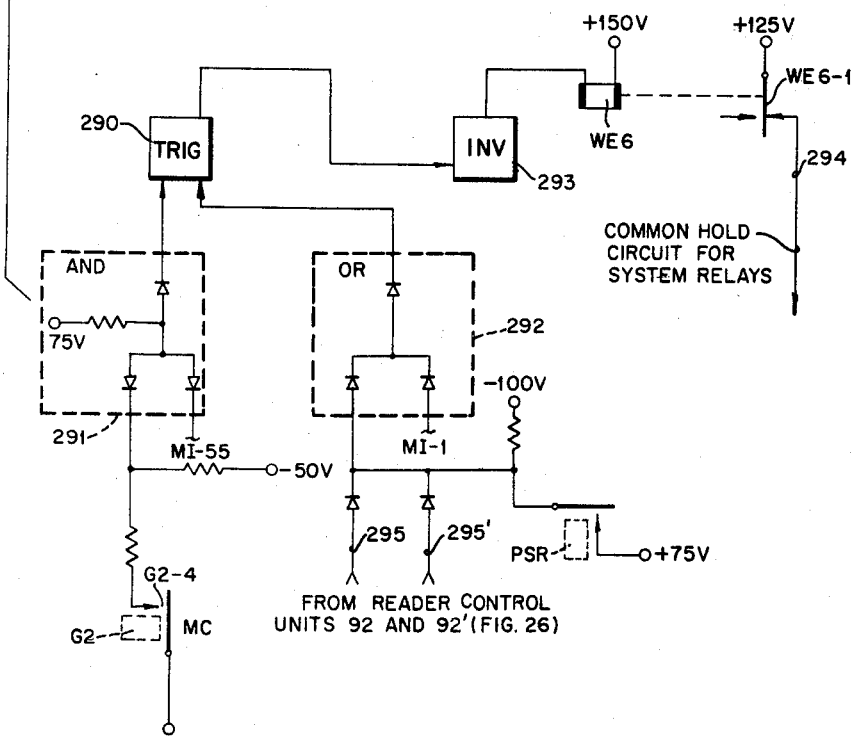
FIG.11

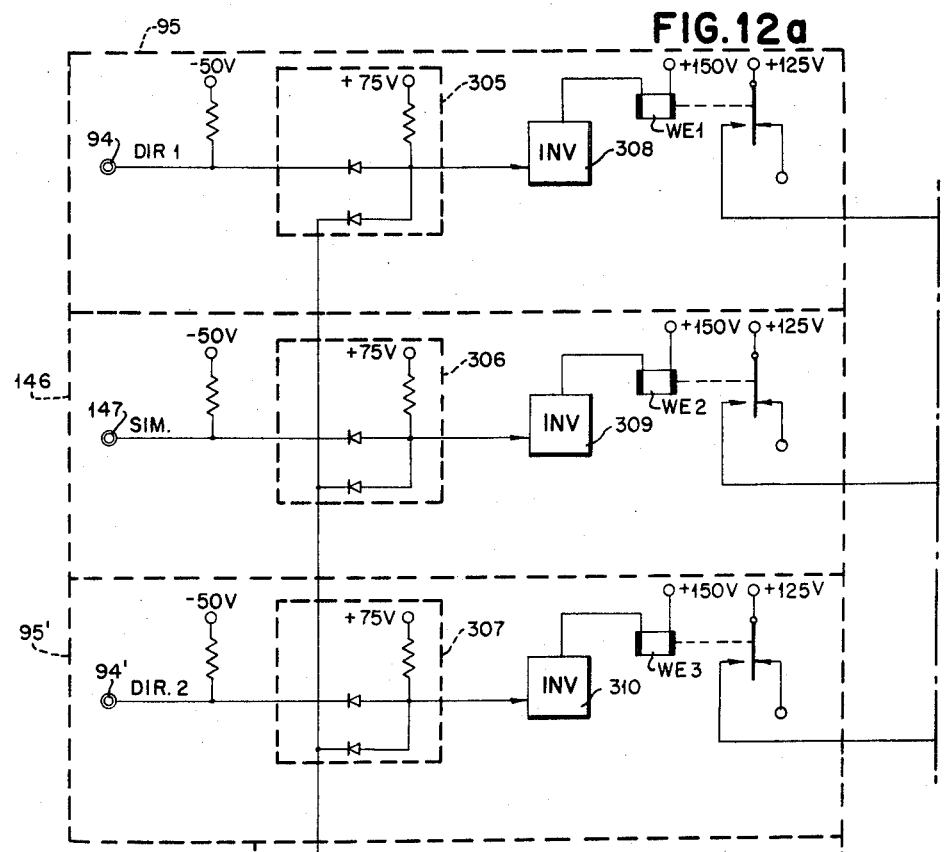
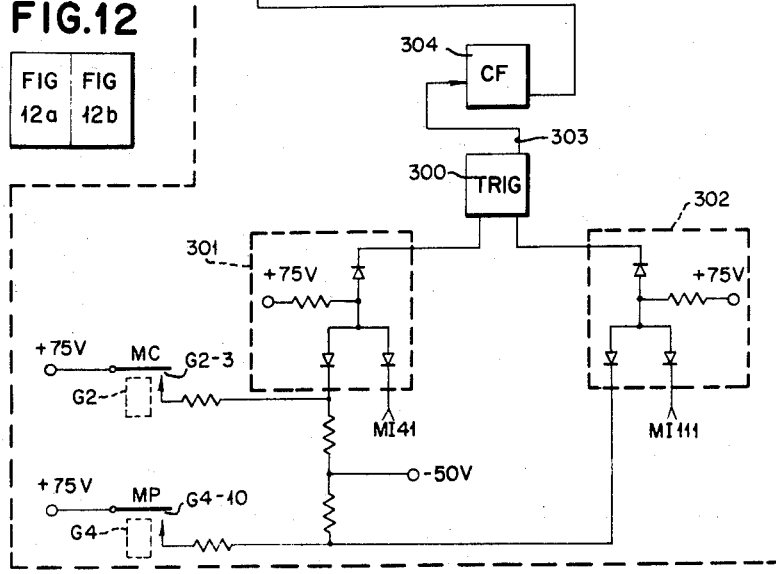

April 12, 1960

F. A. FOSS 2,932,249

HIGH SPEED LISTER WITH AUTOMATIC
VERIFICATION OF LISTING ACCURACY

Filed Nov. 13, 1957

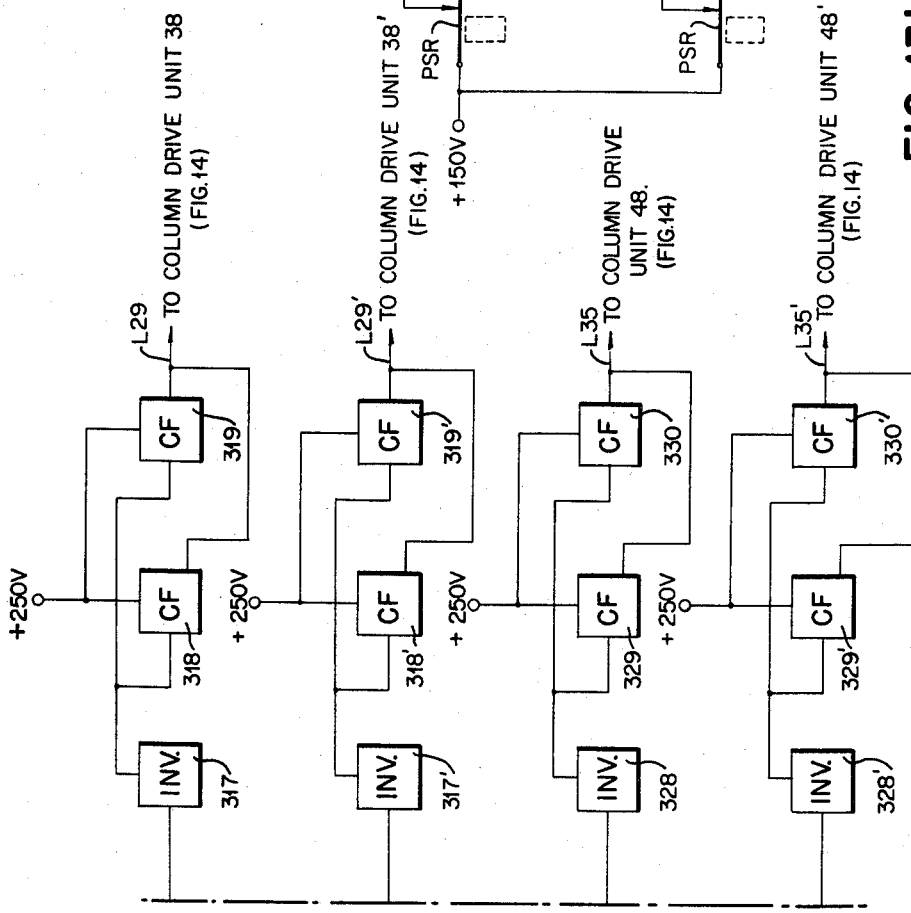

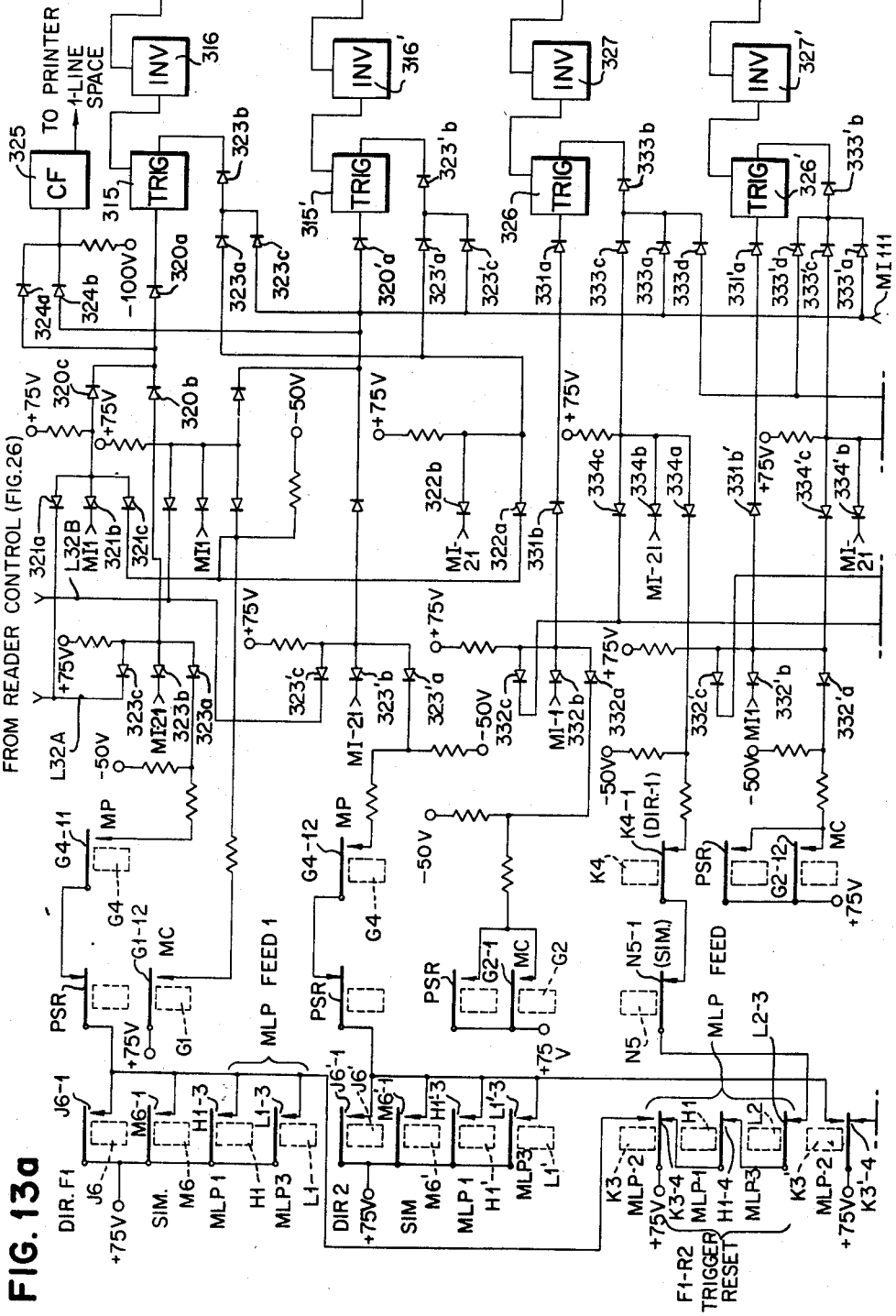

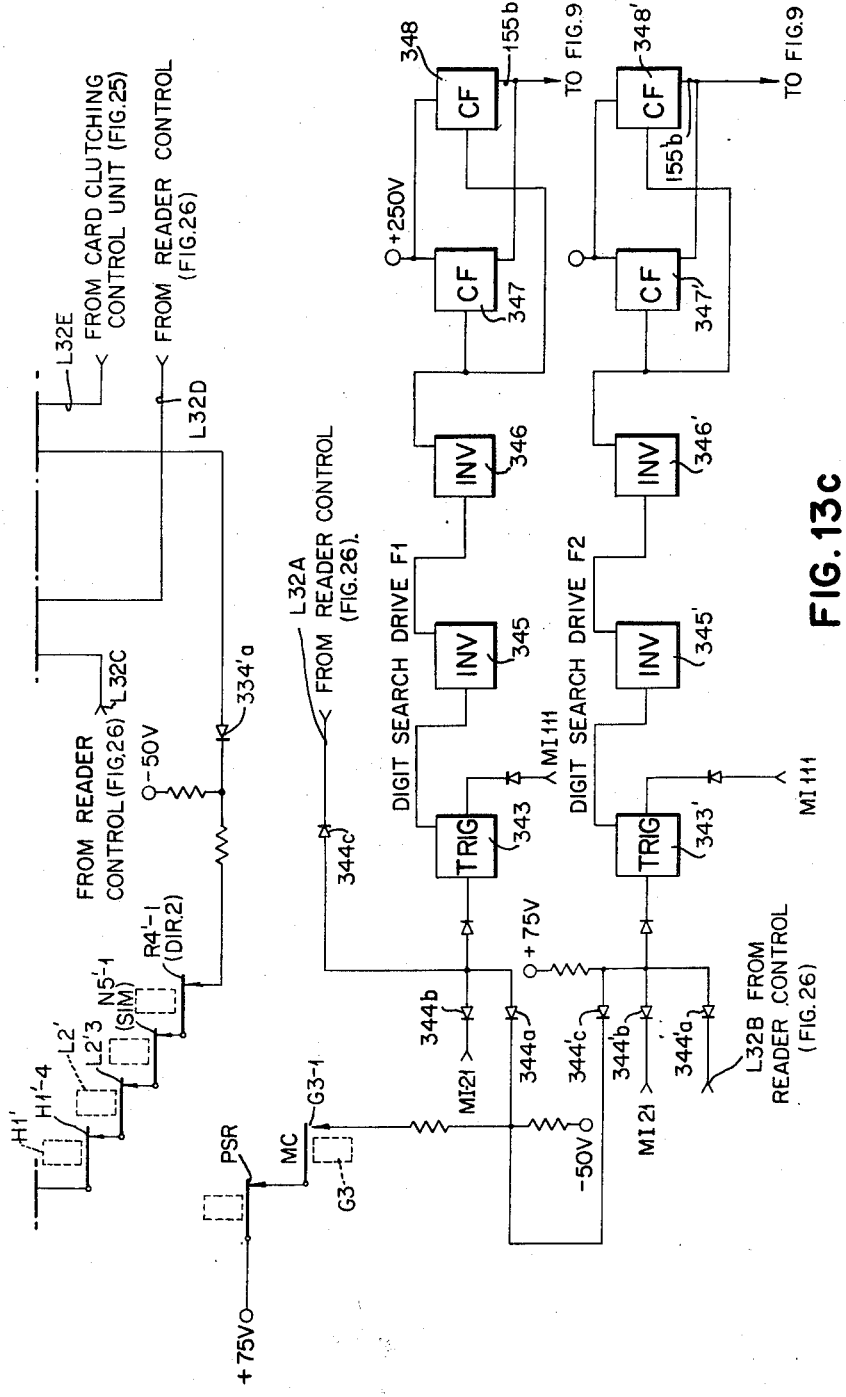

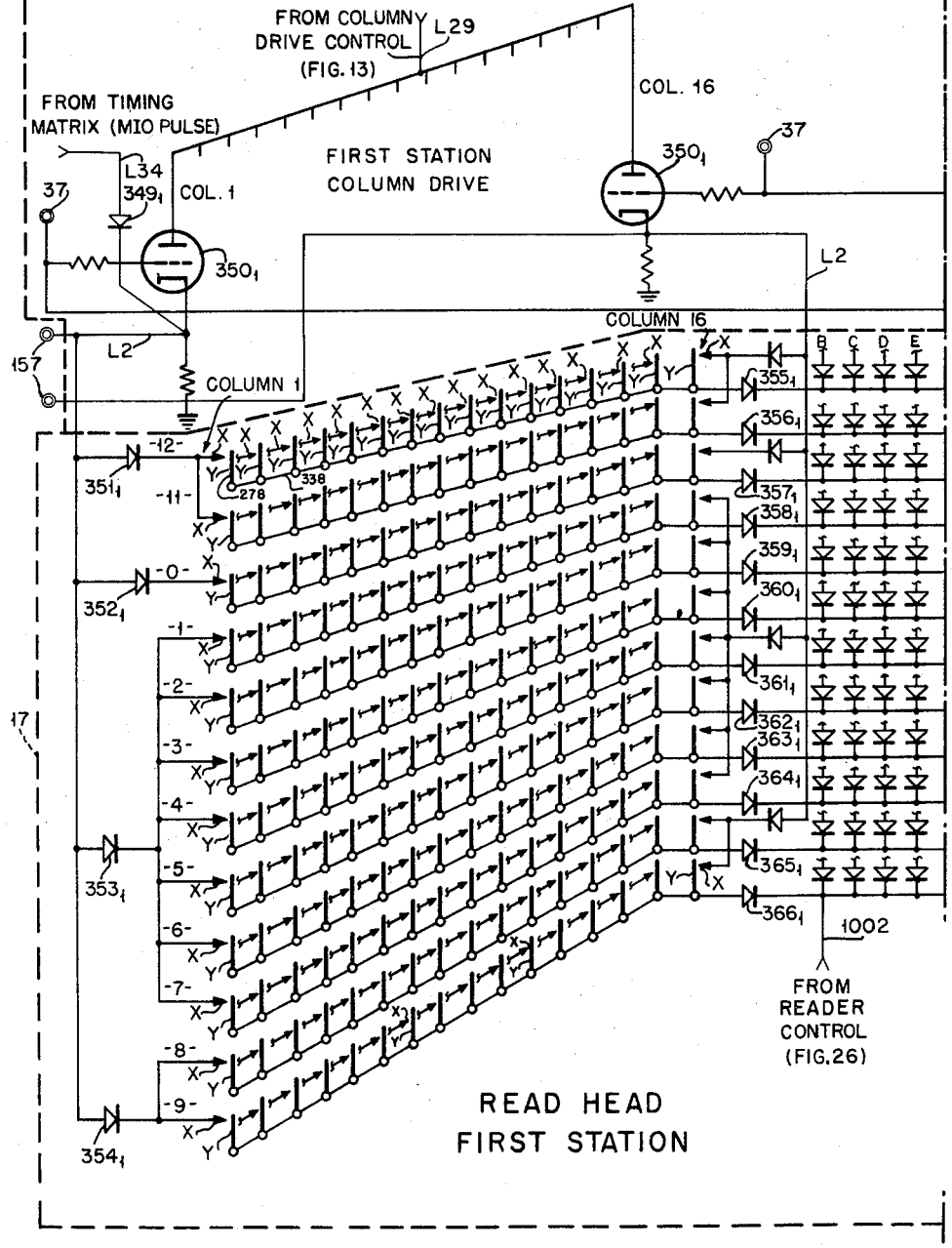

April 12, 1960

F. A. FOSS 2,932,249

HIGH SPEED LISTER WITH AUTOMATIC
VERIFICATION OF LISTING ACCURACY

Filed Nov. 13, 1957

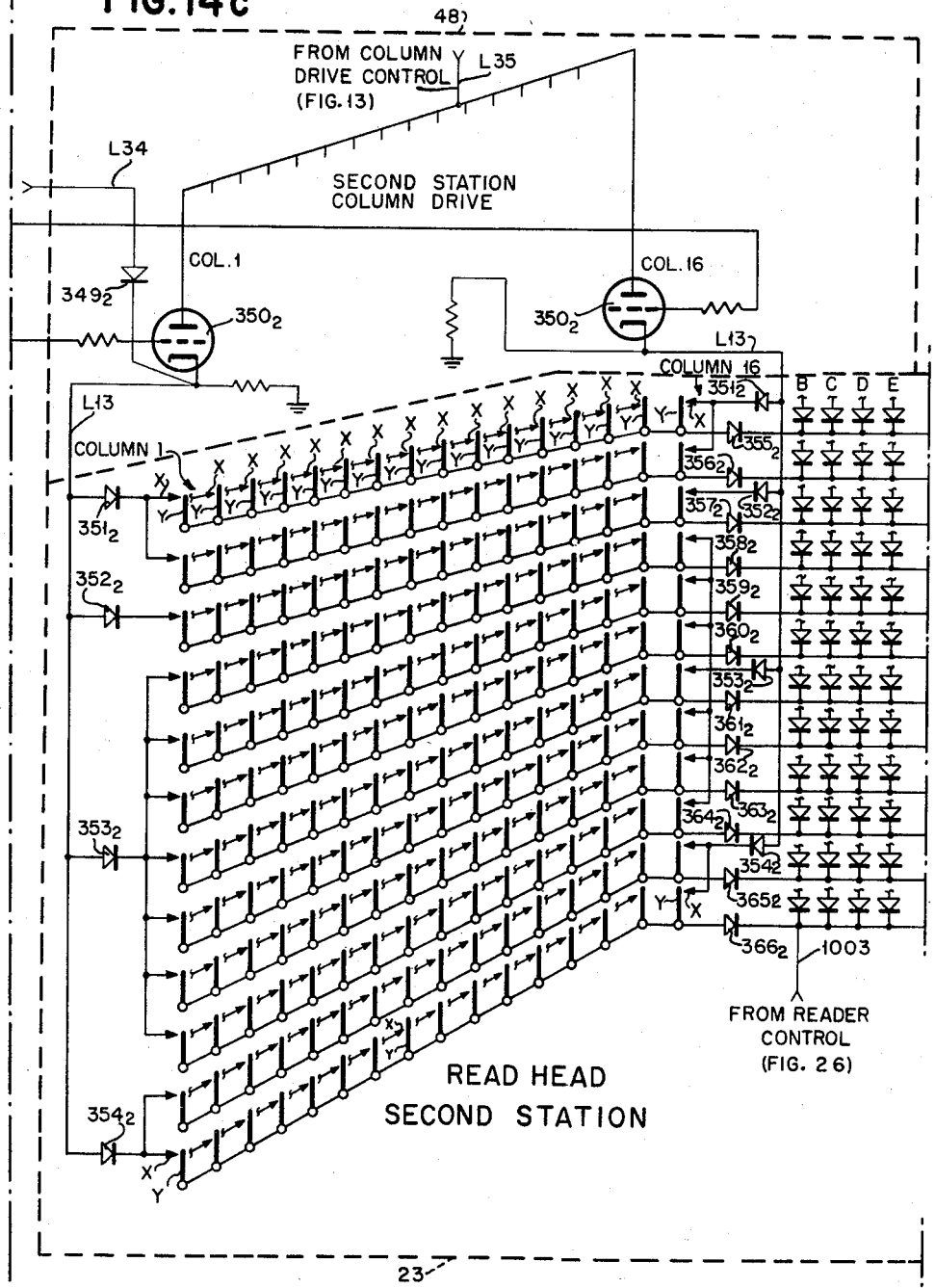

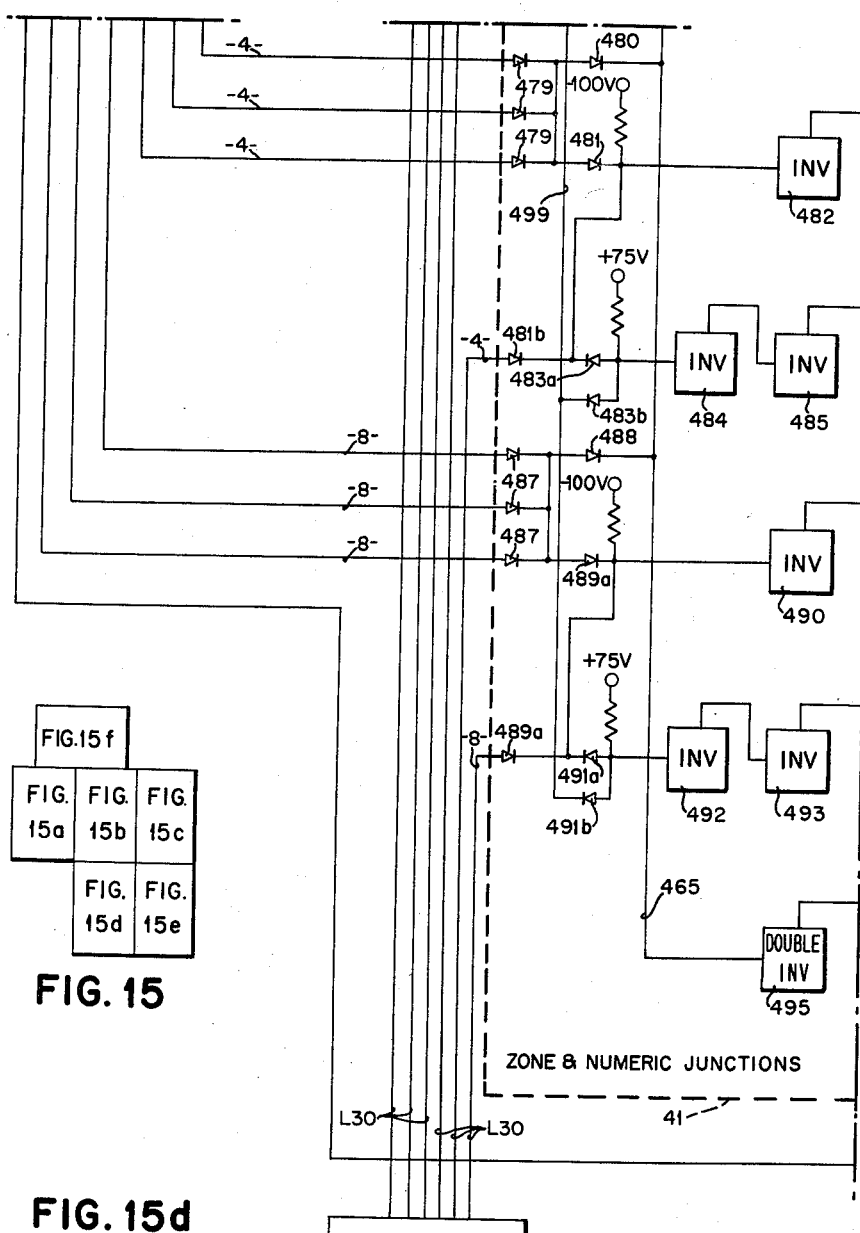

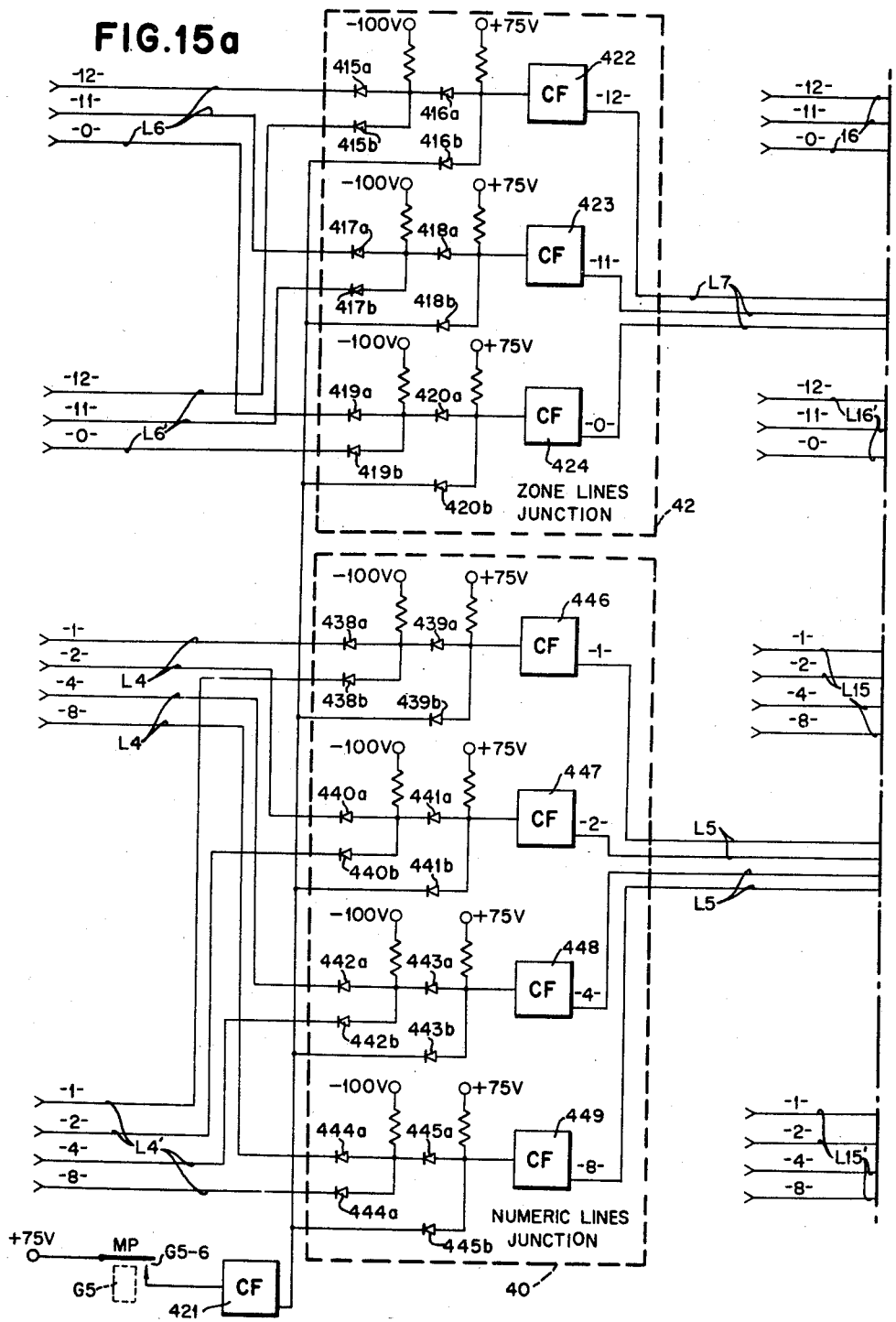

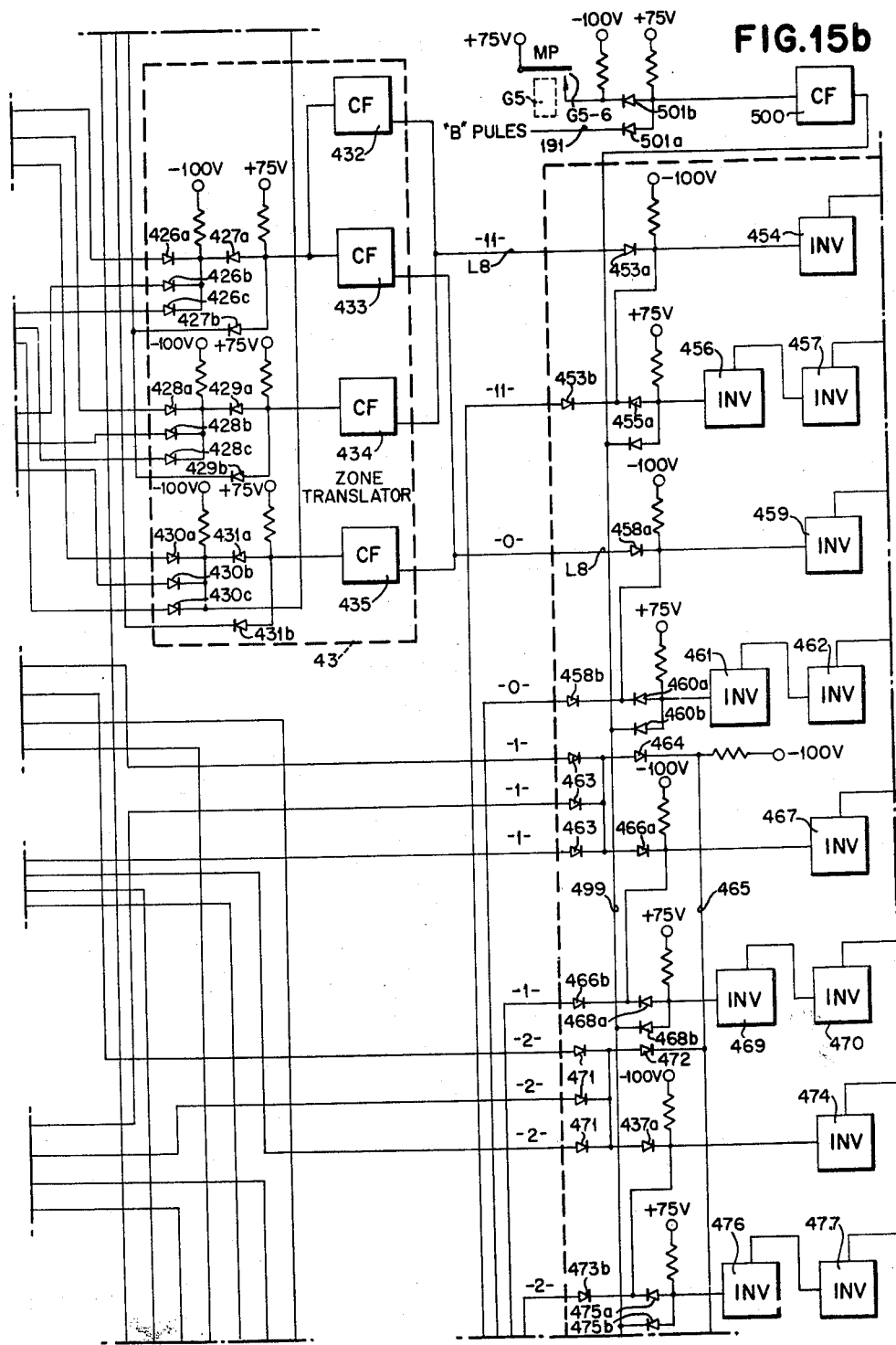

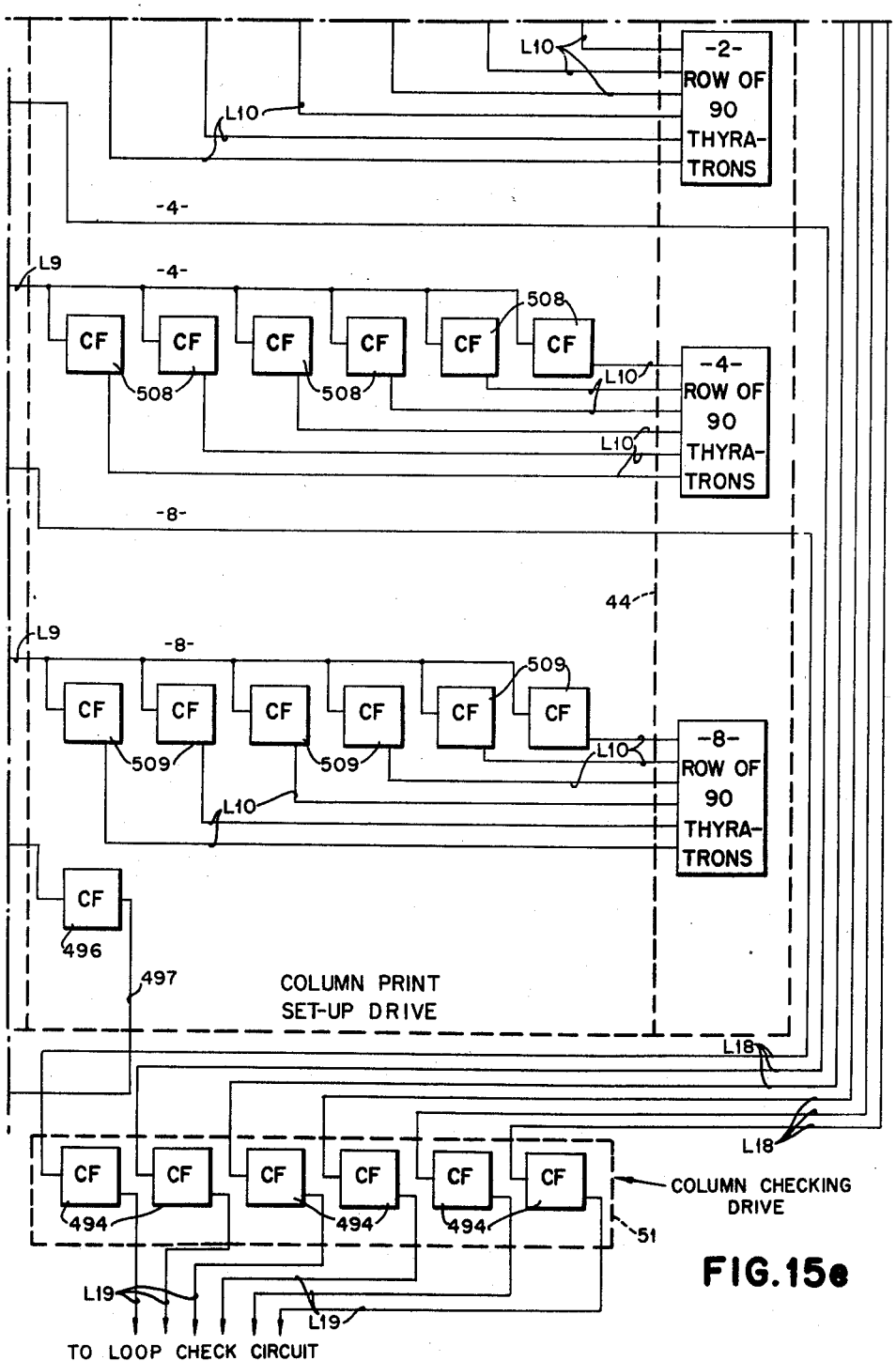

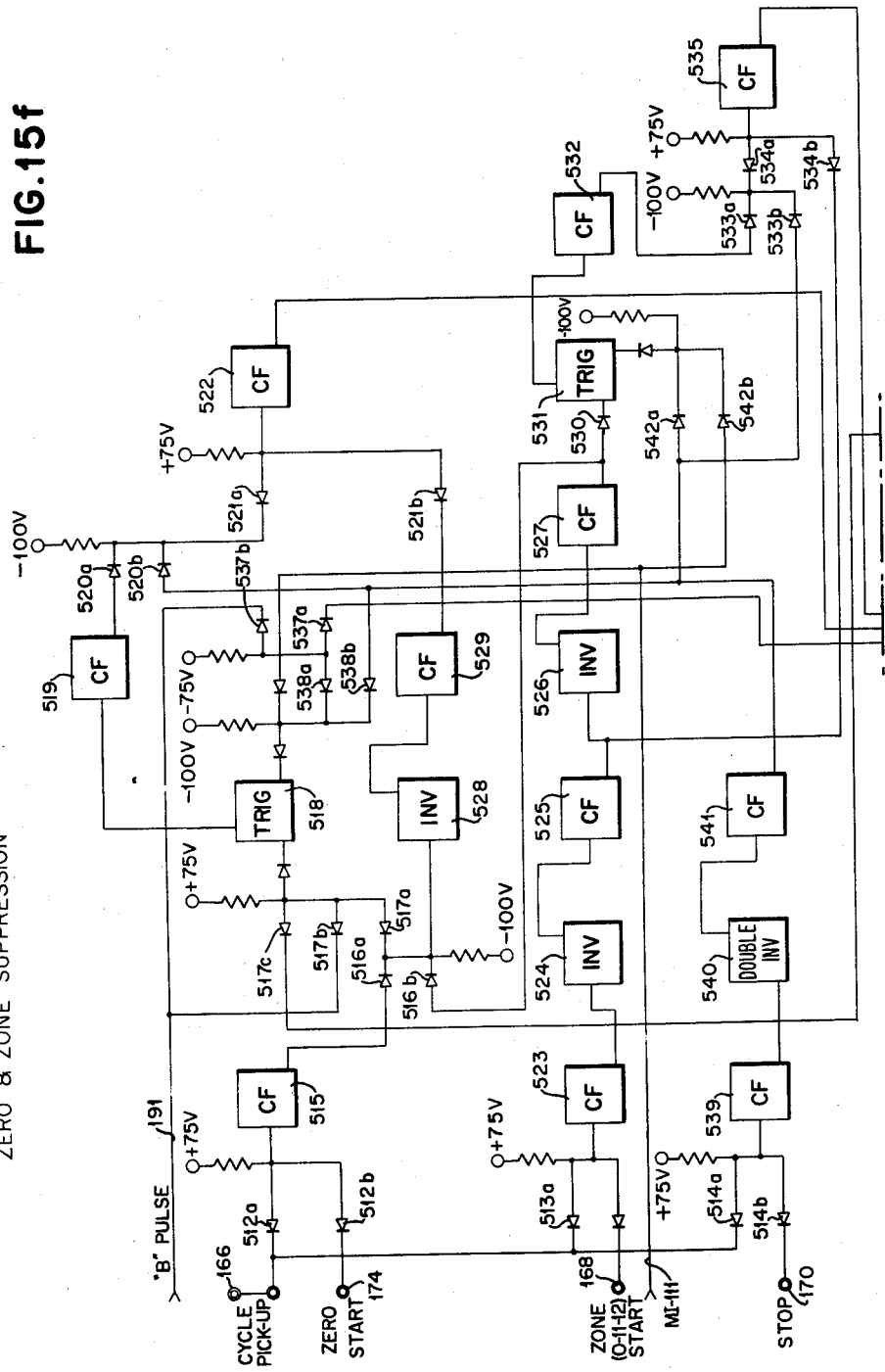

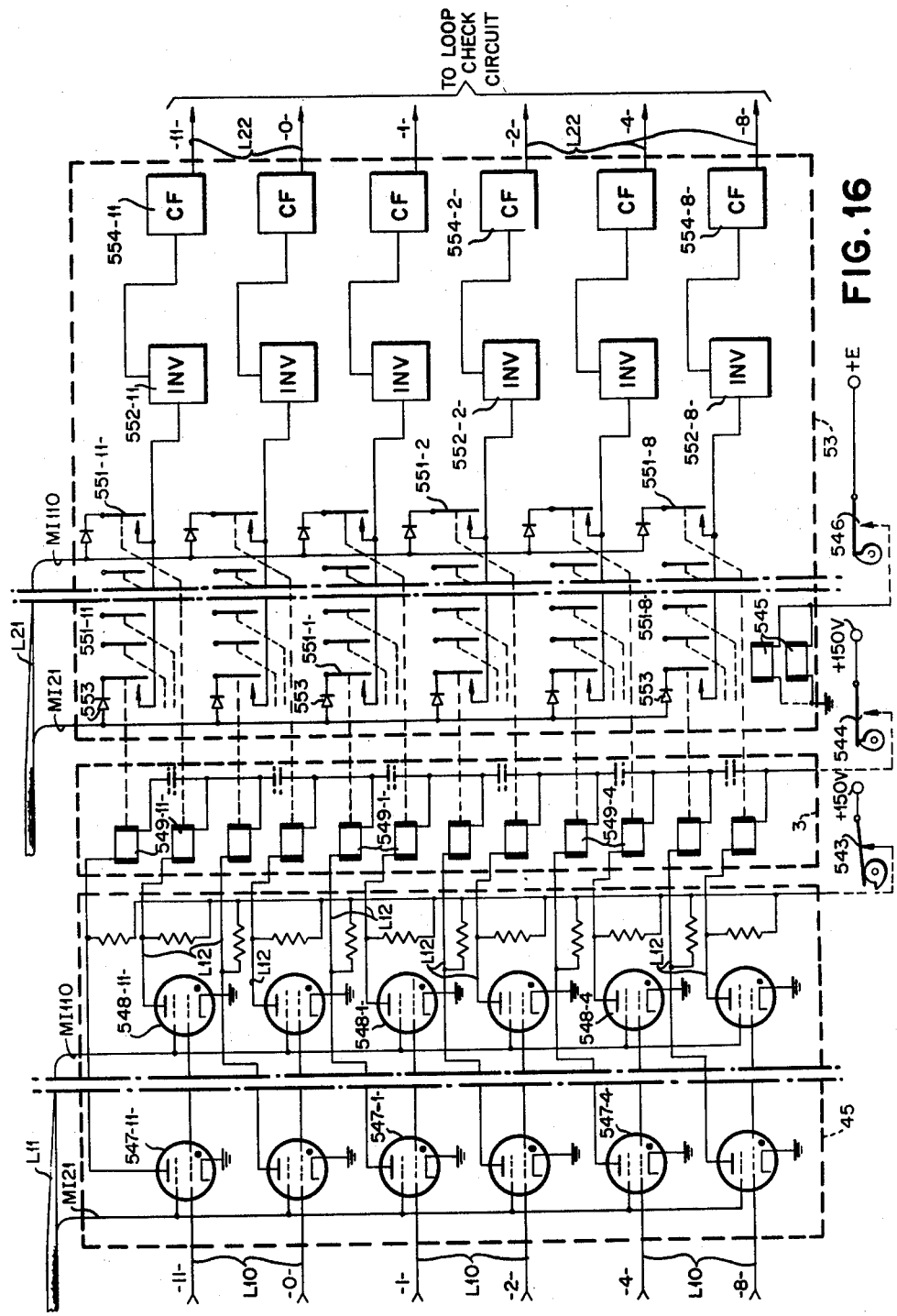

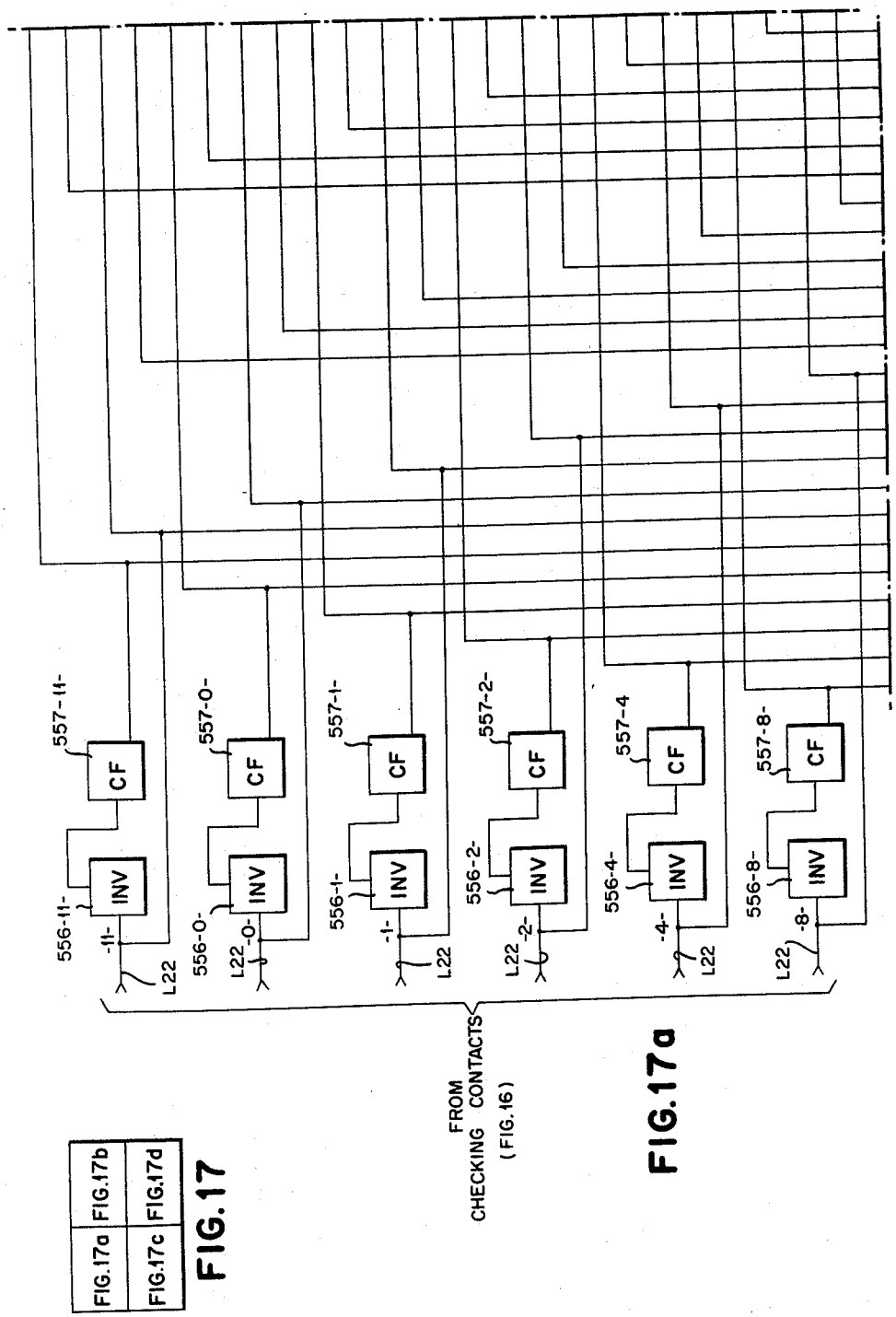

April 12, 1960

F. A. FOSS 2,932,249

HIGH SPEED LISTER WITH AUTOMATIC
VERIFICATION OF LISTING ACCURACY

Filed Nov. 13, 1957

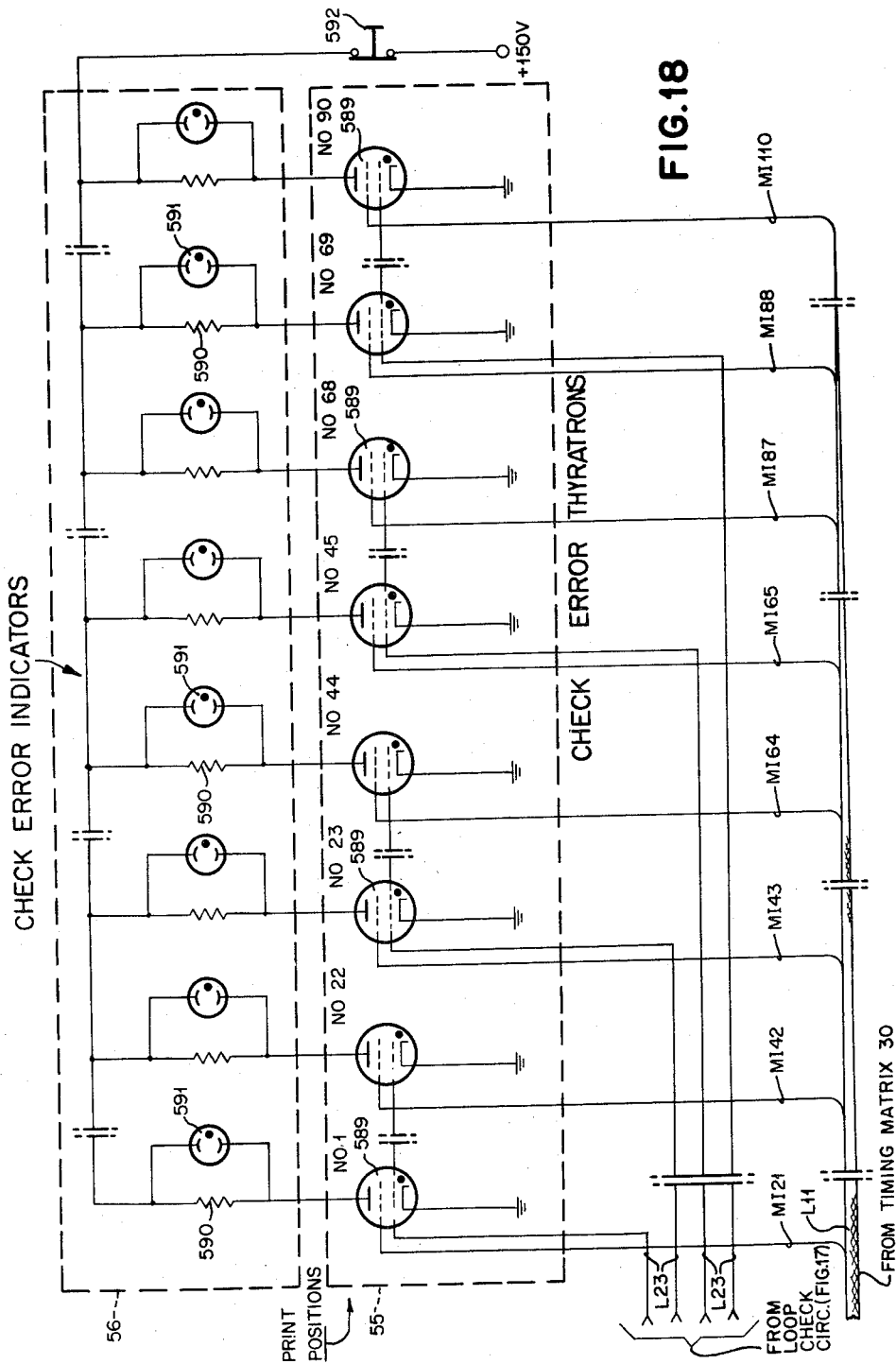

April 12, 1960
F. A. FOSS
2,932,249
HIGH SPEED LISTER WITH AUTOMATIC
VERIFICATION OF LISTING ACCURACY
Filed Nov. 13, 1957
61 Sheets-Sheet 38
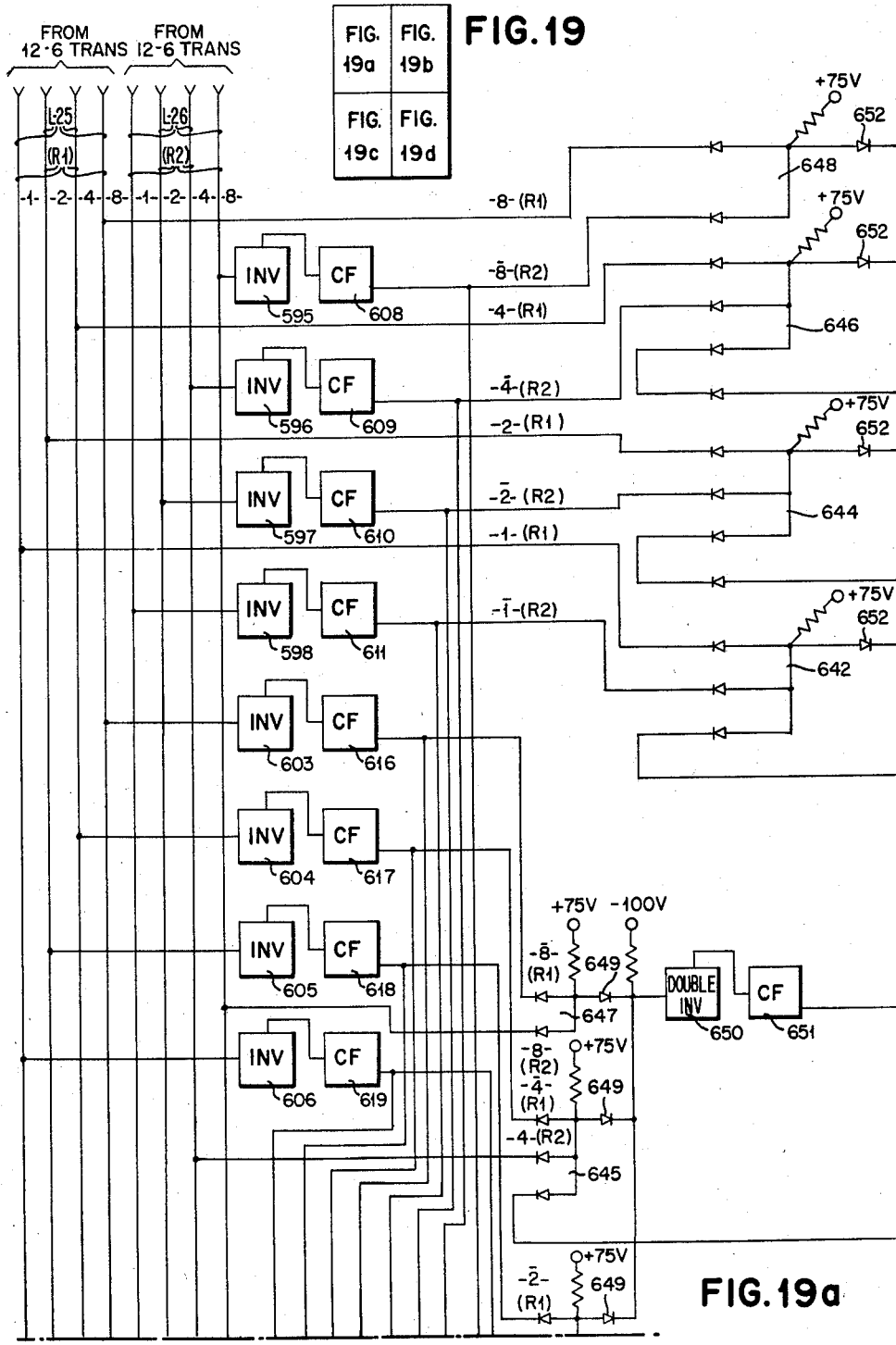

April 12, 1960

F. A. FOSS 2,932,249

HIGH SPEED LISTER WITH AUTOMATIC
VERIFICATION OF LISTING ACCURACY

Filed Nov. 13, 1957

April 12, 1960 F. A. FOSS 2,932,249
HIGH SPEED LISTER WITH AUTOMATIC
VERIFICATION OF LISTING ACCURACY
Filed Nov. 13, 1957 61 Sheets-Sheet 42
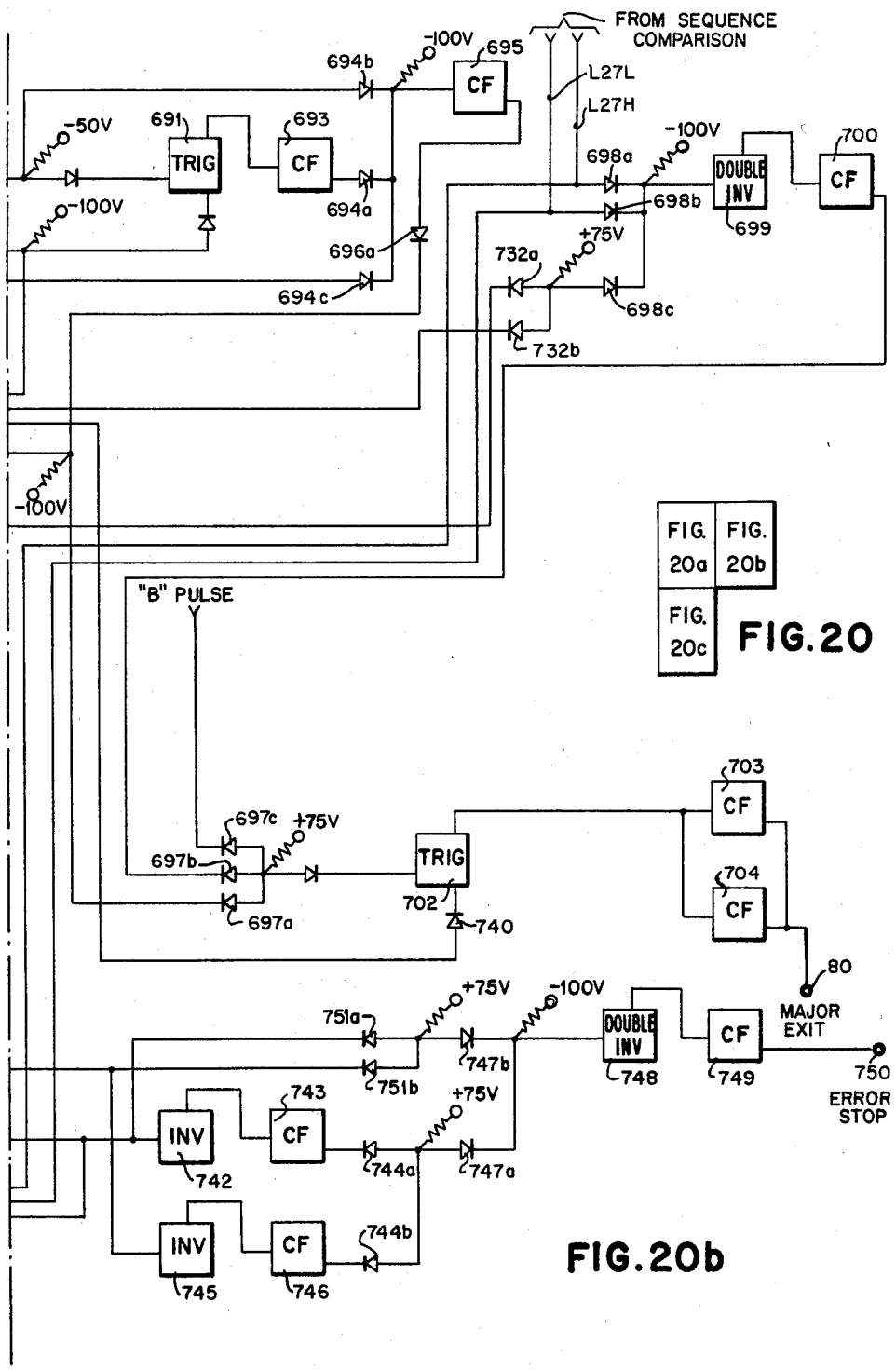

April 12, 1960
F. A. FOSS
2,932,249
HIGH SPEED LISTER WITH AUTOMATIC
VERIFICATION OF LISTING ACCURACY
Filed Nov. 13, 1957
61 Sheets-Sheet 43
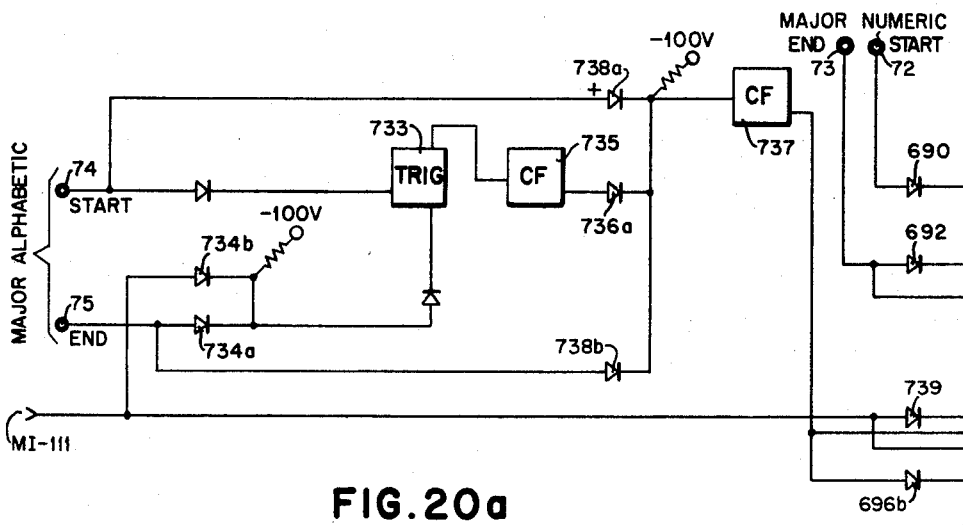
FIG. 20a
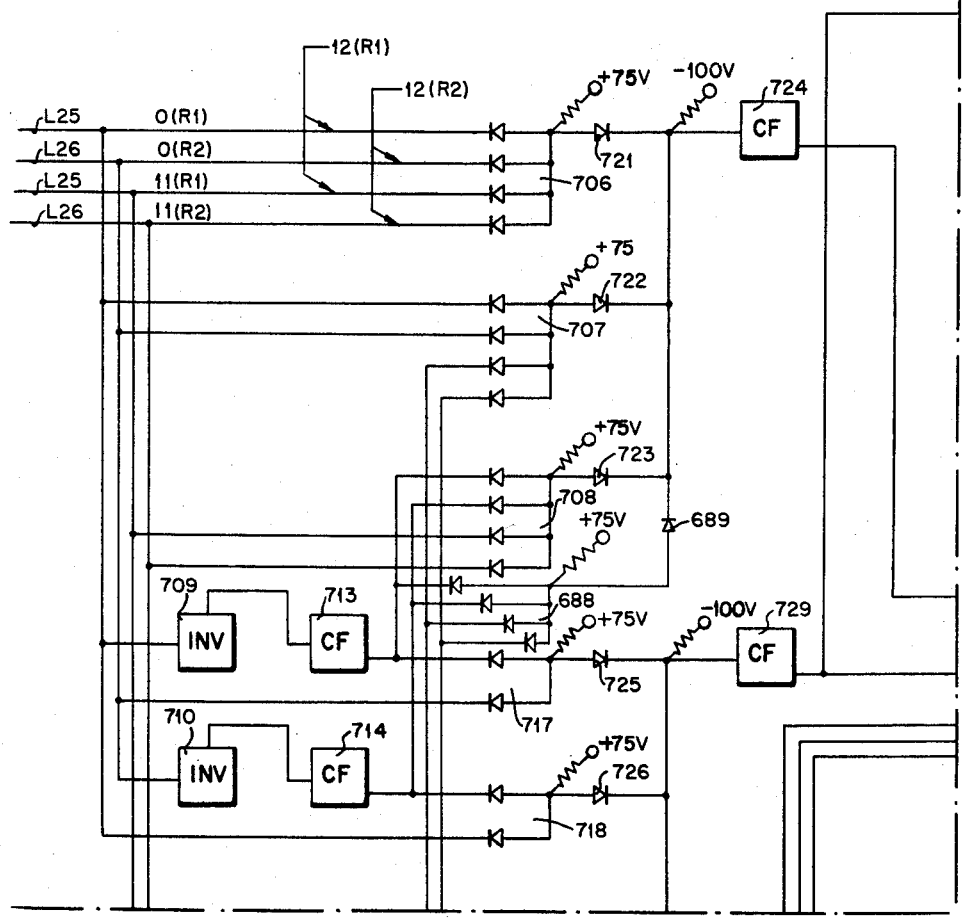

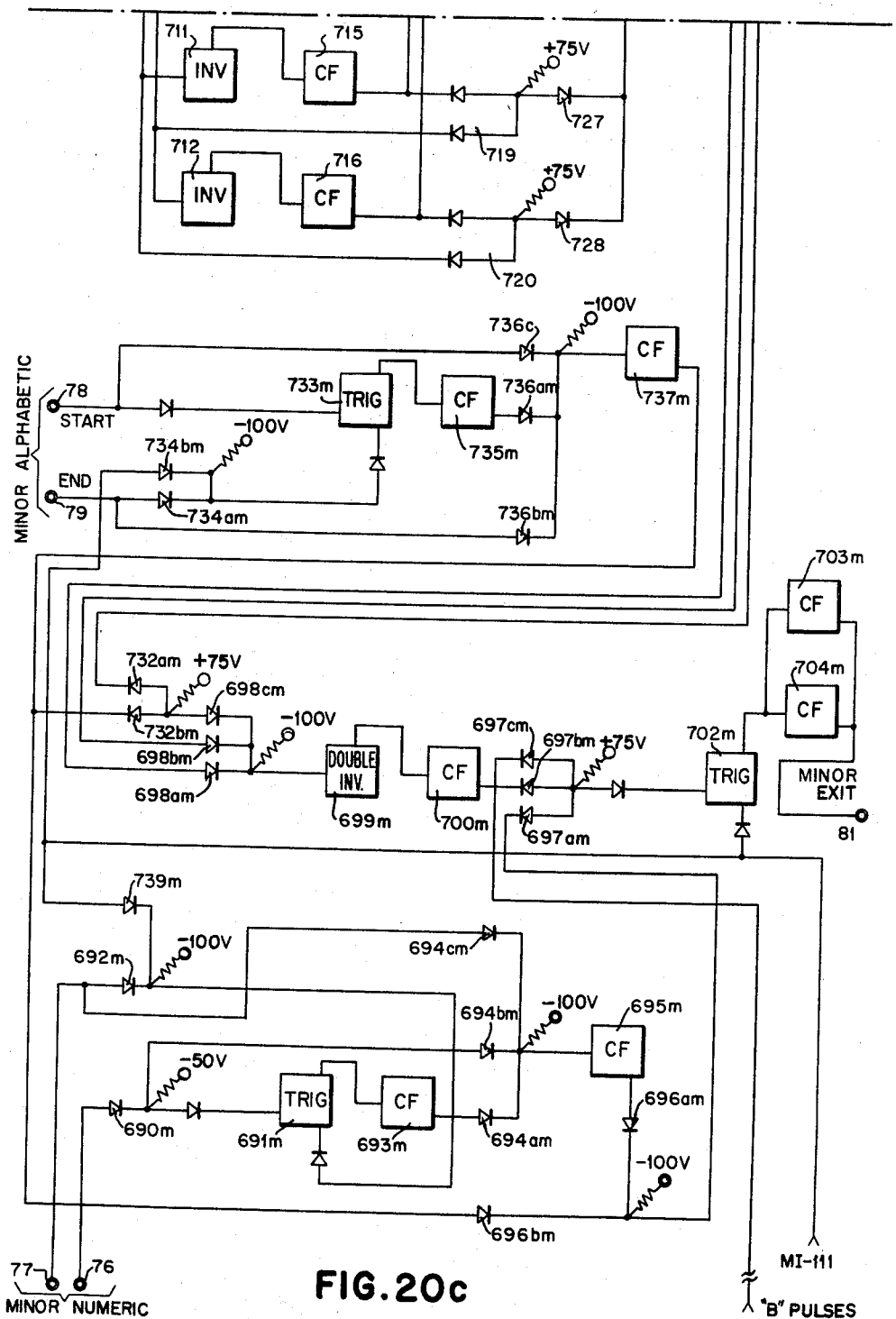

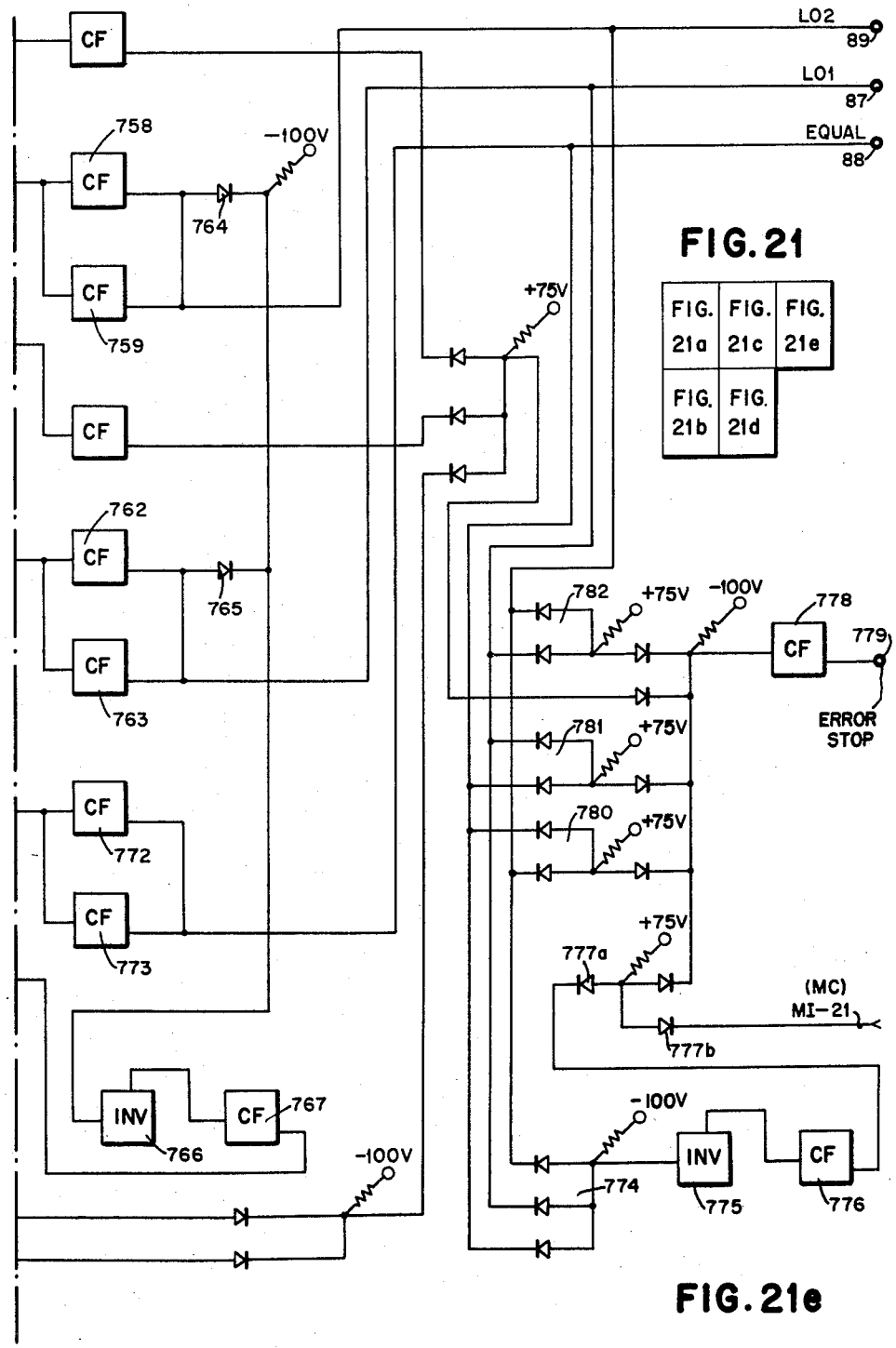

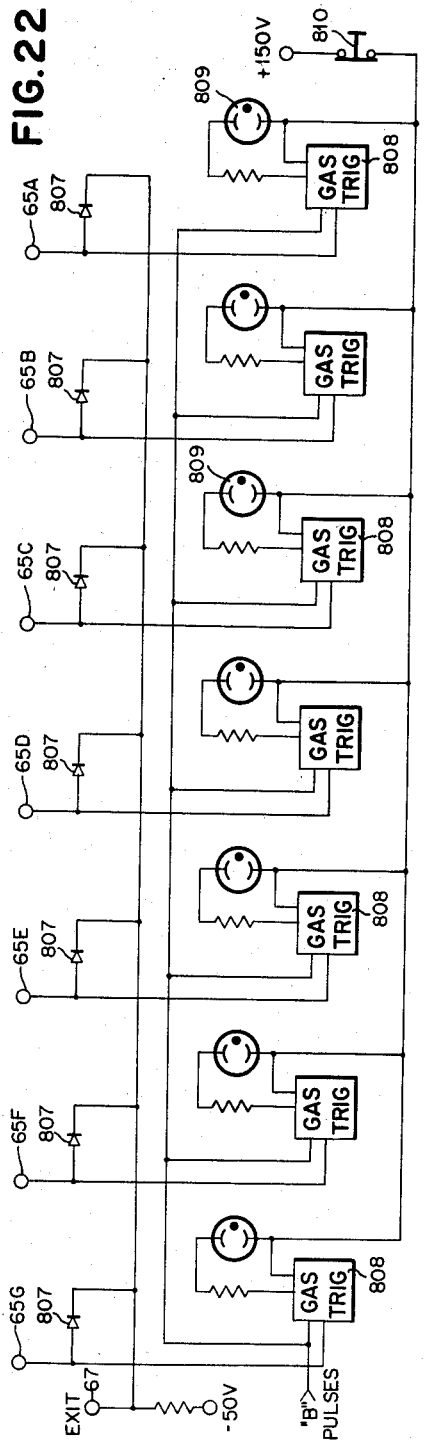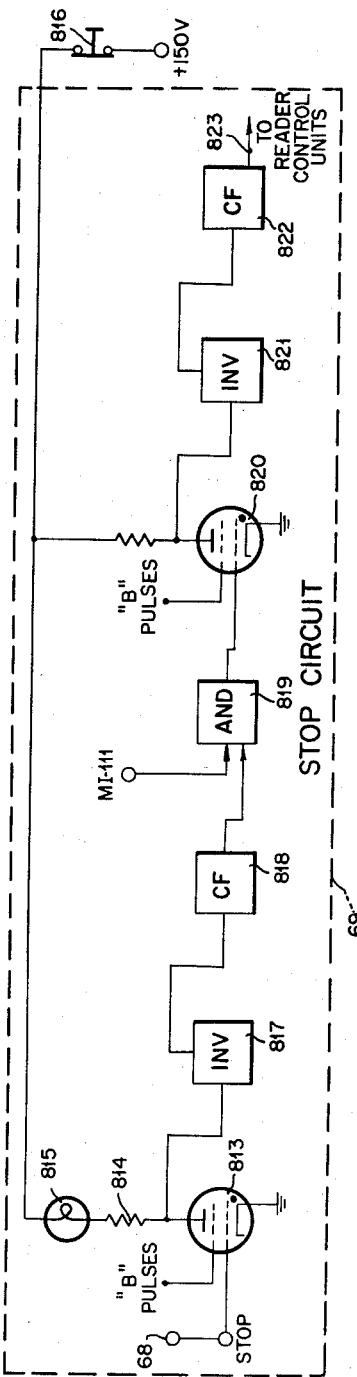

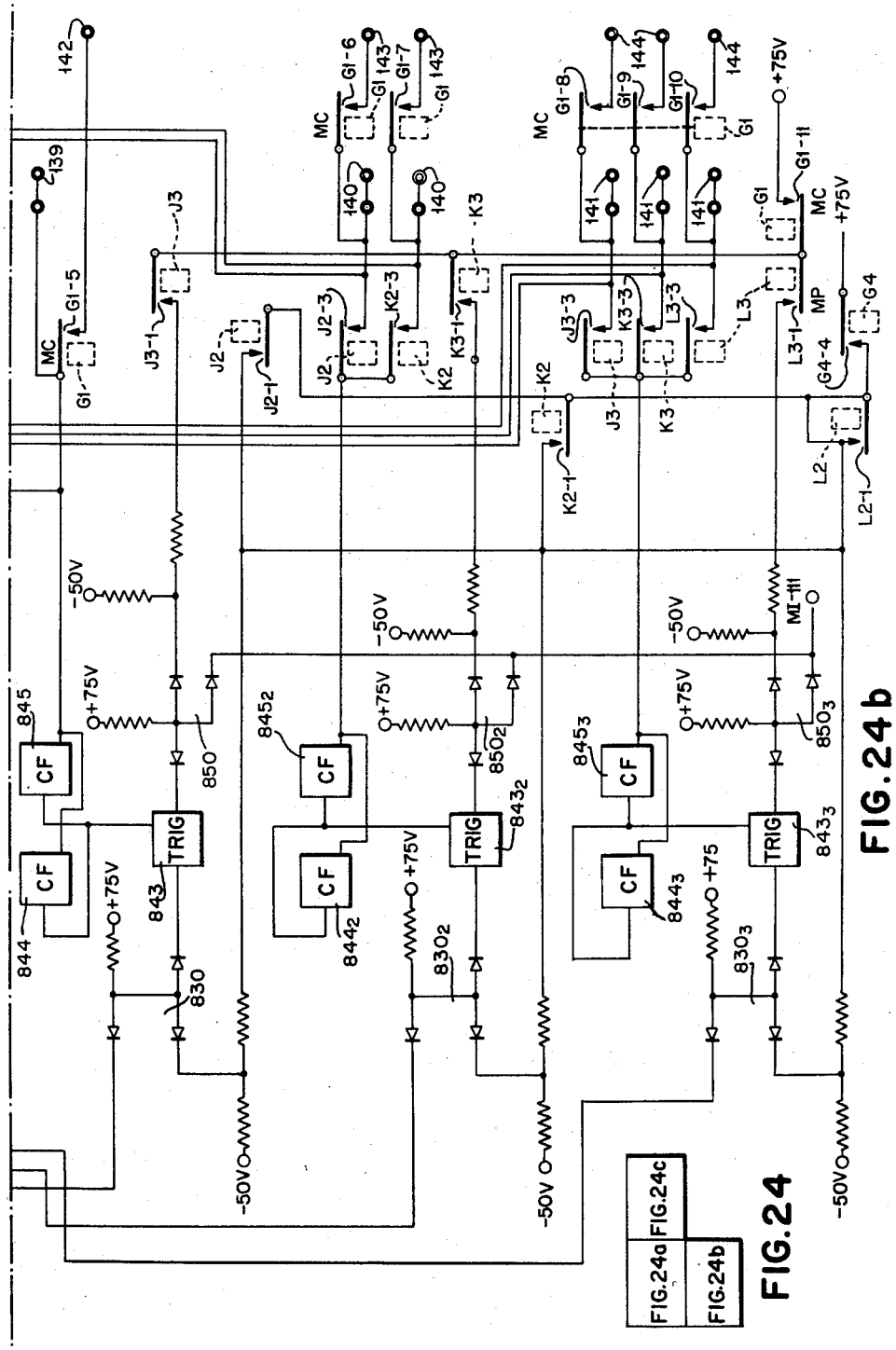

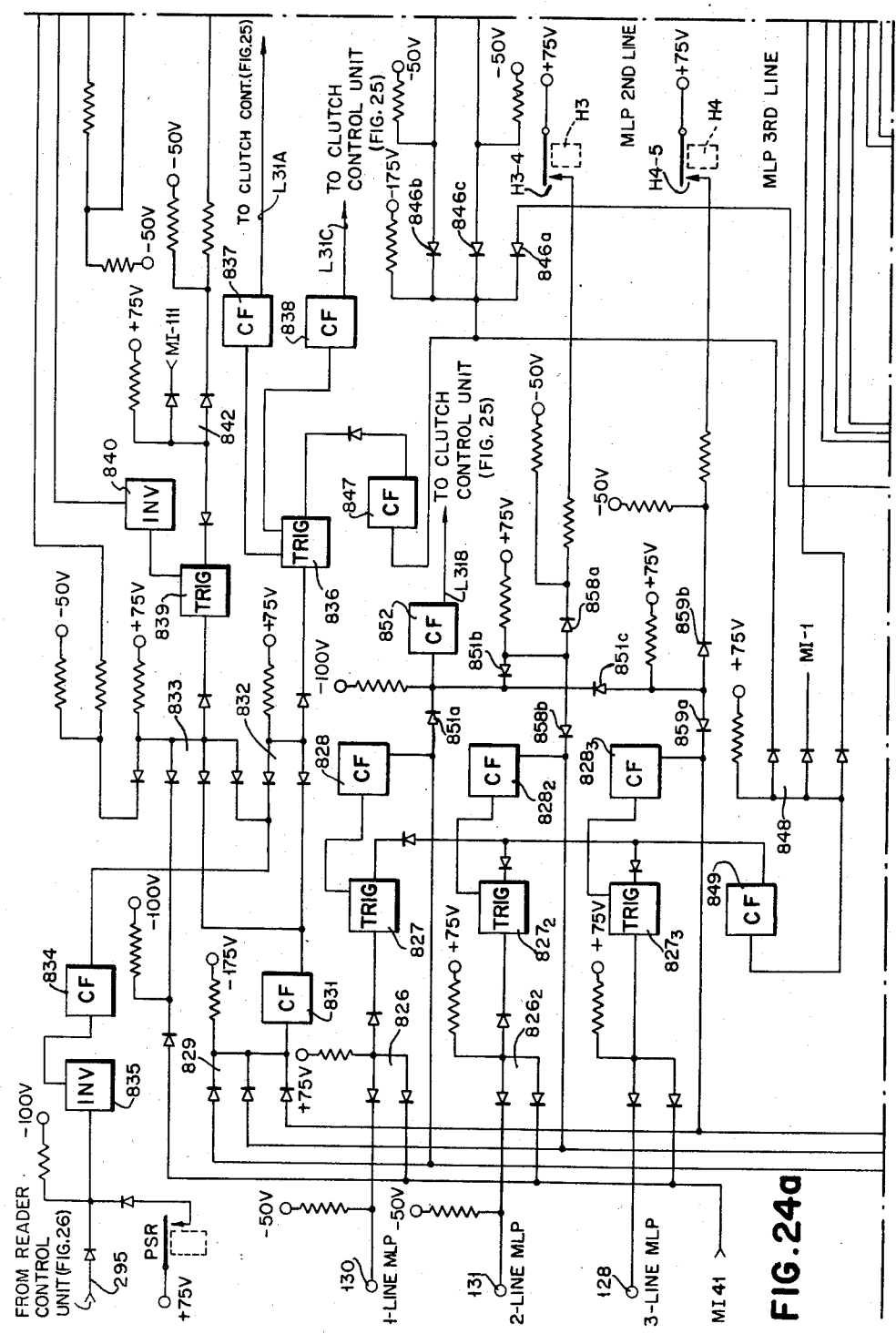

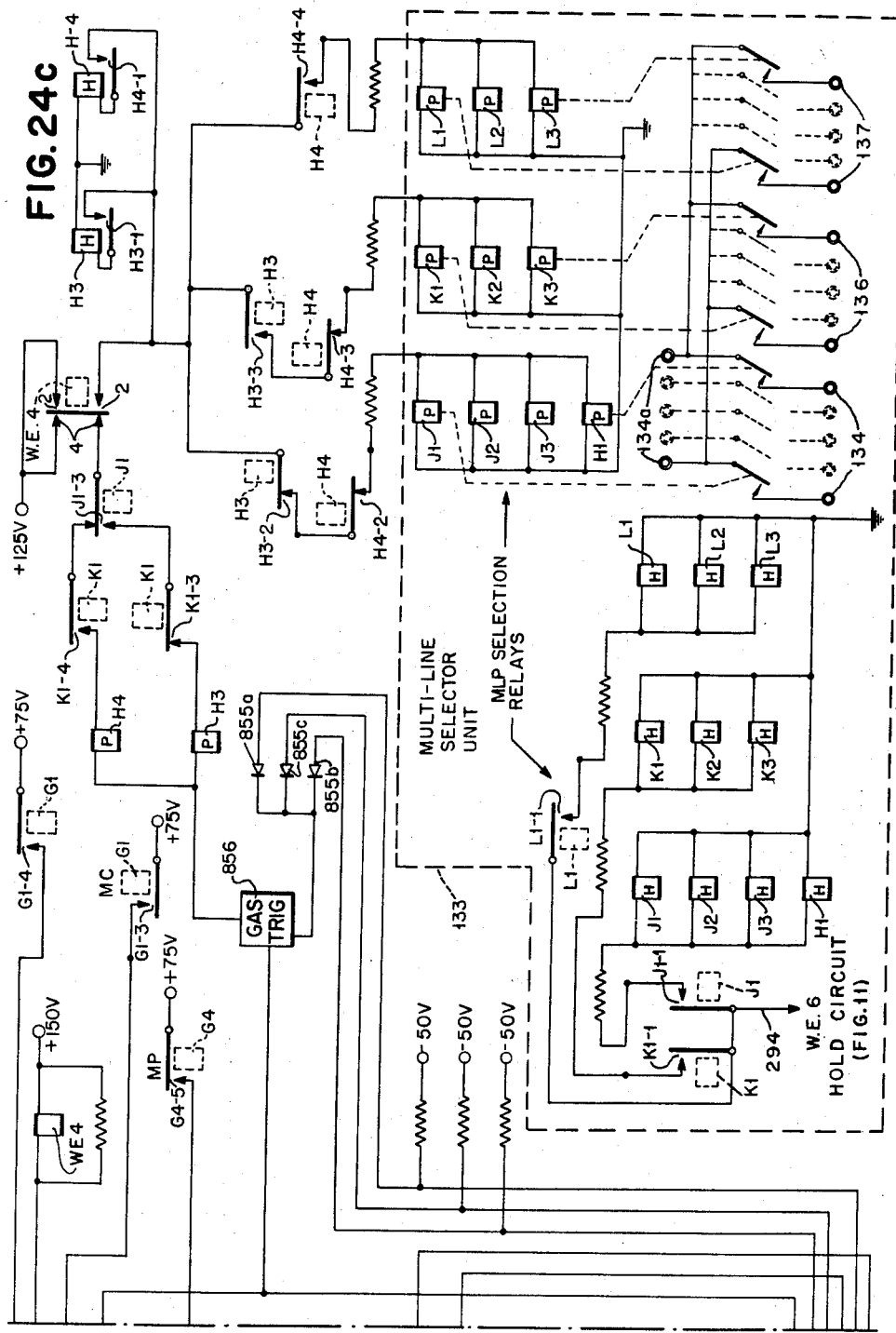

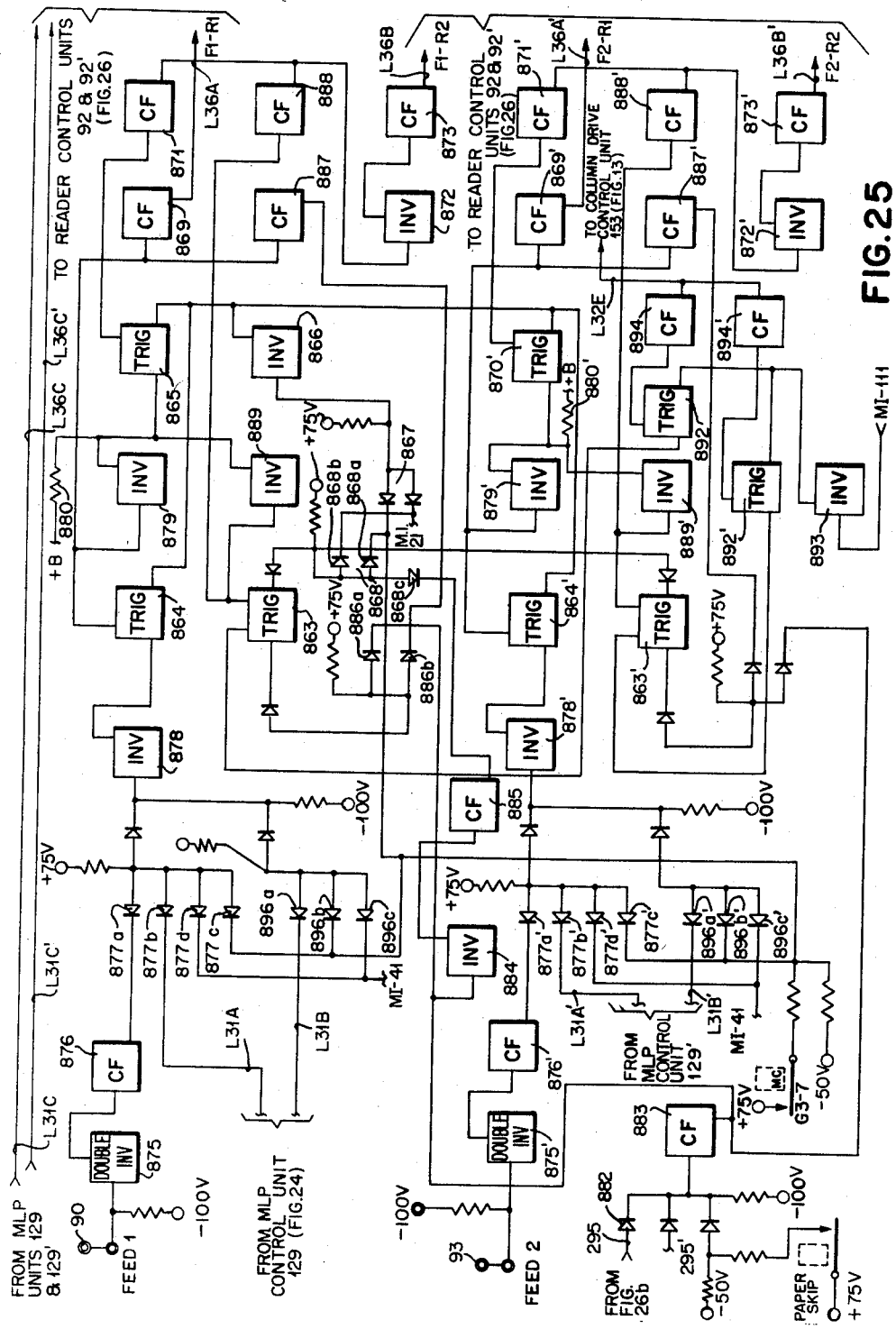

April 12, 1960
F. A. FOSS
2,932,249
HIGH SPEED LISTER WITH AUTOMATIC
VERIFICATION OF LISTING ACCURACY
Filed Nov. 13, 1957
61 Sheets-Sheet 55
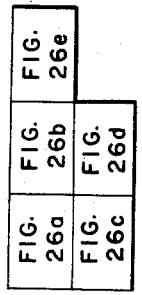
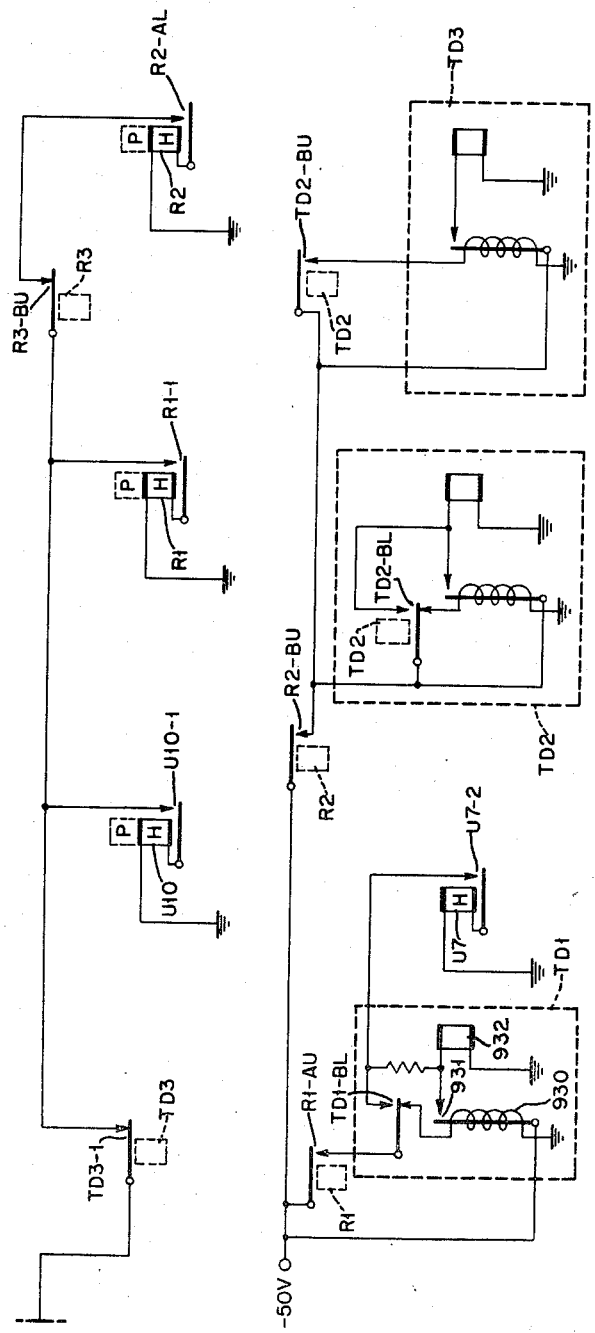
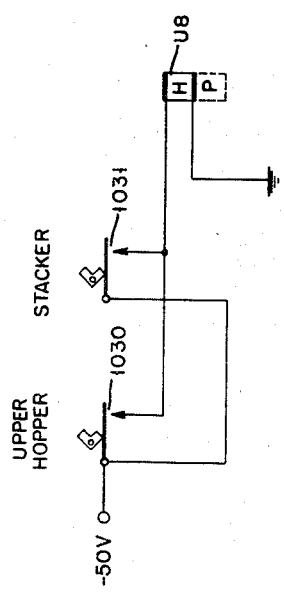
FIG. 26e

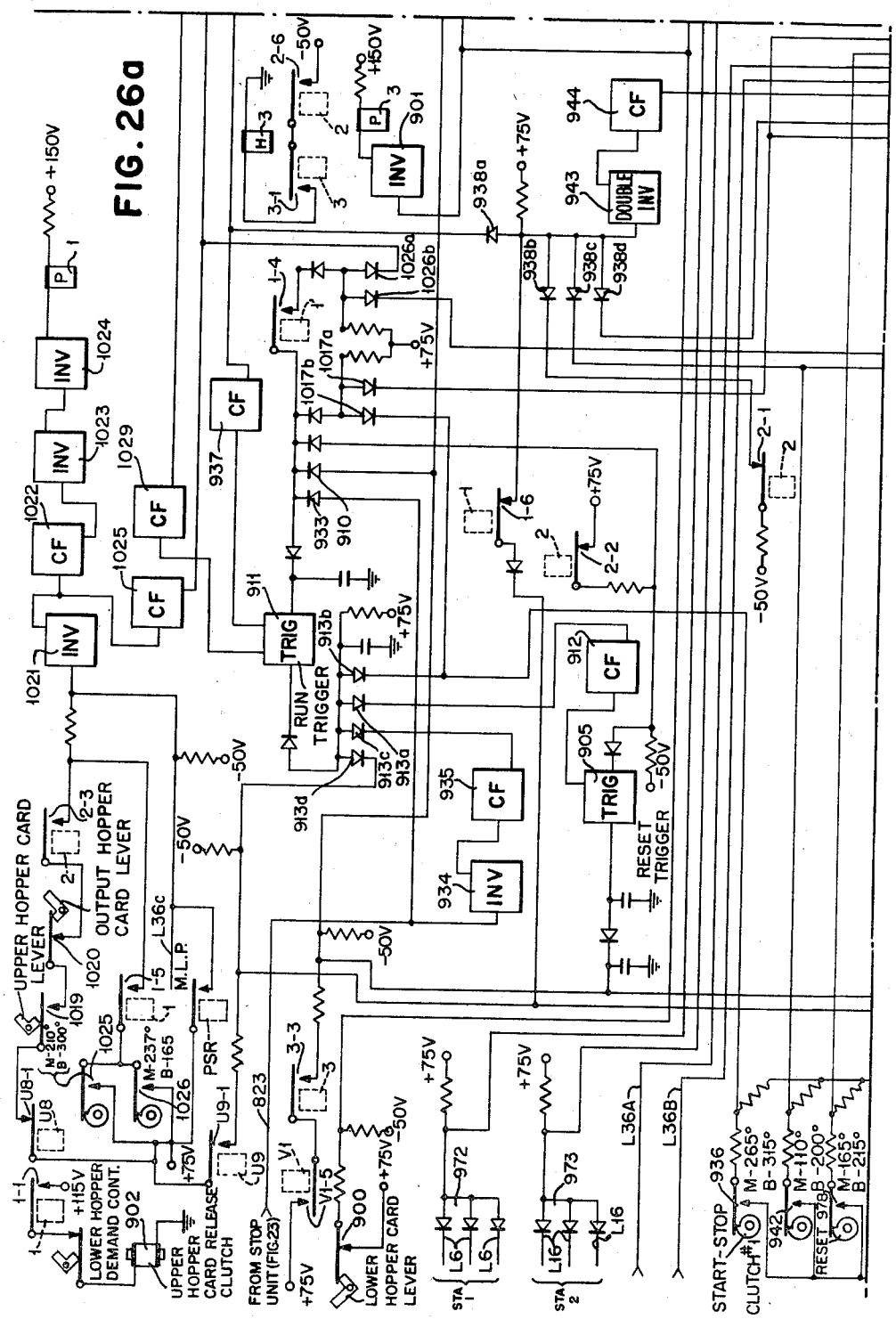

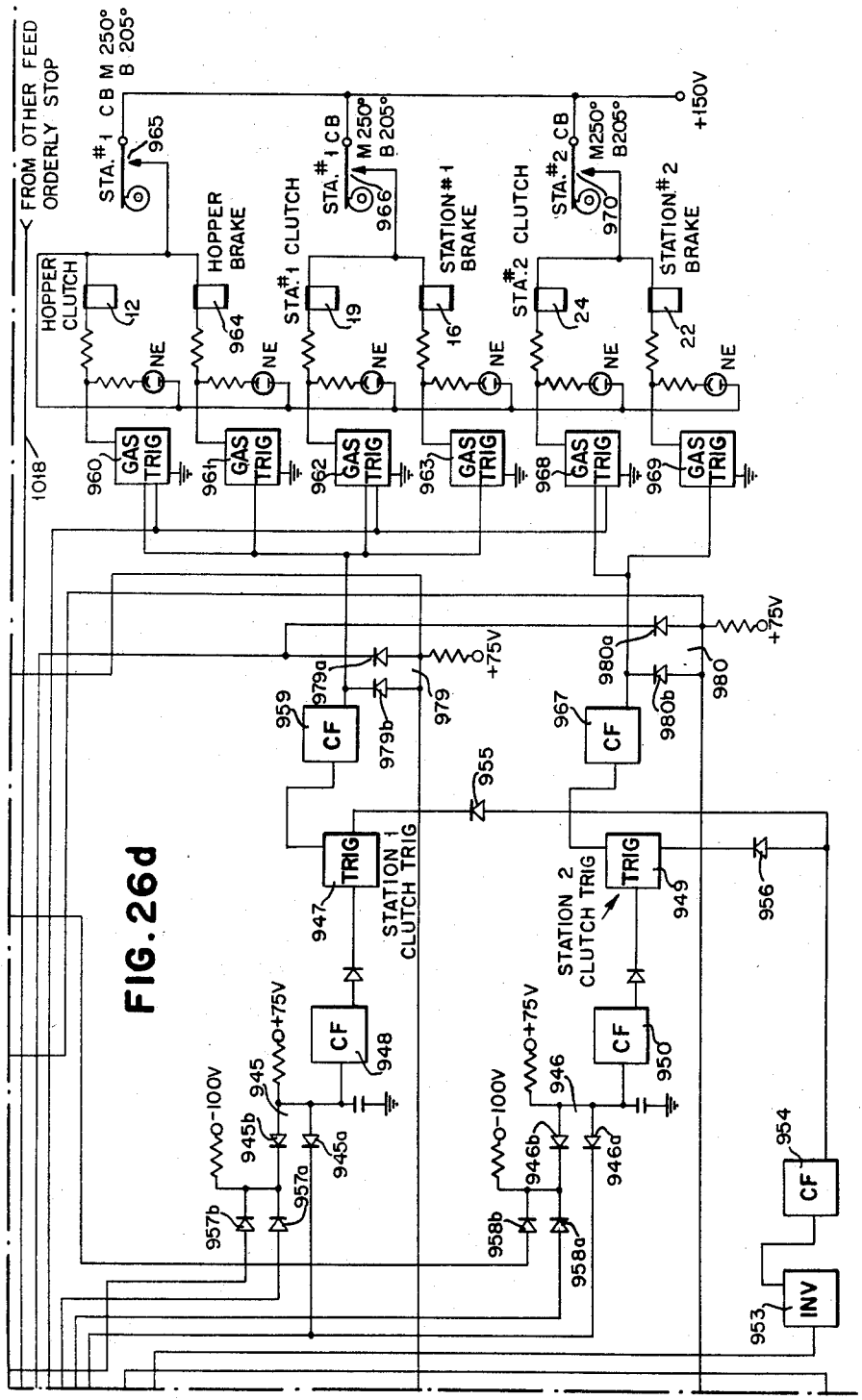

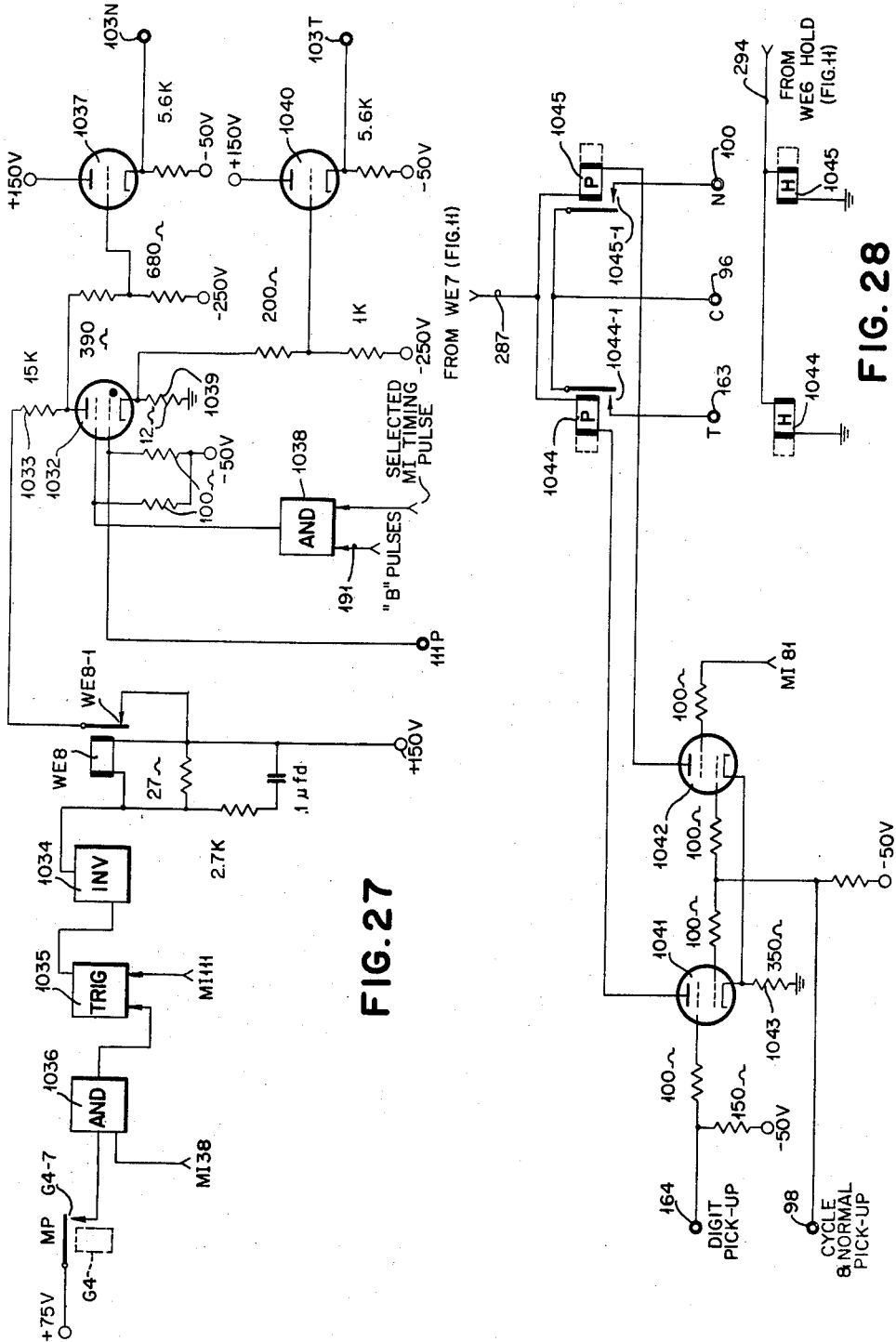

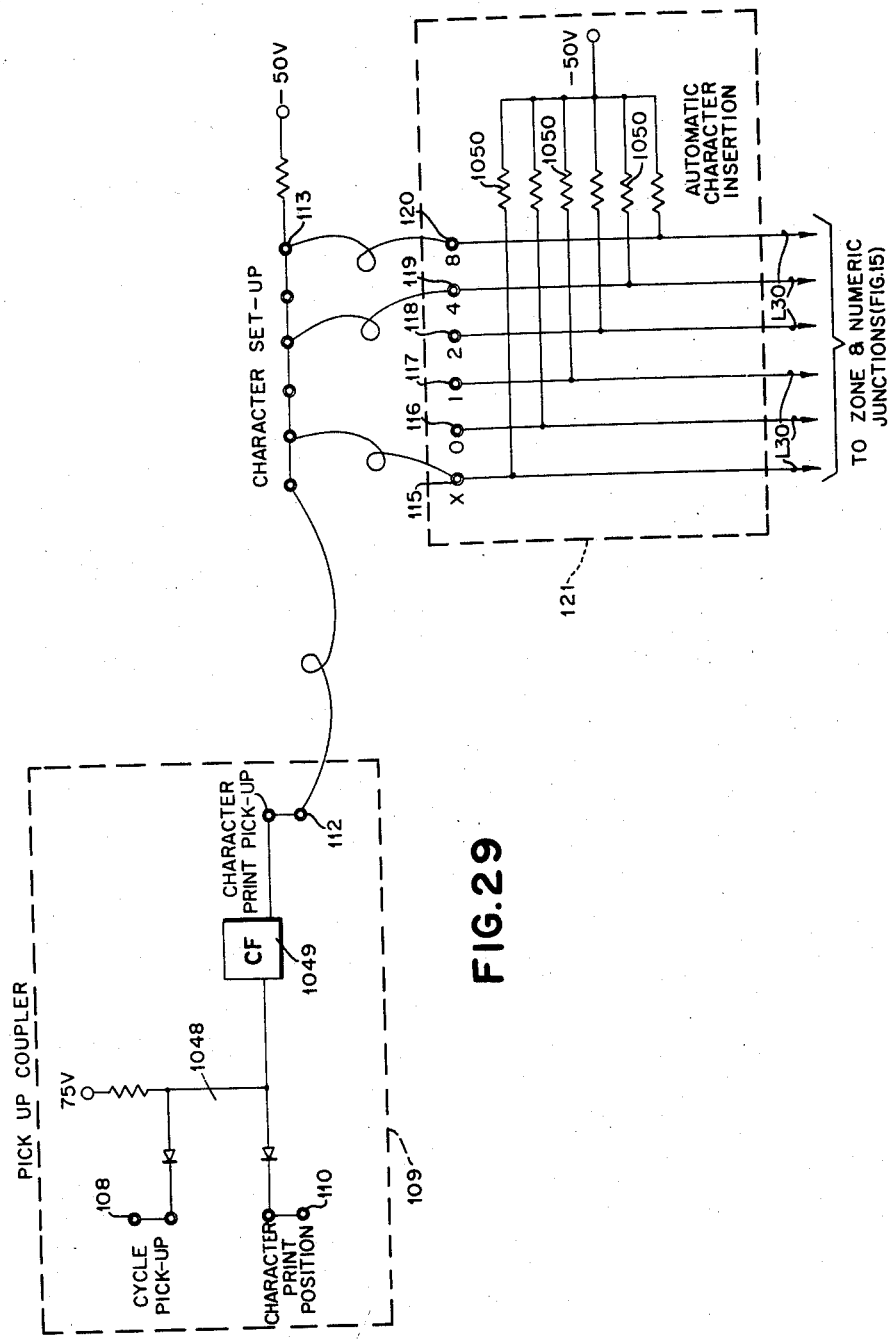

United States Patent Office 2,932,249
Patented Apr. 12, 1960

2,932,249

HIGH SPEED LISTER WITH AUTOMATIC VERIFICATION OF LISTING ACCURACY

Frederic A. Foss, Binghamton, N.Y., assignor to International Business Machines Corporation, New York, N.Y., a corporation of New York Application November 13, 1957, Serial No. 696,093

40 Claims. (Cl. 101—93)

The present invention relates to a machine for deriving and processing at high speed data information punch recorded on business or tabulating cards and, more particularly, to one in which the derived data is used in the printing of information such as reports, information tabulations, or written documents.

Business or tabulating cards conventionally are used by recording data information within a specified area of the card arranged in columns and rows of "index points." Conventionally there are twelve rows of such index points, identified as "zone" rows 0, 11 and 12, which are conventionally used either for functional control or for alphabetic designation, and numeric rows zero and one through nine. Recording of alphabetical information and of certain symbols involves the use of dual index point punching using a preselected zone index point and a preselected numerical index point for each alphabetic character and each symbol. The method of such recording is commonly referred to as a recording by use of the Hollerith 12-bit code. There are conventionally ninety columns of index points and these are usually divided in use into fields of information, such as an address field, an item field, a premium amount due field, and the like, each field comprising a preselected group of columns having a preselected location on the card.

The information recorded in business or tabulating cards in the manner previously described may be subsequently used in numerous ways and for many purposes. It is often desirable that such information be read and supplied to a printing mechanism for printing or listing in the preparation of reports or documents such as insurance premium notices. All of the information to be listed may be recorded in one card, but frequently it is desirable to obtain such information by use of two companion cards, one of which is in the nature of a master card and contains invariable information such as the name and address and also the number of a policy holder while the other card is a detail card and contains variable information such as the amount of premium due together with a currently declared dividend. When such master and detail companion cards are used, it is possible to read them consecutively for listing purposes, but for economy of operation it would be highly desirable to arrange the variable detail and invariable master cards in two separate and distinct groups and to read companion cards of these groups concurrently and at high rate with concurrent listing of all information derived from the companion cards.

In doing so, it would be convenient to provide such flexibility of listing operation that one or more lines of information might concurrently or selectively be derived and listed from either card and further that the lines of listed information from each card be listed if desired on either the same line or on individual lines of a printed form in relation to lines of information derived from the companion card. Line selection in this case preferably should be under automatic control of the information derived from the companion cards, and provision should be made for automatically stopping the machine or otherwise sounding an alarm whenever abnormal conditions are found to prevail such as a failure of proper matching of companion cards or a condition of cards out of numerical sequence.

All such listing preferably should be accompanied by an automatic re-reading and verification of the listed information against the recorded information to avoid errors in listing, and here again the machine preferably should be automatically stopped or an alarm sounded in the event that error of listed information should be detected. In addition, all of the listing operations preferably should be adaptable to a high degree of flexibility of machine function and operation to meet a wide variety of particular applications encountered in practice, and economy dictates that listing be accomplished at the highest practicable card handling rate.

It is an object of the present invention to provide a novel business machine wherein information recorded in a record medium, such as tabulating cards, is read and stored successively at two reading stations and is utilized by use of the information stored at a first of these stations and the accuracy of utilization is verified by comparative use of the same information stored at the other of the stations.

It is an additional object of the invention to provide a tabulating card type of business machine wherein all of the information recorded on each tabulating card is derived and stored during a reading interval of relatively short duration and by use of relatively simple, inexpensive and reliable reading-storage structures, and the information is then available for utilization and for verification of accuracy of utilization throughout a relatively long utilization interval of variably controlled duration.

It is a further object of the invention to provide an improved business machine of the tabulating card type and having successive card reading cycles of operation and one wherein the utilization of information derived from each card and the verification of accuracy of such utilization requires plural card cycles for completion yet is accomplished while permitting a new card to be read each card cycle.

It is yet an additional object of the invention to provide a tabulating card type of business machine which is characterized by exceptionally fast reading and storage of all information recorded in each of successive cards, and which thereafter makes use of the stored information by serial information translation permitting equipment simplification and reduction of cost while enhancing rapidity of card handling capacity.

Other objects and advantages of the invention will appear as the detailed description proceeds in the light of the drawings forming a part of this application and in which.

Figure 4B:
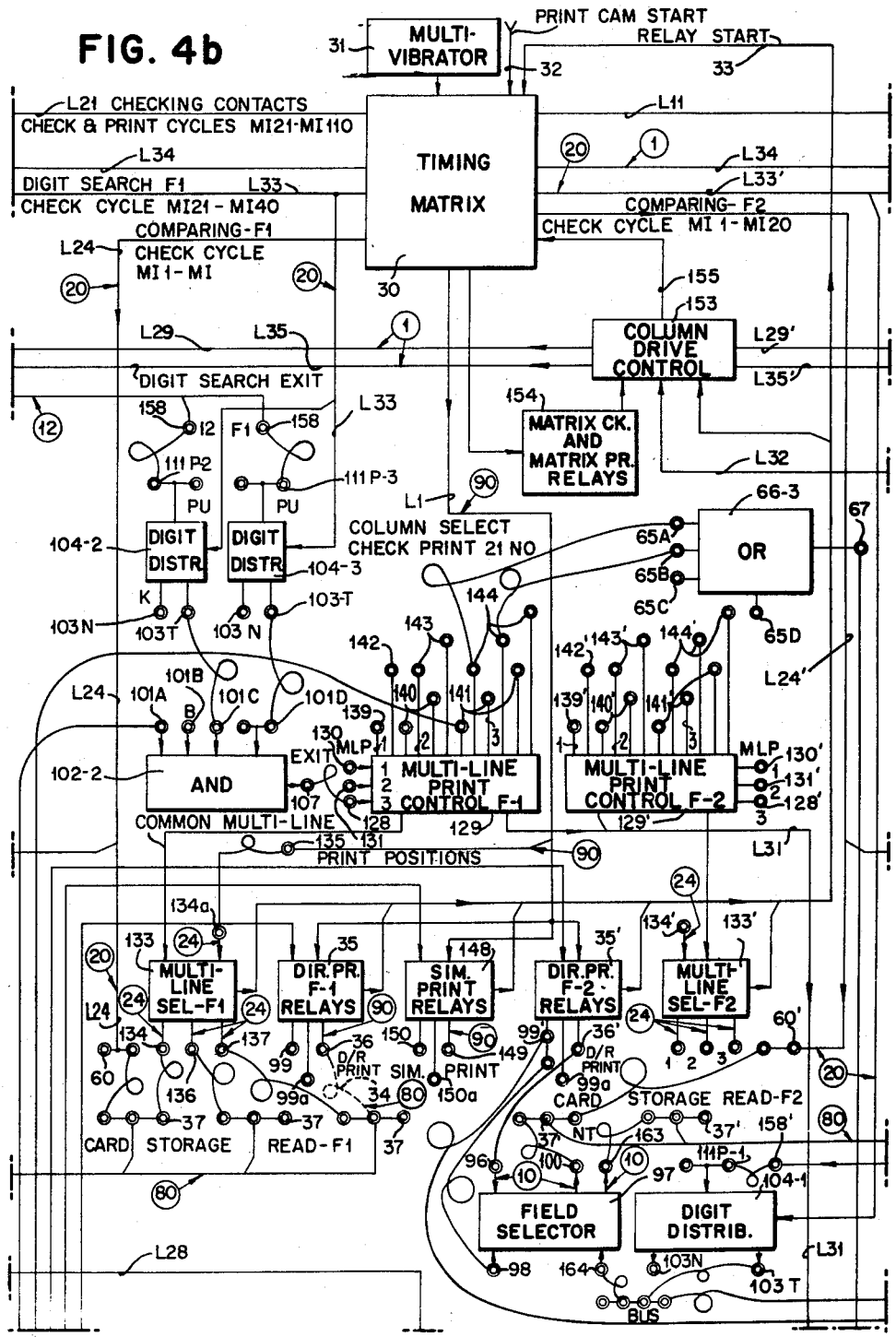
Figure 4C:
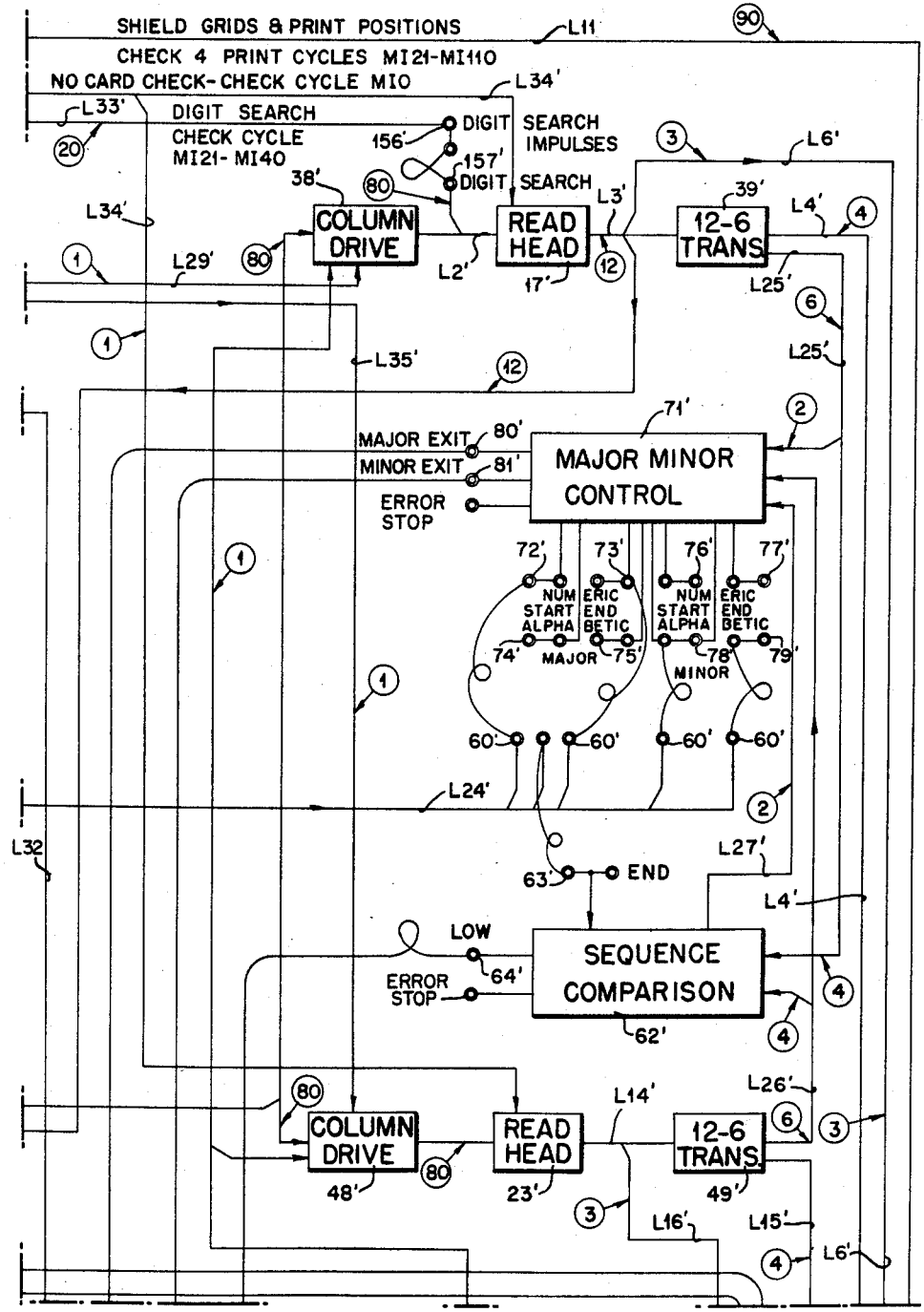
Figure 5:
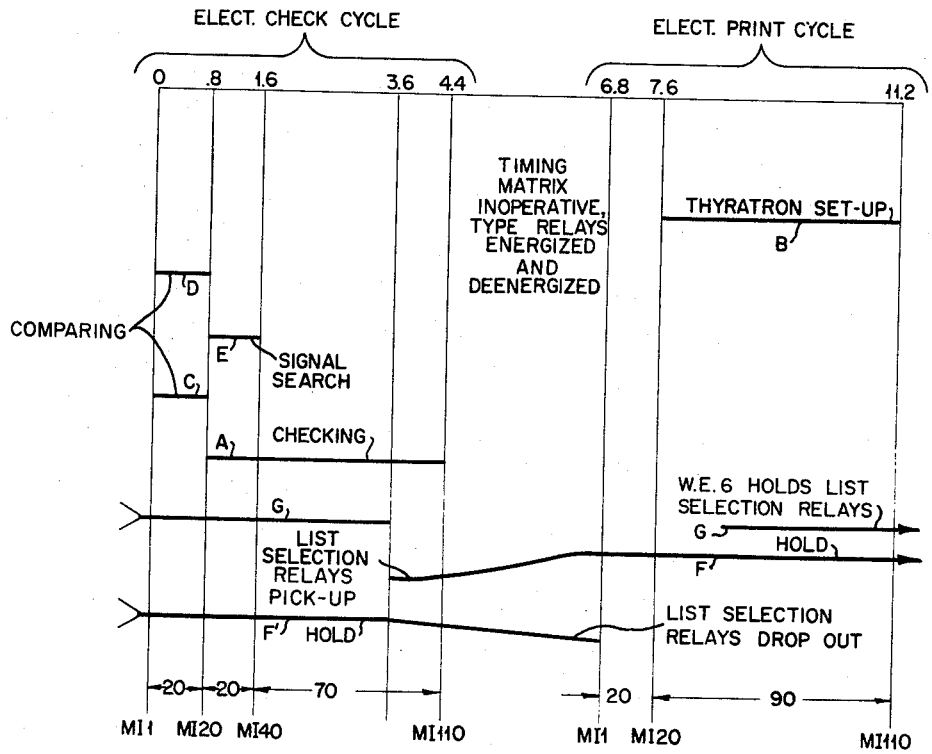
Figure 8:
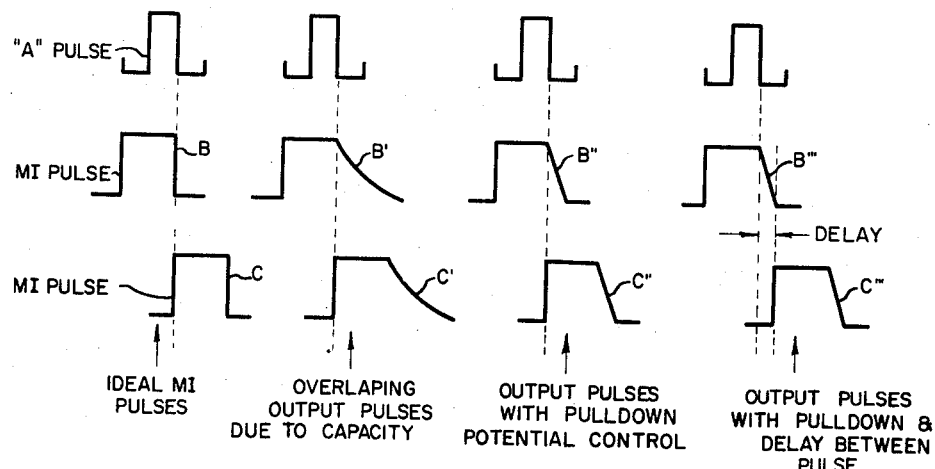
Figure 6B:
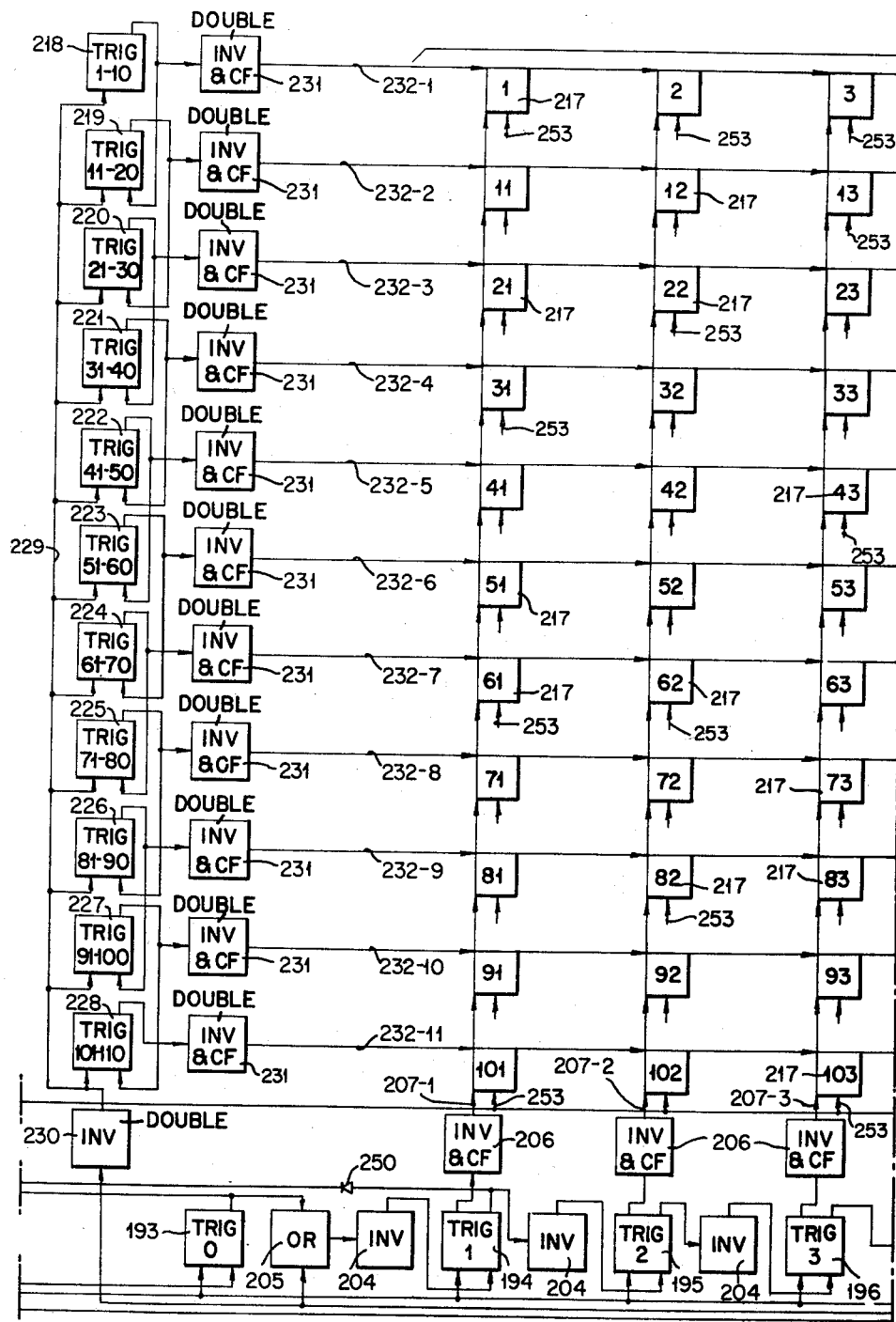
Figure 6C:
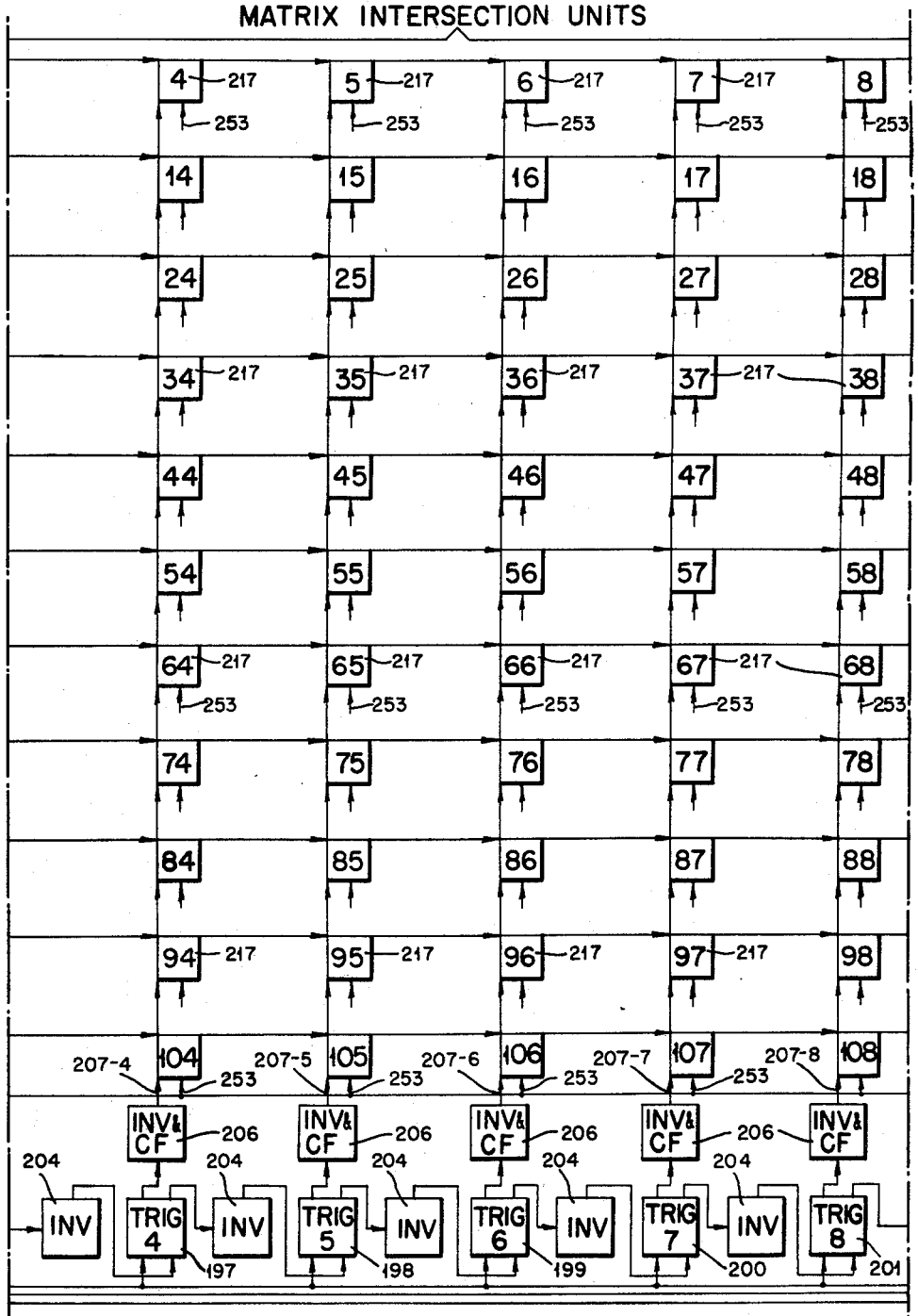
Figure 12B:
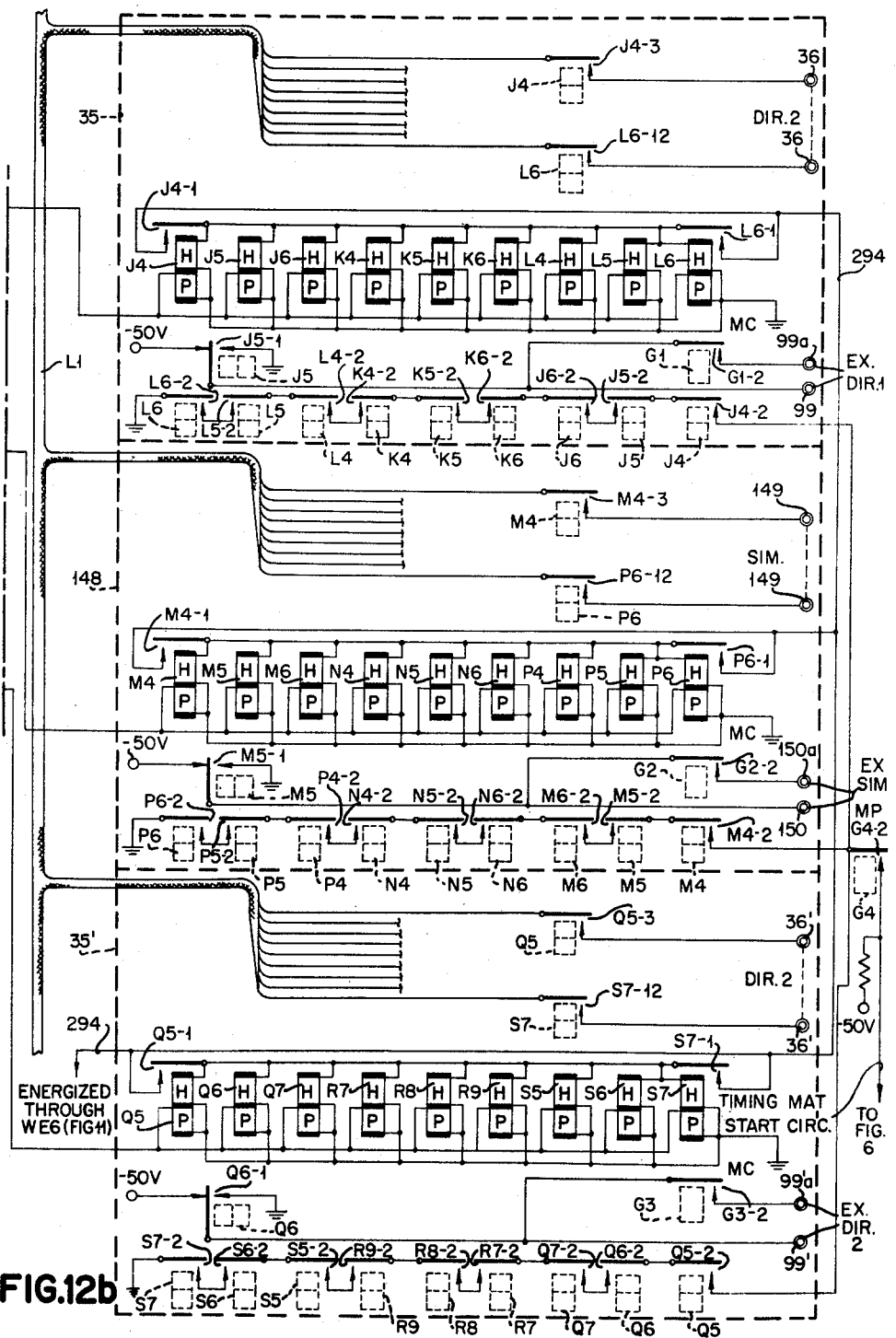
Figure 14B:
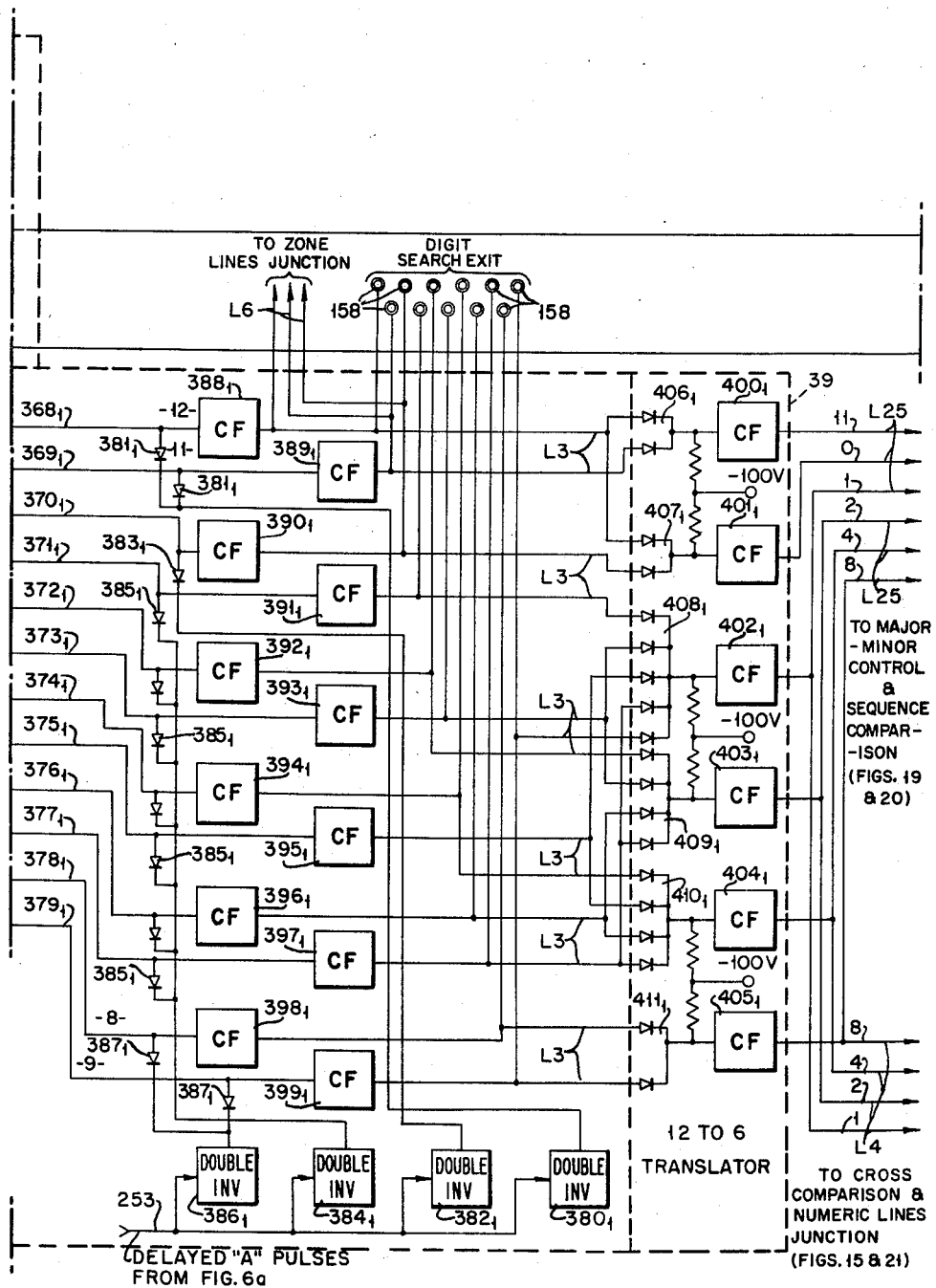
Figure 14D:
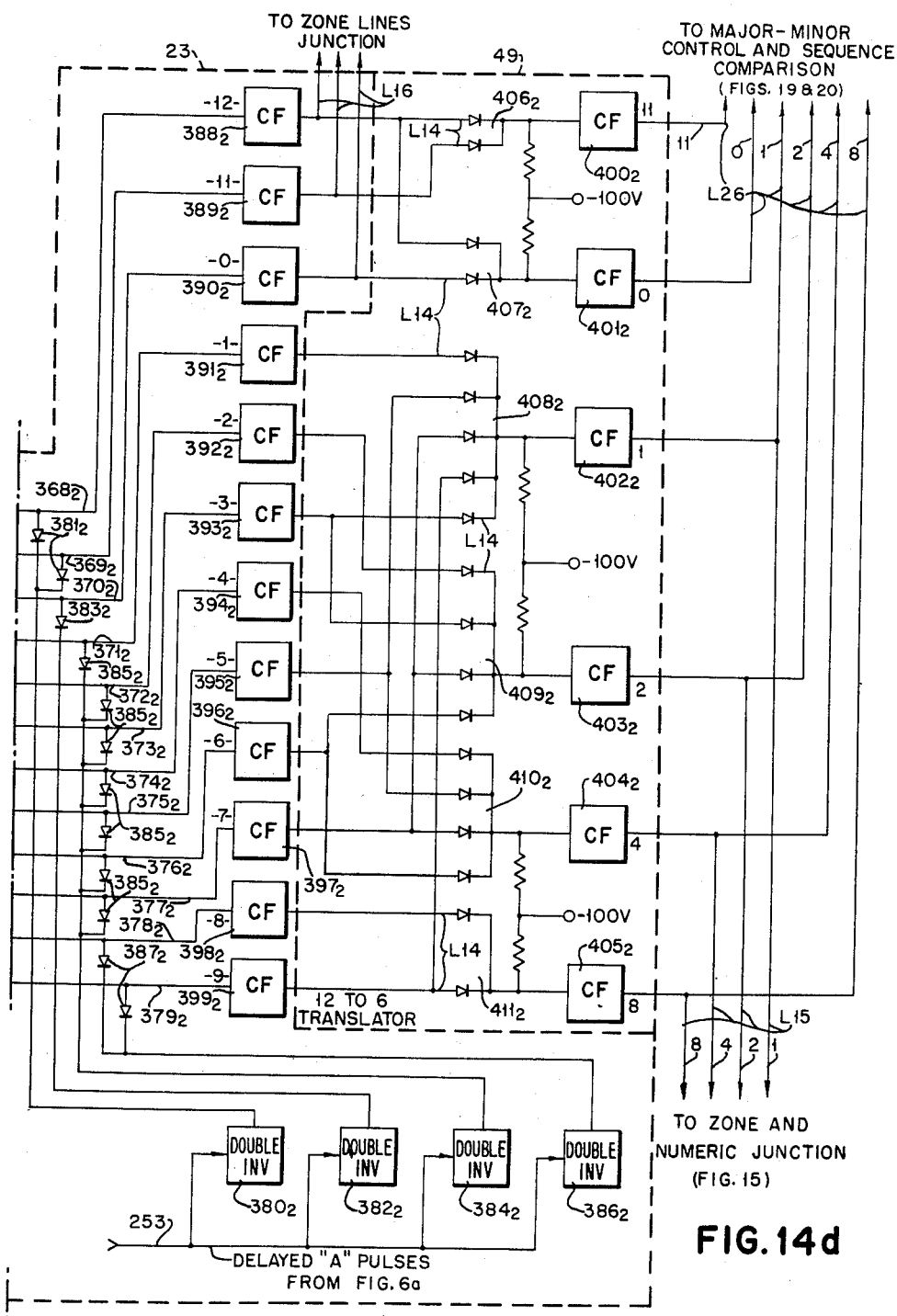
Figure 15C:
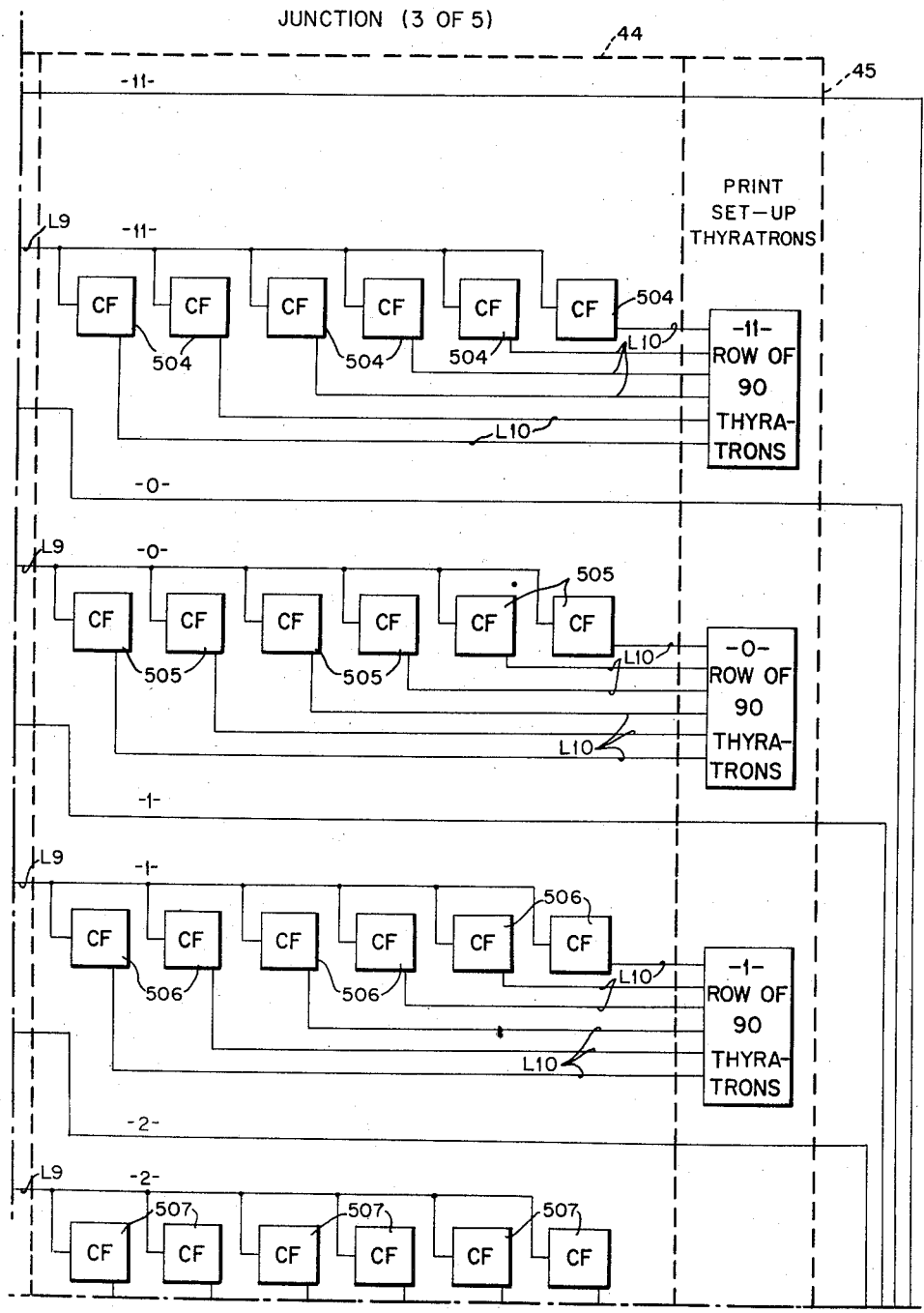
Figure 17B:
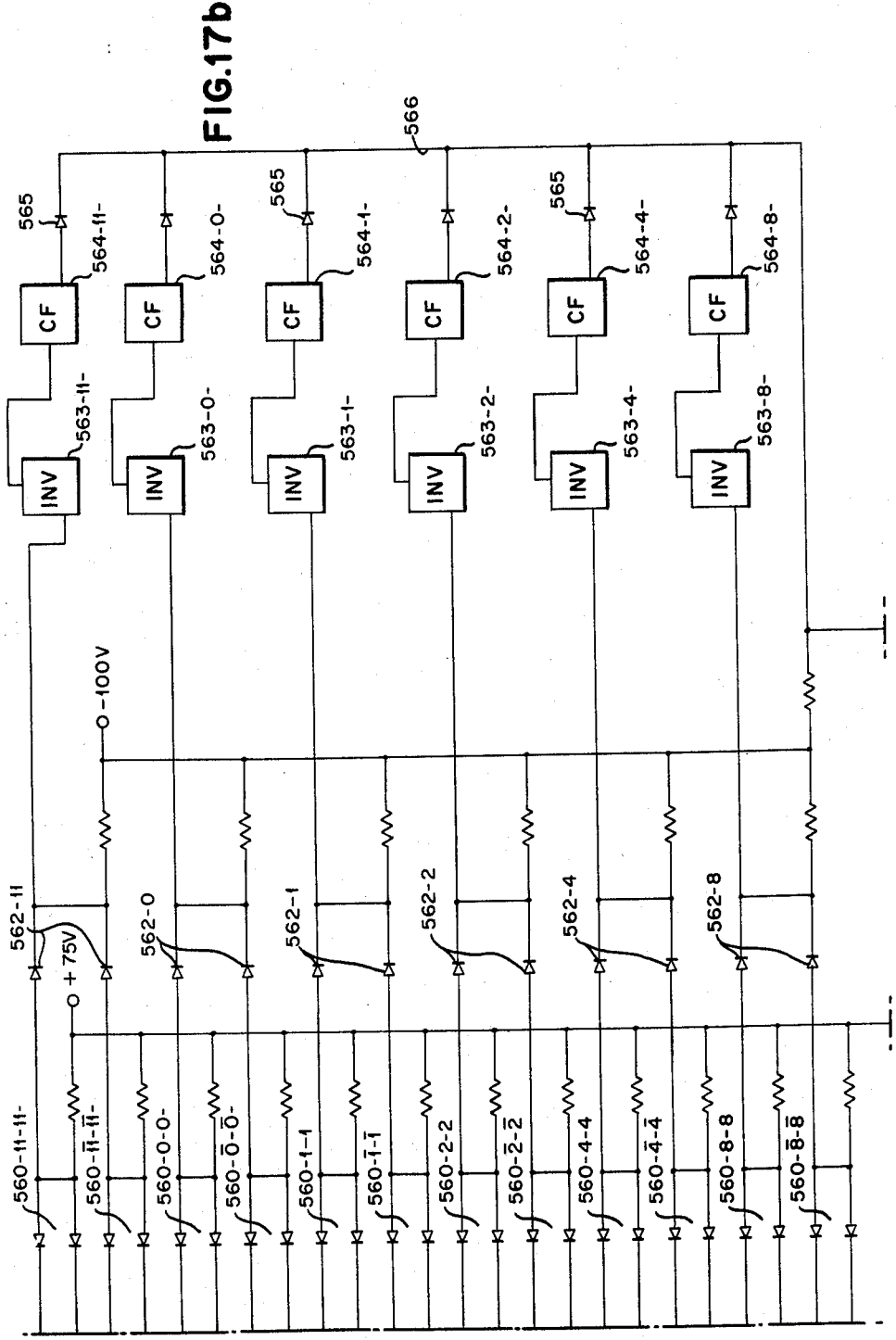
Figure 17C:
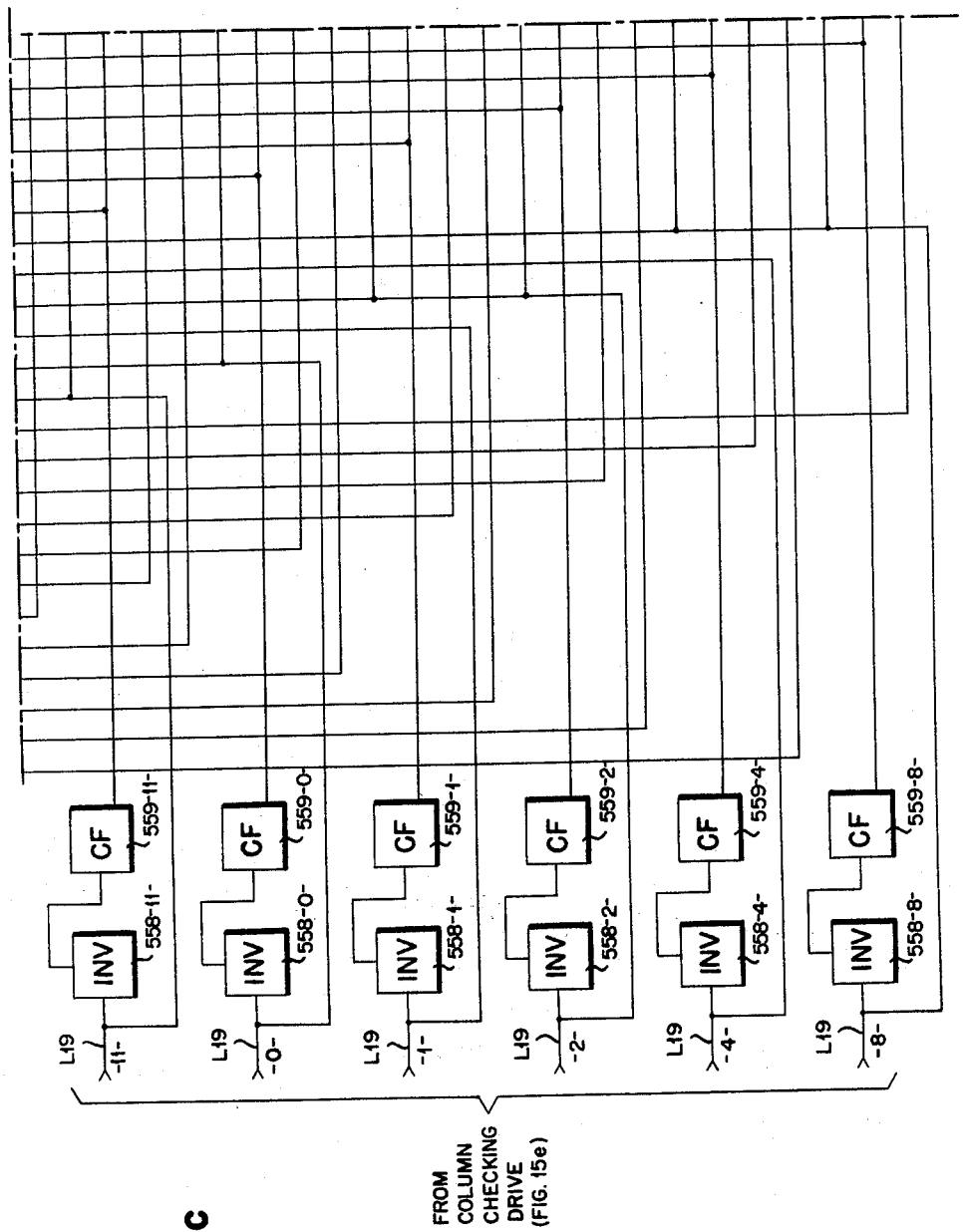
Figure 17D:
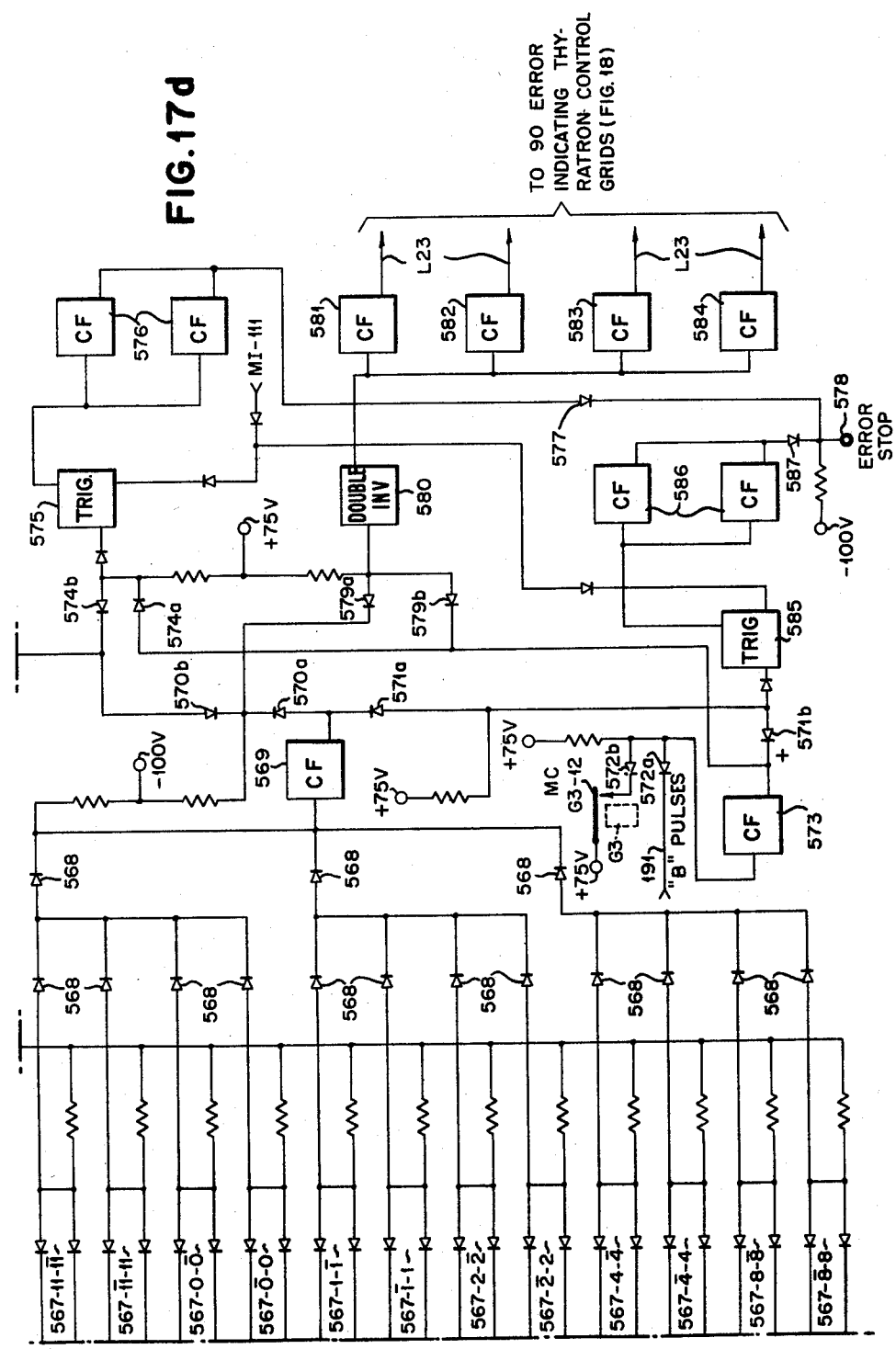
Figure 19B:
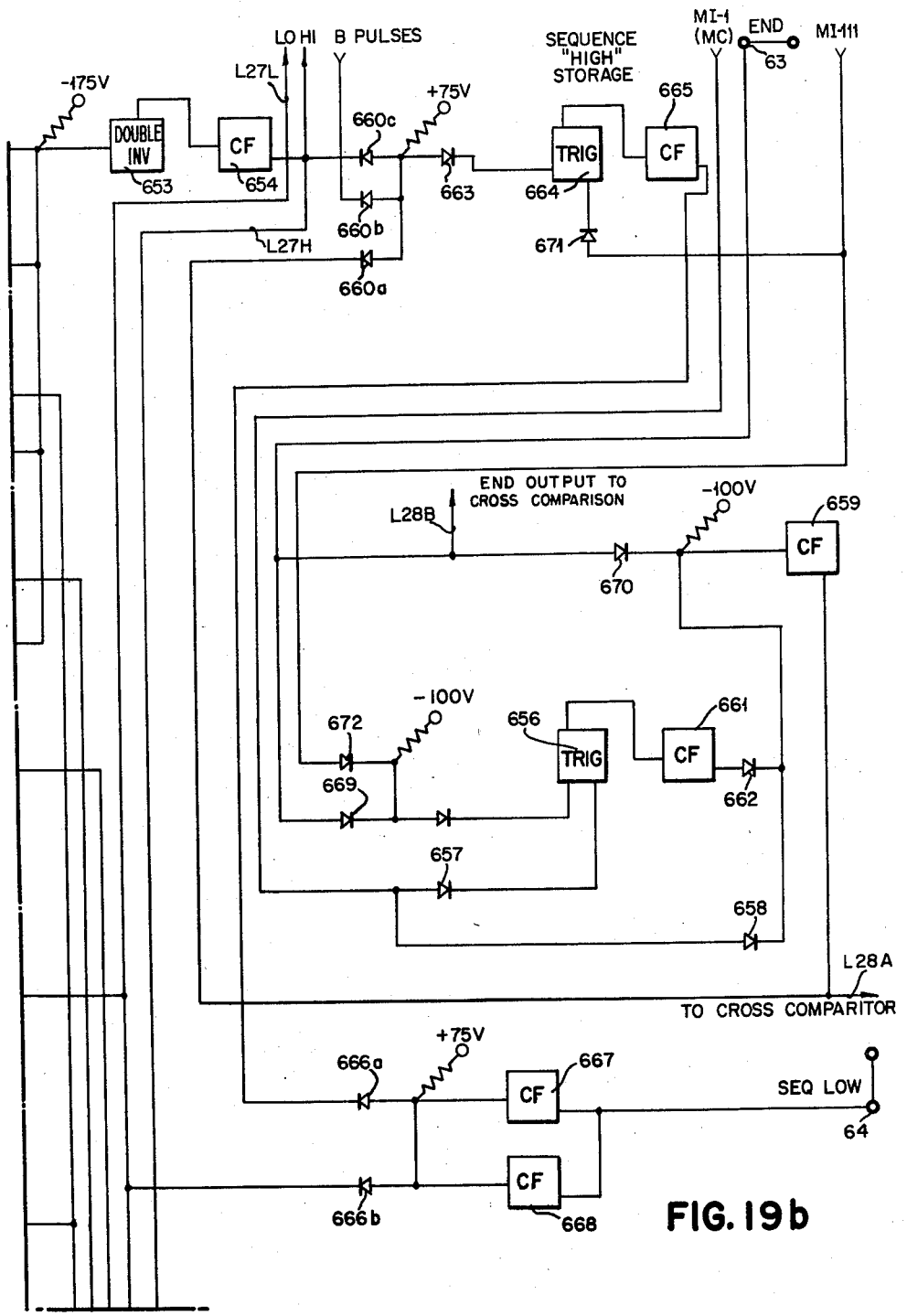
Figure 19C:
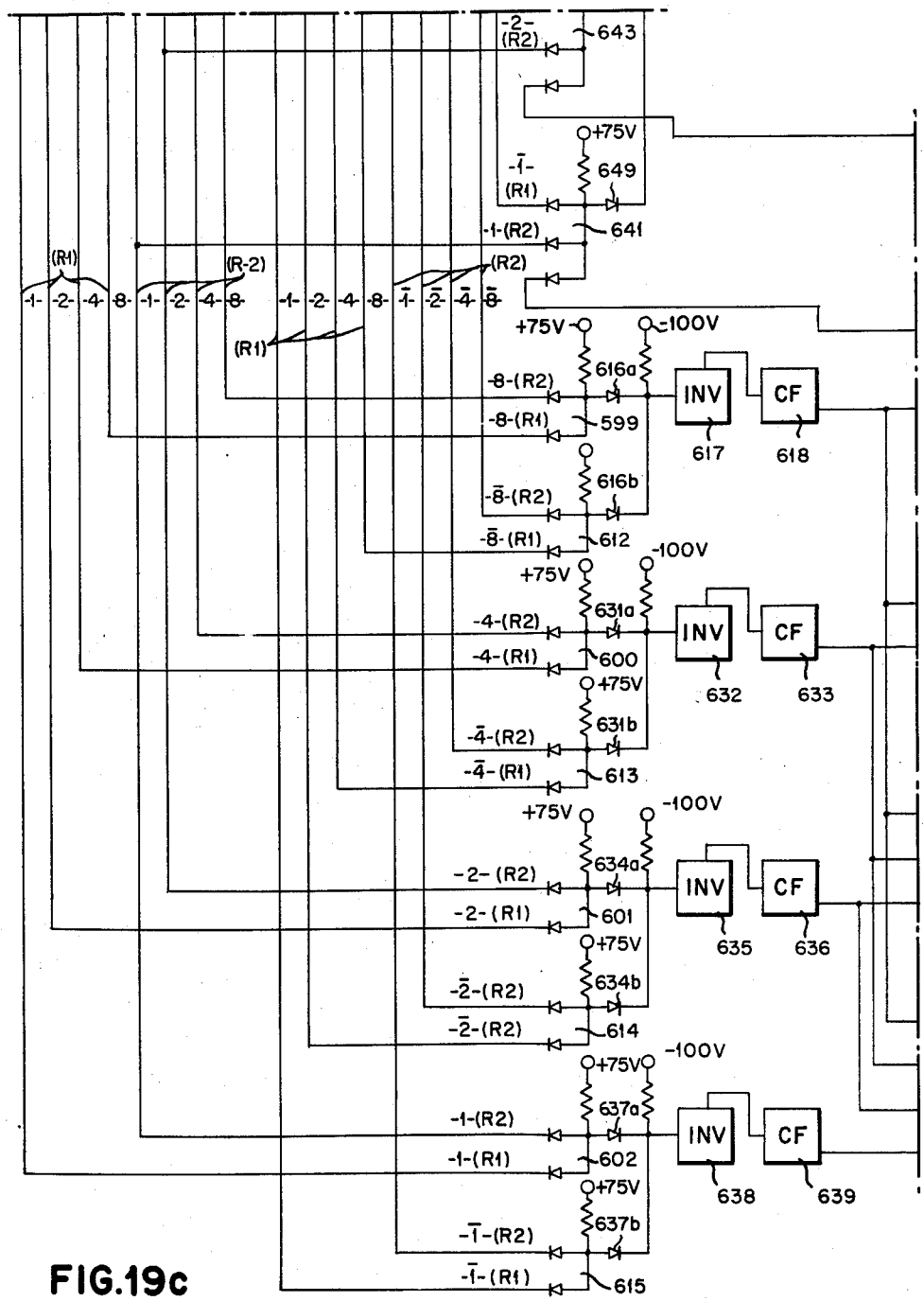
Figure 19D:
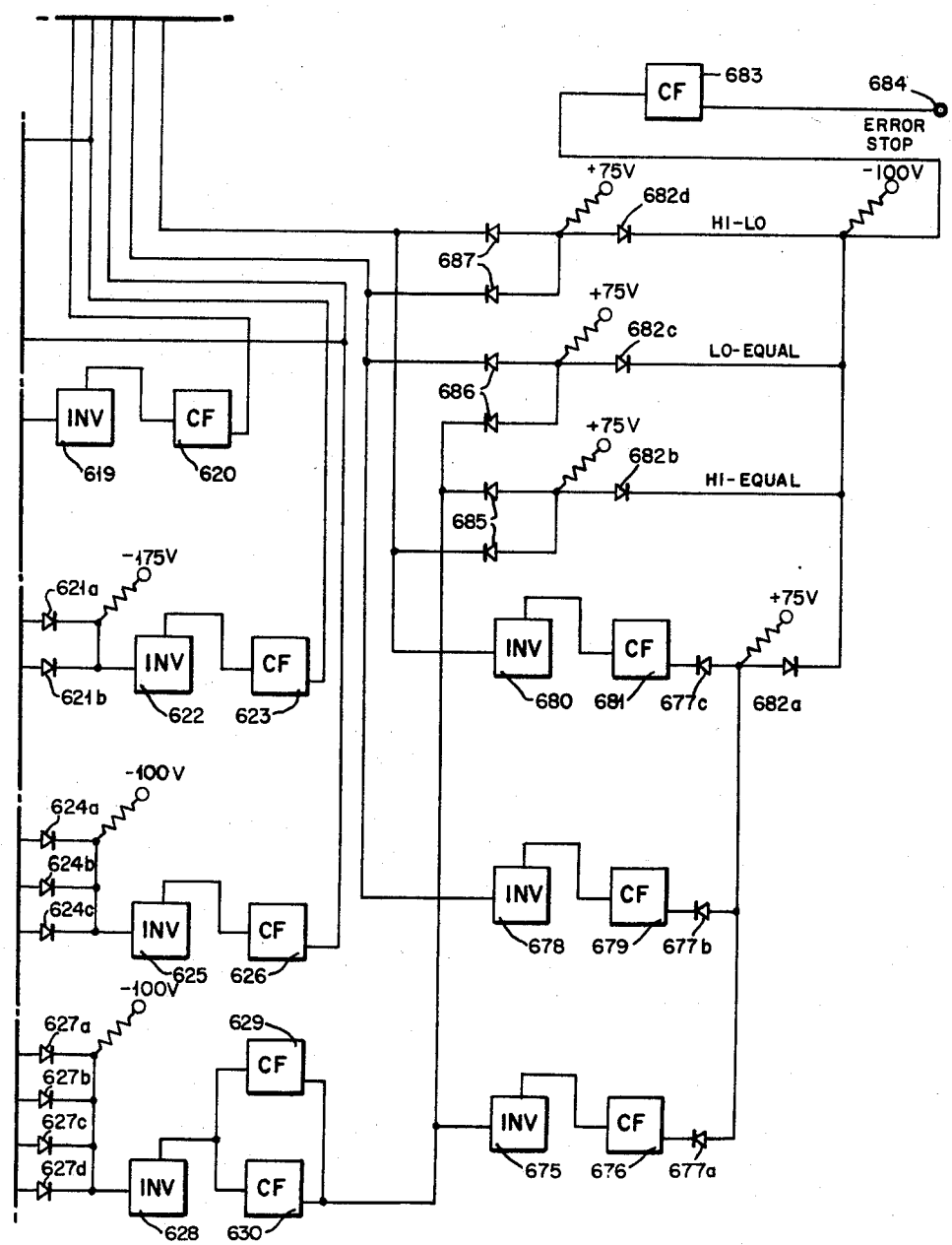
Figure 26B:
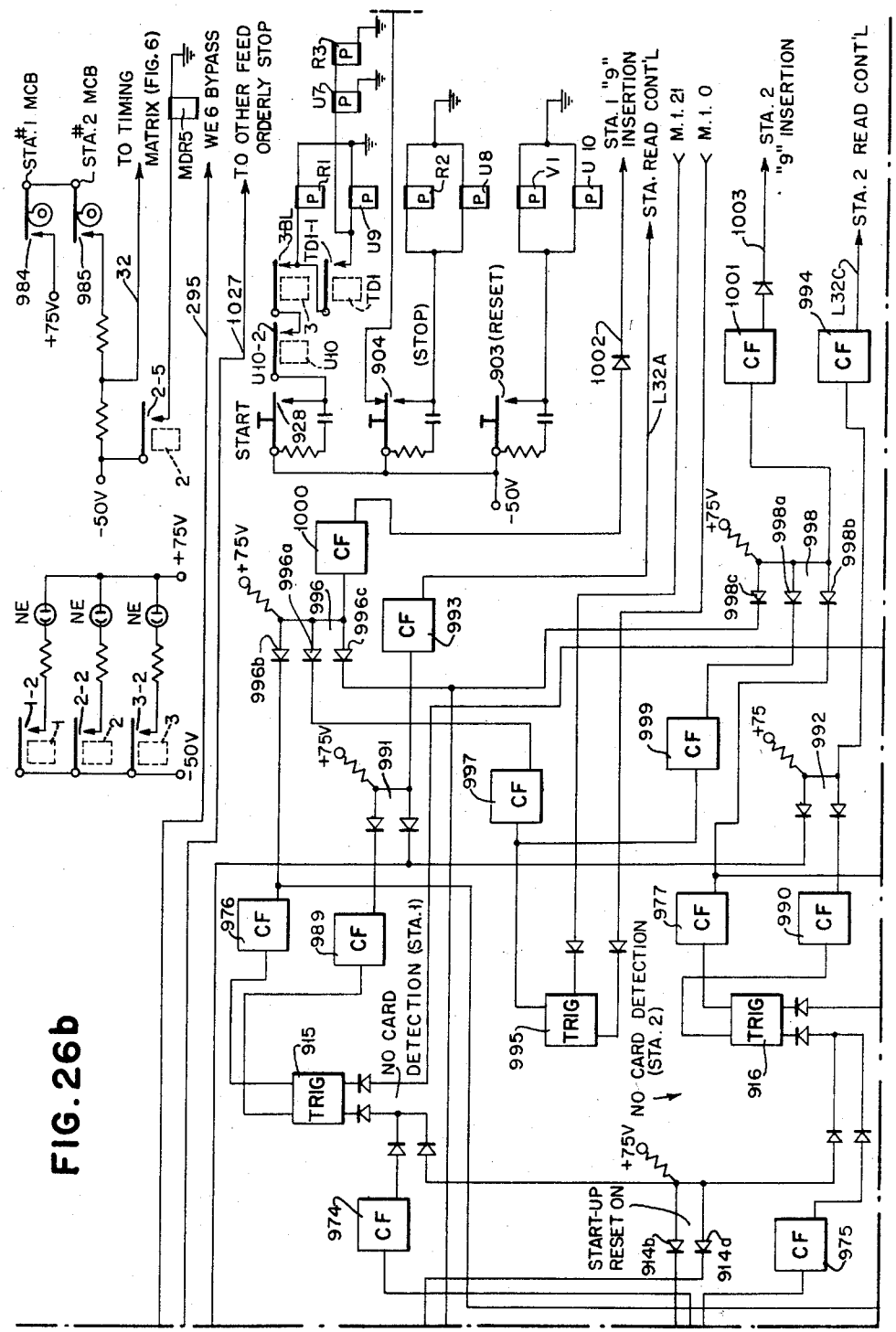
Figure 26C:
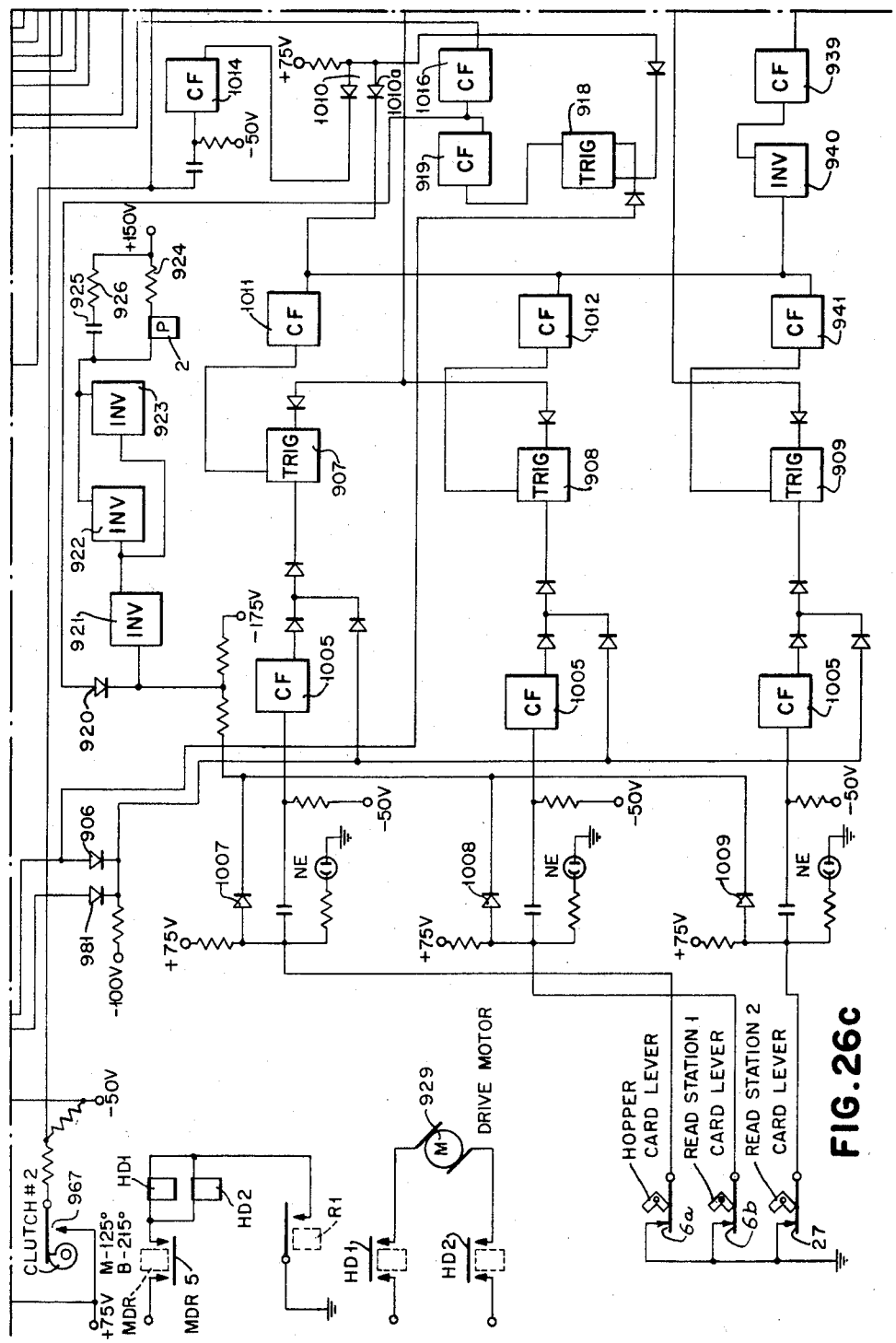

Fig. 3 graphically represents certain timing relationships prevailing in the operation of the listing machine;

Fig. 4 represents schematically the over-all electrical control system of the listing machine;

Fig. 5 graphically represents certain time intervals identified with the operation of the electrical control system;

Figs. 6a–6d show the arrangement of a timing signal or timing matrix unit which exercises over-all electrical control of the electrical control system, these several figures being considered together as a unitary structure as indicated in Fig. 6;

Figs. 7, 9 and 10 show the electrical circuit of several units of the timing matrix last mentioned, and Fig. 8 graphically represents certain voltage relationships occurring during operation of these units and is used as an aid in explaining their operation;

Fig. 11 represents a relay system having general overall control of the operation of the electrical control system;

Figs. 12a and 12b, considered together as indicated in Fig. 12, show the electrical circuit of direct print and simultaneous print relay systems employed in the listing machine;

Fig. 13 represents the electrical arrangement of a column drive control unit forming a component of the electrical control system;

Figs. 14a–14d, which should be considered together as indicated in Fig. 14, represent the electrical arrangement of column drive units and read heads used in the listing machine;

Figs. 15a–15f, considered together as indicated in Fig. 15, represent the electrical circuit of a zone line junction, a numerics line junction, a zone translator unit with associated zero and zone suppression unit, a zone and numerics junctions unit, a column print set up drive unit, and a column checking drive unit employed in the electrical control system of the listing machine;

Fig. 16 shows the electrical circuit of a print set up thyratron unit, a printer magnet system, and a checking contact system which form components of the electrical control system;

Figs. 17a–17d, to be considered together as shown in Fig. 17, represent the electrical arrangement of a loop check circuit unit;

Fig. 18 shows the arrangement of a check error thyratron unit;

Figs. 19a–19d, which should be considered together as indicated in Fig. 19, show the electrical arrangement representative of two sequence comparison units forming components of the electrical control system;

Figs. 20a–20c, arranged as shown in Fig. 20, show the electrical arrangement of each of two major-minor control units employed in the listing machine;

Figs. 21a–21e, which should be arranged as indicated in Fig. 21, represent the electrical circuit arrangement of a cross comparison unit which forms a component of the electrical control system;

Fig. 22 shows the arrangement of an indicating OR unit, and Fig. 23 that of a stop circuit used in the electrical control system;

Figs. 24a–24c, arranged as indicated in Fig. 24, show the circuit arrangement of a typical multiline print control unit of which two are used in the electrical control system;

Fig. 25 represents the arrangement of a card clutching control unit of the electrical system;

Figs. 26a–26e, arranged as indicated in Fig. 26, represent the electrical circuit typical of each of the two reader control units employed in the listing machine;

Fig. 27 represents the electrical circuit of a typical digit distributor unit of which a number are employed in the electrical control system, and Fig. 28 represents the circuit arrangement typical of the several digit distributors of the electrical control system; and Fig. 29 shows the electrical circuit arrangement of a pick-up coupler and automatic character insertion unit typical of a number of such units which are employed in the electrical control system.

GENERAL ORGANIZATION AND OPERATION

Figure 1:
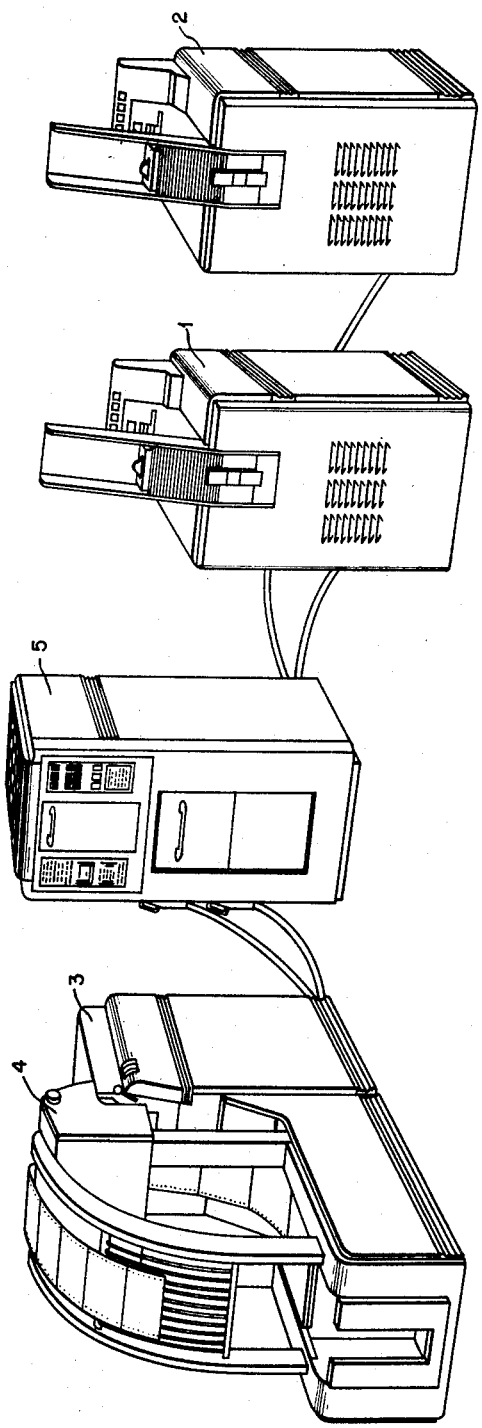
Fig. 1 illustrates the physical appearance of the units employed in the high-speed listing machine herein disclosed.

As illustrated in Fig. 1, a typical high-speed listing machine and system as described herein includes two card feed units 1 and 2, a wire printer unit 3 of the type disclosed in the Johnson United States Patent No. 2,730,040, a form transporting carriage 4 of the type disclosed in the Cunningham et al. United States Patent No. 2,747,717, and an electronic control unit 5. The recorded data information of the cards is read and temporarily stored in each of two reading stations provided in each of the card feed units 1 and 2, and the read information from both reading stations of each feed is then translated through the electronic control unit 5 to set up and control the printer unit 3 and the automatic carriage 4, while providing a concurrent automatic check or continuous monitoring of the accuracy of information printed by the printer unit 3. The printer unit 3 is of the high-speed wire printer type capable of printing alphabetic or numeric information or any of a number of special characters within a total of ninety print positions.

The operation of the listing machine and flow of data information to the printer through the electronic control unit 5 occurs under control of a timer included in the latter unit and hereinafter referred to as a "timing matrix." The detailed arrangement and operation of the timing matrix will be described hereinafter, but for the moment it will be sufficient to say that the timing matrix operates through two "electronic" cycles during each card or listing cycle and provides 111 timing pulses in each such electronic cycle. By a card cycle is meant the interval between the initiation of picking one card from the card supply hopper to the initiation of the picking of the next successive card from the supply hopper. A listing cycle has the same interval but may not involve a corresponding card movement. The initiation of each cycle of the timing matrix does not bear a fixed relation to the initiation of the card or listing cycle, but rather is determined and controlled alternately by a printer cam contact which upon closing signifies that printing on the previous "print" cycle is completed and by print-control relays which determine the type of printing operation next to be performed. For convenience of identification of the two cycles of operation of the timing matrix, the first cycle is hereinafter referred to as an "electronic check cycle" initiated by the printer cam contact as previously mentioned, and the second as the "electronic print cycle" which is initiated as will hereinafter be described more fully by the pick up of the last of a number of relays which are automatically energized under card control to establish the type of print operation to be next performed. In this, the type of printing operation is usually under card-information control and may be a direct print from feed 1, direct print from feed 2, simultaneous print from feeds 1 and 2, or multiple line print of information supplied from either or both feeds.

The two cycles of the timing matrix each have a duration of 4.4 milliseconds (during each of which 111 timing pulses are generated as earlier mentioned) and the two cycles are separated by a 2.4 millisecond quiescent interval. These two timing cycles are completed within a total of 11.2 milliseconds, leaving approximately 28.8 milliseconds for transport and reading of each card whereby a maximum single-line listing speed of 3,000 cards per minute (1,500 lines of print) may be effected by concurrent use of both card feeds.

Card feeds

Figure 2:
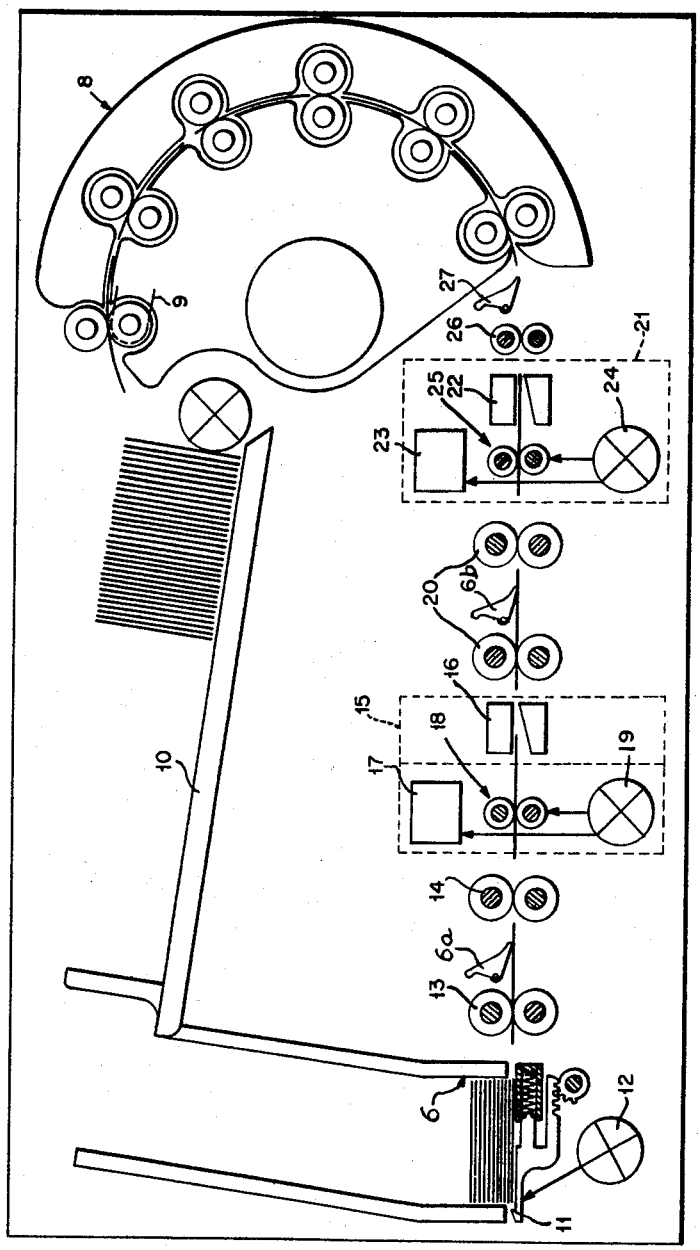
Fig. 2 illustrates the general mechanical arrangement of each of the two card feeds used in the listing machine.

Fig. 2 illustrates the general mechanical arrangement of each of the two card feeds. Each feed includes a card supply hopper 7 and a card output stacking system 8. The latter includes a continuously running belt 9, which receives and moves the cards to an output magazine 10.

Between the hopper 7 and the stacker system 8 is a card transport mechanism and two sensing or reading stations. The card transport arrangement includes a picker knife 11 which is reciprocated by driving motion imparted thereto from a driving source through a clutch 12 and which operates to pick the lowest card in the hopper 7 and move it into engagement with a pair of continuously rotating feed rolls 13. The feed rolls 13 transport the card past a card-jam detection finger or lever 6a (which actuates a jam indicator switch, not shown) to a second pair of driven feed rolls 14 which in turn move the card into position in a card reading station 15. The components of the latter are indicated generally within broken lines, and include a wedge gate 16 operating to stop the card motion with the card in reading position in the reading station. The card is aligned by a conventional aligning mechanism, not shown. At the next card feed cycle, a read clutch 19 is actuated to effect driving movement of a read head or pin box 17. The latter is first automatically cleared of any previously stored information and is thereafter immediately moved to a position where it reads the information punch recorded in the stationary card. The read head 17 then returns to its position of rest while mechanically retaining or storing the information read from the card. The wedge gates 16 open and a pair of feed rolls 18 are mechanically driven through the clutch 19 and move the card through the gate 16 for further transport by driven rolls 20. This moves the card past a second card-jam detection finger or lever 6b (also actuating a jam detection switch, not shown) into a second reading station 21, the components of which are generally indicated as those included within broken lines, where the movement of the card is again halted by a wedge gate 22. While this card is moving between the first and second reading stations, a new card is moved from the hopper 7 into position in the first reading station as above described. As at the first reading station, the card now positioned in the second station is automatically aligned by an aligning mechanism (not shown). At the next card feed cycle, a read clutch 24 is actuated to move a read head or pin box 23 first to be cleared of previously stored information and then to read and store the information recorded in the stationary card. The read head 23 then returns to its position of rest. The gates 22 open and the clutch 24 actuates feed rolls 25 to transport the card into a pair of output feed rolls 26 and move the card past a third jam detection finger or lever 27 into the stacking mechanism 8. Concurrently with this card movement, if the machine is not processing a multiple line card, there is a transfer of a card from the first to the second reading station and a transfer of a new card from the hopper 7 to the first reading station. If the machine is processing a multiple line card, the information stored in the first read head 17 must be held for successive listing cycles. Under these conditions, no card is transferred from the first to the second reading station and no new card is transferred into the first reading station from the hopper 7 concurrent with the transfer of a card from the second reading station to the stacking mechanism 8.

As the card moves through the feed unit just described, several operations occur in predetermined sequence in the listing operations. This sequence of events will briefly be described to enable a better understanding of the more detailed listing operation hereinafter described. Fig. 3 graphically represents certain interrelated operations of the reading and storage of information at each reading station in relation to certain other listing operations of the listing machine, and assumes that only one line of information is to be listed from each card so that the card cycle and listing cycle are synonymous.

Curve A of Fig. 3 graphically represents the reset and reading operation of the first reading station 15, and assumes that the reading station at the initiation of the operation there graphically represented stores information from a card identified as card No. 1. Two complete listing cycles are shown in Fig. 3, each being identified both in degrees of cyclic operation and in milliseconds of elapsed listing cycle time. As represented by curve A, the first reading station read head 17 begins its reset operation at approximately 15 milliseconds after initiation of a listing cycle, completes reset at approximately 23 milliseconds, completes the reading of a stationary card No. 2 at approximately 31 milliseconds, and returns to its position of rest at approximately 39 milliseconds while storing the information read from card No. 2. The clearing of information from this read head and reading and storage of information from card No. 3 follows as indicated by curve A. The operation of the second reading station read head 23 is graphically represented by curve B which assumes that at the initiation of the listing cycle considered the station stores information from a card conveniently identified as No. 0 and thereafter reads and stores the information of card No. 1 concurrently with reading and storage by the first reading station 15 of information from card No. 2. Similarly, the second reading station 21 reads and stores information from card No. 2 concurrently with reading and storage by the first reading station 15 of information from card No. 3.

The two electronic cycles of the timing matrix earlier mentioned are graphically represented by curve C, and it will be seen that these cycles occur relatively early in each listing cycle. Curve D graphically represents an interval during the electronic check cycle of the timing matrix when certain information comparison operations are performed, such as comparison of information read from cards in one or both of the card feeds to ascertain that a master card corresponds with a companion detail card or to ascertain that the cards are in proper sequence. Curve E graphically represents an interval during the electronic print cycle of the timing matrix when information derived at the first reading station of each card feed is used to set up a bank of thyratrons which in turn control the set up of the print code rods of the printer to determine the character to be printed in each of the 90 print positions. Curve F graphically represents an interval when the print magnets are energized and actually actuate the print code rods of the printer in performing the actual type set up. The actual printer set up, however, occurs by movement of the code rods under control of the print magnets and according to the timing represented graphically by curve G. Actual line printing or listing occurs with the timing graphically represented by curve H, from which it will be noted that a line is printed just prior to the set up of a new line of type at the time represented by curve G.

Tracing specifically the printing of information read from card 1, and stored in the read head of the first reading station at the outset of the first listing cycle of Fig. 3, it will be seen that the card 1 information is set up in the print control thyratrons within this first listing cycle, and ultimately is set up in type form by code rod actuation near the end of this first listing cycle as represented by curve G. The information is not printed, however, until approximately the middle of the second listing cycle as indicated by curve H. While the information of a card is set up in the print magnets but before the information is actually printed, the accuracy of set up is checked or verified against information read from the same card at the second reading station. Referring particularly to curves B and C', the latter of which is a duplication of curve C but positioned for convenience graphically to represent the two electronic cycles of the timing matrix as related to the time when information is read at the second reading station and the read information utilized from this station, it will be noted that at the time information is read and stored in the first reading station from card No. 1 the second reading station reads and stores information from the preceding card. Thus referring specifically to the second listing cycle shown in Fig. 3, the first reading station stores information from card No. 2 at the outset of the cycle whereas the second reading station has read and stored information from card No. 1. During the major portion of the electronic check cycle, the information stored at the second reading station from card No. 1 is checked or verified against the type set up effected from information read at the first reading station from card No. 1 as indicated in Fig. 3 by the broken lines between curves G and C'. Since this occurs prior to the actual printing of a line of information from card No. 1, the checking operation can if desired be arranged to stop the machine when an error of type set up is found to exist, but in the representative form of listing machine hereinafter described the indicated error merely provides an alarm and indicates the location of the error.

Electrical control system

As will be explained more fully hereinafter, the electronic control unit 5 of the listing machine includes a number of electronic component structures many of which are arranged to have input circuits and output circuits (and in some instances control circuits) arranged to terminate in conventional manner in a plug board. This permits extreme flexibility in setting up the listing machine to perform various functions desirable for a particular application. As thus arranged, the several units may be connected and interconnected in conventional manner by plug board wiring. A representative arrangement of interconnected electronic component units capable of performing the functions suitable for a particular application of a listing machine embodying the invention is represented in Figs. 4a–4f, which should be considered together as a unitary structure in a manner represented by Fig. 4. It may be noted at this point that many of the electrical units shown in Figs. 4a–4f are interconnected by multi-conductor lines or cables, and for clarity of description each such line has a circled number associated with it to indicate the number of conductive circuits employed in that line. Also since many of the units are connected by plug hub wiring arranged according to the particular one of numerous types of listing operation of which the machine is capable, those units having both input and output plug hubs are usually provided in greater numbers than shown in Fig. 4 to enhance the flexibility of application of the machine for these numerous types of operation.

The timing matrix earlier mentioned is represented by a unit 30 which operates under control of a driving multivibrator 31. The check cycle of the timing matrix is initiated through a print cam starting circuit 32 as earlier mentioned, and the print cycle is initiated under relay control through a relay start circuit 33.

The arrangement and operation of the electrical control system will be considered first by tracing the manner in which information is transferred from the first reading station into the print set up mechanism under control of timing pulses generated by the timing matrix 30, and this will be followed by considering the manner in which information from the second reading station is transferred into information checking units to verify the accuracy of each print set up also under control of timing pulses. Thereafter the discussion will consider in detail the specific timing relationships and specific operations involved in certain comparison steps, a so-called signal search of the card information to determine operating control functions, certain relay control operations, and other like details involved in the over-all system operation.

Information read from a card at the first reading station of either feed is temporarily stored in the read head of that feed by a read head having the general construction and operation disclosed in the copending application of Klotz et al., Serial Number 376,929, filed August 27, 1953. Each read head of the present listing machine differs from that shown in the Klotz et al. application only in the number of sensing wires employed (there being 960 in the present read head). The cycle of motion of each read head in the present machine (established by the "home" position of the clutches 19 and 24) is from the storage or "intermediate" position referred to in the Klotz et al. application through reset and read positions and back to the intermediate position. For the purposes of the present description, it may be stated that each read head includes a total of 960 normally open pairs of contacts of which there is one contact pair provided for each index point of a card, and each such contact pair occupies a row and column position corresponding to the same position of the corresponding index point of the card. Upon reading a card, apertures in the card are sensed by projection of the read-head sensing wires through individual apertures of the card. Each such sensed aperture effects closure of the contact pair of the read head corresponding to the particular index point on the card. Thus upon completion of the reading operation, the read head will have a plurality of closed contact pairs corresponding in positional pattern to the identical pattern of punched index points of the read card and the remainder of the read head contact pairs will be open (thereby indicating unpunched index points of the card).

To transfer the information represented by the open and closed contact pairs of the read head, the timing pulses MI21–MI110 of the timing matrix 30 are applied through a ninety conductor line L1 to a feed-one direct print relay unit 35 and a feed-two direct print relay unit 35' each providing ninety relay-controlled contacts corresponding to the ninety print positions of the printer. Consider for the moment only the transfer of information from the read head 17 and assume that the ralay contacts of the unit 35 are so controlled as to translate the timing pulses to ninety direct print output plug hubs 36 of this unit. Assume further that eighty of these plug hubs are connected as indicated by the broken line 34 (used temporarily at this point merely to explain this phase of the listing operation) to individual selected ones of eighty input plug hubs 37 associated with the input circuits of a column drive unit 38. The timing pulses translated by the unit 35 so control the unit 38 as effectively to read or sample in succession (by control potentials applied through its eighty conductor output line L2) the eighty columns of the closed contact pairs of the read head 17. There are twelve rows of contact pairs in the eighty columns thereof in the read head as earlier explained, and the contact pairs in each row are connected to a common output circuit of the read head 17. Thus the latter includes twelve output circuits L3 corresponding to these rows, and as the timing pulses successively read or sample the read head contact pairs column by column those of the contact pairs which are closed in each column effect energization by successive column order of the corresponding one or ones of the twelve output circuits L3 of the read head. This identifies each data information bit read in Hollerith code form from the stored information of the read head. A twelve-to-six code form translator or converter 39 converts each information bit from Hollerith code form to a machine 6-bit binary code form (hereinafter referred to as an 11-0-1-2-4-8 code form) required for operation of the printer, which is more conventionally constructed for control by the latter code form rather than the Hollerith code form.

Figure 4E:
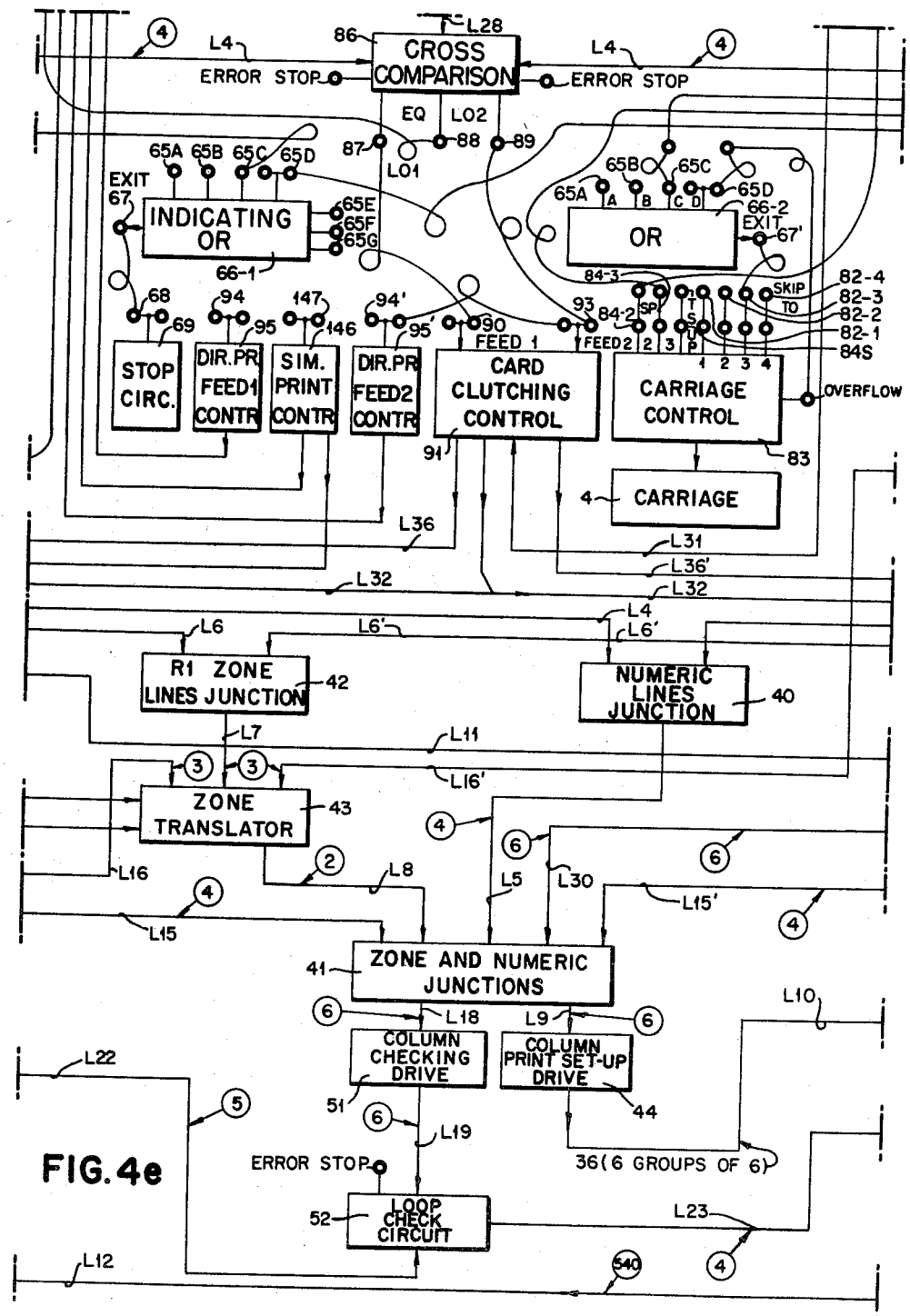

The successive numeric information bits of the read station 17, after conversion to the 6-bit binary code form by the translator 39, are applied through a four conductor line L4 to a numeric lines junction 40 (shown in Fig. 4e and which under certain conditions, not here considered, may also receive similar numeric information through a line L4' from the first read station 17' of the second feed). The output of the numeric lines junction 40 is applied during the electronic print cycle of the timing matrix 30 through a four conductor line L5 to a zone and numeric junctions unit 41. The latter also receives during the electronic print cycle zone information in Hollerith code form supplied through a three conductor line L6 directly from the output of the read head 17 to a zones line junction unit 42, which translates the zone information through a three conductor output line L7 to a zone translator unit 43 and through a two conductor output circuit line L8 of the latter to the unit 41. Under certain conditions not here considered, similar zone information may be supplied in the Hollerith code form through a three conductor line L6' from the read head 17' of the second feed and through the units 42 and 43 to the zone and numeric junctions unit 41. The zone translator 43 translates the Hollerith 0 and 11 zone information directly into machine 0 and 11 code bit information but operates to convert the Hollerith 12 zone information into a combination of machine 0-code and 11-code bits, so that the four digits of numeric information translated through line L5 and the three digits of zone information translated through line L6 are compacted to a total of 6 digits of information applied to the zone and numeric junctions unit 41 through lines L5 and L8. The zone and numeric information thus applied to the unit 41 is combined therein and is applied during the electroinc print cycle through a six conductor line L9 to a column print set up drive unit 44, which supplies this information through a thirty-six conductor line L10 during the print thyratron set up interval (Curve E of Fig. 3) to the print set up thyratron unit 45.

It may be helpful at this point to consider an illustrative example of a representative Hollerith code form suitable for use with the present listing machine together with the conversion of that code form to a binary code form by operation of the units 39, 49, 39', 49' and 43 which, as last mentioned, results in a 6-bit binary code form at the output circuits of the zone and numeric junctions unit 41. A representative code form of this type is given in Table A where the result of converting the Hollerith 12 zone information to a combination of machine zone 0-code and 11-code bits is evident.

TABLE A

| Numeral, Letter or Symbol | Card Punch | Converted to Binary Form | Letter or Symbol | Card Punch | Converted to Binary Form |
|---|---|---|---|---|---|
| 1 | 1 | 1 | J | 11-1 | 11-1 |
| 2 | 2 | 2 | K | 11-2 | 11-2 |
| 3 | 3 | 2, 1 | L | 11-3 | 11-2-1 |
| 4 | 4 | 4 | M | 11-4 | 11-4 |
| 5 | 5 | 4, 1 | N | 11-5 | 11-4-1 |
| 6 | 6 | 4, 2 | O | 11-6 | 11-4-2 |
| 7 | 7 | 4, 2, 1 | P | 11-7 | 11-4-2-1 |
| 8 | 8 | 8 | Q | 11-8 | 11-8 |
| 9 | 9 | 8, 1 | R | 11-9 | 11-8-1 |
| 0 | 0 | 0 | $ | 11-8-3 | 11-8-2-1 |
| # | 8-3 | 8, 2, 1 | * | 11-8-4 | 11-8-4 |
| | | | — | 11 | 11 |
| A | 12-1 | 0-11-1 | / | 0-1 | 0-1 |
| B | 12-2 | 0-11-2 | S | 0-2 | 0-2 |
| C | 12-3 | 0-11-2-1 | T | 0-3 | 0-2-1 |
| D | 12-4 | 0-11-4 | U | 0-4 | 0-4 |
| E | 12-5 | 0-11-4-1 | V | 0-5 | 0-4-1 |
| F | 12-6 | 0-11-4-2 | W | 0-6 | 0-4-2 |
| G | 12-7 | 0-11-4-2-1 | X | 0-7 | 0-4-2-1 |
| H | 12-8 | 0-11-8 | Y | 0-8 | 0-8 |
| I | 12-9 | 0-11-8-1 | Z | 0-9 | 0-8-1 |
| . | 12-8-3 | 0-11-8-2-1 | , | 0-8-3 | 0-8-2-1 |
| ☐ | 12-8-4 | 0-11-8-4 | % | 0-8-4 | 0-8-4 |
| & | 12 | 0-11 | | | |

The thyratron unit 45 comprises ninety groups of six thyratrons per group, and each such group controls the set up of an individual one of the print positions in the printer. These groups of thyratrons are energized sequentially group by group by MI21–MI110 timing pulses supplied to the unit 45 through a ninety-conductor line L11 from the timing matrix 30. The information from the unit 44 is in the form of a 6-bit code as earlier mentioned, and is applied to all of the thyratrons concurrently as arranged in six rows thereof corresponding to the six possible binary bits which may comprise the applied information. Thus if the applied information corresponding to a given data bit consists at a given moment of three binary bits, these binary bits are concurrently applied to the corresponding three rows of ninety thyratrons but since the groups of thyratrons are energized in succession only one group of six thyratrons is energized at that moment with the result that only three thyratrons of the energized group are fired. This progresses from thyratron group to thyratron group at the rate of presentation of the information in 6-bit code form so that at the end of the read-in interval comprised by the 90 timing pulses MI21–MI110 of the timing matrix 30 those thyratrons which stand in fired condition effectively record and store all of the successive information bits which have been applied to the thyratron unit 45, each group of thyratrons storing an individual numeral, letter or symbol.

After the thyratrons have been thus set up, they concurrently control through a 540 conductor line L12 the energization of 540 corresponding print magnets of the printer unit 3, and here again there are 90 groups of print magnets of which each group represents a print position and is comprised by six print magnets energized by individual ones of the six thyratrons of a corresponding group thereof in the unit 45. Accordingly at the end of the print magnet energization interval (curve F of Fig. 3), the print magnets have received all of the information applied to the thyratron unit 45. Actually, during this print magnet energization interval, the printer code print wire mechanism is actuated as a unit so as to print out the information stored therein from the last listing cycle. This printing process restores the code print wires and prepares them for reception of the new information now stored in the print magnets. The code print rods of the printer are then moved in accordance with the state of energization of their respective print magnets to preselected positions identifying an individual alphabetic, numeric, symbol, or punctuation character at each of the ninety print positions corresponding to the information to be listed from a given card. Shortly thereafter the code print wires of the printer are positioned by the code print rods so as to store the line of information which has been received by the printer as represented by the energized states of the print magnets of the unit 3. The information thus stored in the code print wires is printed out during the next listing cycle. In this, it will be appreciated that the information supplied to the printer unit for listing may comprise one line totaling ninety characters of which a maximum of eighty may be derived from the card and additional characters may be automatically inserted. The information may be supplied as successive groups of characters constituting two or three lines of information to be listed, the printer unit being automatically spaced under card-information control to effect selected positioning of successive listed lines on the document form in preparation. As earlier indicated, and as will be explained more fully hereinafter, the listed information may be distributed to any of ninety print positions, may be normally supplied concurrently from the first reading station of both the first and the second card feeds, or under card-information control may be selectively supplied from the first reading station of either feed and this applies for each line of listed information.

The manner in which verification of the accuracy of the printer type set up, for each line listed, is checked against information supplied from the second reading station of each feed will not be explained. Assume again for purposes of the present description that the plug hubs 36 of unit 35 (Fig. 4b) are connected to the plug hubs 37, as indicated by the broken line 34. The latter plug hubs constitute individual ones of the eighty input circuits of the column drive unit 38, as earlier explained, and also constitute individual ones of eighty input circuits of a column drive unit 48 for the second read head 23. Thus the timing pulses from the timing matrix 30 are translated through the direct print unit 35 and are applied to the column drive unit 48. As in the case of the first reading station, the column drive unit 48 controls through an eighty conductor output line L13 the read out of information from the read head 23 of the second reading station, and this read head also has a twelve conductor output line L14 through which the information read out is supplied to a twelve-to-six translator or converter unit 49 for conversion of the Hollerith code to the 6-bit binary code form earlier mentioned.

The numeric digits of the unit 49 are translated through a four conductor transmission channel L15 to the zone and numeric junctions unit 41, and the zone information of the read head 23 (in Hollerith code form) is also translated through a three conductor line L16 to the zone translator unit 43 where the zone information may be selectably controlled and applied from the latter unit through the transmission line L8 to the junctions unit 41. Under certain conditions not here considered but which will be later described, the checking or verification information from the second reading station of the second feed may likewise be read out of the second station read head 23' and be supplied through a four conductor numeric line L15' and a three conductor zone line L16' and the line L8 to the zone and numeric junctions unit 41. The accuracy checking or verification information thus supplied to the unit 41 from either or both of the second read stations of the feeds Nos. 1 and 2 is translated during the electronic check cycle through a six conductor line L18, a column checking drive unit 51 and a six conductor line L19 to a loop check circuit unit 52. The print magnets of the printer unit 3 each operate (or a separate relay corresponding to, and energized concurrently with, such print magnet itself operates) a normally open contact which is closed whenever the print magnet becomes energized under control of the thyratron unit 45 as earlier explained, and these 540 contacts of the print magnets constitute a checking contact system 53. The timing matrix 30 during the electronic check cycle supplies to the checking contact system 53 through a ninety conductor line L21 ninety timing pulses MI21–MI110 corresponding to the ninety print positions of the printer, and each such timing pulse is concurrently applied to an individual group of six check contacts associated with a group of six print magnets identifying an individual one of the print positions of the printer unit. Corresponding ones of each of the six-group check contacts of the system 53 are connected in common through an individual circuit of a six conductor output line L22 to the loop check circuit unit 52. The timing pulses effectively read or sample successive groups of checking contacts, and corresponding conductors of the line L22 are energized according to the closed contacts of each successive contact group as thus sampled. Each group of checking contacts therefore identifies and supplies to the check unit 52 at each sampling moment the binary code form of a corresponding bit of information as actually set up in an individual print position of the printer 3. There is also supplied at the same moment from the second reading station to the loop check circuit 52 a corresponding bit of information identifying what should be the correct set up of the printer at the corresponding print position. The unit 52 operates during the electronic check cycle to match the identity of the information thus supplied to it at each moment through corresponding conductors of the lines L19 and L22, and derives an output potential whenever identity of the compared information fails. This output potential may be developed, of course, at a check time corresponding to any of the ninety print positions and in accordance with its time of development is supplied through a single conductor circuit L23 to a check thyratron unit 55 having ninety thyratrons corresponding to the ninety print positions of the printer unit. This lack-of-identity potential is applied to a control electrode of all of the thyratrons concurrently. The MI21–MI1110 timing pulses of the timing matrix 30 are supplied through the ninety conductor line L11 to individual second control electrodes of the thyratrons of unit 55, so that concurrent energization of any thyratron by a timing pulse and a lack-of-identity potential supplied through the line L23 causes this thyratron to fire and indicate error in the print set up at the print position corresponding to that thyratron. The thyratrons of the unit 55 control individual indicators of an indicator unit 56 through a ninety conductor line L20 to provide a visual indication of the print position at which the error of print set up is detected.

As will be evident from Fig. 3 earlier considered, the information read at the first reading station of either feed from a given card in one listing cycle is not effective to set up the type of the printer unit until the following listing cycle. It will be recalled, however, that if card No. 1 is read and the information stored at the first reading station of a given feed in a given listing cycle, it is not read and stored in the second reading station of that feed until the next listing cycle. Accordingly, the second reading station has the information of a given card in storage and available for checking or verification purposes in the same listing cycle when the information from that card is ultimately utilized in setting up the type of the printer unit. It is important to keep this fact in mind if the relative timing of the print set up and accuracy check of that set up are to be clearly perceived. Actually, and as indicated more clearly by the timing chart of Fig. 5 to which attention is now directed, the print thyratron set up and checking operations occur in different ones of the two cycles of operation of the timing matrix 30. Curve A of Fig. 5 shows that accuracy checking is accomplished during the last ninety timing-pulse interval of the electronic check cycle of the timing matrix whereas the set up of the thyratrons of unit 45 occures during the interval of the last ninety timing pulses of the electronic print cycle of the timing matrix as indicated by curve B of Fig. 5. In this, and bearing in mind what has just been said, it should be remembered that the thyratron set up during the electronic print cycle occurs in one listing cycle whereas the checking operation during the electronic check cycle of the timing matrix does not occur for a corresponding card until the next listing cycle.

It was earlier explained that many of the components of the listing machine herein described have pluggable input and output circuits to provide flexibility in selectably setting up the character of operation and function of the machine for a particular application. In order to illustrate this flexibility of operation by use of a particular representative application for which the present machine is suited, the arrangement of Figs. 4a–4f is shown with certain illustrative plug hub wiring to accomplish a particular form preparation. The following description will consider various types of operations and functions of the listing machine as thus plug hub wired. The salient features of the described operation may be briefly listed as follows, the operation assuming that a master multiple-line-listing card is read in the first feed and that a detail card to be listed is read in the second feed:

(1) A sequence comparison, a major-minor control function, and a digit search control function is accomplished by utilizing the information supplied within both feeds;

(2) An out-of-sequence indication from either feed is effective to stop the machine;

(3) The initiation of each of successive card movements into the first feed is under control of cross-compared information supplied by both feeds, and specifically occurs upon the cross comparison indicating that the numeric control information of the first reading station of the first feed is lower than the numeric control information of the first reading station of the second feed;

(4) Multiple-line-listing operations are controlled by reading multiple-line control information from the first feed concurrently with the occurrence of an equal cross comparison between the numeric information of the first reading stations of both feeds;

(5) The initiation of each card movement into the second feed, and direct listing of information from the second feed, is under control of cross-compared numeric information from both feeds and specifically is effected by the numeric information of the first reading station of the second feed being lower than the numeric information of the first reading station of the first feed;

(6) The printer unit carriage is caused automatically to skip to the next form in preparation either automatically in response to completion of a form or upon information read and compared between the first and second reading stations of the second feed and indicative of a "major" control change (i.e. such as a differentiation indicating that one group of related cards has been listed and the next card read constitutes the first card of a second group of related cards);

(7) A comparison of numeric information between cards read at the first and second reading stations of the second feed provides a "minor" control function causing triple line spacing within the same form under preparation;

(8) On the first listing cycle of a three-line multiple-line-listing operation, suppression of zone information from a reading station is started on column 18 and ended on column 24 of the read card;

(9) An asterisk is printed in print position No. 68 on a second feed direct-list operation; and

(10) A zone information bit in a particular control column and a second feed direct-list operation causes selection of a different field of the card to be read and listed than would otherwise normally be read and listed.

As just indicated, certain types of information are compared both between the reading stations of the two feeds and also between the reading stations of each feed by which to effect certain machine control operations. These comparing operations occur within the interval of the first twenty timing pulses MI1–MI20 of the electronic check cycle of operation of the timing matrix 30 as graphically indicated by curves C and D of Fig. 5. To this end, the first twenty timing pulses of the check cycle of the timing matrix 30 are supplied through twenty-conductor lines L24 and L24' to individual ones of twenty plug hubs 60 and 60' for the respective first and second feeds where they are available for control of the comparison functions of the machine.

One simple form of machine control by information comparison is that effected by a numeric sequence comparison unit 62 (Fig. 4a) used in the first feed and by a similar unit 62' (Fig. 4c) used in the second feed. The cards from which information is to be read are fed through the listing machine in ascending order of numeric sequence recorded in a given twenty column (or less) field of the card used for comparison, major and minor control purposes. The plug hubs 60 are wired to the appropriate given field input plug hubs 37 for the column drive units 38 and 48 to effect comparison-interval read out of information read and stored by the read head 17 with respect to the latest-read card and concurrent read out of information read and stored by the read head 23 with respect to the preceding card. The binary code digits identifying the resultant numeric output of the translator 39 of the first reading station and of the translator 49 of the second reading station are both supplied through respective multi-conductor lines L25 and L26 to the sequence comparison unit 62 where the equal-valued digits of the numeric information are compared as the stored information of the read heads 17 and 23 is read column by column through the control field of the card. Since the control field may be less than twenty columns wide, sequence comparison may be terminated by wiring an appropriate one of the plug hubs 60 of the timing matrix 30 to an "end" plug hub 63 of the sequence comparison unit 62 to terminate the sequence comparison operation after reading the last column from which comparison information is derived from the information stored in the read heads 17 and 23; otherwise the timing matrix plug hub 60 corresponding to the 20th card column of the comparison field is wired to the end plug hub 63 of the unit 62. The sequence comparison unit 62 operates to recognize a step down in numeric sequence, which ordinarily can occur only when a card has been missorted or misfiled in sequential order. When such numeric sequence step down is recognized by the unit 62, a control pulse is developed at its "low" output plug hub 64 and this output is ordinarily wired to an input plug hub 65C of an indicating OR unit 66–1 having a visual indicator lamp associated with each of its input plug hubs 65A–65G to indicate which plug hub receives a pulse at any time. This indicating feature is desirable especially since an output plug hub 67 of the OR unit 66–1 is wired to an input plug hub 68 of a machine stop control unit 69 which is effective to stop further operation of the listing machine such as upon the occurrence of the last-mentioned step down in numeric sequence. In similar manner, the timing matrix comparing control plug hubs 60' are plug hub wired to the appropriate control field input plug hubs 37' of the second feed units 38' and 48' to effect sequence-interval read out of the read heads 17' and 23'. The sequence comparison unit 62' of the second feed accordingly receives numeric comparison information from the first and second reading stations of the second feed, and has its output plug hub 64' similarly plug hub wired to the unit 66–1 and through the latter to the stop unit 69 also to terminate operation of the machine upon detection of a numeric sequence step down in the cards feeding through the second feed. Numeric sequence comparison as just described is ended for major and minor numeric information, which is read prior in point of time to the reading of any alphabetic comparison information.

A major-minor control unit 71 compares both numeric and alphabetic information. The zone information is supplied through the line L25 from the translator 39 of the first reading station and through the line L26 from the translator 49 of the second reading station. While the development of any output potential at the low output plug hub 64 of the sequence comparison unit 62 is terminated under control of the timing pulse applied to its "end" plug hub 63, the sequence comparison unit nevertheless continues to compare the numeric information from the first and second reading stations so that any inequality of compared numeric information may be supplied through a two conductor line L27 for use by the major-minor control unit 71. The latter may use this information directly for its numeric major-minor control seeking function, and may combine the information with zone information to seek out inequalities in alphabetic information supplied to it. The search by unit 71 for inequality of numeric major control information is initiated by timing pulses applied to its start plug hubs 72 and is terminated by a timing pulse applied to its end plug hubs 73, whereas its search for inequality in alphabetic major control information is initiated by a timing pulse applied to its start plug hub 74 and is terminated by a timing pulse to its end plug hub 75. Similarly, the search for inequality of minor control numeric information is initiated and terminated by timing pulses applied to the respective start and end plug hubs 76 and 77, and the search for inequality of alphabetic minor control information is initiated and terminated by timing pulses applied to its respective start and end plug hubs 78 and 79. A major inequality develops a control output potential at the major output plug hub 80, whereas a minor inequality develops an output control potential at the minor output plug hub 81.

In the illustrative arrangement herein described, the major-minor control unit 71 is not used in the first feed to perform any control function, but the corresponding unit 71' of the second feed is used for control purposes in a manner which will now be considered. In the latter unit timing pulses are shown applied to the numeric major start and end plug hubs 72' and 73'. Termination of output of the sequence comparison unit 62' is indicated as occurring upon a timing pulse intermediate the start and end timing pulses for major numeric information. The unit 71' is also shown as arranged for comparison of minor alphabetic information by plug hub wiring to the minor alphabetic start and end plug hubs 78' and 79'. The major output plug hub 80' of this unit is shown as utilized for skip control through an OR unit 66–2, the exit 67' of which is wired to a "skip-3" plug hub 82–3 of a carriage control unit 83. The latter effects selective energization through the three-line space aperture of the carriage spacing-control tape, and thereby causes the carriage 4 to space the form either to a preselected position on the form then in preparation or even to a preselected position on the next succeeding form. The output of the minor exit plug hub 81' of the unit 71' is shown as applied to a three-line space control plug hub 84–3 of the carriage control unit 83 by which to effect a three-line space operation. This unit also includes a one-line skip plug hub 82–1, a two-line skip plug hub 82–2, a four-line skip plug hub 82–4 (all operating in similar manner to that described for the plug hub 82–3), and further includes a two-line space plug hub 84–2 and a space-suppress plug hub 84S.

Certain machine operations are also controlled by comparing the information from the first reading station of the first feed with the information from the first reading station of the second feed. To this end, a cross-comparison unit 86 (Fig. 4e) is provided and receives numeric information both through the line L4 from the translator 39 of the first reading station of the first feed and also through the line L4' from the translator 39' of the first reading station of the second feed. The numeric information to be thus cross compared is included within the same portion of the comparison field that is sequence compared by the unit 62 of the first feed, and accordingly the end timing pulse which is applied to the unit 62 is also conveniently applied through a single conductor line L28 to control the termination of cross comparison by the unit 86. The latter compares the equal-valued digits of the numeric information read column-by-column during the comparing interval from the first station of each feed, and upon the basis of this comparison develops a low-one output control potential at its low-one output plug hub 87 (the numeric information of the first feed is of lower value than that of the second feed), an equal output potential at its equal output plug hub 88 (equal-valued information), or a low-two output control potential at its low-two output plug hub 89 (the numeric information of the second feed is the lower).

The low-one output of unit 86 is applied to a feed-1 input plug hub 90 of a card-clutching control unit 91. The latter unit responds to a potential applied to this input plug hub and, through a transmission line L36, controls a reader control unit 92 to effect transfer of a new card from the input card hopper to the first reading station, concurrent transfer of the previously read card to the second reading station, and concurrent transfer of the card in the second station to the output card hopper.

An output developed at the low-two output hub 89 of the cross-comparison unit 86 performs two functions. First, this potential is applied to an input plug hub 93 of the card-clutching control unit 91 and also to an input plug hub 94' of a direct print feed-2 control unit 95'. The card-clutching control 91 applies a control potential to a feed-2 reader control unit 92' which effects movement of a new card from the input card hopper to the first reading station of feed 2, concurrent transfer of a card from the first reading station to the second reading station, and concurrent transfer of a card from the latter to the output card hopper. At the same time, the direct print feed-2 control unit 95' actuates relays of a direct print feed-2 relay system 35' which provide ninety print control contacts through which ninety timing pulses MI21–MI110 are translated from the timing matrix 30 and its output line L1 to ninety direct-print output plug hubs 36' of the unit 35'. A maximum of eighty of these output plug hubs 36' may be plug hub wired to the input plug hubs 37' of the column drive units 38' and 48', although in the arrangement herein described a selected field having a maximum of ten columns is plug hub wired as shown to corresponding input plug hubs 96 of a field selector unit 97 which has an input control plug hub 98 receiving a control pulse from the matrix print exit plug hub 99' of the unit 35'. A pulse applied to the plug hub 98 causes the field selector to connect its input plug hubs 96 to normal output plug hubs 100 which are plug hub wired to plug hubs 37' providing the selected example field of ten columns appropriately distributed within the 80 input circuits of the column drive units 38' and 48' of the respective first and second reading stations of the second feed. This causes read out of the stored information in the first reading station to selected print positions in the printer unit, in the manner earlier described, and subsequent accuracy verification of the print set up from information stored in the second reading station of the second feed.

Under the condition that certain control information is punched into the card read at the first reading station of the second feed, and as noted above in the list of functions to be performed by the listing machine, an asterisk is punched in print position No. 68 on the last-described direct printing operation for the second feed. This control information is derived during a so-called "signal search" interval presently to be considered, but for the moment suffice it to say that the result of reading this control information from the card during the signal search interval has the effect of energizing an input plug hub 101D of an AND unit 102–1 (Fig. 4f) from an output plug hub 103T of a digit distributor 104–1. The AND unit 102–1 is further conditioned by a control potential applied at this time from the direct print feed-2 output control plug hub 99' of the unit 35' to another input plug hub 101C of the AND unit 102–1. When so energized, the AND unit 102–1 develops an output potential in its output plug hub 107 which is plug hub wired to an input plug hub 108 of a cycle pick-up coupler 109. The latter has an input plug hub 110 which is plug hub wired to the electronic print cycle output plug hub MI–68 of the timing matrix 30 to receive a timing pulse identified with print position No. 68 of the printer unit. The coupler unit 109 has an output plug hub 112 in which an output pulse is developed at a time corresponding to the selected print position (position No. 68 in the example herein described) at which the asterisk is to be printed, and this output pulse is applied through a plug hub bus 113 to the "11" digit plug hub 115, the "4" digit plug hub 119 and the "8" digit plug hub 120 of an automatic character insertion unit 121 (the digits 11–4–8 being the binary coded identification of an asterisk). The latter also includes input plug hubs 116 for "0" insertion, 117 for a "1" digit insertion, and 118 for a "2" digit insertion in order that any desired character or characters may be inserted to suit a particular application. The timing pulse thus applied from the coupler 109 to the unit 121 causes an asterisk 11–4–8 code to be translated through a six conductor output line L30 of this unit to the zone and numeric junctions unit 41 where it is used both in setting up the thyratrons of the unit 45 and in effecting verification of the accuracy of print set up by operation of units 51, 52, 53 and 55.

If the cross comparison unit 86 develops an output potential in its equal output plug hub 88, this potential is applied to an input plug hub 101A of an AND unit 102–2 which also may receive a potential applied to its input plug hubs 101C and 101D from respective feed-1 digit distributor units 104–2 and 104–3. The latter units operate during the digit search interval earlier mentioned, and which it was explained would be considered in detail hereinafter. For the moment suffice it to say that output potentials are concurrently developed at the output plug hubs 103T, 103T of the respective digit distributors 104–2 and 104–3 in response to concurrent reading of a 12 and a 3 index point punch in a multiple-line-listing (MLP) control column of a card read at the first station of the first feed. The concurrently applied potentials at the plug hubs 101A, 101C and 101D of the impulse coupler 102–2 develops a potential in its output plug hub 107 which is applied to a three-line-listing or MLP-3 input control plug hub 128 of a multi-line print control unit 129.

This latter unit also includes one-line and two-line MLP listing input control plug hubs 130 and 131, which are not used in the representative application herein described, and performs such machine controls as to enable selectable listing of one line, two lines, or three lines of information from the card being read at that time at the first reading station of the first feed. The multi-line print control unit 129 controls a plurality of relay contacts in a multi-line feed-1 selector unit 133 in such manner that a first group of twenty-four of its output plug hubs 134 are energized to list information on a first line according to twenty-four print positions plug hub wired to its twenty-four input plug hubs 134a from ninety multi-line print position output plug hubs 135 of the timing matrix 30; a second group of twenty-four output plug hubs 136 similarly effect listing of information on a second line; and a third group of twenty-four output plug hubs 137 likewise effect listing of information on a third line. This permits a maximum of any twenty-four print positions to be selected for listing of each of the multi-listed lines. The units 129 and 133 thus so operate that the timing pulses corresponding to the selected print positions for the first, second and third lines to be listed are applied to the input plug hubs 37 common to the input circuits of both of the column drive units 38 and 48 of the respective first and second reading stations of the first feed, thereby effecting print set up by the printer unit of three lines of information read out of the stored information in the first station and verified for accuracy from corresponding information read out line-by-line from the information stored at the second reading station. This information for the three lines so listed is read from three selected fields of the card such as those identifying name, street address, and city. The multi-line print control unit 129 also applies a control pulse through a line L31 to the card-clutching control unit 91, and the latter in turn controls the reader control units 92 and 92′ to prevent the feed of a new card from the input card hopper to the first station until such time as the listing of the three lines of information has been completed.

A second multi-line print control unit 129′ is provided for the second feed, but is not utilized in the typical application of the listing machine herein described. This unit might well be used, for example, in an application where cards running through both feeds supply multi-line listing information such as that required for preparation of mailing labels printed in side-by-side relation on a form to be later separated into individual labels, the side-by-side labels being printed independently by the two card feeds but concurrently through concurrent operation of both feeds.

The multi-line print control unit 129 is provided with a plurality of output control plug hubs of which there is one plug hub 139 effective upon one-line listing to develop an output control potential initiated during the same listing cycle in which print set up for that line occurs, a pair of output plug hubs 140 effective upon two-line listing to develop two successive control potentials initiated by corresponding listing cycles, and three output plug hubs 141 effective for three-line listing to develop three successive control potentials initiated by corresponding listing cycles. The unit 129 is also provided with three additional groups of plug hubs 142, 143 and 144 which likewise develop output control potentials in the manner just described but with the difference that the potentials developed in these plug hubs is initiated during the next listing cycle to that identified by associated line 1, lines 1 and 2, and lines 1, 2 and 3. All of these developed output potentials may be used for machine control purposes. By way of example of this, the lines 1 and 2 plug hubs 144 are coupled to input plug hubs 65A and 65B of an OR unit 66–3 which has an output plug hub 67 plug hub wired to the double-space input plug hub 84–2 of the carriage control unit 83 to effect double line spacing between each line of the three line listing effected by the unit 129.

While not used in the foregoing described illustrative apparatus arrangement, the direct print feed-1 relay unit 35 has utility in those applications where it is desired that there be direct printing or listing of information from the first feed, and this may occur alternately or concurrently with direct print or listing of information from the second feed through the unit 35′. When direct print of feed-1 information under control of the unit 35 is desired, a direct-print feed-1 control unit 95 (Fig. 4e) has its input plug hubs 94 plug hub wired in accordance with the desired logic of a particular application, and this unit in turn controls the direct-print feed-1 relay unit 35 to effect the desired listing operation in the manner earlier explained. In this, the exit plug hub 99 of the unit 35 may be plug hub wired to a field selector as in the case of the field selector 97 associated with the direct-print feed-2 unit 35′.

In those applications of the listing machine where information is to be concurrently listed from both the first and the second feed, a simultaneous print control unit 146 (Fig. 4e) has its input plug hub 147 plug hub wired in accordance with the logic of the particular application. This unit controls a simultaneous print relay unit 148 having ninety output plug hubs 149 which are plug hub wired, for particular print positions of the printer, to the plug hubs 37 and 37′ of both feeds. The simultaneous print relay unit 148 also includes exit plug hubs 150 and 150a for use with field selectors (like the selector 97) in accomplishing the desired logic of the particular application. Exit plug hub 150 develops a control potential in the electronic print cycle of the same listing cycle that a control potential is applied to the input plug hub 147 of the simultaneous print control unit 146, whereas the control potential developed at the exit plug hub 150a occurs in the electronic check cycle of the next listing cycle.

It has been explained above that during set up of the printer from the information read at the first reading station of either the first or the second feed or both, the column drive units 38 and 38′ cause read out of information from the read heads 17 and 17′. It was also explained that the information stored in the read heads 23 and 23′ of the second reading stations of the first and second feeds is used to verify the accuracy of the print set up. The timing sequence with which the print set up and checking functions are accomplished will now be considered in a little more detail. The column drive units 38 and 38′ are energized through lines L29 and L29′ by a column drive control unit 153 during the electronic print cycle for purposes of print set up and also during the interval of the first twenty timing pulses of the electronic check cycle for purposes of sequence and cross comparison. The column drive control unit 153 also energizes through lines L35 and L35′ the column drive units 48 and 48′ of the second reading stations during the entire interval of the electronic check cycle in order that information may be read out of the second reading stations during the first twenty timing pulses of this cycle for sequence comparison purposes and during the remainder of the cycle for checking or verification purposes. This somewhat alternating control of the column drive units 38 and 48 on the one hand and 38' and 48' on the other by the control unit 153 primarily effects a form of isolation between the column drive units within each feed so that the timing pulses plugged according to card type and desired print positions are fed first through the first station read heads 17 and 17' and secondly through the second station read heads 23 and 23' during the electronic print cycle and electronic check cycle respectively. This isolation has special significance during a so-called digit or signal search interval graphically represented by curve E of Fig. 5, and comprised by the timing pulses MI21–MI40 of the electronic check cycle, when information must additionally be read out of the read heads 17 and 17' of the first reading stations. The significance of these digit or signal search functions will presently be considered in more detail.

The control unit 153 is controlled by a matrix check and matrix print relay unit 154 which receives timing pulses from the timing matrix 30 by which to identify the electronic check cycle and electronic print cycle of the latter and provide a corresponding control of the unit 153. The unit 153 is supplied through a line L32 with control potentials from the reader control units 92 and 92' and the card-clutching control unit 91, and operates under control of these units in a manner and for reasons which will be explained more fully during the detailed description of these units. The unit 153 is also under control of the relay units 35, 35', 133, 133' and 148, this control being one of a nature verifying proper actuation of these relays as a condition to operation of the unit 153.

Considering now in more detail the digit or signal search interval, which extends from the 21st through the 40th timing pulse of the electronic check cycle of the timing matrix 30 and which is represented by curve E of Fig. 5, the information stored in the read heads 17 and 17' is searched for specific digit control information. For this purpose, potentials developed in a digit search output line 155 of the control unit 153 so control certain outputs of the timing matrix 30 as to cause the timing pulses MI21–MI40 of the electronic check cycle of the latter to be applied to digit search plug hubs 156 for the first feed and 156' for the second feed. These latter plug hubs are plug hub wired to input plug hubs 157 and 157' which are directly connected to any selected twenty columns of contacts of the read heads 17 and 17' of the first reading station of the first and second feeds. It will be noticed from Fig. 5 that these digit search pulses are applied to the read head input plug hubs 157 and 157', and thus directly to the read heads, after the comparing interval (timing pulses MI1–MI20 of the electronic check cycle) during which the column drivers 38 and 38' were energized. The read out functions of the read heads 17 and 17' during the signal search portion of the electronic check cycle are effectively isolated by the column drive control unit 153 acting in conjunction with the column drives 38 and 38' as earlier mentioned.

The digit search is for a specific digit or any combination of digits punched in any of the eighty columns of the card, so that there are 80 digit search plug hubs 157 and 157' although only a maximum of twenty digit search operations may be effected by selectable plug hub wiring to the digit search plug hubs 156 and 156'. The output of the read head 17 includes twelve digit search exit plug hubs 158, and the read head 17' similarly includes twelve digit search exit plug hubs 158', there being an individual such exit plug hub corresponding to an individual one of twelve bits of Hollerith code information which may be read from any searched column of information of the read heads. One or more of the exit hubs 158 become active depending upon the card punching in the column being searched. In the illustrative listing machine herein described, the exit hubs 158 of the read head 17 are connected to pick-up plug hubs 111P–2 and 111P–3 of the respective digit distributors 104–2 and 104–3 which are also supplied with the digit search pulses through a twenty conductor line L33 from the timing matrix 30. The units 104–2 and 104–3 use the digit search pulses to translate the information read from storage in the read head 17 into machine control pulses as previously explained in connection with units 104–2 and 104–3. The digit search exit hubs 158' of the read head 17' of the second feed are shown plug hub coupled to pick up hubs 111P–1 of the feed–2 digit distributor 104–1, which also receives digit search pulses through the line L33, so that the information read out of storage from the read head 17' is likewise translated into machine control pulses used for a purpose previously described.

In connection with the digit distributors 104–1, 104–2 and 104–3, it may be stated that each includes a normal output plug hub 103N in which is developed a control potential for a portion of every listing cycle except when the input plug hub 111P is energized. The latter energization transfers the developed control potential from the output plug hub 103N to the output plug hub 103T. In other words, the normal plug hub 103N of each digit distributor develops an output control potential on every listing cycle until digit information is applied (during the digit search interval) to the input plug hub 111P of the digit distributor thereto to cause the output control potential to be thereafter developed at the output plug hub 103T. The control potential from either the transfer hub 103T or normal hub 103N can be wired directly to control selection, printing, card feeding, and other operating features although they are more commonly used in combination with other controls. Thus in the listing machine herein described, only the transfer plug hubs 103T of the digit distributors 104–2 and 104–3 are used to control the AND unit 102–2 (and thereby establish a multi-line printing operation in the manner earlier described) while only the transfer plug hub 103T of the digit distributor 104–1 is used to control the AND unit 102–1 (for asterisk insertion) and to control the field selector 97 by plug hub wiring to a digit pickup plug hub 164 of the latter.

In regard to control of the field selector 97, it may be mentioned at this point that its ten input plug hubs 96 are not normally internally connected to corresponding ones of its ten normal output plug hubs 100 or to its ten transferred output plug hubs 163. A control potential applied to its cycle and normal pick-up plug hub 98 causes internal connection of the plug hubs 96 and 100, while concurrent energization of its plug hubs 98 and 164 causes internal connection of its plug hubs 96 and 163. The latter plug hubs remain interconnected during the electronic print cycle of one listing cycle and the electronic check cycle of the succeeding listing cycle. Accordingly, whenever a preselected zone control information bit is read from read head 17' to transfer the digit distributor 104–1 during a direct print feed–2 control operation, it causes a transfer of the field selector 97 to cause its plug hubs 96 to be connected to its output transfer plug hubs 163 and thereby causes a different field of the stored information in the read head 17' to be read and printed.

The listing machine described herein also includes provision for controlled suppression of zero and zone information to eliminate this information from that supplied to the printer for listing. Any such information eliminated during printer set up must, of course, be again eliminated during the succeeding automatic checking operation when the accuracy of print set up is verified. The present listing machine has provision for also accomplishing this second information elimination in an entirely automatic manner. Suppression of preselected zero and zone information is desirable for several reasons. With respect to zero suppression, a given width of card field must often be selected for listing the largest number of significant digits of numeric information which will be encountered in a particular application. A given listing may, however, not require the full digit field assigned to such numeric information, and in these instances it is often desirable to suppress or eliminate zeros to the left of the first significant digit of the numeric information actually listed. The suppression of zone information may be desirable from the standpoint that it permits numeric card fields to be used for the dual purpose of recording numeric information for listing purposes and additionally of independently recording zone information useful in control of machine functions, thus to expand the recording capacity of a card for machine control purposes. The recorded numeric information of these dual-purpose fields is ignored by the machine insofar as functional control is concerned, and zone suppression within a numeric card field permits the desired numeric listing operation to be performed without any interference from the recorded zone information.

Zero and zone suppression is effected by a unit 165 which operates under preselected control to accomplish several types of suppression as desired. Zone information contained in selected fields may be suppressed from numeric information otherwise listed from those fields, or zone information combined with zeros may likewise be suppressed, or zeros to the left of the first significant digit listed in a numeric field may be suppressed. All such zone and zero suppression may be plug hub wired to be effective during a direct print operation, a multiple-line listing operation, or a simultaneous print type of operation or even by use of an equivalent machine control potential to introduce a preselected suppression control for a specific listing cycle.

The zero or zone suppression unit 165 includes a cycle pick-up hub 166 which is here shown by way of example as plug hub wired to the first cycle plug hub 141 of the multi-line print control unit 129. The plug hub 141 is energized beginning with the electronic print cycle of the timing matrix 30 corresponding to the first listed line and continuing through the electronic check cycle of the next listing cycle, so that the zero and zone suppression unit 165 is energized during the electronic print cycle of one listing cycle while the printer is set up and also during the succeeding electronic check cycle when the accuracy of the printer set up is verified. The zero and zone suppression unit 165 includes a zone start suppression plug hub 168, which is here shown by way of example as plug hub wired to print position plug hub MI–21 corresponding to the twenty-first timing print-cycle pulse of the timing matrix 30, and includes a stop suppression plug hub 170 here shown as plug hub wired to the twenty-fourth timing pulse plug hub MI–24 of the timing matrix 30. The cycle pick-up plug hub 166 thus effects zone suppression during the first line listing of a three-line listing or MLP–3 operation, the suppression starting in accordance with the zone start timing pulse applied to plug hub 168 and stopping in accordance with the stop timing pulse applied to plug hub 170. During the interval extending from timing pulse MI21 to timing pulse MI24 of a first line listing of an MLP operation, the unit 165 controls the zone translator unit 43 to suppress transmission by the latter of all zone and zero information. Accordingly, this suppressed information is not supplied to the zone and numeric junction unit 41 for either listing in a given listing cycle or for checking purposes in the succeeding listing cycle.

Zero suppression alone may be effected by energization of the cycle pick-up hub 166 of the unit 165 in conjunction with energization by a selected timing pulse applied to a zero start suppression plug hub 174, suppression being terminated in accordance with the energization of the stop plug hub 170 by a selected stop timing pulse. In this type of operation, zone information (which is needed when alphabetic information is to be listed concurrently with numeric information) is not suppressed, but the unit 165 so controls the translator unit 43 that all zeros are suppressed to the left of the first significant digit of numeric information listed. As in the case of zone information suppression, zero suppression is effective both during the printer set up interval and the succeeding interval when checking or verification of the printer set up is performed.

The listing machine herein described automatically stops when a card fails to apear in the second reading station of either feed at the time of card reading by the read head. It will be appreciated from what has been said that the absence of a card from a reading station at card reading time effects closure of all the reading head contacts. To detect this condition, a "zero" timing pulse MI–0 (which precedes timing pulse MI–1 of the electronic check cycle) is supplied through a single conductor line L34 to the first column of contacts of the read heads 17 and 23 of the first feed and through a line L34′ to the first column of contacts of the read heads 17′ and 23′ of the second feed. This zero timing pulse is translated to the reader control unit 92 or 92′ through the 12-11-0 zone contacts by lines L6 and L6′ (which concurrently close only under the "no card" reading condition at a given read head) and the lines L16 and L16′ if there is no card in the second reading station of a feed. The reader control unit to which this concurrent Hollerith -12-, -11-, -0- zone information is supplied utilizes the information as a "no card" control indication accomplishing the following results. A no card detection trigger (corresponding to the second station) in the reader control unit 92 or 92′ is turned On, and this so controls the operation of the column drive control unit 153 that read out of information is immediately terminated (prior to MI–1 time of the electronic check cycle) from the second reading station of the feed where the no card indication arose. Read out of information from the second station is not resumed until the no card detection trigger is reset Off. The On state of the no card detection trigger results in a forced clutching operation of the second reading station under machine controlled timing, which resets the no card detection trigger Off but has no other effect at this time except to remove any card in the second reading station which is so defective or so erroneously punched as to give rise to the no card detection indication.

DETAILED DESCRIPTION OF COMPONENT UNITS

The foregoing description of the listing machine control system indicates the nature of the construction and operation of numerous component electrical or electronic units. Each of these will now be disclosed and described in more detail, starting with those units which exercise over-all timing and program or sequence control of the listing machine.

Timing matrix 30 and multivibrator 31

It has been explained above that the timing matrix 30 operates under control of a multivibrator 31 and has two successive cycles of operation, one of which is conveniently identified as a "check" cycle initiated by card master circuit breakers (984 and 985 of Fig. 26) provided in each reader control unit of the two card feeds and which energize a control circuit 32, and the other of which cycles is conveniently identified as a "print" cycle initiated through a relay start circuit 33. In discussing the operation of the timing matrix 30 with particular reference to Fig. 5, it was pointed out that the check cycle of operation occupied a 4.4 milliseconds time interval during which an initial twenty timing pulses are generated for use in comparing operations, a succeeding group of twenty timing pulses are generated for use in the signal search operation, and these latter pulses, together with a terminal group of seventy timing pulses are employed in a checking verification operation.

It was further pointed out that approximately 2.4 milliseconds of time elapses between the check cycle of the timing matrix 30 and the succeeding print cycle thereof, and that during 3.6 milliseconds of the latter cycle (which again occupies an interval of 4.4 milliseconds) ninety timing pulses are generated for use in timing control by print position and in actuating the set up of the thyratrons which in turn control the set up of the printer. These numerous timing pulses, generated by the timing matrix, are conveniently referred to as "matrix intersection" or "MI" pulses by analogy to the structural arrangement of the matrix which takes the form of a grid or matrix structure, as will hereinafter become more fully apparent. Accordingly, in the detailed descriptions which will follow hereinafter, the timing pulses are identified as "MI" pulses associated with a number which identifies the number of a particular pulse in succession of those generated and which total one hundred and eleven during each matrix cycle, as pointed out above. Using this terminology, the matrix pulses MI1–MI20 of the check cycle are used for comparing operations; pulses MI21–MI40 of the cycle are used both for signal search and for checking operations; and pulses MI41–MI110 are used for checking operations. In like manner, pulses MI21–MI110 of the print cycle are used for the thyratron set up operation and for timing control according to print positions. In addition to these pulses, the timing matrix 30 generates an MI0 pulse which precedes the MI1 pulse of the check cycle, and which is used for a "no card detection" operation, as above explained, and further generates an MI111 pulse following the MI110 pulse of each cycle and which is generally used for electronic reset operations. Upon completing each check cycle and each print cycle, the timing matrix stops and awaits a restarting control potential for the next cycle whether of the check or print type.

Figs. 6a through 6d, which should be considered together as a unitary structure in the manner shown by Fig. 6, represent the electrical circuit arrangement of the timing matrix 30 and its associated multivibrator unit 31. Considering first the multivibrator unit 31, a multivibrator type of relaxation oscillator 185 generates output pulses of symetrical rectangular wave form having a periodicity of approximately twenty-five kilocycles, and these are supplied to a wave shaper 186 which sharpens the leading edge of each generated pulse. The pulses of shaped wave form are supplied to an inverter 187, which, in turn, supplies them to a cathode follower 188 in the output circuit 189 of which are developed pulses hereinafter identified as "A" pulses for convenience, and also to an inverter and cathode follower unit 190 which develops in its output circuit 191 "B" pulses which have the same wave form and timing as the "A" pulses but have opposite polarity with respect to the latter. The inverter 187 also develops in an output circuit 192 "A" pulses which are supplied as advance pulses to a counter of the Overbeck type (is shown in the Overbeck Patent No. 2,404,918) and which is comprised of 11 multivibrator or trigger units 193–203. These trigger units are connected in tandem with the Off output circuit of each coupled through an inverter-pulse-delay unit 204 to the turn On input circuit of the succeeding trigger, as shown. When one of these triggers is turned On, its Off output circuit is at elevated potential, but the rise of this potential at the time the unit turns On does not produce a drop of potential in the output circuit of the succeeding inverter-pulse-delay unit 204, since the latter is of the type having a series capacitor input circuit and having a control electrode biased through a resistor from the source of anode potential, so that the output potential of the inverter does not appreciably change for increasing values of potential applied to its input circuit, but does produce a short positive pulse of sharp leading edge and sloped trailing edge in response to any decrease of potential applied to its input circuit. The input circuits of the trigger units 193–203 are of the capacitive-input type so that it is the lagging edge of a positive input pulse that is effective to change the state of the trigger. This has the result that a succeeding trigger is not turned On until a short delay interval after the preceding trigger turns Off (with consequent drop of the Off side output potential of the latter). Accordingly, each of the triggers 193–203 turns On in succession in response to the preceding trigger turning Off; all of the triggers are turned Off in successive manner by the trailing edges of the "A" pulses applied to their turn Off input circuit through the advance line 192. The Off output circuit of the trigger 203 is coupled through an OR unit 205 to the inverter-pulse-delay generator 204 which precedes the trigger 194, so that the triggers 194–203 normally constitute a free-running counter arrangement which, upon starting, continues to cycle rapidly until stopped in a manner hereinafter explained. The On output circuits of the triggers 194–203 are coupled to the input circuits of inverter and cathode follower units 206, as shown, having output circuits 207–1 to 207–10 which are coupled to the input or grid circuit of individual columns of matrix intersection units 217, as shown. These units are of three types which are disclosed and described hereinafter in connection with Figs. 7, 9 and 10.

The timing matrix also includes a second counter of the Overbeck type including tandem coupled triggers 218–228 which have concurrently applied to their turn Off input circuits through an advance circuit 229 and a double inverter 230, the output pulses developed by the Off output circuit of the trigger 203 as the latter completes a cycle of its operation. The Off output circuits of the triggers 218–228 are coupled through double inverter and cathode follower units 231 to the anode circuit of rows of the matrix intersection units 217, as shown. As thus arranged, and assuming the triggers 194 and 218 are turned On to initiate the operation of the timing matrix, it will be apparent that as each of the triggers 194–203 is successively turned On and then turned Off again by the "A" pulses applied to the advance line 192, the trigger 203 in operating through its cycle applies through the inverter 230 to the advance line 229 an advance pulse which is effective to turn the trigger 218 Off and this in turn turns the trigger 219 On. The next cycle of successive operations of the triggers 194–203 is effective to turn the trigger 219 Off and thereby turn the trigger 220 On, and this continues until the timing matrix completes its cycle of operation (except for the MI111 pulse generated in a manner hereinafter explained) by turning Off of the trigger 228.

During this timing matrix cycle, it will be apparent that the grid or input circuits of the matrix intersection units 217 are energized by successive columns thereof whereas the anode circuits of these units are energized in successive rows, but with the energization changing from row to row only after all of the units 217 in a row have had their grid or input circuits energized in succession according to the position of a given unit 217 in the columns thereof. It may be stated at this point, and as will become more fully apparent hereinafter in the detailed description of the units 217, that any given unit 217 develops an output only when its input or grid circuit is concurrently energized with its anode circuit. As a result of this, the matrix intersection units 217 are successively energized to develop individual outputs in the order of their position in the matrix, which order is identified by the numerals 1–110 applied to these units and which correspond to respective MI1–MI110 times. It is in this manner that the timing matrix generates its output timing pulses MI1–MI110.

As will become more apparent in the later consideration of the detailed construction of the units 217, these units provide timing pulses in plural output circuits which extend through the output multi-conductor transmission line L1 to the direct print feed-1 relay unit 35 (actually comprised by the relay contacts of corresponding direct print relays), the direct print feed-2 relay unit 35', the simultaneous print relay unit 148, the multiple-line-print plug hubs 135; through lines L33 and L33' to the digit search plug hubs 156 for the first feed and the digit search plug hubs 156' for the second feed; through lines L24 and L24' to the compare plug hubs 60 for the first feed and the compare plug hubs 60' for the second feed; and additionally through the multi-conductor line L11 extending to the print set up thyratron unit 45 and the multi-conductor line L21 extending to the checking contact system 53. In order to develop certain of the output timing pulses only during the electronic check cycle of the timing matrix, certain of the cathode follower stages which are included in the first four rows of the units 217 are energized only during the electronic check cycle by control exerted through the column drive control unit 153 in a manner which will be explained hereinafter during the detailed description of the latter unit.

The 111th timing pulse MI111 is generated by an output potential of the 110th matrix intersection unit 217, which potential is applied through a double inverter and cathode follower 234 to the turn On input circuit of a trigger unit 235 to which is also applied the "A" pulses of the advance line 192 as shown. Thus, upon completion of generation of the MI110 timing pulse, the trigger 235 is turned On and is turned Off by the next "A" pulse to generate the MI111 pulse which is applied through a cathode follower unit 236 to an output control circuit 237. The latter circuit is essentially a trigger reset circuit and extends to numerous component units of the system above described.

The check cycle of the timing matrix operation is initiated by start potentials applied through the control circuits 32 and 32' from the reader control units 92 and 92' of the first and second feeds to an AND gate 238, the latter thereupon translating to an OR unit 240 a potential applied to the gate upon closure of matrix check cycle contacts G3–13 of a relay G3. The print cycle of operation is initiated by a control potential applied through the circuit 33 to the OR unit 240 from the relay units 35, 35', 133, 133' and 148 as earlier explained. Either of these control potentials is translated by the OR unit 240 to an inverter and cathode follower 241 and the resulting output potential of the latter is applied to a home position trigger 242 to turn the latter On. The On output potential of the trigger 242 is translated through an inverter 243 to the turn On input circuit of the trigger 193 to turn the latter On when the home position trigger is turned Off almost immediately in a manner which will presently be explained. The trigger 193 is turned Off by the next "A" pulse applied to the advance line 192 thereby to develop in the Off output circuit of this trigger an MI0 timing pulse which is translated through a network 244, a cathode follower 245, and the no-card check cycle lines L34 and L34' to the first column of the respective read heads 17 and 17' for the "no card" detection operation earlier described. The now elevated Off output potential of the home position trigger 242 is applied to condition an AND gate 246 to translate the next "B" pulse, and the latter is thereupon further translated by an inverter 247 to turn Off the home position trigger 242.

The home position trigger 242, in addition to initiating generation of the MI0 pulse, as has just been explained, also so controls the timing matrix as to permit it to initiate each check and print cycle of operation. In this, the output control potential of the MI110 matrix intersection unit 217 is translated through the unit 234, as earlier mentioned, and is applied to the turn On input circuit of a reset trigger 248 to turn the latter On at the end of MI110 time. The Off output potential of the trigger 248 is translated by an inverter 249 to a clamping diode 250 to clamp or hold down the Off output potential of the trigger unit 194 (and thereby maintain this unit turned Off) as long as the reset trigger 248 is turned On. Thus, the generation by the timing matrix of its MI110 output pulse causes it to terminate its cycle of operation by preventing the trigger 194 from being turned On as it ordinarily would be by the output pulse of the trigger 203 translated through the OR unit 205 and the inverter pulse delay 204. However, when the home position trigger 242 is turned On and is again turned Off by the described action of the AND gate 246 and inverter 247, it turns the reset trigger 248 Off and thus removes the clamping action of the diode 250 on the trigger 194. Accordingly, when the trigger 193 turns Off at the end of MI0 time, its output potential is applied to and translated by the OR unit 205 and the inverter pulse delay 204 to turn the trigger 194 On and thereby initiate the continuous successive cycling of the triggers 194–203 during the check and print matrix cycles.

As will presently be explained in connection with the description of the matrix intersection units 217, their operation is substantially enhanced by the use of a matrix "pull down" potential, which is generated from the "A" pulses developed in an output circuit of the inverter 187 and which are translated by a double inverter 251, a double inverter and pulse delay unit 252, and an output circuit 253 of the latter to all of the matrix intersection units 217. The purpose for the delay provided in the unit 252 will shortly be more fully explained.

The detailed arrangement of each of the matrix intersection units included in the first two rows thereof is shown in Fig. 7, and each includes a triode type of cathode follower 255 having an input or grid circuit energized by one of the output circuits 207 of the inverter and cathode follower units 206 of the timing matrix. The anode of this cathode follower stage is energized by one of the anode energizing circuits 232 of the double inverter and cathode follower units 231 of the timing matrix. In this, it will be appreciated that the matrix intersection unit presently described occupies an individual matrix position identified with the generation of an individual matrix timing pulse, as established by concurrent energization of the input circuit 207 and anode circuit 232 of a given cathode folower stage. The output of the cathode follower stage 255 is applied to the input of a cathode follower stage 266 having an anode circuit energized during the comparison interval of the check cycle from the column drive control unit 153 (Fig. 13) through a control circuit 155a. The stage 266 has a cathode circuit coupled to a comparing control hub 60 for the feed-1 comparing operation. The cathode circuit of this cathode follower has applied to it through a diode 267 the pull down potential developed in the output circuit 253 of the unit 252 of the timing matrix. The output of the cathode follower 255 is also applied to a cathode follower 268 having an anode energized during the comparison interval of the electronic check cycle through the energizing circuit 155a' from the column drive control unit 153. The cathode circuit of the cathode follower 268 is coupled to a comparing plug hub 60' for the feed-2 comparing operation. There is likewise applied to this output circuit, through a diode 269 from the output circuit 253 of unit 252, a pull down potential the purpose of which will now be explained by reference to Fig. 8.

Curve A of Fig. 8 graphically represents "A" pulses generated by the multivibrator unit 31 and used in the generation of the matrix timing pulses. The latter theoretically should have a rectangular pulse wave form as represented by curves B and C and should follow one another immediately in point of time, as indicated by the related positions of the pulses shown by curves B and C. However, the cathode circuits of the matrix intersection units (of which the one shown in Fig. 7 is illustrative) have inherent output circuit capacitance which causes the trailing edges of the timing pulses to decay exponentially with time, as represented with curves B' and C' of Fig. 8. The trailing edge of one pulse accordingly would, unless prevented, overlap the succeeding matrix pulse. The pull down potential, it will be recalled from the foregoing description of Fig. 6, is developed from "A" pulses delayed by the unit 252. The latter includes two inverters of which one is of the pulse-delay type corresponding to the inverter pulse delay unit 204, by which to develop a short negative pulse having a steep leading edge and a sloping trailing edge. These pull down potential pulses pull down the trailing edge of each generated matrix pulse, thus sharpening the trailing edge wave form as represented by curves B" and C" of Fig. 8. Now by using the inverters 204 between each of the triggers 193–203 of the timing matrix, as shown and described in connection with Fig. 6, the termination of one matrix pulse and the initiation of the next matrix pulse is delayed a small amount (of the order of 5 microseconds), as represented by curves B''' and C''', so that the slight remaining decaying edge of one pulse as improved by use of the pull down potential now no longer overlaps any portion of the succeeding matrix pulse.

The inverter pulse delay units 204 last mentioned provide approximately a 5 microsecond delay between the turn Off of one of the triggers 193–203 and the turn On of the succeeding trigger, and thus enables the use of approximately 5 microseconds to effect the pull down operation last described. The pull down delay time in practice is adjusted by adjustment of the bias potential applied to the control grid of the pull down inverter delay tube. This pull down time delay actually takes into account the fact that there is a slight delay between the time that a trigger turns Off and the time that the control grid of the input tube of the corresponding matrix intersection tube begins to go negative. Thus, the pull down potential pulse delay is such that the pull down potential does not attempt to pull the cathode circuit potential negative while the control grid of the cathode follower tube is still trying to hold it positive.

It will be apparent from the foregoing description of the Fig. 7 type of matrix intersection unit that these units, positioned in the first two rows of matrix intersection units, are only operative during the comparison interval of the check cycle of the timing matrix since their energization is so controlled by the column drive control unit 153.

The matrix intersection units of the third and fourth rows are of the type shown in Fig. 9, and it will be seen that this type of unit is essentially similar to that previously described, and similar elements are accordingly identified by similar reference numerals. In the present unit, however, the cathode follower 266 is continuously energized so that it translates its generated matrix pulse during both the check and print cycles of the timing matrix. These translated pulses are applied from the cathode output circuit of this stage through the units 35, 35' and 148 to the respective direct feed-1 plug hubs 36, the direct feed-2 plug hubs 36', and simultaneous print plug hubs 149, and are also applied directly to the multiple-line-print plug hub 135, as indicated in broken lines.

The output matrix intersection pulses of the cathode follower stage 255 are also applied to four cathode follower stages 272—275, the first two of which 272—273 have output cathode circuits comprising the respective conductors of the transmission lines L11 and L21. The line L11 extends to the print set up thyratron unit 45 and check error thyratron unit 55, and the line L21 extends to the checking contact system 53. Cathode follower 272 also has its output cathode circuits connected by conductor L11 to print position plug hubs used for purposes of zero and zone suppression and character insertion in selected print positions as previously described. The second pair of cathode followers 274 and 275 have cathode output circuits which terminate in the digit signal search plug hubs 156 and 156' for the respective first and second feeds, as indicated by broken lines, and these cathode followers are energized through conductors 155b and 155b' from the column drive control unit 153 only during the signal search interval of the check cycle of the timing matrix. Thus, while this type of matrix intersection unit supplies output pulses to the print set up thyratrons and printer checking contact system during both the check and printing cycles of the timing matrix, digit signal search pulses are applied to the digit signal search plug hubs 155 and 155' only during the signal search interval of the check cycle of the timing matrix.

Fig. 10 shows the electrical circuit arrangement of the third type of matrix intersection unit used in rows 5 through 11 of the timing matrix. These units are quite similar to the first four stages of the Fig. 9 type of unit and similar components are identified by similar reference numerals, the operation of this type of unit being the same as that described for the corresponding portion of the Fig. 9 type of unit.

Matrix check and matrix print relay unit 154

Aside from the timing matrix 30 just described, there is one other unit which exercises over-all machine control. This is the matrix check and matrix print relay unit 154, which operates to provide such control that all machine functions are performed selectively in relation to the electronic check cycle or the electronic print cycle according to the nature of the function to be performed.

The circuit arrangement of this unit is shown in Fig. 11. It includes a trigger 280 which is turned On through a diode 281 by an MI25 timing pulse from the timing matrix 30 and is turned Off through two diodes 283 and 284 which constitute an AND gate conditioned by the G4–8 contacts of a relay G4 (closed during the electronic print cycle of the timing matrix 30) to translate the MI110 pulse at the end of the print cycle. During the interval when the trigger 280 is On, an inverter 286 is rendered conductive to energize a relay WE7. The latter in its deenergized state energizes three electronic check cycle relays G1, G2 and G3. The energized state of the relay WE7 causes energization of the electronic print cycle relays G4, G5 and G6, and also provides an energizing circuit 287 for the several field selectors which will be described in detail hereinafter.

While on first impression it might seem that the trigger 280 is turned On at MI25 time of a check cycle and is then turned Off again at MI110 time of the same check cycle (due to the fact that the contacts G4–8 of the relay G4 appear to close throughout the entire On period of the trigger 280), such is not the fact due to the lag in relay pick up which will now be specifically considered. The relay WE7 itself requires approximately 2.2 milliseconds to close its contacts after the initiation of relay energization, so that approximately fifty-five timing pulses elapse before its contacts actually close following MI25 time when the trigger 280 turns On. This means that the energization of the relays G4, G5 and G6 is initiated at approximately MI80 time, but these relays also require an interval of approximately 1.4 milliseconds (corresponding to an elapsed time of approximately thirty-five timing pulses) by reason of which the relay contacts G4–8 do not actually close until shortly after the MI110 time of the electronic check cycle. Accordingly, the MI110 timing pulse of the electronic check cycle is not able to turn the trigger 280 Off since the AND gate 283—284 is not conditioned to translate these pulses because the relay contacts G4–8 have not yet closed. The trigger 280 therefore turns On at MI25 time of the electronic check cycle and remains On until MI110 time at the end of the electronic print cycle of the timing matrix 30.

Since the relays G1, G2 and G3 are energized during the major portion of the electronic check cycle, they are identified with the matrix check cycle interval and their contacts are accordingly identified with control of machine functions which must take place during the matrix check interval. Similarly, the relays G4, G5 and G6 close their contacts after the electronic check cycle and during the electronic print cycle so that the contacts of these relays control those machine functions which must take place during the matrix print interval.

The contacts of relays G1–G6 are included in the control circuits of many of the machine control units which will hereinafter be described in detail, and it will be helpful to keep in mind in considering the arrangement and operation of such units that the relays G1, G2 and G3 are electronic "check" cycle function relays while the relays G4, G5 and G6 are electronic "print" cycle relays thus establishing control of machine functions during one of these two intervals.

Many of the relays used in several of the machine component units hereinafter to be described are energized throughout the electronic print cycle as represented by curve F of Fig. 5, and it is required that they remain thus energized until almost the end of the succeeding electronic check cycle as represented by curve F' of Fig. 5. A normally deenergized hold relay WE6 (Fig. 11) is provided for this purpose, and its normally closed contacts WE6–1 engage to complete a relay hold circuit during the latter part of each electronic print cycle and continuing through the major portion of the succeeding electronic check cycle as represented by curve G of Fig. 5. This hold relay must be energized near the middle of each electronic check cycle to interrupt the hold circuit thus provided and thereby permit the currently used group of machine list-selection control relays to drop out (their contacts opening just after the end of the check cycle) and a new group of list-selection control relays to pick up (the contacts of the last-to-close one of the latter initiating the next electronic print cycle). To this end, a trigger 290 (Fig. 11) is turned On through an AND gate 291 at MI55 time of the electronic check cycle when the relay contacts G2–4 of relay G2 are closed. The trigger 290 is turned Off through an OR unit 292 at the next MI-1 time, which will be that of the electronic print cycle of the timing matrix 30. While the trigger 290 is On, an inverter 293 is rendered conductive and energizes the relay WE6 to interrupt a relay hold circuit 294. Thus the deenergized state of the relay WE6 completes the common hold circuit 294 for those relays which are energized during the electronic print cycle under control of relays G4, G5 and G6 and are to be maintained energized during the succeeding electronic check cycle. It may be noted that hold circuit 294 is not interrupted immediately upon turn On of the trigger 290 at MI55 time of the electronic check cycle for the reason that the relay WE6 requires approximately 2.2 milliseconds to open its contacts after initiation of its energization, so that the hold circuit 294 remains closed until so near the end of the check cycle that the concurrently held group of list-selection control relays do not actually open their contacts until a time just following completion of the electronic check cycle. It will therefore be seen that the relays which are picked up during the electronic print cycle under control of the relays G4, G5 and G6 remain picked up through energization of the hold circuit 294 and maintain their contacts closed until the end of the succeeding electronic check cycle.

It may be noted in connection with the energization of the hold circuit 294 under control of the relay WE6 that occasionally a malfunctioning of the machine for some reason or a relatively long paper skip operation may make it desirable to maintain the hold circuit 294, and thus continue energization of the list-selection relays already picked up. Thus where the machine operation is delayed by a relatively long paper skip operation or is terminated before the actual completion of the succeeding check cycle, this will enable the machine to be restarted and complete the desired checking operation through the check cycle. To this end, the trigger 290 may also be turned Off at any time through the OR unit 292 by a control potential applied to the latter when the contacts PSR of a paper skip relay close or through a circuit 295 from the card clutching control unit 91 of the first card feed (or a similar circuit 295' from the second feed control unit 91') under certain conditions which will be explained hereinafter during the detailed description of the latter unit.

*Direct print and simultaneous print control units 95, 95' and 146 and direct print and simultaneous print relay units 35, 35' and 148*

While the print control and print relay units do not exercise over-all machine control as do the units above described, and accordingly their detailed description should logically come at a later point in the present description, the print control and print relay units do explain certain of the previously mentioned functions performed by the matrix check and matrix print relay unit 154 just described. It will for this reason be helpful to consider the print control and print relay units at this point.

The direct print feed-1 control unit 95, direct print feed-2 control unit 95', and the simultaneous print control unit 146 have circuit arrangements as shown in Fig. 12a, while the direct-1 print relay unit 35, the direct-2 print relay unit 35', and the simultaneous print relay unit 148 have circuit arrangements shown schematically in Fig. 12b. Figs. 12a and 12b should be considered together as a unitary structure as shown in Fig. 12. The direct-print feed-1 control unit 95, the direct-print feed-2 control unit 95', and simultaneous print control unit 146 are all under common control of a trigger 300 which is turned On through an AND gate 301 at MI41 time of the electronic check cycle when the contacts G2–3 of the check cycle relay G2 are closed. The trigger 300 is turned Off through an AND gate 302 at MI111 time at the end of the electronic print cycle when the relay contacts G4–10 of the print cycle relay G4 are closed. Thus the trigger 300 is On from MI41 time of the electronic check cycle to MI111 of the electronic print cycle, and during its On interval the elevated potential of its Off output circuit 303 is translated through a cathode follower 304 to one diode of each of AND gates 305, 306 and 307 in the respective control units 95, 146 and 95'. The respective input control plug hubs 94, 147 and 94' of the latter units are selectably energized as a result of signal search, during the signal search interval extending from MI21 to MI40 of the electronic check cycle as earlier explained during the system description of Figs. 4a–4d, and remain energized through the following electronic print cycle.

Only one of the input control plug hubs 94, 94' or 147 is energized, however, during any listing cycle so that only one of the gates 305, 306 or 307 is conditioned to translate the control potential of the trigger 300 to an inverter 308 in the unit 95, an inverter 309 in the unit 146, or a unit 310 in the unit 95'. The control potential applied by one of the gates 305, 306 or 307 to its respective inverter 308, 309 or 310 causes the latter to become conductive and energize an associated relay WE1, WE2 or WE3. These relays accordingly have their energization initiated at MI41 time of the electronic check cycle when the trigger 300 turns On (just following the end of the signal search interval at MI40 of the electronic check cycle), but these relays require approximately 2.2 milliseconds to close their contacts so that the latter do not become closed until approximately MI95 time of the electronic check cycle.

The relay WE1 controls the energization of a plurality of relays J4–J6, K4–K6 and L4–L6 in the direct-1 print relay unit 35. The latter relays accordingly begin to pick up at approximately MI95 time of the electronic check cycle, but also require an interval to close their contacts so that their contacts actually close at approximately the time when it is desired that the electronic print cycle of the timing matrix 30 should be initiated. As explained in connection with the timing matrix 30, its electronic print cycle of operation is initiated through a relay control circuit 33. It will be seen from Fig. 12b that this relay control circuit 33 includes the contacts G4–2 of the print cycle relay G4, which close somewhat prior to the initiation of the print cycle, and also includes a serial arrangement of one contact of all of the relays of the unit 35 as shown. Accordingly, it is the last-to-close contact of the latter relays which actually initiates the electronic print cycle of the timing matrix through the print cycle relay contacts G4–2 and the control circuit 33.

The relays of the unit 35 have hold windings which are energized through the contacts J4–1 of the relay J4 or the contact L6–1 of the relay L6 and through the hold circuit 294 provided by the WE6 relay as described in connection with Fig. 11. It will be recalled that the relay WE6 maintains the hold circuit 294 energized during the latter half of the electronic print cycle and continuing to almost the end of the succeeding electronic check cycle. By virtue of this, the relays of the relay unit 35 all close their contacts at the beginning of the electronic print cycle of one listing cycle and maintain their contacts closed through the succeeding check cycle.

Each relay of the unit 35 includes 10 contacts which are connected, as indicated in Fig. 12b in connection with the relay contacts J4–3 and L6–12, in series between an individual output plug hub 36 of the unit 35 and an individual output circuit of the cathode follower stages of the timing matrix 30 (through the transmission line L1 of the latter). The particular contacts of these relays which are so employed are listed in connection with the several notes to Fig. 6, and it will be seen that the ninety relay contacts so employed concurrently energize ninety output plug hubs 36 of the unit 35 from the cathode followers of the timing matrix 30 corresponding to the MI21–MI110 timing pulses generated by the latter.

The unit 35 includes an exit direct-1 plug hub 99 which is connected by the relay contact J5–1 of the relay J5 either to a −50 volt potential source in the deenergized state of the relay or to ground in the energized state of the relay. The plug hub 99 may accordingly be used to provide control as desired over the operation of another unit of the listing machine in accordance with a desired type of operation in a particular application of the machine. An exit direct-1 plug hub 99a of the unit 35 is similarly energized during the electronic check cycle through the contacts G1–2 of the check relay G1, so that this plug hub is available to provide a similar control effective only during the listing cycle following that when the relays of the unit 35 become energized.

A relay WE2 of the simultaneous print control unit 146 in similar manner controls energization of a plurality of magnets M4–M6, N4–N6 and P4–P6 of the simultaneous print relay unit 148. The latter unit operates under control of the simultaneous print control unit 146 in a manner similar to that described for the units 35 and 95, and provides ninety relay contact controlled circuits between the output plug hubs 149 of the unit 148 and the cathode followers of the timing matrix 30 corresponding to matrix times MI21–MI110.

A relay WE3 of the direct-print feed-2 control unit 95' in like manner energizes a plurality of relays Q5–Q7, R7–R9, and S5–S7 of the direct-print feed-2 unit 35' which also operates like the units 35 and 95 earlier described and provides ninety relay contact controlled circuits between the output plug hubs 36' of the unit 35' and the cathode followers of the timing matrix 30 corresponding to matrix times MI21–MI110.

It will be noted that the relays of units 35, 35' and 148 are energized under control of the respective relays WE1, WE3 and WE2 through the electronic print cycle and that they are thereafter maintained energized through the hold circuit 294 of the relay WE6 of Fig. 11. It was explained in connection with the latter relay that it opened its hold circuit near the end of the check cycle, so that any energized relays of the units 35, 35' or 148 become deenergized and open their contacts just after the end of the check cycle. It is evident that this relay drop out may occur concurrently with the relay pick up of another one of the units 35, 35' or 148 beginning late in that check cycle and being completed to initiate the succeeding print cycle. In this, it may be noted that if any one of the units 35, 35' or 148 is involved in two successive listing cycles, its relays will remain energized from the time that they were picked up at the initiation of a print cycle of one listing cycle, through the entire period of the next listing cycle and through the check cycle of the succeeding listing cycle. This is for the reason that whereas the hold circuit 294 is interrupted near the end of the check cycle of the second listing cycle last mentioned, the relays do not have sufficient time to open their contacts before the relays are again energized by the associated one of the relays WE1, WE2 or WE3 at approximately MI95 time of the check cycle.

The reason why the relays of any of the units 35, 35' and 148 when picked up at the initiation of a print cycle are required to be held through the succeeding check cycle will now be considered in more detail. The contacts of these relays provide the connections through which the timing pulses of the timing matrix are supplied (via plug hubs 36, 36' or 149 on the one hand and plug hubs 37 or 37', Fig. 4b, on the other hand) to the read head 17 at the first read station of the first feed or to the read head 17' at the first station of the second feed to effect set up of the printer as described in connection with the over-all system of Fig. 4. The same set up of the relays is therefore required during the succeeding check cycle in order that their contacts may now supply the same timing pulses from the timing matrix 30 to the read heads 23 or 23' of the second stations of these feeds for purposes of reading the same information by which to check the printer set up during MI21–MI110 times of the check cycle. Thus a direct read out of the first station of the first feed to set up the printer in accompanied by an identical direct read out of the second station of the first feed to check or verify the accuracy of set up; similarly a direct read out of the first station of the second feed to set up the printer is succeeded during the next check cycle by an identical direct read out of the second station of the second feed to check or verify the accuracy of printer set up; and lastly, a simultaneous read out of the first stations of both feeds to set up the printer is accompanied during the succeeding check cycle by an identical direct read out of the second stations of both feeds by which to check or verify the accuracy of the printer set up.

*Column drive control unit 153*

As previously mentioned, the column drive control unit 153 directly controls through the column drive units 38, 38' and 48, 48' the read out of information stored in the respective read heads 17 and 23 of the first feed and 17' and 23' of the second feed for purposes of printer set up in one listing cycle and verification of printer set up in the succeeding listing cycle. The column drive control unit 153 also operates through the timing matrix 30 to effect read out directly from the read heads 17 and 23 of the first feed and 17' and 23' of the second feed during the comparing interval, which comprises the interval MI1 to MI20 of the electronic check cycle, and in addition controls the supply of MI21–MI40 digit search pulses to the digit search pulse plug hubs 156 and 156' for purposes of effecting the digit search read out of information from storage in the read heads 17 and 17'.

Figs. 13a–13c, which should be considered together as a unitary structure as indicated in Fig. 13, show the electrical circuit arrangement of the column drive control unit.

Considering first the function of the column drive control unit 153 in effecting the function of printer set up and verification or checking of the printer set up, consider at the outset the control of read out of information for purposes of printer set up. This control function for the first feed is accomplished by a trigger 315 (Fig. 13a) which upon being turned On in a manner presently to be described supplies, through tandem arranged inverters 316 and 317 and parallel-connected cathode followers 318 and 319, a positive potential to the output circuit L29. The latter energizes the column drive unit 38 during the print set up interval, comprised by timing pulses MI21–MI110 of the electronic print cycle, and there is thus effected during this interval a read out of information from the first station read head 17 of the first feed. Read out of information from the first station read head 17' of the second feed under control of a positive potential supplied through the conductor L29' (Fig. 13b) to the column drive unit 38' is accomplished by the column drive control unit 153 also by use of a trigger 315' (Fig. 13a) which through tandem inverters 316' and 317' and parallel-connected cathode followers 318' and 319' energizes the output circuit L29'. The manner in which the triggers 315 and 315' are turned On and Off to accomplish the read out function last described will now be considered with respect to the trigger 315. Since the circuit and circuit components employed in its control are identical to the circuit and circuit components employed in the control of the trigger 315', reference numerals used to identify the circuit components employed in connection with the trigger 315 are primed to identify the corresponding components used in association with the trigger 315'. The operation hereinafter described with respect to control of the trigger 315 is the same as that for the trigger 315'.

The trigger 315 is normally reset Off, in a manner presently to be explained, at the initiation of both the electronic check cycle and the electronic print cycle. With respect to the electronic check cycle, during which information is required to be read out of the first station read head 17 from MI1 to MI40 for comparison and signal search purposes, the trigger 315 is turned On through OR diodes 320a and 320c at MI-1 time through and AND gate comprised by diodes 321a, 321b and 321c. This AND gate is conditioned to open by a positive potential applied to the diode 321c through the relay contacts G1-12 of the relay G1 which is energized during the electronic check cycle. The diode 321a of this AND gate normally has a positive potential applied thereto through a conductor L32A from the feed-1 reader control unit 92 which, as will be described hereinafter in connection with the latter unit, energizes the circuits L32A for the first feed and L32B for the second feed as long as a "run trigger" of the reader control unit is On and a "no card detection" trigger is Off to indicate normal listing machine operation. The AND gate 321a, 321b and 321c as thus conditioned actually opens when an MI-1 pulse is applied from the timing matrix 30 to the diode 321b, and this pulse is translated by the gate to turn the trigger 315 On and thus initiate read out of information from the first station read head 17.

The trigger 315 is subsequently turned Off at MI21 of the electronic check cycle since the comparing and signal search intervals are then completed. To this end, the relay contacts G1-12 of the relay G1 apply a positive potential to a diode 322a of an AND gate which includes a diode 322b energized by an MI-21 pulse applied thereto from the timing matrix 30. The AND gate 322a, 322b accordingly translates the MI-21 pulse through an OR diode 323a to turn the trigger 315 Off.

The trigger 315 is turned On again at MI21 time of the electronic print cycle through the OR diodes 320a and 320b and AND gate diodes 323a, 323b and 323c. This AND gate also is conditioned by a positive potential applied through the circuit L32A from the reader control unit 92 to the diode 323c and by a positive potential applied to the diode 323a through the contacts G4-11 of the relay G4 (which is energized during the electronic print cycle), normally closed contacts PSR of a print skip relay (which is only energized during the operation of the printer in skipping several lines of the document in preparation), and through any one of the following contacts: the contacts J6-1 of the direct feed-1 relay J6, the contacts M6-1 of the simultaneous print relay M6, the contacts H1-3 of a multiline print one-line relay H1, the transfer contacts K3-4 of a multiline print two-line relay K3, or the contacts L1-3 of a multiline print three-line relay L1. Of these, the relays J6 and M6 were previously considered in the description of Fig. 12, and the relays M6, H1 and K3 are included in the multi-line print control unit 129 to be described hereinafter. The AND gate comprised by the diodes 323a, 323b and 323c as thus conditioned translates an MI21 pulse applied from the timing matrix 30 to the diode 323b, and this translated pulse is effective to turn On the trigger 315. The latter is now turned Off by an MI111 pulse applied from the timing matrix 30 to an OR diode 323c and translated by the OR diode 323b. The trigger 315 is thus turned On during the interval MI21 through MI111 of the electronic print cycle to effect energization of the output circuit L29 and thus cause read out of information from the first station read head 17.

The MI21 pulse translated through the AND gates 323a, 323b and 323c as last described, or a similar pulse translated through the corresponding AND gate 323'a, 323'b and 323'c to turn On the trigger 315' for the second feed, is translated through an OR diode 324a or an OR diode 324b to a cathode follower 325 which further translates the pulse to the printer unit (not shown) to effect a one-line space of the document under preparation in the printer.

The column drive control unit 153 effects, through the column drive units 48 and 48', read out of information from the second station read head 23 of the first feed and 23' of the second feed. To this end, a trigger 326 (Fig. 13a) when turned On supplies through tandem arranged inverters 327 and 328 and parallel-connected cathode followers 329 and 330 positive potential energization of an output circuit L35 to effect through column drive unit 48 read out of information in the read head 23. Similarly, a trigger 326' is effective through tandem arranged inverters 327' and 328' and parallel-connected cathode followers 329' and 330' to energize an output line L35' which through the column drive unit 48' accomplishes read out of information from the read head 23' of the second feed. As in the case of the triggers 315 and 315', the control circuit for the trigger 326 is the same as that for the trigger 326' so that reference numerals used to identify the components of the former are primed to identify corresponding components of the latter and the following description of the arrangement and operation of the control circuit for the trigger 326 applies in all respects to that for the trigger 326'.

The trigger 326 is normally reset Off, in a manner presently to be described, at the initiation of both the electronic check cycle and the electronic print cycle. It is turned On at MI-1 time of the electronic check cycle through OR diodes 331a and 331b and an AND gate comprised by diodes 332a, 332b and 332c. The diode 332c normally has a positive potential applied to it through the conductor L32C from the reader control unit 92 which, as will be explained in the detailed description of the latter unit, maintains the circuit L32C energized as long as its run trigger is On and its no card detection trigger is Off. The diode 332a has a positive potential applied to it through the contacts G2-1 of the relay G2, which is energized during the electronic check cycle, or in the event that the contcts PSR of a paper skip relay should be closed during a paper skip operation of the printer. The purpose of such energization by the paper skip relay contacts PSR will presently be explained. The AND gate 332a, 332b and 332c is thus conditioned to translate an MI1 pulse applied from the timing matrix 30 to the diode 332b, and this translated pulse is further translated through the diodes 331a and 331b to turn On the trigger 326. The latter is normally turned Off by an MI111 pulse applied from the timing matrix 30 through OR diodes 333a and 333b.

However, the trigger 326 may also be turned Off at MI21 time early in the electronic check cycle through AND diodes 334a, 334b and 334c (the diode 334c being energized from the line L32C, and the diode 334b being energized by an MI21 pulse from the timing matrix 30) in the event that the diode 334a should have a positive potential applied to it through the contacts shown and by reason of the fact that none of the direct print relay K4, the simultaneous print relay N5, or MLP relays L2, H1 or K3 are energized thereby to indicate that no information was listed from the first feed during the preceding print cycle and therefore no information is to be checked or verified for this feed during the presently considered check cycle. The trigger 326 may also be prematurely turned Off by a positive potential applied to the OR diode 333d from the circuit L32E extending to the card clutching control unit 71 which energizes this circuit (in a manner which will be explained during the detailed description of the latter unit) at MI41 time of the electronic check cycle under the condition that the listing machine operation is halted for any reason.

In a paper skip operation, the form in preparation is rapidly advanced to skip over several line spaces or the advance may carry from the end of one form to the beginning of a new form. The time required to accomplish the paper skip operation is minimized by substantially increasing the velocity of the form movement through the form transport carriage, but nevertheless may need several card cycles for completion. It is one purpose of the paper skip relay shown in the aforementioned Patent 2,747,717, and having contacts heretofore and hereinafter identified as PSR, to hold up the operation of the card feed machine and the electronic unit herein described for one or more card cycles as required to accomplish each paper skip operation. The accelerated form paper feed begins immediately after the printing of a line by the printer. The print set-up for the next line of print proceeds during the paper-skip interval. Depending upon the particular construction and print set up arrangement employed in the printer, the print set up may be accomplished in either of two ways. Firstly, it may be effected in normal fashion from information read and stored in the read head of the first reading station, in which case the set up remains stored in the printer awaiting completion of the paper skip operation. For this mode of printer operation, the trigger 315 (Fig. 13a is turned on in normal manner (to effect read out of the read head of the first reading station) during the electronic print cycle and to this end the print skip relay contacts PSR remain closed to energize the AND gate 323a, 323b and 323c during MI21 time of the electronic print cycle. Also in this case the second station trigger 326 is not again turned On until completion of the paper skip operation, and to this end the paper skip relay contacts PSR are connected in series (contrary to that shown in Fig. 13a) with the relay contacts G2-1. In the second mode of printer operation, the printer set up is not stored beyond a card cycle, and the last mentioned skip relay contacts PSR are connected in parallel with the relay contacts G2-1 as shown in Fig. 13a. The second station trigger 326 is accordingly turned On at MI1 time of both the electronic check and print cycles, and the printer is now set up once each card cycle during the paper skip interval by information read from storage in the read head of the second reading station. Inspection of Fig. 3 will show that the information stored in the second station read head is correct to do this. Accuracy of print set up is checked as before from the second station read head.

Accordingly, when the reader control unit deenergizes the line L32C, a double inverter 335 turns Off a trigger 336 (the latter being of the type not affected by a positive potential applied to either of its input circuits but only by a negative potential change applied to either input circuit) which is normally turned On at MI1 time of the electronic print cycle through an inverter 337 and an AND gate 338a and 338b supplied with a MI1 pulse from the timing matrix and a positive potential through the contacts G5-7 of the relay G5 energized during the electronic print cycle. The trigger 336 upon thus turning Off energizes through a cathode follower 339 a diode 340a which is included with diodes 340b and 340c in an AND gate. The diode 340c has a positive potential applied thereto through any of the closed contacts which were earlier described as being effective to turn On the trigger 315 for a direct feed-1, simultaneous, or MLP operation. An MI21 pulse applied from the timing matrix to the diode 340b is accordingly translated by this AND gate and is further translated by the OR diodes 331a and 331c to turn the trigger 326 On at MI21 time of the electronic print cycle. The trigger 326 as before is turned Off at the next MI111 time or earlier as above described. Deenergization of the line L32D by the reader control unit effects turn On of the trigger 326' through the trigger 336' in the same manner.

For purposes of information read-out control during the comparison interval, the column drive control arrangement for the first and second feeds is shown in Fig. 13b. For the first feed, this control simply comprises a series arrangement of a normally closed pair of contacts of the paper skip relay PSR and a pair of contacts G3-3 of the check relay G3 connected between a source of positive potential and the output circuit 155a which supplies energization to the Fig. 7 feed-1 cathode follower stages of the timing matrix and by which these stages are energized during the electronic check cycle. The compare drive control for the second feed similarly includes normally closed paper skip relay PSR contacts and check contacts G5-1 of the relay G5 to energize through the output circuit 155'a the Fig. 7 feed-2 cathode follower stages of the timing matrix. Thus both the feed-1 and feed-2 Fig. 7 cathode followers of the timing matrix are energized throughout the entire electronic check cycle, but compare pulses are developed by the timing matrix only during the interval MI1–MI20 of the check cycle since only these timing pulses are applied to the corresponding ones of these cathode follower stages of the timing matrix.

In order that the timing matrix 30 may develop digit search impulses during the interval MI21–MI40 of the electronic check cycle, the column drive control unit includes a feed-1 and feed-2 digit search drive system as shown in Fig. 13c. The feed-1 and feed-2 drives are similar, and only that for feed-1 will be described but this description will apply in all respects to the drive for feed-2 (components of the latter corresponding to similar components of the former being identified by the same reference numerals primed). The feed-1 digit search drive includes a trigger 343 which is turned On through an AND gate comprised of diodes 344a, 344b and 344c. The diode 344c of this gate has a positive potential applied to it through the circuit conductor L32A from the reader control unit as long as the first station and first feed no card detection trigger of the latter unit is Off during normal feed operation of the machine. The diode 344a has a positive potential applied to it through the relay contacts G3-1 of the relay G3 which is energized during the electronic check cycle, these contacts being included in a series circuit with a pair of normally closed contacts of the paper skip relay PSR.

Thus the gate 344a, 344b and 344c is normally conditioned during the electronic check cycle to translate an MI21 timing pulse applied to the diode 344b of the gate, and this translated pulse turns the trigger 343 On. The resulting elevated potential in the Off output circuit of the trigger 343 after translation by the tandem arranged inverters 345 and 346 and the parallel connected cathode followers 347 and 348 energizes the output circuit conductor 155b which in turn supplies energization to the Fig. 9 type of feed-1 cathode follower stages of the timing matrix provided for translation of the signal digit search pulses MI21–MI40. The trigger 343 is turned Off by an MI111 pulse of the timing matrix but signal digit search pulses MI21–MI40 only are supplied by the timing matrix since the latter includes cathode followers corresponding only to this group of digit search pulses. It will be seen that the feed-2 digit search drive also is under control of the relay contacts G3–1, and that it energizes the output circuit 155'b to energize the Fig. 9 type of feed-2 cathode follower stage which supplies signal digit search pulses MI21–MI40 for the feed-2 operation.

*First and second read heads, column drives, and 12-6 code translators*

The construction and arrangement of the first and second station read heads, column drive units, and 12-6 code translators for the first and second feeds are identical and accordingly only that for the first feed will be here described.

With the exception that the first station read head 17 includes input digit search plug hubs 157 as shown in Fig. 4 described above, the construction and arrangement of the first station read head 17, associated column drive unit 38, and associated 12-6 code translator is identical to that of the second station read head 23, column drive unit 48, and 12-6 code translator 49. Consequently only the arrangement of components associated with the first read station will be described and the components of these units will be identified by the subscript 1 while the corresponding components of the second read station will be identified by the same reference numerals with the subscript 2.

The units of the first read station have a construction and arrangement shown in Figs. 14a and 14b while those of the second read station have an essentially identical arrangement shown in Figs. 14c and 14d. Figs. 14a–14d should be considered together as indicated in Fig. 14, and it will be seen that the only feature common to these two read stations is the common interconnection of the input plug hubs 37 with common cathode follower stages of the first read station column drive unit 38 and the second read station column drive unit 48.

Considering first the construction of the read head 17, it was mentioned above that with minor exceptions there noted it utilizes the physical construction disclosed in the copending application of Klotz et al., Serial No. 376,929, filed August 27, 1953. It includes for each index point of the card to be read a pair of normally open contacts $x$ and $y$. Each such pair of contacts is actuated to closed circuit position whenever a hole is sensed at the corresponding index point position of the card read at the first station. Each such pair of contacts, however, remain in open circuit position if the corresponding index point of the card is not punched. It will be seen from Fig. 14a that these pairs of read head contacts are arranged in columns (only the first sixteen columns are here shown for simplicity) and in twelve rows corresponding to the eighty columns and twelve rows of index points of the card to be read. As indicated for the first and sixteenth columns of contact pairs $x$ and $y$, a cathode follower stage $350_1$ is provided in the column drive unit 38 for each of the eighty contact-pair columns, and each such stage $350_1$ energizes the 12 and 11 zone rows of contact pairs through a diode $351_1$, the zero row of contact pairs through a diode $352_1$, the 1–7 numeric contact pair rows through a diode $353_1$, and the 8 and 9 numeric contact pair rows through a diode $354_1$. The diodes $351_1$–$354_1$ are isolating diodes used in conformity with the illustrative code set forth above in Table A to prevent spurious energization of contact pair rows for any combination of zone and numeric multirow combinations used as in the Hollerith coding of alphabetic information and certain character information.

The cathode follower stages $350_1$ have anodes energized in common through the circuit conductor L29 from the column drive control unit 153 last described, and have control electrodes selectively energized through individual card storage read plug hubs 37. It will be recalled from the description of the column drive control unit that the cathode followers $350_1$ are normally energized through the circuit L29 during the comparing interval MI1–MI20 of the electronic check cycle and during the interval MI21–MI110 of the electronic print cycle. The cathode follower stages $350_1$ during the intervals last mentioned accordingly energize individual columns of the read head contact pairs in accordance with the selected MI time plug hub wiring of their input card storage read plug hubs 37. However, the cathode follower stages $350_1$ do not have anode energization applied to them through the line L29 during the signal search interval MI21–MI40 of the electronic check cycle, and the individual columns of contact pairs of the read head are accordingly energized during this interval by appropriate plug hub wiring of digit search pulses to their input plug hubs 157 which it will be seen are connected to the cathode circuits of individual ones of the cathode follower stage $350_1$.

It will be seen from Fig. 14a that a corresponding contact of the contact pairs $x$, $y$ are connected by rows thereof through an individual diode $355_1$–$366_1$ to an individual common output circuit $368_1$–$379_1$ corresponding to an individual Hollerith code value. While Fig. 14a shows for convenience only sixteen columns out of the ninety such columns of contact pairs as earlier mentioned, four additional such groups of contact pairs having sixteen columns each (i.e. each duplicating the arrangement shown in Fig. 14a) are coupled into the output circuits last mentioned through corresponding output circuit diodes identified in columns as B, C, D and E. It will be recalled in connection with certain cathode follower stages of the timing matrix that delayed "A" pulses were used for "pull down" purposes to sharpen the trailing edge of the resultant timing pulses. The use of the "pull down" principle is also used in connection with the read head output circuits, and to this end delayed "A" pulses are supplied through the circuit 253 from the timing matrix and through a double inverter $380_1$ and diodes $381_1$ to pull down the output circuits $368_1$ and $369_1$; a double inverter $382_1$ applies delayed "A" pulses through a diode $383_1$ to the output circuit $370_1$; a double inverter $384_1$ supplies delayed "A" pulses through diodes $385_1$ to the output circuits $371_1$–$377_1$; and a double inverter $386_1$ supplies delayed "A" pulses through diodes $387_1$ to the output circuits $378_1$ and $379_1$.

Thus as each column drive cathode follower $350_1$ translates its individual timing pulse (according to the plug hub wiring of its input plug hub 37), or as digit search pulses are applied to the digit search input plug hubs 157, a corresponding pulse is translated by any of the closed pairs of contacts in the corresponding column thereof to the output circuits $368_1$–$379_1$ and the trailing edges of these translated pulses are sharpened by the delayed "A" pulses translated by the double inverters and diodes associated with each output circuit. These pulses appearing in the output circuits $368_1$–$379_1$ during each timing pulse of the column drive cathode followers, or digit search pulses, are translated through respective cathode followers $388_1$–$399_1$ to the 12-6 code translator 39. The output circuits of the cathode followers $388_1$–$390_1$ are also connected to the transmission line L6 as indicated, and a digit search exit plug hub 158 is connected to individual ones of the cathode follower output circuits as shown.

The 12 to 6 code translator 39 includes six cathode follower stages $400_1$–$405_1$ having input circuits coupled through respective groups of OR diodes $406_1$–$411_1$ to the output circuits of the cathode followers $388_1$–$399_1$ as shown. Thus a Hollerith -12- code bit appearing in the output circuit of the cathode follower $388_1$ is translated by both of the cathode followers $400_1$ and $401_1$ to appear as an -11-0- binary code in the output circuits thereof. Similarly, an -11- Hollerith code bit appearing in the output circuit of the cathode follower $389_1$ is translated only by the cathode follower $400_1$ to appear as an -11- binary code bit in the output circuit of the latter. A -0- Hollerith code bit appearing in the output circuit of the cathode follower $390_1$ is translated only by the cathode follower $401_1$ to appear as a binary -0- code bit in its output circuit. It will be apparent from inspection that a Hollerith -1- code bit appears as a binary -1- code bit in the output circuit of the cathode follower $402_1$, that a Hollerith -2- code bit appears as a binary -2- code bit in the output circuit of the cathode follower $403_1$, that a Hollerith -3- code bit appears as a binary -1-2- code in the output circuits of the cathode followers $402_1$ and $403_1$, and correspondingly that the remaining Hollerith code bits -4- through -9- are similarly converted to binary form in the output circuits of the cathode followers $402_1$–$405_1$. The output circuits of the cathode followers $400_1$–$405_1$ are connected to the alpha-numeric transmission line L25 as shown, while the cathode followers $402_1$–$405_1$ are also connected to the numeric transmission line L4.

The cathode follower stages $350_2$ of the second station column drive unit 48 have control electrodes connected to the input plug hubs 37 in common with corresponding cathode followers of the first station unit 38 as shown. The second station column drive unit 48 has its cathode followers energized through the circuit conductor L35 from the column drive control unit 153 earlier described. The output circuits $368_2$–$379_2$ of the second station read head 23 are coupled through the cathode followers $388_2$–$399_2$ and the transmission line L14 to the 12 to 6 translator 49 of the second read station in similar manner to that of the first read station just described. The cathode followers $400_2$–$405_2$ of the translator 49 have output circuits connected to the transmission line L26 while the cathode follower stages $402_2$–$405_2$ have their output circuits also connected to the transmission line L15 as shown.

To permit a no-card detection operation hereinafter described with reference to the reader control unit 92, MI0 timing pulses are applied through an isolating diode $349_1$ directly to the cathode circuit of the cathode follower stage $350_1$ corresponding to the first index-point row as shown.

During a card run-out operation described hereinafter in connection with the reader control unit 92, "9's" are automatically inserted first in the output of the first station read head and later in the output of the second station read head. In particular, this is accomplished by applying a positive potential from the reader control unit through a conductor 1002 to the conductor $379_1$ and through a conductor 1003 to the conductor $379_2$.

*Numeric lines junction 40, zone lines junction 42, zone translator 43, zone and numeric junctions unit 41, column print set up drive 44, print set up thyratrons 45, and zero and zone suppression unit 165*

The construction and circuit arrangement of the several units last identified is shown in Figs. 15a–15f which should be considered together as indicated in Fig. 15.

Considering first the arrangement of the zone lines junction 42, it will be seen that the zone transmission line L6 from the read head 17 of the first reading station of the first feed and the zone transmission line L6' from the read head 17' of the first reading station of the second feed are so terminated in the zones lines junction unit 42 that the Hollerith -12- code bit lines are coupled through OR diodes 415a and 415b to AND gate diode 416a, the Hollerith -11- code bit lines are coupled through OR diodes 417a and 417b to AND gate diode 418a, and the Hollerith -0- bit lines are coupled through OR diodes 419a and 419b to AND gate diode 420a. The AND gate diodes 416b, 418b and 420b have a common positive potential applied to them through a cathode follower 421 and the print relay contacts G5–6 of the relay G5 from a positive source of potential. Thus these gates are conditioned during the electronic print cycle to transmit zone information received during this time from the first read stations of either or both the first and second feeds. The Hollerith code -12-, -11- and -0- information is transmitted by respective cathode followers 422, 423 and 424 and the transmission line L7 to the zone translator 43.

There is also applied to the zone translator 43 through transmission lines L16 and L16' Hollerith code -12-, -11- and -0- information from the read heads 23 and 23' of the second read stations of the first and second feeds. As shown more clearly in Figs. 15a and 15b, the Hollerith code -12- zone information is transmitted through OR diodes 426a, 426b and 426c to a diode 427a of an AND gate which includes a further diode 427b; the Hollerith code -11- zone information is transmitted through OR diodes 428a, 428b and 428c to a diode 429a of an AND gate which also includes a diode 429b; and the Hollerith code -0- zone information is transmitted through OR diodes 430a, 430b and 430c to a diode 431a of an AND gate which also includes a diode 431b. In the absence of zone information suppression under control of the zero and suppression unit 165, which has a circuit arrangement shown in Fig. 15f presently to be considered, the latter unit applies a positive potential to the diodes 427b, 429b and 431b so that the gates of which these diodes form components transmit the combined Hollerith code -12- zone information received from all four stations of the two feeds to cathode followers 432 and 433, similarly transmit the Hollerith code -11- zone information to a cathode follower 434, and transmit the Hollerith code -0- zone information to a cathode follower 435. The output circuits of cathode followers 432 and 434 are connected together to generate the machine -11- code bit. Similarly the output circuits of cathode followers 433 and 435 are connected together to generate the machine -0- code bit. The output connections of these cathode followers 432, 433, 434 and 435 provide the translation of the Hollerith zone information into the machine zone information. However, it may be pointed out at this point that the zero and zone suppression unit of Fig. 15f may suppress the Hollerith code -11- and -12- zone information by removing the positive bias applied to the AND gate diodes 427b and 429b and may or may not also suppress the Hollerith code -0- information by removal by the positive potential applied to the AND gate diode 431b. In this, the suppression of -0- information (which may comprise either zone or numeric information) is independent of the suppression of -11- and -12- code zone information.

Turning attention now to the numeric lines junction unit shown in Fig. 15a, the numeric information transmission lines L4 and L4' from the 12-6 code translators 39 and 39' associated with the first stations of the first and second feeds are so terminated in the unit 40 that the binary -1- information from both feeds is combined by OR diodes 438a and 438b and is applied to an AND gate comprised by diodes 439a and 439b, the binary -2- information is combined by OR diodes 440a and 440b and is applied to an AND gate which includes diodes 441a and 441b, the binary -4- information is combined by OR diodes 442a and 442b and is applied to an AND gate which includes diodes 443a and 443b, and the binary -8- information is combined by OR diodes 444a and 444b and is applied to an AND gate including diodes 445a and 445b. The four gates last mentioned are opened concurrently with the gates of the zones lines junction unit 42 by a positive potential applied during the electronic print cycle through the cathode follower 421 to the diodes 439b, 441b, 443b and 445b of the unit 40. The numeric information thus transmitted by the gates of the unit 40 is further transmitted through cathode followers 446–449 and the transmission line L5 to the zone and numeric junctions unit 41 shown in Figs. 15b and 15d.

The zone information transmitted by the zone translator 43 is also applied to the zone and numeric junctions unit 41 through the transmission line L8, as is automatic character insertion information translated through the line L30 from the automatic character insertion unit 121.

As shown in Figs. 15b and 15d, the output circuits of both of the cathode followers 432 and 434 of the zone translator 43 are coupled through an OR diode 453a both to an inverter 454 and also to an AND gate which includes diodes 455a and 455b and which is coupled to tandem arranged inverters 456 and 457. An OR diode 453b couples the -11- zone code bit conductor of the transmission line L30 also to the gate diode 455a. The cathode followers 433 and 435 are coupled through an OR diode 458a to an inverter 459 and also to an AND gate including diodes 460a and 460b the output of which is likewise coupled to tandem arranged inverters 461 and 462. The -0- code bit conductor of the line L30 is similarly coupled to the gate diode 460a through an OR diode 458b. As thus arranged, a Hollerith code -12- information bit is translated by the cathode followers 432 and 433 of the unit 43 and is thus converted to -11-0- binary code form in the output circuits of the inverters 454 and 457 on the one hand and inverters 459 and 462 on the other hand; a Hollerith code -11- information bit translated by the cathode follower 434 of the unit 43 is translated as a binary form -11- code bit to the output circuits of the inverters 454 and 457; and a Hollerith code -0- information bit translated by the cathode follower 435 is translated as a binary form -0- code bit to the output circuits of the inverters 459 and 462.

The binary -1- information bits transmitted through the lines L5, L15 and L15′ are combined by OR diodes 463 and are transmitted through a diode 464 to a conductor 465 and are also transmitted through an OR diode 466a both to an inverter 467 and an AND gate which includes diodes 468a and 468b the output of which is connected to tandem arranged inverter stages 469 and 470. The binary -1- conductor of the line L30 is coupled through an OR diode 466b to the gate diode 468a. In similar manner, the binary -2- conductors of the lines L5, L15 and L15′ are coupled through OR diodes 471 and a diode 472 to the conductor 465 and are also coupled through an OR diode 473a to both an inverter 474 and an AND gate including diodes 475a and 475b the output of which is connected to tandem arranged inverters 476 and 477. The binary -2- conductor of the transmission line L30 is likewise coupled through an OR diode 473b to the gate diode 475a. The binary -4- conductors of the transmission lines L5, L15 and L15′ are coupled through OR diodes 479 and a diode 480 to the conductor 465 and are also coupled through an OR diode 481a both to an inverter 482 and an AND gate 483a and 483b the output of which is coupled to tandem arranged inverters 484 and 485. The binary -4- conductor of the line L30 is coupled through an OR diode 481b to the AND diode 483a. Lastly, the binary -8- conductors of the transmission lines L5, L15 and L15′ are coupled through OR diodes 487 and a diode 488 to the conductor 465 and are also coupled through OR diode 489a both to an inverter 490 and an AND gate 491a and 491b the output of which is connected to tandem arranged inverters 492 and 493. The binary -8- conductor of the line L30 is similarly coupled through an OR diode 489b to the AND gate diode 491a.

It will thus be apparent that the combined information of all of the binary -1-, -2-, -4- and -8- conductors of the several lines L5, L15, L15′ and L30 are connected by binary values to the inverters 467, 474, 482 and 490. The output circuits of the latter, together with those of the zone inverters 454 and 459 comprise conductors of the transmission line L18 which extends to individual cathode followers 494 comprising the column checking drive unit 51. The cathode follower output circuits of the unit 51 comprise the transmission line L19 which extends to the loop check circuit unit 52. It will further be apparent that all of the conductors of the transmission lines L5, L15, L15′ and L30 are coupled through diodes to the conductor 465 which comprises the input circuit of a double inverter 495 having an output circuit coupled through a cathode follower 496 to a conductor 497 extending to the zero and zone suppression unit of Fig. 15f presently to be described. Lastly, it will be apparent that all of the conductors of the transmission lines L5, L15, L15′ and L30 are coupled by binary values through AND gates to individual ones of the inverters 469, 476, 484 and 492. The last-mentioned AND gates are opened concurrently by a positive potential applied to one diode of each thereof through a conductor 499 from a cathode follower 500 which translates "B" pulses applied to an AND gate diode 501a when another AND gate diode 501b has a positive potential applied thereto by closure of relay contacts G5–6 energized during the electronic print cycle. Accordingly, during the electronic print cycle "B" timing pulses are transmitted by any of the gates of the zone and numeric junctions unit 41 which concurrently have applied thereto either zone or numeric information, and this information thereupon appears in a corresponding one or ones of the transmission line conductors L9 which extend from the zone and numeric junctions unit 41 to the column print set up drive unit 44.

The column print set up drive unit 44 last mentioned comprises six groups 504–509 of cathode follower units of which each group in turn includes six cathode follower stages all connected with parallel input circuits to an individual conductor of the transmission line L9. The output circuits of the cathode follower stages 504–509 comprise the transmission line L10 which extends to the print set up thyratron unit 45 which has, as indiacted, six rows of ninety thyratrons each corresponding to each of the six groups 504–509 of cathode followers in the drive unit 44. In particular, and considering the group of cathode followers 504 by way of example, a binary -11- information bit is concurrently transmitted by all of the cathode followers of the group but each such cathode follower drives a group of fifteen thyratrons in the associated -11- row of thyratrons. As will presently be explained in more detail, the thyratron drive is of that type wherein a positive potential is applied by the driving cathode followers to a control electrode of the thyratrons thereby tending to render the latter conductive. Thus while the -11- row of thyratrons may all tend to be rendered conductive by an -11- code bit translated concurrently by the group of cathode followers 504, only one of the thyratrons actually becomes conductive at a time and this is the thyratron which has concurrently applied to a screen electrode thereof a timing pulse from the timing matrix 30 coincident in time with the pulse translated by the cathode follower group 504.

Consider now the arrangement of the zero and zone suppression unit 165 having the detailed circuit arrangement shown in Fig. 15f. This unit has a cycle pick up plug hub 166 which when energized applies a positive potential to AND gate diodes 512a, 513a and 514a which have associated therewith respective AND gate diodes 512b, 513b and 514b. When it is desired to initiate zero suppression, a zero start plug hub 174 has applied thereto a selected print-position timing pulse from the timing matrix 30. This applied pulse is transmitted by the gate 512a, 512b, a cathode follower 515, and an OR diode 516a to an AND gate diode 517a which has associated with it AND gate diodes 517b and 517c. The AND gate diode 517c is energized whenever a Hollerith code form -0- information bit is transmitted by any of the OR diodes 430a–430c of the zone translator unit 43, and the AND gate diode 517b is energized with "B" pulses from the timing matrix 30. Thus whenever the AND gate diode 517a has a positive potential applied to it and the diode 517c has a -0- information code bit applied to it, this gate transmits a "B" pulse to turn On a trigger 518. The presence of the -0- information code bit at diode 517c in the AND gate logic is necessary because if no -0- bit is present in the first print position of the field being suppressed (a numeric 1 through 9 must be present) no zero suppression is needed so the trigger 518 does not need to be turned On. If the -0- code bit information had been excluded from the logic, trigger 518 would receive incompatible simultaneous turn On and turn Off signals at its inputs under the above-stated condition. The potential of the On output circuit of the latter thereupon, through a cathode follower 519 and an OR diode 520a closes down an AND gate comprised by diodes 521a and 521b. The output potential of the latter gate thereupon decreases in negative direction, and this decreased potential is transmitted through a cathode follower 522 to close the -0- gate diode 431b of the zone translator 43. When this occurs, the zone translator 43 suppresses further transmission of -0- information supplied to it. To insure immediate zero suppression prior to turn On of the trigger 518, the pulse translated by the gate 517a–517c is also translated by an inverter 528 and a cathode follower 529 to close the gate diode 521b.

The trigger 518 of the zero and zone suppression unit may also be turned On by a zone start suppression timing pulse (corresponding to a given print position) applied to the zone start plug hub 168. This pulse is translated by the AND gate 513a, 513b, a cathode follower stage 523, an inverter 524, a cathode follower stage 525, an inverter 526, a cathode follower 527 and an OR diode 516b to the AND gate 517a–517c to effect turn On of the trigger 518 by a "B" pulse upon transmission of a coincident -0- information bit by the zone translator 43, thus suppressing further translation of -0- information. For the purpose of insuring immediate suppression of a -0- information bit prior to turn On of the trigger 518, the output potential of the cathode follower 527 is also applied through the inverter 528 and a cathode follower 529 to decrease the positive potential on the AND gate diode 521b and thus reduce the potential to the input of the cathode follower 522 and thereby immediately close the -0- gate of the zone translator 43. The output of the cathode follower 527 is also applied through a diode 530 to turn On a -11- and -12- suppression trigger 531. The On output potential of the latter accordingly drops and through a cathode follower 532 and an OR diode 533a closes an AND gate comprised by diodes 534a and 534b. Here again to insure immediate suppression of zone information, the output of the cathode follower 525 closes the gate 534a, 534b by a decrease of potential applied to the diode 534b thus closing this gate immediately and without waiting for the trigger 531 to turn On. The lowered output potential of this gate is transmitted through a cathode follower 535 to close the -11- and -12- gates of the zone translator unit 43 by removing the positive potential applied to the AND gate diodes 427b and 429b. This suppresses further transmission of -11- and -12- bit zone information by the unit 43.

Where zero suppression is effected either by a timing pulse applied to the zero start plug hub 174 or by a timing pulse applied to the zone start plug hub 168, zero suppression is terminated upon receipt of any numeric information by the zone and numeric junctions unit 41. In this instance, any numeric information is applied as previously described to the conductor 465 and through the latter to the double inverter 495, and is transmitted as a positive potential pulse through the cathode follower 496 and the conductor 497 to be applied to an AND gate diode 537a. This permits transmission of a "B" pulse, applied to an AND gate diode 537b, through an OR diode 538a to turn Off the trigger 518 and thereby through the cathode follower 519 and OR diode 520a open the AND gate 521a, 521b to effect through cathode follower 522 the opening of the zero information AND gate 431a, 431b of the zone translator 43.

Zone suppression of -0-, -11-, -12- information when once started is effective to terminate transmission by the zone translator 43 of this information until such time as suppression is terminated by a stop suppression timing pulse applied to the plug hub 140 or, in the case of zero information suppression, until a significant digit is transmitted to the zone and numeric junctions unit 41. The stop suppression timing pulse applied to the stop plug hub 170 is selected to correspond with the print position to the right of the last print position within the suppressed field. The stop suppression timing pulse applied to the stop plug hub 170 is translated by the gate 514a, 514b, a cathode follower 539, a double inverter 540, and a cathode follower 541 to turn Off the trigger 518 through an OR diode 538b. It also immediately opens the gate 521a, 521b through an OR diode 520b (the gate thereafter remaining open upon turn Off of the trigger 518), and in addition turns Off the trigger 531 through an OR diode 542a and immediately opens the gate 534a–534b through an OR diode 533b (the gate thereafter remaining open by turn Off of the trigger 531). The gate 521a–521b in opening is effective to open the zero information gate of the zone translator 43, and the gate 534a–534b in opening is effective to open the -11- and -12- information gates of the latter unit so that the zone translator thereafter transmits all further zone information.

The triggers 518 and 531 are automatically reset Off by MI111 timing pulses applied through an OR diode 538c to the trigger 518 and through an OR diode 542b to the trigger 531.

*Printer magnet unit 3 and checking contacts unit 53*

An illustrative portion of the printer magnet arrangement of the printer unit 3 and of the checking contacts unit 53 is shown in Fig. 16. This figure also shows two columns of six rows of print set up thyratrons included in the print set up thyratron unit 45. It was earlier explained that the column print set up drive unit 44 energizes the print set up thyratrons in binary valued rows thereof by common energization of the control electrode of the thyratrons as arranged in such rows, but that the thyratrons were individually rendered conductive by timing pulses applied from the timing matrix 30 to the screen grids of the thyratrons as the latter are arranged in columns. This detailed circuit control of the thyratrons of the print set up thyratron unit 45 is shown for that column of thyratrons 547 which have an MI21 timing pulse applied to their screen grids and also for that column of thyratrons 548 which have an MI110 timing pulse applied to their screen grids. Each thyratron anode circuit is energized through an anode resistor and a common printer-actuated cam contact 543 as shown and comprises an individual conductor of the transmission line L12 which terminates in an individual print magnet winding 549 in the unit 3. The thyratrons when rendered conductive remain relatively weakly conductive by current supplied through their individual current-limiting anode resistors, but become more strongly conductive when supplied with energizing current through their individual magnet winding 549 and a printer-actuated cam contact 544 which closes at the conclusion of the electronic print cycle and before the contact 543 opens.

It was explained above that the set up of each print position of the printer is controlled by the status of energization of six print magnets associated with an individual column of thyratrons. It will be appreciated that one or more of the thyratrons in each column becomes conductive according to the code form of the information presented to that column at the moment the print position timing pulse (such as the timing pulse MI21 applied to the thyratrons 547) conditions the thyratron column to become conductive. The conductive thyratrons cause a corresponding code combination of relay windings 549 to be energized and thus set up a particular print character or print symbols for the individual print position of the printer.

Each of the print magnets 549 in addition to setting up the printer as earlier mentioned actuates an individual contact pair 551 of the checking contact system 53. The stationary contacts of these contact pairs are connected by binary digit rows as shown to an individual inverter 552, and each column of contact pairs is energized through a diode 553 by an individual timing pulse supplied from the timing matrix as indicated in Fig. 16. Thus the inverters 552 are energized in various code combinations during successive timing matrix pulses, each such code combination corresponding to the information code effecting printer set up for an individual print position. The output of the inverters 552 is transmitted through an associated cathode follower 554 to the transmission line L22 which extends to the loop check circuit now to be described. Each actuated contact pair 551 is latched in actuated position until latch-release magnets 545 associated with individual ones of the magnets 549 are energized, following completion of the subsequent electronic check cycle, by a printer-actuated cam contact 546.

Loop check circuit 52

The loop checking circuit 52 has a circuit arrangement shown in Figs. 17a, 17b, 17c and 17d which should be considered together as a unitary arrangement as indicated in Fig. 17.

The loop checking circuit automatically checks the accuracy of the printer set up from the information read at the first station during the electronic print cycle against the same information read from the second station during the electronic check cycle. This is true without regard to whether the information is supplied to the printer from either feed-1 or feed-2. It will become evident from the following description of the loop checking circuit that this automatic check verifies the correct operation of not only the first reading station itself, of all components which interconnect it to the printer, and of the correct operation of the printer, but additionally verifies the correct operation also of the second reading station and all components which connect it to and through the loop checking circuit thus to provide a comprehensive accuracy check upon the functioning of substantially all of the listing machine components.

The conductors of the input transmission line L22 from the checking contact system 53 last described are connected through an inverter 556 and a cathode follower 557 to terminate in a first diode gate 560 and also terminate directly in a second diode gate 567. The diode gates 560 compare the simultaneous presence and absence of like code bits from lines L22 and L19 to establish an equality condition. The diode gates 567 likewise perform a comparison function to positively establish the inequality condition if present.

Referring to Fig. 17c, it will be seen that the conductors of the transmission line L19 from the column checking drive unit 51 earlier described in similar fashion are connected through inverters 558 and cathode followers 559 to the gates 560 first mentioned above and terminate directly in the second gates 567 above mentioned. For convenience of description, each of the inverters 556 and cathode follower 557 is identified by the binary code bit identification of the transmission line conductor L22 with which the inverter and cathode follower is associated, and this is likewise true for the inverters 558 and cathode followers 559 associated with the conductors of the transmission line L19. The gates 560 are arranged as "equality" gates and each is identified in conformity with Boolean algebraic notation indicating concurrent presence and concurrent absence of a binary code information bit appearing in the corresponding conductors of the transmission lines L22 and L19.

It will be recalled from the foregoing descriptions of the column checking drive unit 51 and the checking contacts unit 53 that each conductor of the transmission lines L19 and L22 has a positive potential on it until the line receives an information code bit at which time the potential of the line decreases for the duration of the code bit. This is because the conductors of the line L19, for example, are energized from an inverter through a cathode follower (i.e. in Figs. 15c and 15e the inverter 454 and cathode follower 494 for the -11- conductor of the line 19) and the conductors of the line L22 likewise are energized by an inverter through a cathode follower (i.e. in Fig. 16 the inverter 552–11– and cathode follower 554–11– for the -11- line conductor). As a consequence, the "equality" gate 560–11–11– is always energized directly by the -11- conductors of the transmission lines L19 and L22 so long as these lines do not carry an information bit. However, when an information bit appears on the -11- conductors of the latter lines, the inverters 556–11– and 558–11– and associated cathode followers 557–11– and 559–11– cause the gate 560–11–11– to become conductive. It will be apparent that this likewise holds true for the remaining equality gates so long as the corresponding binary valued conductors of the transmission lines L19 and L22 concurrently transmit or do not transmit the same information bit. All of the equality gates 560 are coupled through OR diodes 562 to individual inverters 563 which are connected through individual cathode followers 564 and OR diodes 565 to a conductor 566. Each equality gate of given binary value when conductive renders its associated inverter 563 conductive and through the associated cathode follower 564 and diode 565 may decrease the potential of the line 566 dependent on the status of all other equality gates. It will be apparent that the conductor 566 has decreased potential if a single gate within each pair of six equality gates is conductive. Conductor 566 has elevated potential if any of the six pairs of equality gates is not conductive.

A double check of proper system operation is provided by a plurality of "unequal" gates 567 of which a first group is connected as shown to the output of a cathode follower 557 and a conductor of the transmission line L19 and a second group is connected to a conductor of the transmission line L22 and to one of the cathode followers 559. Thus these inequality gates become conductive whenever an information bit appears in one of the transmission lines L19 or L22 concurrently with the absence of an information bit in the corresponding binary valued conductor of the other transmission line. These inequality gates are all coupled through OR diodes 568 and a cathode follower 569 both to an OR diode 570a and to a diode 571a of an AND gate which includes a diode 571b.

As shown in Fig. 17b, "B" pulses are applied to a diode 572a of a gate which includes a diode 572b to which a positive potential is applied through the contacts G3-12 of the relay G3 energized during the electronic check cycle. Thus during the latter cycle the gate 572a-572b translates "B" pulses through a cathode follower 573 to the AND gate diode 571b and also to a diode 574a of an AND gate which includes a diode 574b to which the potential of the conductor 566 is applied. Now should the conductor 566 remain at a positive potential during any information bit checking interval, by failure of either of any pair of equality gates 560 to conduct as above explained, the diode 574b is conditioned to transmit the next "B" pulse applied to the diode 574a and this transmitted pulse turns On an error trigger 575 which is reset Off at each MI111 time. This results in the potential of the Off output circuit of the latter increasing, and this increased potential is translated through parallel connected cathode followers 576 and an OR diode 577 to an error stop plug hub 578. At the same time, the elevated potential of the conductor 566 is applied through an OR diode 570b to an AND gate which includes a diode 579b to which the "B" pulses of the cathode follower 573 are also applied. Thus the elevated potential of the conductor 566 conditions the gate 579a–579b to transmit the next "B" pulse through a double inverter 580 to each of four cathode followers 581–584. The cathode followers 581 and 582 each energize through the transmission line L23 the control electrodes of two groups of 22 thyratrons each in the check error thyratron unit 55 presently to be described, while the cathode followers 583 and 584 each energize through the line L23 a group of 23 check error thyratrons thus energizing a total of ninety such thyratrons corresponding to the ninety print positions.

The same result as last described obtains if the cathode follower 569 energizes the AND gate diode 579a through the OR diode 570a due to any one of the inequality gates 567 being rendered conductive by unlike information bits appearing in the input transmission lines L19 and L22 at any moment. In addition, the output potential developed by the cathode follower 569 conditions the gate 571a–571b to translate the next "B" pulse and thereby turn On an error trigger 585 which is reset Off at each MI111 time. The potential of the Off output circuit of the latter thereupon increases, and this increased potential is translated through parallel connected cathode followers 586 and an Or diode 587 to the error stop plug hub 578.

It will be noted that the error triggers 575 and 585 may be turned On only during the electronic check cycle when the cathode follower 573 translates "B" pulses, and by the same token "B" pulses are only available during this cycle for translation by the gate 579a and 579b and the double inverter 580 to energize the check error thyratrons of the unit 55, the arrangement of which will now be considered.

*Check error thyratron unit 55 and check error indicator unit 56*

The check error thyratron unit 55 and check error indicator unit 56 are arranged as shown in Fig. 18. The check error thyratron unit 55 includes ninety error thyratrons 589 which are controlled in four groups through individual conductors of the transmission line L23 from the loop check circuit 52 last described. In particular, each conductor of the transmission line L23 is connected to the control electrode of an individual group of the error thyratrons, and the screen electrode of each thyratron has an individual timing pulse applied to it from the timing matrix 30 through the transmission line L11 as indicated in Fig. 18. Since the error indication provided by the loop check circuit last described occurs for each successive print position of the printer, the coincidence of this error indication with an individual one of the timing pulses applied to the error thyratrons will result in that particular thyratron becoming conductive. The anode circuit of each of the thyratrons 589 includes an anode load resistor 590 and parallel-connected neon lamp 591 in the indicator unit 56 so that each conductive thyratron of the unit 55 causes its associated indicator 591 to become illuminated and thereby indicate the print position at which the error is found to occur by operation of the loop check circuit 52 last described. Once any of the error thyratrons becomes conductive, it remains so until a switch 592 is manually actuated to interrupt the common anode energizing circuit of the error thyratrons.

Ordinarily the error stop plug hub 578 of the loop check circuit last described will be wired to stop the listing machine upon detection of an error. The stop circuit, hereinafter to be described, which accomplishes this function also includes thyratrons which are deactivated by a manually actuated switch and the latter for convenience may be mechanically interconnected with the switch 592 for concurrent actuation and by which to effect concurrent extinction of the error indication and to recondition the stop circuit to resume normal operation of the machine.

*Sequence comparison unit 62 or 62'*

The sequence comparison units 62 and 62' for the respective first and second feeds have identical construction and operation, and accordingly only the unit 62 will be here described.

It was previously pointed out that the sequence comparison unit operates during the comparison interval MI1–MI20 of the electronic check cycle, and that it functions to make a numeric comparison of the information read at the first and second reading stations of the given feed. This comparison is made digit by digit beginning at MI1 time corresponding to the first column of index points of the data card and continuing column by column until the digit data read from the last column of the card has been compared at MI20 time or until the comparison is deliberately terminated by pre-establishing plug board wiring at some intermediate time corresponding to a card field column width less than twenty columns in value. The data digits are punch recorded in the comparison field of the card such that the highest order digit is punch recorded in the initial index point column of the card and lower value digits are punch recorded in later index point columns. Since the column width of the field used for sequence comparison is the same as that used for cross-comparison, the components used to initiate and terminate the operation of the sequence comparison unit 62 also are used to control the comparison interval of the cross-comparison unit 86 (presently to be described) in order that the construction of the latter unit may be simplified. Further, since the sequence comparison unit 62 makes a numeric comparison, the results of such comparison may be supplied to and utilized by the major-minor control unit 71 (presently to be described) to simplify the construction of the latter unit both with respect to its function of numeric and alphabetic comparison.

Numeric comparisons in the present listing machine are performed on the basis that the data cards are fed through the listing machine from the first reading station to the second reading station in the order of ascending numerical sequence of data punch recorded in the comparison field of the cards.

The sequence comparison unit 62 has a construction and circuit arrangement shown in Figs. 19a–19d which should be considered together arranged as indicated in Fig. 19. As shown in Figs. 19a and 19c, numeric data in binary form from the 12 to 6 translator 49 of the second reading station is translated through the transmission line L26 to four inverters 595–598 of the sequence comparison unit and also terminate in "equality" diode gates 599–602. The numeric data in binary code form from the 12-6 translator 39 of the first reading station similarly is supplied through the transmission line L25 to four inverters 603–606 of the sequence comparison unit and likewise terminate in the equality gates 599–602 as shown. The output circuits of the inverters 595–598 associated with the second reading station are coupled through respective cathode followers 608–611 to a second set of "equality" gates 612–615, and the inverters 603–606 associated with the first reading station are likewise coupled through respective cathode followers 616–619 to the equality gates 612–615 as shown.

The pairs of equality gates thus provided for each equal valued code digit have the same nature and character of operation as described above in connection with the equality gates of the loop check circuit 52. Considering the pair of equality gates 602 and 615 by way of example, the gate 602 becomes conductive if the binary -1- code bit concurrently appears in the information read from both the first and second read stations, or conversely the gate 615 becomes conductive if there is no binary -1- code bit appearing concurrently in this information thus to indicate in either event that the information concurrently read from the two reading stations has equal value with respect to the binary -1- code value.

The equality gates 599 and 612 are coupled through respective OR diodes 616a and 616b to an inverter 617 which in turn is coupled through a cathode follower 618 to an inverter 619 followed by a cathode follower 620. The output circuit of the cathode follower 618 is also coupled through an OR diode 621a to an inverter 622 which is followed by a cathode follower 623, is coupled through an OR diode 624a to an inverter 625 followed by a cathode follower 626, and lastly is coupled through an OR diode 627a to an inverter 628 followed by parallel connected cathode followers 629 and 630. The equality gates 600 and 613 similarly are coupled through respective OR diodes 631a and 631b to an inverter 632. The latter is coupled through a cathode follower 633 and an OR diode 621b to the inverter 622, an OR diode 624b to the inverter 625, and an OR diode 627b to the inverter 628. The equality gates 601 and 614 are coupled through respective OR diodes 634a and 634b to an inverter 635 which in turn is coupled through a cathode follower 636 and an OR diode 624c to the inverter 625 and through an OR diode 627c to the inverter 628. The equality gates 602 and 615 are coupled through respective OR diodes 637a and 637b to an inverter 638 which is coupled through a cathode follower 639 and an OR diode 627d to the inverter 628.

As thus arranged, the cathode follower 620 develops a positive output whenever the concurrently presented information from the first and second reading stations has equal valued binary -8- digit values, the cathode follower 623 develops a positive output potential if both the binary -8- and binary -4- digit values are equal, the cathode follower 626 develops a positive output potential if all of the binary -8-, -4- and -2- digit values are equal, and the cathode followers 629 and 630 develop a positive output potential if all of the binary -8-, -4-, -2- and -1- digit values of the information are equal. In this, it should be borne in mind that this equality comparison is conducted information bit by information bit (column by column of the data card) read from the first and second reading station during each of comparison intervals MI1–MI20.

The sequence comparison unit also includes two sets of "inequality" gates one of which is used to establish the fact that the information supplied from the first reading station has higher numeric value than that supplied from the second reading station and the other inequality gate establishing that the information supplied from the second reading station has higher numeric value than that supplied from the first reading station, again bearing in mind that this numeric comparison occurs during each of the MI1–MI20 comparison intervals. To this end, the output potential of the cathode follower 626 is applied both to an inequality gate 641 and an inequality gate 642. The gate 641 has also applied to it the binary -1- code digit of the information supplied from the second reading station and is conditioned through the inverter 606 and cathode follower 619 to become conductive if the binary -1- digit is absent from the information supplied from the first reading station. Since the positive potential output of the cathode follower 626 shows equality of the -8-, -4- and -2- code digits of the information, the conductive state of the gate 641 establishes that the information from the second reading station is of higher value because it possesses a binary -1- code digit whereas the first reading station does not. In similar fashion, the inequality gate 642 has applied to it the binary -1- code digit of the first reading station and is rendered conductive through the units 598 and 611 in the absence of a binary -1- code digit from the second reading station to indicate that the information from the first reading station is of higher numeric value to the extent of the binary -1- code digit.

The output potential of the cathode follower 623 is applied to inequality gates 643 and 644. It will be evident from what has been said and by inspection of the circuit arrangement of these gates that the gate 643 becomes conductive if the information from the second reading station has higher numeric value than that of the first reading station to the extent of the binary -2- digit value, or conversely that the inequality gate 644 becomes conductive if the information from the first reading station is higher by a binary -2- value than for the second reading station. The output potential from the cathode follower 620 is applied to both an inequality gate 645 and an inequality gate 646, the former of which upon becoming conductive establishing that the information from the second reading station is higher by a binary -4- value than that of the first reading station and the gate 646 upon becoming conductive conversely establishing that the numeric value from the first reading station has a binary -4- digit value higher than that from the second reading station.

An inequality gate 647 establishes that the numeric information from the second reading station has a binary -8- value higher than that from the first reading station, while an inequality gate 648 establishes that the numeric information from the first reading station has a binary -8- value higher than that from the second reading station.

The inequality gates 641, 643, 645 and 647 are coupled through OR diodes 649 and a double inverter 650 and tandem-arranged cathode follower 651 to the output transmission line conductor L27L of the sequence comparison unit, and it will be evident that a positive potential is impressed upon this line conductor whenever the inequality gates last mentioned establish that the numeric information supplied from the second reading station has higher value than that supplied from the first reading station. The inequality gates 642, 644, 646 and 648 are similarly coupled through OR diodes 652 and a double inverter 653 and tandem-arranged cathode follower 654 to the transmission line conductor L27H of the sequence comparison unit. A positive potential impressed upon the latter conductor accordingly provides an indication that the numeric information supplied from the first reading station is of higher value than that supplied from the second reading station.

As shown in Fig. 19b, the sequence comparison unit includes a trigger 656 which is set in the Off position at the outset of the comparison interval MI1–MI20 by an MI1 pulse supplied during the electronic check cycle through an OR diode 657. This MI1 pulse is also supplied through an OR diode 658 and a cathode follower 659 both to the transmission line conductor L28A (which extends to the cross-comparator unit where the puse initiates a comparison operation of the latter) and also to a diode 660a of a gate which includes diodes 660b and 660c. The trigger 656 in thus turning Off supplies an elevated positive potential through a cathode follower 661 and OR diode 662 to the cathode follower 659 to maintain a positive potential on both the line conductor L28A and the gate diode 660a following termination of the MI1 pulse. The continued positive potential on the line conductor L28A continues the operation of the cross-comparator unit during the comparison interval which as mentioned is common to the sequence comparison and cross-comparison units.

If a positive potential is now impressed on the transmission line conductor L27H to indicate that the numeric information from the first reading station is higher than that from the second reading station, it is also impressed on the gate diode 660c to condition this gate to transmit the next "B" pulse applied to the gate diode 660b and thereby through a diode 663 turn On a trigger 664 which effectively "stores" this feed-1 high output information. Prior to the trigger 664 being turned On, the elevated positive potential in its On output circuit is supplied through a cathode follower 665 to a diode 666a of a gate which includes a diode 666b connected to the transmission line conductor L27L. This gate is thus conditioned by the Off output state of the trigger 664 to translate through parallel connected cathode followers 667 and 668 to the sequence-low plug hub 64 the positive potential impressed upon the transmission line conductor L27L to indicate that the numeric information from the second reading station has higher value than that from the first reading station. It will accordingly be apparent that an output is developed at the sequence-low plug hub 64 in the event that a sequence-low output potential is impressed on the transmission line conductor L27L prior to the time that a sequence-high output potential is impressed upon the transmission line conductor L27H to turn On the trigger 664, and conversely that a sequence-high indication in turning On the trigger 664 closes the gate 666a, 666b to prevent a sequence-low output from being developed at the sequence-low plug hub 64. This circuit logic is provided since once a high sequence output has been obtained in the comparison field there is no significance to any low sequence outputs obtained from lower order numeric digits within that field.

It was previously pointed out that the sequence comparison operation is terminated by plug hub wiring to supply an appropriate timing pulse (corresponding to the last data column to be compared) to the End plug hub 63. This timing pulse is applied through an OR diode 669 to turn On the trigger 656 and thereby through cathode followers 661 and 659 decrease the potential on the transmission line conductor L28A (to terminate further operation of the cross-comparator unit) and to shut down the gate 660a, 660b and 660c. The End timing pulse is, however, also translated through an OR diode 670 to the cathode follower 659 to maintain the transmission line conductor L28A at positive potential and to maintain the gate 660a, 660b and 660c open for the duration of the timing pulse. This insures that the last column corresponding to the End timing pulse is itself sequence compared and cross-compared. The End timing pulse is applied through the transmission line conductor L28B directly to the cross-comparison unit. The triggers 664 and 656 are reset through respective OR diodes 671 and 672 at each MI111 time.

The sequence comparison unit develops an error stop output potential under several conditions which indicate equipment malfunctioning. In the following description, it should be kept carefully in mind that the comparison process occurs by successive information bits so that an error due to equipment malfunctioning may be indicated at any time throughout the comparison interval. The output potential of the cathode followers 629 and 630 is supplied through an inverter 675 and a cathode follower 676 to a gate diode 677a, the potential on the sequence-low transmission line conductor L27L is applied through an inverter 678 and a cathode follower 679 to a gate diode 677b, and the potential of the sequence-high conductor L27H is applied through an inverter 680 and a cathode follower 681 to a gate diode 677c. It will be recalled that a negative potential is developed in the output circuit of the cathode follower 629 and 630 if there is at least one inequality of the compared code digits supplied from the first and second reading stations, and this negative potential through inverter 675 impresses a positive potential on the gate diode 677a. If at the same moment both of the transmission line conductors L27L and L27H both have negative potential impressed upon them to indicate neither a sequence-low nor a sequence-high output (which obviously is inconsistent with the inequality indication output of the cathode followers 629 and 630), the gate diodes 677b and 677c also have positive potentials impressed upon them through the respective inverters 678 and 680. This results in a positive potential being impressed through an OR diode 682a and a cathode follower 683 on the error stop plug hub 684.

The second type of error indication is accomplished by applying the output potential of the cathode followers 629 and 630 to two AND gates 685 and 686 to which are also respectively applied the potential of the sequence-high output conductor L27H and sequence-low output conductor L27L. An equality comparison which develops a positive potential in the output circuit of the cathode followers 629 and 630, indicating equality of all binary code digits of the information supplied at any moment from the first and second reading stations, is obviously incompatible with either a concurrently developed sequence-high output rendering the gate 685 conductive or a concurrently developed sequence-low output rendering the gate 686 conductive. Either condition therefore applies a positive potential through an OR diode 682b or 682c and the cathode follower 683 to the error stop plug hub 684.

The third type of error indication is accomplished by applying the potential of the sequence-high output conductor L27H and the potential of the sequence-low output conductor L27L to a gate 687. Concurrently developed sequence-high and sequence-low output potentials are incompatible and accordingly result in a positive potential being applied through an OR diode 682d and the cathode follower 683 to the error stop plug hub 684.

*Major-minor control 71 (or 71')*

The major-minor control unit 71 of the first feed is identical in construction and operation to that of the second feed, and accordingly only the unit 71 will be here described.

One numeric punch card field and one alphabetic punch card field may be major or minor controlled with the control being independent as respect the major or minor control and also as respect the numeric and alphabetic control. A major or minor control output is premised entirely upon an inequality between the information supplied from the first reading station and that supplied from the second reading station without regard to the nature or character of the inequality.

The circuit arrangement of the major and the minor control unit 71 is shown in Figs. 20a, 20b and 20c which should be considered together as indicated in Fig. 20. Referring particularly to Figs. 20a and 20b, and considering at the outset the matter of major numeric control, it was pointed out above in connection with the over-all system description that major numeric control is initiated by applying an appropriate starting timing pulse to the start plug hub 72 and is ended by a timing pulse applied to the End plug hub 73. The timing pulse applied to the start plug hub 72 (Fig. 20a) is transmitted through an OR diode 690 to turn On a trigger 691 (Fig. 20b), the latter being subsequently turned Off by the End timing pulse applied to the End plug hub 73 and transmitted through an OR diode 692. During the interval when the trigger 691 is turned On, the elevated potential in its Off output circuit is transmitted through a cathode follower 693 and an OR diode 694a to a cathode follower 695 and is further transmitted by the latter and an OR diode 696a to a diode 697a which with diodes 697b and 697c constitutes an AND gate. It may be noted that the start timing pulse translated through the diode 690 and the stop timing pulse translated through the diode 692 are also translated through respective OR diodes 694b and 694c and the cathode follower 695 to the gate diode 697a to insure that major numeric control includes the punched card information columns corresponding to the start and End timing pulses for the field over which major control is desired. The numeric sequence-high potential developed on the transmission line conductor L27H and the sequence-low control potential developed on the transmission line conductor L27L, by operation of the sequence comparison unit 62 last described, are applied through respective OR diodes 698a and 698b on the input circuit of a double inverter 699. The output circuit of the latter unit is coupled through a cathode follower 700 to the gate diode 697b, so that any numeric inequality of either the sequence-high or sequence-low type appearing on the transmission line conductors L27H and L27L causes the gate 697a, 697b and 697c to transmit the next "B" pulse applied to the gate diode 697c. This transmitted pulse turns On a trigger 702, and the resulting elevated potential in the Off output circuit of the latter is translated through parallel connected cathode followers 703 and 704 to the major exit plug hub 80 of the major-minor control unit.

Major alphabetic control by the unit 71 involves not only a consideration of numeric inequalities but also of zone information inequalities since algebraic information is a combination of zone and numeric coding as indicated above in Table A. Accordingly, the zone information conductors of the transmission line L25 from the reading station and L26 from the second reading station terminate (Fig. 20a) in the major-minor control unit 71 in a number of "equality" and "inequality" gates. Thus all of the zone conductors of the line L25 and L26 terminate in an equality gate 706 and terminate by pairs in pairs of equality gates 707 and 708 as shown in Fig. 20a. Each transmission line conductor also is connected to an inverter 709–712 having respective associated output cathode followers 713–716 which are coupled as shown to the equality gates 688, 707 and 708 and are also coupled with individual ones of the line conductors in individual inequality gates 717–720. The equality gates 688 and 706–708 are coupled through respective OR diodes 689 and 721–723 to a cathode follower 724 while the inequality gates 717–720 are coupled through respective OR diodes 725–728 to a cathode follower 729, and it will be apparent that the arrangement and operation of these inequality gates is in all respects similar to that previously described in connection with the loop check circuit 32 and sequence comparison unit 62. The equality gate 706 senses the simultaneous presence of both the -0- and -11- code bits from both the first and second reading stations of feed one. The equality gate 707 senses the simultaneous presence of the -0- code bit and the absence of the -11- code bit from both the first and second reading stations. The equality gate 708 senses the simultaneous absence of the -0- code bit and the presence of the -11- code bit from both the first and second reading stations. The equality gate 688 senses the simultaneous absence of both the -0- and -11- code bits from the first and second reading stations of feed one. Equality gates 706, 707, 708 and 688 are connected through OR diodes 721, 722, 723 and 689 to cathode follower 724 to establish the over-all -0- and -11- code bit equality condition. The output potential of the cathode follower 729 is applied to a diode 732a (Fig. 20b) of a gate which includes a diode 732b and is coupled through an OR diode 698c to the double inverter 699 and its associated cathode follower 700.

A major alphabetic control operation is initiated by a start timing pulse applied to the start plug hub 74 (Fig. 20a) to turn On a trigger 733, and the operation is terminated by an End timing pulse applied to the End plug hub to turn Off the trigger 733 through an OR diode 734a. During the On period of the trigger 733, the elevated potential in its Off output circuit is translated through a cathode follower 735, an OR diode 736a, and a cathode follower 737 to the gate diode 732b so that this gate is opened during each alphabetic control interval to translate to the double inverter 699 any zone information inequality potential developed in the output circuit of the cathode follower 729. Any such inequality, and also any numeric inequality potential appearing on the sequence-high transmission line conductor L27H or sequence-low conductor L27L is likewise applied to the inverter 699 as previously described, with the result that either a numeric or zone inequality is effective to turn On the trigger 702 and thereby develop an output potential at the major exit plug hub 80. In this, it will be noted that both the start timing pulse and End timing pulse applied to the alphabetic start and End plug hubs 74 and 75 are applied through respective OR diodes 738a and 738b to the cathode follower 737 in order that the alphabetic major control may include the punch card information column corresponding to the start and stop timing pulses.

The triggers 691, 702 and 733 are reset at MI111 time through respective OR diodes 739, 740 and 734b.

To guard against equipment malfunctioning, particularly in connection with the equality and inequality gates of this unit, check error stop potentials are developed under two conditions. In the first of these, the output potential of the cathode follower 729 is applied to an inverter 742 which is coupled through a cathode follower 743 to a gate diode 744a. The output potential of the cathode follower 724 is applied to an inverter 745 which is coupled through a cathode follower 746 to a gate diode 744b. The gate diode 744a has a positive potential applied to it whenever the inequality gates 717–720 determine that there is no zone inequality, whereas the gate diode 744b has a positive potential applied to it whenever the equality gates 688 and 706–708 determine that there is no equality of zone information. Obviously a failure to find that there exists neither an equality nor an inequality is an incompatible condition indicating malfunctioning of the gate components, and in this event the gate 744a, 744b becomes conductive to impress a positive potential through an OR diode 747a, a double inverter 748, and a cathode follower 749 on an error stop plug hub 750.

The second condition indicating equipment malfunctioning is that existing when the cathode follower 724 develops an output potential indicating equality of zone information while the cathode follower 729 concurrently develops an output potential indicating some inequality of the zone information. This is for the reason that a condition giving rise to output of any of the equality gates 688 and 706–708 inherently prevents any of the inequality gates 717–720 from properly developing an output potential, and conversely whenever one or more of the inequality gates develop an output potential the equality gates 688 and 706–708 must inherently be incapable of developing any output potential. Thus the cathode followers 724 and 729 can develop concurrent output potentials only by reason of malfunctioning of the gate components, and this condition is indicated by applying the output potentials of these cathode followers to respective AND gate diodes 751a and 751b to develop through an OR diode 747b and the units 748 and 749 a positive output potential at the error stop plug hub 750.

The arrangement of the minor numeric and minor alphabetic control triggers and associated components is shown in Fig. 20c and corresponds in all respects to the major numeric and alphabetic control arrangement just described. Accordingly, components of the minor numeric and alphabetic control corresponding to the same components of the major numeric and alphabetic control are designated by the same reference numerals with a subscript M, and the operation described in connection with the major control applies in all respects to the minor control and will not be repeated.

*Cross-comparison unit 86*

The cross-comparison unit 86 performs a numeric comparison between the information read at the first reading station of the first and second card feeds. The results of comparison indicate that the numeric information of one or the other feed is of higher value than that of the other and in which feed this higher valued numeric information occurs or alternatively provides an indication that the numeric information of the two feeds is equal.

The arrangement of the cross-comparison unit is shown in Figs. 21a–21e which should be arranged as indicated in Fig. 21.

The numeric transmission lines L4 and L4′ from the first reading station of the respective first and second card feeds terminate in the cross-comparison unit in a set of equality AND gates and two sets of inequality AND gates. This input gate construction of the cross-comparison unit (and the gate operation) is identical to that of the sequence comparison unit 62 above described, and components of the former unit corresponding to those of the latter unit are identified by the same reference numeral with an $x$ subscript. As in the sequence comparison unit, the cross-comparison cathode follower $654_x$ (Fig. 21c) develops a positive output potential whenever the numeric information transmitted over the line L4 from the first card feed is of higher value than that of the second card feed. Similarly, the cathode follower $651_x$ develops a positive output potential whenever the information supplied through the line L4′ from the second card feed has higher numeric value than that from the first feed.

The cathode follower $654_x$ is connected to an AND gate diode 755a having a gate diode 755b to which "B" pulses are applied from the timing matrix 30. The output potential of this gate is applied to a diode 756a which with diodes 756b, 756c and 756d constitute an AND gate having a positive potential applied to the diode 756b through the transmission line L28A from the sequence comparison unit throughout the active comparison interval (extending from MI1 to and including the End timing pulse applied to the sequence comparison unit) and having "B" pulses applied to the diode 756c. The gate diode 756d has a positive potential applied to it until the cross-comparison unit develops an output potential as will presently become more fully apparent.

Accordingly, a positive potential developed in the output circuit of the cathode follower $654_x$ (resulting from the higher valued numeric information being supplied from the first card feed) causes the gate last mentioned to transmit the next "B" pulse and turn On a trigger 757. The elevated potential thereupon developed in the Off output circuit of this trigger is translated through parallel connected cathode followers 758 and 759 to the low-2 output plug hub 89 to indicate that the numeric information from the second card feed is of lower value than that from the first card feed. In similar manner, the output circuit of the cathode follower $651_x$ is coupled through an AND gate 759, to which "B" pulses are applied as shown, to an AND gate diode 760a associated with a diode 760b to which the potential of the line L28A is applied, a diode 760c to which "B" pulses are applied, and a diode 760d to which a positive potential is applied until the comparison unit completes its comparison operation as will presently be more fully apparent. Accordingly, a positive potential developed in the output circuit of the cathode follower $651_x$ causes the next "B" pulse to be transmitted by the gate diode 760c to turn On a trigger 761. The elevated potential thereupon developed in the Off output side of this trigger is transmitted through parallel connected cathode followers 762 and 763 to the low-1 output plug hub 87 to indicate that the numeric information from the first card feed is of lower value than that from the second card feed.

The potentials transmitted by the cathode followers 758 and 759 on the one hand or 762 and 763 on the other are also transmitted through respective OR diodes 764 and 765 to an inverter 766 which is coupled through a cathode follower 767 to the gate diodes 756d and 760d thus maintaining these diodes at a positive potential until such time as a low-2 output potential is developed at the plug hub 89 or a low-1 output potential is developed at the plug hub 87. When, however, a potential is developed at one of the latter plug hubs, the inverter 766 and cathode follower 767 close the gate diodes 756d and 760d so that whichever one of the triggers 757 or 761 is in the Off state at this time cannot thereafter be turned On during the comparison interval.

Figure 21A:
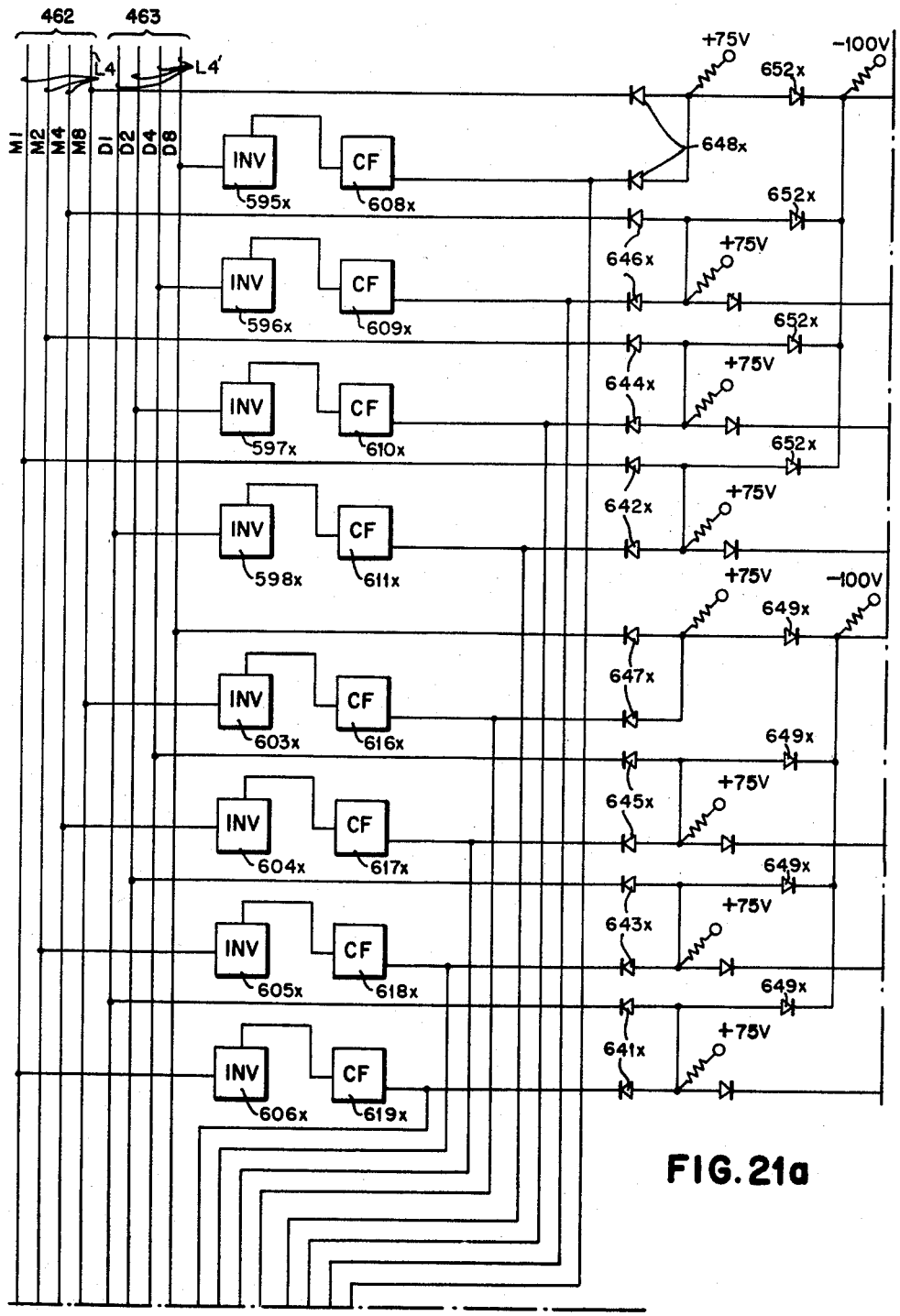
Figure 21B:
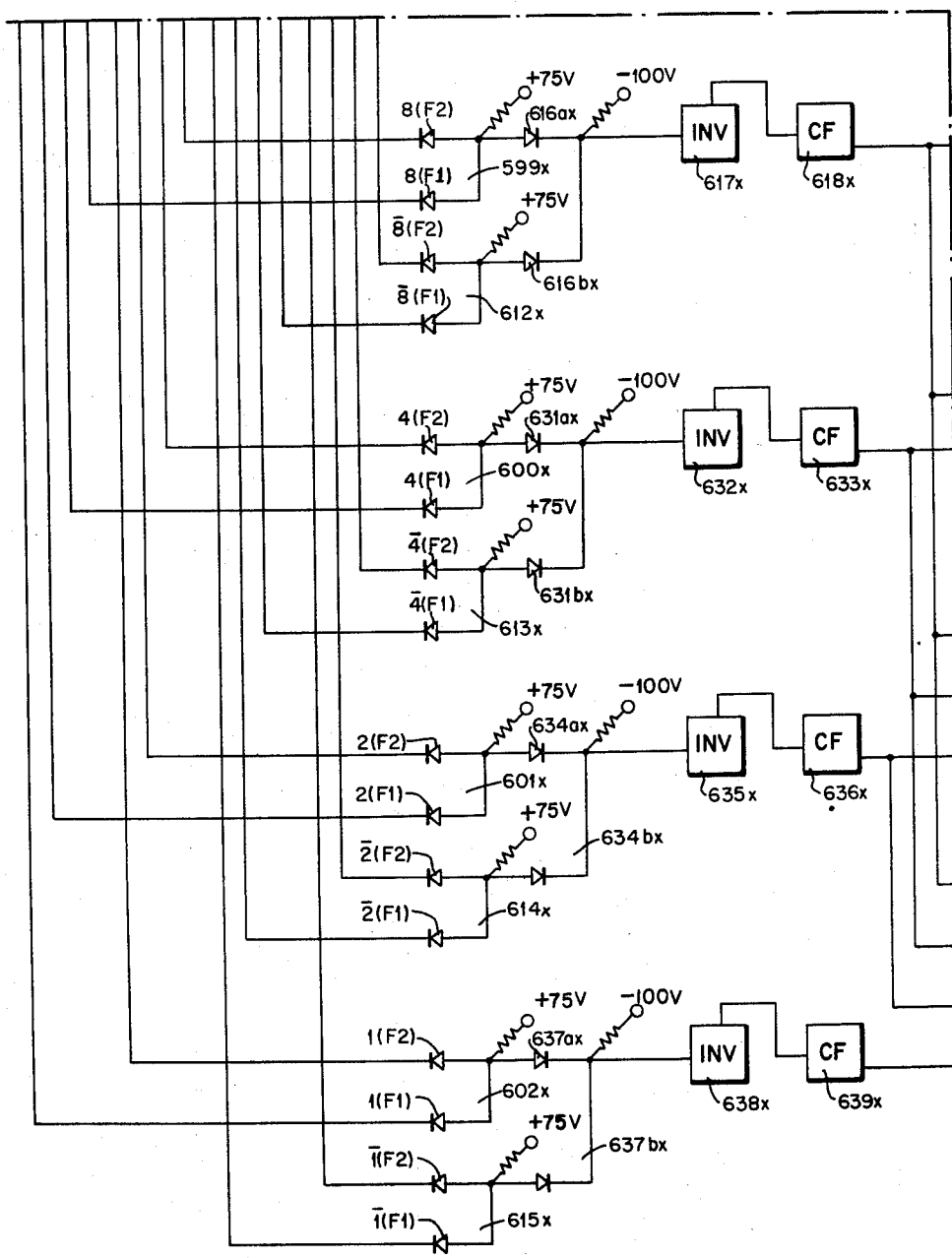
Figure 21C:
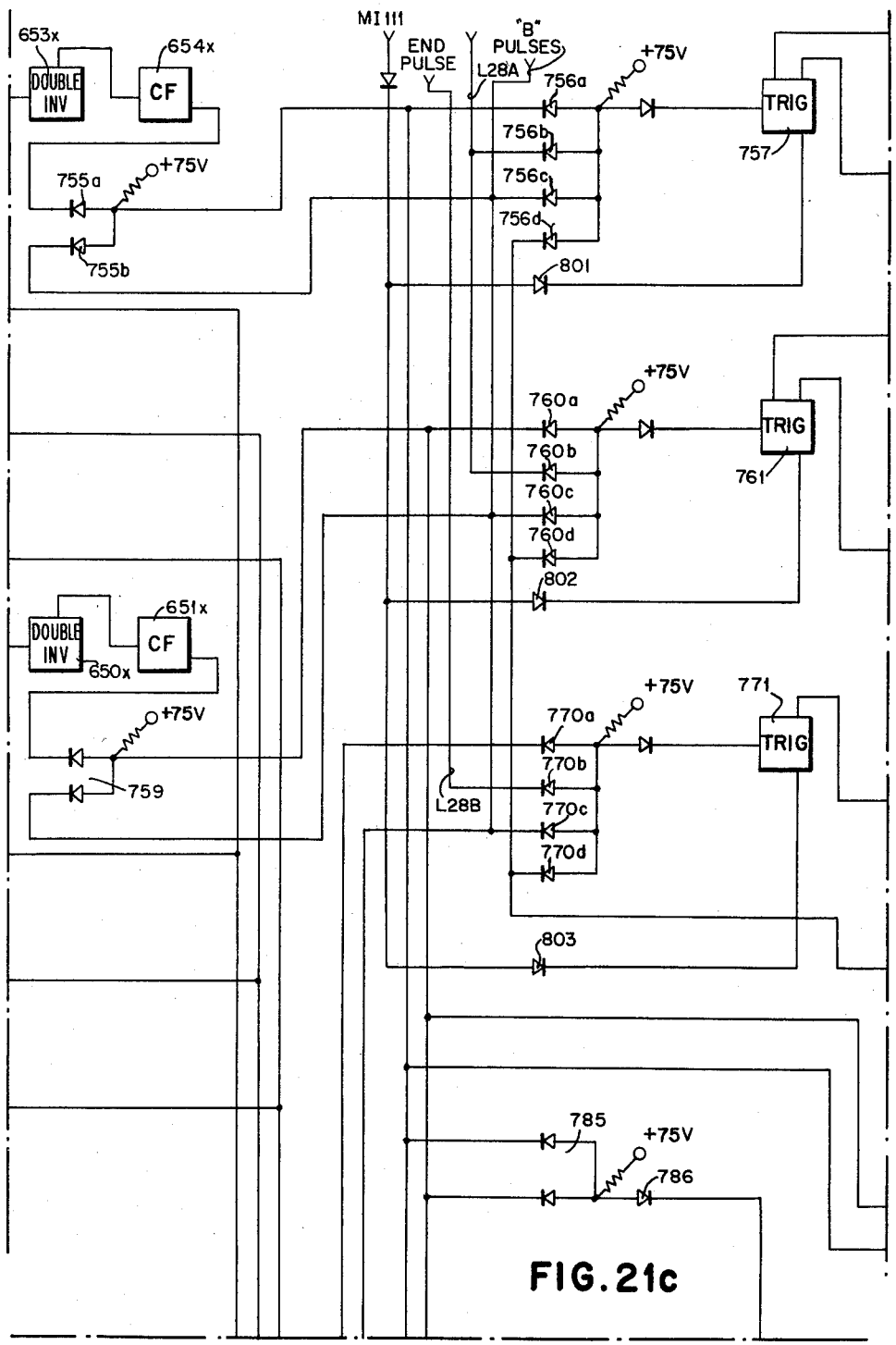
Figure 21D:
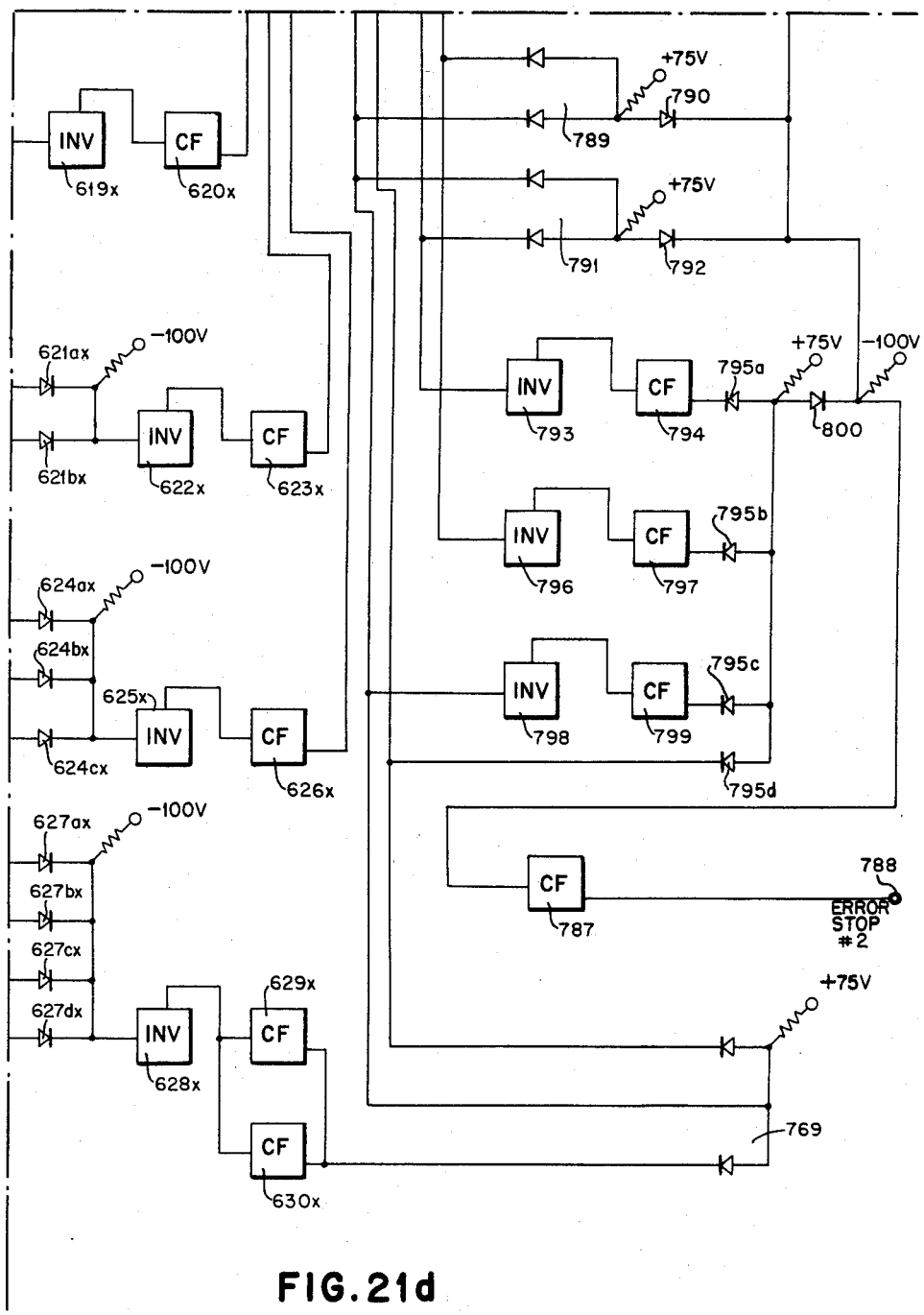

As shown in Figs. 21c and 21d, the potential developed in the output circuit of the cathode followers $629_x$ and $630_x$ is translated through a gate 769, to which "B" pulses are also applied, to a gate diode 770a associated with a gate diode 770b to which the comparison End timing pulse is applied through the transmission line conductor L28B from the sequence comparison unit, a diode 770c to which "B" pulses are applied, and a diode 770d to which the output potential of the cathode follower 767 is applied. If at the time the comparison End timing pulse is applied to the diode 770b neither a low-2 nor a low-1 output potential has been developed by the cross-comparison unit, the gate diode 770d remains at elevated potential, the equality comparison gates will develop and apply through the gate 769 a positive potential to the gate diode 770a, and the comparison End timing pulse therefore conditions the gate 770a–770d to translate the next "B" pulse and turn On a trigger 771. It will be noted that this can occur only at the time of occurrence of the comparison End timing pulse corresponding to the last card data column to be cross-compared, and only in the event that the cross-comparison unit develops neither a low-2 output potential nor a low-1 output potential. The elevated potential developed in the Off output circuit of the trigger 771 is translated through parallel connected cathode followers 772 and 773 to the equal output plug hub 88 to indicate that the numeric information from both the first and second feeds has been equal throughout the interval of comparison.

To avoid improper operation of the listing machine due to malfunctioning of the machine components, the cross-comparison unit may develop either of two error stop output potentials. The first of these has relation to the comparison results indicated by operation of the triggers 757, 761 and 771. Referring more particularly to Fig. 21e, an output potential developed at any of the low-2 plug hub 89, low-1 plug hub 87 or equal plug hub 88 is translated through an OR unit 774 to an inverter 775 and tandem arranged cathode follower 776. In the absence of a potential transmitted through the OR unit 774, the output potential of the cathode follower 776 is positive and is applied to a gate diode 777a having an associated gate diode 777b to which an MI21 timing pulse is applied during the electronic check cycle. This timing pulse is the one immediately following the last of the comparison interval timing pulses, and is translated by the gate 777a and 777b and a cathode follower 778 to an error stop plug hub 779 in the event that the cross-comparison unit has failed to develop any low-2, low-1 or equal output potentials at some time during the comparison interval. A similar error stop potential is developed by a gate 780 in the event that a low-2 output potential is developed concurrently with an incompatible equal output potential. An error stop output potential is also developed by a gate 781 in the event that a low-1 output potential is concurrently developed with an incompatible equal output potential. Lastly, an error stop output potential is developed by a gate 782 in the event that concurrent low-2 and low-1 output potentials are developed.

The second type of error indication is a more rapid one than that last described, and furnishes an error indication at the time of comparison of each information bit supplied to the cross-comparison unit from the first and second feeds. Thus referring to Figs. 21c and 21d, a gate 785 develops a positive output potential whenever the comparison of an information bit from the two feeds indicates that the information of each feed is higher than that of the other. This developed potential is applied through an OR diode 786 and a cathode follower 787 to an error stop output plug hub 788. A diode gate 789 develops and applies through an OR diode 790 to the cathode follower 787 an output positive potential whenever a low-1 indication is developed concurrently with an equality output potential from the cathode followers 629$_x$ and 630$_x$. A gate 791 likewise develops and applies through an OR diode 792 to the cathode follower 787 a positive potential whenever a low-2 indication is developed concurrently with an equality indication from the cathode followers 629$_x$ and 630$_x$. A fourth type of error indication is provided by applying the output of the low-2 gate 755a, 755b to an inverter 793 and associated cathode follower 794 which is coupled to an AND gate diode 795a, by applying the output of the low-1 gate 759 to an inverter 796 with associated cathode follower 797 coupled to an AND gate diode 795b, and by applying the output of the equality gate 769 to an inverter 798 with associated cathode follower 799 having an output circuit connected to an AND gate diode 795c. The AND gate comprised by the diodes last mentioned includes a further diode 795d to which "B" pulses are applied. When it is recalled that any lack of equality will prevent a positive potential being applied from the equality gate 769 to the inverter 798 and thus will maintain the gate diode 795c biased to a positive potential by the cathode follower 799, the concurrent failure at this time to develop either a low-2 output at the gate 755a, 755b or a low-1 output at the gate 759, whereby the gate diodes 795a and 795b continue to have positive potentials supplied to them from the respective cathode followers 794 and 797, is an incompatible condition indicating an error and a "B" pulse is accordingly translated by the gate diode 795d and is further translated by an OR diode 800 and the cathode follower 787 to the error stop plug hub 788.

The triggers 757, 761 and 771 are reset at MI111 time through respective OR diodes 801, 802 and 803.

*Indicating OR unit 66–1 and OR units 66–2, 66–3*

The OR unit 66–1 is of a type which provides a visual indication whenever a pulse is received by any input plug hub of the unit. Since this OR unit is associated with the stop circuit 69, it is usually desirable to indicate the source of the stop pulse which terminates operation of the listing machine. The OR units 66–2 and 66–3 involve the same construction insofar as the OR function is concerned but are not of the indicating type.

The OR unit 66–1 has a circuit arrangement shown in Fig. 22, and it will be seen that each of the input plug hubs 65A–65G are coupled through an OR diode 807 to the exit plug hub 67 so that a pulse received at any input plug hub is translated directly to the exit plug hub. As just mentioned, each of the OR units 66–2 and 66–3 involves this OR construction, but the unit 66–1 in addition includes gas trigger tubes 808 having their control electrodes connected to individual ones of the input plug hubs 65A–65G. "B" pulses are supplied to the screen electrodes of all of the gas trigger tubes 808, and each includes in its anode circuit a visual indicator device 809 conveniently of the neon discharge lamp type. These indicating devices become illuminated whenever the associated gas trigger tube is rendered conductive by a pulse applied to its control electrode from the associated input plug hub. In practice, each input plug hub will normally be reserved for plug hub wiring to a particular error stop plug hub provided in certain of the units previously described or for functional control in the manner shown and described with reference to the over-all system of Fig. 4. Thus each of the indicator lamps 809 may be provided with an appropriate label to indicate the source of the pulse which was translated by this OR unit to the stop circuit 69 to terminate operation of the listing machine. All of the gas trigger tubes 808 are energized from a positive source of potential through a manually operable switch 810 which may be uni-controlled with the manually actuated switch 592 associated with the check error indicator thyratron tubes of Fig. 18.

*Stop circuit 69*

The arrangement of the stop circuit 69 is shown in Fig. 23. The input plug hub 68 of this unit is connected to the control electrode of a gas discharge trigger tube 813 having a screen electrode to which "B" pulses are applied and having an anode energized through a load resistor 814, indicator lamp 815, and a manually actuated switch 816 from a source of positive potential. A stop pulse applied to the stop plug hub 68 causes the tube 813 to become conductive at the next "B" pulse and thereby illuminate the indicator lamp 815 to indicate that the stop circuit has fuctioned.

As mentioned above in connection with the over-all system operation of Fig. 4, the stop circuit exercises control over the reader control units 12 and 12' of the respective first and second card feeds. To this end, the output potential of the tube 813 is applied through an inverter 817 and cathode follower 818 to an AND gate 819 to which MI111 pulses are also applied. Thus the AND gate 819 is conditioned by the conductive state of the trigger tube 813 to translate the succeeding MI111 pulse to a gas trigger tube 820 which is thereupon rendered conductive by the succeeding "B" pulse applied to its screen electrode. The output potential of the tube 820 is transmitted through an inverter 821 and a cathode follower 822 to an output circuit 823 which extends to control circuits in the reader control units 92 and 92' to control the operation of these units in a manner presently to be explained in the detailed description of these units.

The manually actuated switch 816 may conveniently be uni-controlled with the manually actuated switch 592 of the check error indicator system shown in Fig. 18, thus enabling one manual switch actuation to extinguish all indicator lamps and reset associated thyratrons.

*Multiline print control unit 129 or 129' and multiline selector 133 or 133'*

The multiline print control units 129 and 129' and associated multiline selector units 133 and 133' have the same construction and mode of operation, and the following description applicable to the feed–1 MLP unit 129 and multiline selector unit 133 will apply in all respects to the feed–2 MLP unit 129' and multiline selector unit 133'.

As just indicated, a multiline print control unit is provided for each card feed and it was explained above in connection with the over-all listing machine arrangement that this MLP unit is selectably controlled by functional control information read from a punched card at the first reading station of the feed.

An illustrative example of an MLP operation is that involving the printing of insurance premium notices where a first line may be devoted to printing the name of the policy holder and the annual premium amount, the second line to the street address of the policy holder and the amount of a declared annual dividend, and the third line to the city and state of residence of the policy holder and the net amount of premium due. In this type of operation, it was mentioned above that each step of printing one line of an MLP operation requires one card cycle for setting up and verifying the accuracy of set up of the printer. Accordingly, provision is made to terminate the card feed (including termination of any further card reading operation) until completion of printer set up from the last line of information of an MLP operation.

The multiline print control unit has a circuit arrangement as shown in Figs. 24a, 24b and 24c which should be considered together as a unitary structure as shown in Fig. 24. The following description of this arrangement will first consider a single line or MLP–1 operation, and this will be followed by consideration of the modified structures provided by which to effect 2-line or MLP–2 and 3-line or MLP–3 operations.

A single line or MLP–1 operation is initiated by a positive potential applied to the MLP–1 plug hub 130 to turn On at MI41 time through an AND gate 826 a trigger 827. It was previously explained in connection with the over-all system arrangement shown in Fig. 4 that the potential applied to any MLP input plug hub, such as the plug hub 130, originates in a digit distributor. The construction of the digit distributors will be described hereinafter, at which time it will be apparent that an MLP control potential is derived by the digit distributor during the digit search operation which occupies the interval MI21 to MI40 of the electronic check cycle. Thus the MLP control potential is available at the MLP plug hub 130 during the electronic check cycle and prior to the occurrence of the timing pulse MI41.

When the trigger 827 turns On as just mentioned, the elevated potential in its Off output circuit is transmitted through a cathode follower 828 to an OR unit 829. The potential applied to the OR unit 829 is further transmitted by a cathode follower 831 to a first AND gate 832 and a second AND gate 833. The AND gates 832 and 833 also have a positive potential applied to them through a cathode follower 834 from an inverter 835 except when the latter has a positive potential applied to its input circuit from a paper skip relay PSR or through an output circuit 295 from the associated reader control unit by reason of the Off state of a run trigger included in the reader control unit hereinafter described (this run trigger in turning Off being effective to terminate further operation of the listing machine).

The positive potentials applied to and translated by the AND gate 832 as last described are effective to turn On a trigger 836. The resulting lowered potential in the On output circuit of the trigger 836 is transmitted by a cathode follower 837 and the transmission line conductor L31A to the clutch control unit presently to be described, and is effective to terminate further normal clutching operations by the latter and thus terminate its control over normal card feed operations. The On state of the trigger 836 results in an elevated potential in its Off output circuit, and this potential is applied through a cathode follower 838 to the transmission line conductor L31C which extends through the clutch control unit to the reader control unit where it is effective so to control a clutch control relay (relay 1) of the latter that the On state of the trigger 836 terminates further card clutching and thus terminates further card feed.

The two positive potentials applied to the AND gate 833 in the manner previously described condition this gate to translate the next MI41 timing pulse applied thereto, and this translated pulse turns On a trigger 839. The resulting elevated potential in the Off output circuit of the trigger 839 is effective to render an inverter 840 conductive and thereby energize a relay WE4 included in the output circuit of this inverter. As shown in Fig. 24c, the latter relay through its contacts WE4–2 thereupon energizes a plurality of relays J1, J2, J3 and H1 of the multiline selector unit 133 through the normally closed contacts H4–2 of a relay H4 and the normally closed contacts H3–2 of a relay H3. The relay contacts WE4–2 maintain these relays energized throughout the remainder of the electronic check cycle and the following electronic print cycle and until the relay WE4 becomes deenergized by turn Off of the trigger 839 at the end of the electronic print cycle when an MI111 pulse is applied to an AND gate 842 conditioned to translate this pulse by closure during the electronic print cycle of the relay contacts G4–5 of the relay G4 as shown. The relays J1, J2, J3 and H1 continue to remain energized, however, through the succeeding electronic check cycle by virtue of the energization of their hold windings (shown in Fig. 24c) through the relay contacts J1–1 of the relay J1 and the circuit 294 which extends to the relay WE6 hold circuit previously described in connection with Fig. 11. The purpose in energizing the relays J1, J2 and J3 will now be considered with specific reference to Fig. 24b.

The On state of the trigger 827 also causes the cathode follower 828 to apply a positive potential to an AND gate 830. Upon energization of the relay J2 to close its contacts J2–1, a further positive potential is applied to the AND gate 830 at the outset of the electronic print cycle when the electronic print cycle relay G4 is energized (as previously described in connection with Fig. 11) to close its contacts G4–4. The AND gate 830 now transmits this positive potential to turn On a trigger 843. The resulting elevated potential in the Off output circuit of the trigger 843 is transmitted through parallel connected cathode followers 844 and 845 to the 1-line output control plug hub 139. This output potential is also applied to a 1-line output plug hub 142 during the next electronic check cycle when the relay G1 is energized (as explained in connection with Fig. 11) to close its contacts G1–5.

The positive potential developed in the output circuits of the cathode followers 844 and 845 is also applied through an OR diode 846a and a cathode follower 847 to turn Off the trigger 836 and thereby restore normal operation of the clutch control unit 91. The potential translated by the OR diode 846a also is applied to an AND gate 848 which is conditioned, upon closure during the succeeding electronic check cycle of the relay contacts G1–3 of the relay G1, to transmit an MI1 pulse. This translated pulse is further transmitted by a cathode follower 849 to turn Off the trigger 827 which initiates and controls the 1-line MLP operation. The MLP operation, however, is not fully terminated until the end of this electronic check cycle at which time the trigger 843 is turned Off by an MI111 pulse transmitted through an AND gate 850 conditioned by closure of the relay contacts J3–1 of the relay J3 and the contacts G1–11 of the relay G1 energized during the electronic check cycle.

During this 1-line MLP operation, it was pointed out that the On state of the trigger 836 terminated normal clutching control and thus terminated normal card feed. A single card feed (by which the card in the second reading station is transferred to the output card hopper, that in the first reading station is passed to the second reading station, and a new card is moved from the card hopper into the first reading station) is nevertheless effected during this 1-line MLP operation. This is accomplished by transmitting the positive potential developed in the output circuit of the cathode follower 828 (when the control trigger 827 turns On) through an OR diode 851a and a cathode follower 852 to the transmission line contact L31B which extends to the clutch control unit 91 and effects a one card feed operation as will be explained hereinafter during the description of the latter unit. Thus at the end of this 1-line MLP operation, a new card stands in the first reading station in readiness to be read for further listing operations of the listing machine.

A 2-line MLP operation is initiated by applying a positive potential to the 2-line MLP plug hub 131. Certain of the components which effect the 2-line listing operation correspond to and perform the same function, and are identified by the same reference numerals with the subscript 2, as performed by previously described components in the 1-line MLP operation. Thus a control potential applied to the plug hub 131 turns On the trigger $827_2$ which through the cathode follower $828_2$ turns On the triggers 836 and 839 in the manner previously described. The trigger 839 as before energizes the relay WE4 to effect energization of the relays J1, J2, J3 and H1 of the multi-line selector unit 133 in the manner described above. The output of the cathode follower $828_2$ also causes a trigger $843_2$ to turn On through the AND gate $830_2$ when the relay contacts J2–1 of the relay J2 close and upon closure of the contacts G4–4 of the relay G4 energized during the succeeding electronic print cycle. The trigger $843_2$ in turning On energizes through cathode followers $844_2$ and $845_2$ a first control plug hub 140 when the relay contacts J2–3 of the relay J2 close and during the succeeding electronic check cycle energizes the control plug hub 143 when the contacts G1–6 of the relay G1 also close. Thus this portion of the operation of the 2-line MLP operation, as it accomplishes listing of the first line of information, is essentially similar to that described for the 1-line MLP operation.

As will presently be explained in connection with the card clutching control unit 91, a card having been read at the first reading station moves immediately to the second reading station where it is automatically read at the outset of the next card cycle. Thus the first line of listed information is checked in normal manner during the next check cycle. However since further card feed was suppressed by the negative potential on the line conductor L31A as above explained, the automatic card reading operation at the second reading station as last described results in this read card being moved to the output card hopper but no card replaces it in the second reading station. This state of affairs prevails until the MLP operation terminates in a manner presently to be explained. Until so terminated, the information of the same card remains stored in the read heads of the first and second reading stations where it is available for listing and subsequent checking. In the MLP-2 operation, there are, however, two differences in the 2-line MLP operation which will now be considered and which accomplish listing of the second line of information.

The first of these differences has relation to the application of the output potential of the cathode followers $844_2$ and $845_2$ through the contacts J2–3 of the relay J2 and through an OR diode $855a$ (Fig. 24c) to the control electrode of a gas trigger tube 856. A positive potential is applied to the screen electrode of the latter during the succeeding electronic check cycle when the contacts G1–3 of the relay G1 close, and the gas trigger tube 856 thereupon becomes conductive to energize a relay H3 through the normally closed contacts K1–3 of the relay K1 and the now transferred contacts J1–3 of the relay J1 as soon as the relay WE4 becomes deenergized at the end of the first line listing operation to close its contacts WE4–4. The relay WE4 is so deenergized at the end of the electronic print cycle, and specifically at MI111 time, when the trigger 839 is turned Off as previously described.

The second difference prevailing during the 2-line listing operation occurs by reason of the fact that the output potential of the cathode follower $828_2$ is present during the interval of listing both lines of the 2-line MLP operation so that the AND gate 833 remains conditioned to translate the next MI41 pulse to turn the trigger 839 On again after it is turned Off as last mentioned. When this occurs, the relay WE4 is again energized and the previously described energization of the relay H3 now prevents (through its now open contacts H3–2) a second energization of the relays J1, J2, J3 and H1; rather, through the now closed contacts H3–3 of the relay H3 and the normally closed contacts H4–3 of a relay H4, three relays K1, K2 and K3 of the multiline selector unit 133 are energized and remain so energized during the succeeding electronic print and check cycles by energization of their hold windings (Fig. 24c) through the relay contact K1–1 and the hold circuit 294 of the WE6 relay. Since the previously energized relays J1, J2, J3 and H1 have their hold windings deenergized by interruption of the WE6 hold circuit at the end of the next electronic check cycle after these relays were energized, the output potential of the cathode followers $844_2$ and $845_2$ (Fig. 24b) is now removed from one of the 2-line control plug hubs 140 and is transferred to the other by closure of the relay contacts K2–3 and is also removed from one of the control plug hubs 143 and transferred to the other such plug hub during the subsequent electronic check cycle when the relay contacts G1–7 close.

The 2-line listing operation is essentially completed when the trigger $827_2$ is turned Off through the cathode follower 849 and the gate 848, but it will be noted that the latter gate is not conditioned until a potential is applied thereto through an OR diode $846b$ by closure of the relay contacts K2–3 in effecting the second line listing of information. The 2-line listing operation is completed when the trigger $843_2$ is turned Off through the gate $850_2$ at MI111 time of the electronic check cycle by closure of the relay contacts K3–1 and closure of the relay contacts G1–11.

One further difference in the 2-line listing operation over the 1-line listing operation is to be noted. When relay H3 is energized in effecting the second line listing of information, its contacts H3–4 (Fig. 24a) close to energize an AND gate comprised of diodes $858a$ and $858b$ (the latter energized by the output of the cathode follower $828_2$) to transmit a positive potential through an OR diode $851b$, the cathode follower 852, and the line conductor L31B to the clutch control unit 91 by which to effect the reading of the card standing in the first reading station followed by the immediate movement of this card to the second reading station where it is normally read at the outset of the following card cycle. It will be noted that this card feed occurs during the listing of the second line of information when the relay H3 is energized.

A 3-line MLP operation is accomplished by use of a number of control components corresponding to and having the same function as (and identified by the same reference numerals with the subscript 3) the components described above in connection with the 1-line and 2-line listing operation. The 3-line listing operation is essentially similar to the 1-line and 2-line listing operations previously described, particularly in that the 3-line listing operation is initiated by a positive potential applied to the plug hub 128 to turn On a trigger $827_3$ which it will presently be shown remains On for the duration of the 3-line listing operation. This prolonged On period of the trigger $827_3$ enables the trigger 839 to be turned On at MI41 time of each of three electronic check cycles (relay contacts G1–3) through its input gate 833, the trigger 839 being turned Off as before at MI111 time of each succeeding electronic print cycle (relay contacts G4–5). A trigger $843_3$ is turned On, as in the case of the trigger 843, through the input gate $830_3$ upon closure of the relay contacts J2–1 and closure of the electronic print cycle contacts G4–4. The output potential of the associated cathode followers $844_3$ and $845_3$ is applied through the relay contacts J3–3, closed during the first line listing operation, and the OR diode $855b$ to render the gas trigger 856 conductive and thereby energize the relay H3 to effect the previously described energization of the relays K1, K2 and K3 upon the second turn On of the trigger 839 and second energization of the relay WE4. This accomplishes the second line listing operation in precisely the same manner as described for the 2-line MLP operation.

Now upon closure of the relay contacts K3–3 (Fig. 24b) during the second line listing operation, the output potential of the cathode followers $844_3$ and $845_3$ is again applied through an OR diode $855c$ again to render the gas trigger tube 856 conductive. The output circuit of the latter is interrupted by the now open contacts K1–3 insofar as the relay H3 is concerned, but since the relay contacts K1–4 are now closed and the relay J1 is now deenergized to close its normally closed contacts J1–3 there is the result that a relay H4 is energized by the relay contacts WE4–4 upon deenergization of the relay WE4 at the end of the second line listing operation. When the trigger 839 turns On a third time again to energize the relay WE4, a third set of relays L1, L2 and L3 of the multiline selector unit 133 are energized through the now closed contacts H4–4 and the relay contacts WE4–2 to accomplish the third line listing operation. As before, the latter relays are held through the succeeding electronic check cycle through the now closed relay contacts L1–1 and the hold circuit 294 extending to the WE6 relay of Fig. 11.

During these three successive line listing operations, it will be apparent that the 3-line output control plug hubs 141 are energized in succession by closure of the relay contacts J3–3, K3–3 and L3–3 and that the output control plug hubs 144 are similarly successively energized during the following electronic check cycle by closure of the relay contacts G1–8, G1–9 and G1–10. As shown in Fig. 24a, the relay contacts H4–5 upon closing for the third line listing operation complete the energization of an AND gate 859a, 859b to transmit a positive potential through an OR diode 851c, the cathode follower 852 and the line conductor L31B so to control the clutch control unit 91 as to effect a card feed so that the reading stations are now ready to resume normal listing operation immediately upon completion of the 3-line listing operation.

Referring to Fig. 24b, upon closure of the relay contacts L3–3 (to initiate the listing of a third line of information) the output potential of the cathode followers $844_3$ and $845_3$ is applied through an OR diode 846c to condition the AND gate 848 to transmit the MI1 timing pulse of the electronic check cycle (relay contacts G1–3) through the cathode follower 849 and turn Off the trigger $827_3$. The 3-line listing operation is completed when the trigger $843_3$ is turned Off by a MI111 pulse translated through the AND gate $850_3$ conditioned by closure of the relay contacts L3–1 and the electronic check cycle contacts G1–11. Normal clutch control is reestablished by turn Off of the trigger 836 by the same potential which was translated through the OR diode 846c to effect turn Off of the control trigger $827_3$ as previously described.

As shown in Fig. 24c, the multiline selector unit 133 includes contacts of the relays J1, J2, J3 and H1 in series between its input plug hubs 134a and its first-line-listing output plug hubs 134, includes contacts of the relays K1, K2 and K3 in series between the input plug hubs 134a and its second-line-listing output plug hubs 136, and includes contacts of the relays L1, L2 and L3 in series between the input plug hubs 134a and its third-line-listing output plug hubs 137. It will thus be apparent from the foregoing description of the MLP operation that the groups of output plug hubs 134, 136 and 137 are successively energized from the input plug hubs 134a to effect listing as selected of one line, two successive lines, or three succesive lines of information read from the card at the first reading station.

*Card clutching control unit 91*

The card clutching control unit 91 has a construction and circuit arrangement as shown in Fig. 25 and operates to control the clutching of cards into and out of the first and second reading stations of each card feed.

This unit also exercises control over the column drive control unit 153 to terminate operation of the latter during a long paper skip interval or during intervals when the run trigger of the reader control unit 92 or 92′, presently to be described, is turned Off to terminate the listing machine operation.

The card clutching control unit 91 includes certain components shown in the upper portion of Fig. 25 which are utilized in the control of the first feed by control (through the reader control unit 92 presently to be described) of card clutching into and out of the first and second reading stations of this feed, and also includes additional components shown in the lower portion of Fig. 25 which are used for like control of the second card feed. The arrangement and operation of those components which are utilized in controlling the first card feed will now be described, and this description will apply in all respects to the arrangement and operation of the components utilized in controlling the second card feed. To this end, those components which control the second card feed and correspond to similar units identified in the description of the first feed are identified by the same reference numerals primed.

Control of the first feed is principally accomplished by the operation of three triggers 863, 864 and 865. The triggers 864 and 865 are initially reset On by a decrease in the output potential of an inverter 866 resulting from a positive potential applied to the input circuit of the latter through an AND gate 867 which is conditioned by closure of relay contacts G3–7 during the electronic check cycle to transmit the next MI21 timing pulse. The trigger 863 is initially reset Off through an AND gate 868 having one diode 868a positively energized by closure of the relay contacts G3–7 during the electronic check cycle to translate the next MI21 timing pulse applied to the gate diode 868b (a diode 868c of this gate is normally continuously energized by a positive potential as will presently become more fully apparent). The On state of the trigger 864 results in a lowered potential of its On output circuit, and this lowered potential is transmitted through a cathode follower 869 and the transmission line conductor L36A to the reader control unit 92. The elevated potential developed in the Off output circuit of the trigger 865 by the On state of the latter is transmitted through a cathode follower 871 to an inverter 872 to render the latter conductive and thus decrease the potential in its output circuit. This decreased potential is transmitted by a cathode follower 873 and a transmission line conductor L36B to the reader control unit 92.

When a positive potential is now applied to the feed-1 input plug hub 90, it is transmitted by a double inverter 875 and a cathode follower 876 to an AND gate diode 877a. This AND gate also includes a diode 877b to which is normally applied through the line conductor L31A a positive potential from the multiline print control unit 129 except during those intervals when an MLP operation is in process in feed-1 at which time the transmission line conductor L31A carries a negative potential to close this gate. The AND gate last mentioned also includes a diode 877c to which a positive potential is applied through the contacts G3–7 during the electronic check cycle, and further includes a diode 877d to which MI41 timing pulses are applied. Thus when a feed-1 potential is applied to the input plug hub 90, and in the absence of an MLP operation in progress in feed-1, the AND gate 877a–877d transmits the MI41 timing pulse during the electronic check cycle and this translated pulse is applied to an inverter 878 to decrease its output potential and thereby turn Off the trigger 864.

The resulting elevated potential in the On output circuit of the latter is transmitted through the cathode follower 869 and the line conductor L36A to the reader control unit 92 where it turns On a clutch trigger to effect reading of the card standing in the first reading station of the first feed, the feed of a card from the card hopper to the first reading station of the first feed, and the transfer feed of the card previously standing in the first reading station to the second reading station of this feed. At the same time, the elevated potential developed in the On output circuit of the trigger 864 is applied to an inverter 879. The latter is of the type having a series-condenser input circuit and a control electrode positively biased through a series resistor from the potential source which energizes the anode of this inverter stage. Thus the elevated potential applied at this time from the trigger 864 to the inverter 879 does not significantly change the output potential developed across the anode load resistor 880 of the inverter. When, however, the trigger 864 is subsequently turned Off through the inverter 866 and AND gate 867 at MI21 time of the electronic check cycle as earlier explained, the resulting decreased potential in its On output circuit causes the inverter 879 to develop a short positive pulse across its anode load resistor 879. The lagging edge of this pulse turns Off the trigger 865. The resulting decrease of potential in the Off output circuit of the latter is transmitted by the cathode follower 871 and, after inversion by the inverter 872, is transmitted as an increased or positive potential by the cathode follower 873 to the transmission line conductor L36B. This conductor extends to the reader control unit 92 where the positive potential last mentioned is effective to turn On a trigger which causes energization of a clutch at the second reading station of the first feed. Energization of this clutch causes the card standing in the second reading station to be read and then moved to the output card hopper.

It will accordingly be apparent that the feed-1 input potential applied to the input plug hub 90 is effective at MI41 time of the electronic check cycle to cause reading of a card by the first reading station followed by immediate transfer of this card to the second station of the feed, concurrent reading by the second reading station of the previous card followed by transfer of this card to the card hopper, and concurrent transfer of a new card from the input card hopper to the first reading station. In this, it will be noted that the foregoing described operation of the card clutching control unit is such that the reading of a card at MI41 time of one electronic check cycle by the first reading station of a feed is followed (except during a machine stop operation or a paper skip operation presently to be considered) by an automatic reading of the same card at the second reading station of this feed at MI21 time of the next electronic check cycle. This automatic successive reading of the same card by the first and second reading stations has particular importance in connection with the modified operation of the card clutching control unit during MLP operations presently to be considered.

Shown in the lower left hand corner of Fig. 25 is a conductive circuit 295 from the reader control unit 92 (shown in Fig. 26) and to which a negative potential is applied so long as the "run trigger" of the latter unit is in its normal On state during normal operations of the card listing machine. This negative potential on the conductor 295 is transmitted by an OR diode 882 and a cathode follower 883, and is applied to an inverter 884 and impressed on an AND gate diode 886a to prevent turn On of the trigger 863. The output of the inverter 884 is transmitted through a cathode follower 885 to the diode 868c of the AND gate 868 to maintain this gate normally conditioned to transmit the MI21 pulse applied to the diode 868b during the electronic check cycle (potential applied to the diode 868a by the contacts G3–7) to turn Off the trigger 863 at this time. Consider now the operation prevailing when the "run trigger" of the reader control unit 92 turns Off and in doing so impresses a positive potential on the conductor 295. The cathode follower 883 now transmits a positive potential to the inverter 884 which through the cathode follower 885 closes down the gate 868 and prevents the trigger 863 being turned Off at MI21 time of the electronic check cycle in the manner earlier explained.

At the same time, the positive potential applied by the cathode follower 883 to the AND gate diode 886a now effects turn On of the trigger 863 by a positive potential applied to a gate diode 886b through a cathode follower 887 when the trigger 864 has been turned Off at MI41 time of the electronic check cycle through the gate 887a–887d. The elevated potential thereupon developed in the Off output circuit of the trigger 863 is transmitted through a cathode follower 888 to the inverter 872 and the latter through its associated cathode follower 873 impresses a negative potential on the transmission line conductor L36B which prevents the normal card reading and transfer operation at the second reading station of the first feed which would occur as above explained when the trigger 864 is next turned Off at MI21 time of the following electronic check cycle. The elevated potential now developed in the Off output circuit of the trigger 863 is also applied to an inverter 889, which is of the same type as the inverter 879 and uses an anode resistor 880 in common with the latter inverter, but this impressed potential produces no significant change across the anode load resistor 880 at this time for reasons previously explained in connection with the operation of the inverter 879 under control of the trigger 864. If the trigger 865 should now be turned Off through the inverter 879 by reason of the trigger 864 being again reset On at MI21 time of the next electronic check cycle, the elevated potential now developed in the Off output circuit of the trigger 863 would nevertheless maintain a negative potential on the output circuit conductor L36B and thus prevent normal reading of the card standing in the second reading station. While this state prevails, the operation of the column drive control unit 153 is terminated in a manner presently to be explained so that no positive clutching potential is thereafter applied to the feed-1 input plug hub 90 with the result that operation of the first reading station of this feed is also terminated.

Now when the "run trigger" of the reader control unit 92 is subsequently manually turned On in a manner which will be explained during the description of the latter unit, the positive potential on the conductor 295 decreases and this decreased potential when transmitted by the cathode follower 833 closes the gate 886a, 886b. At the same time, the decreased potential applied to the input circuit of the inverter 884 results in an elevated potential in the output circuit of the latter, and this elevated potential is transmitted by the cathode follower 885 to the gate diode 868c so that the trigger 863 is turned Off by the next MI21 pulse of the electronic check cycle (contacts G3–7). The resulting decreased potential in the Off output circuit of the trigger 863 is transmitted by the inverter 889 to turn Off the trigger 865 if the latter should be On at this time. The concurrent Off states of the triggers 863 and 865 now cause a positive potential to be impressed on the line conductor L36B with the result that the card which then stands in the second reading station is thereupon read and transferred to the output card hopper.

When the trigger 863 was turned On in the manner just described, the resulting lowered potential in its On output circuit turns Off a trigger 892 which at some previous time had been reset On by an MI111 timing pulse transmitted through an inverter 893. The resulting increased potential in the On output circuit of the trigger 892 is transmitted through a cathode follower 894 to a transmission line conductor L32E which extends to the column drive control unit 153, and this elevated potential on the conductor L32E is effective to turn Off and hold Off two triggers in the latter unit which terminate further operation of the column drive control unit insofar as read out of information from the second stations of either or both feeds is concerned.

It was earlier pointed out that a positive potential applied to the input plug hub 90 effects turn Off of the trigger 864, and thereby initiates clutch control at the two reading stations of the first feed in the manner earlier explained, so long as a positive potential is applied to the gate diode 877b by reason of the absence of an MLP operation by the multiline print control unit 129. Expressed conversely, the initiation of any MLP operation by the unit 129 is effective to close the gate 877a–877d and thus prevent further clutch control such as ordinarily occurs by turn Off of the trigger 864. As explained heretofore in connection with the description of the multiline print control unit 129, this unit impresses on the transmission line conductor L31B a positive potential during a 1-line MLP operation, during the second line of a 2-line MLP operation, and during the third line of a 3-line MLP operation. This positive potential is applied to a diode 896a of an AND gate which includes a diode 896b energized through the contacts G3–7 during the electronic check cycle, and further including a diode 896c to which MI41 timing pulses are applied. Thus it will be apparent that the gate 896a–896c translates an MI41 pulse during the electronic check cycle of that line of an MLP operation which energizes the line conductor L31B, and this translated pulse effects a normal clutching operation by turning Off the trigger 864.

*Reader control unit 92 or 92'*

A reader control unit is provided for each of the two card feeds. These units have the same construction and mode of operation, and accordingly only the control unit 92 for the first card feed will be here described. The circuit arrangement of the control unit is shown in Figs. 26a through 26e, which should be considered together as a unitary construction as shown in Fig. 26.

It is the function of the reader control unit to control the normal starting and stopping sequences involved in placing the listing machine into service and removing it from service. In doing this, the reader control unit provides the required timed clutch actuations at the input card hopper and at the first and second card reading stations by which to effect feed of succesive cards through the listing machine. This unit also automatically terminates operation of the listing machine in response to conditions which might lead to malfunctioning, such as a card jam of a card in transit through the machine, exhaustion of a supply of cards in the input card hopper or when the output card hopper becomes filled with cards, failure of a card to feed when required from one position to another in the listing machine, and the like. The reader control unit also so controls the column drive control unit 153 as to terminate read out of information at the first or second reading stations or both upon detecting that no card is present to be read at a respective one of these stations. On a final card run-out operation performed under manual control and by which certain automatic protective controls are bypassed to permit listing of the last few cards passing through the listing machine, the reader control unit automatically inserts "9" information into the first read station output lines during the comparison interval of the electronic check cycle in order to prevent an out-of-sequence output control potential from being developed by the sequence comparison unit and which might otherwise terminate operation of the machine.

The arrangement and operation of the reader control unit will be considered by reference to several phases of its principal functions.

*Card run in.*—When the listing machine is first placed in operation, a supply of cards is placed in the input card hopper and a "run in" procedure is utilized to transport and effect reading of the first several cards to the point where the machine has cards positioned at each of the two reading stations of one or both card feeds as required by a desired listing operation. This run in procedure is accomplished by manual control which overrides several protective controls normally arranged to terminate operation of the machine due to some condition which would otherwise give rise to an erroneous or impaired operation. Several of these automatic controls become operative in response to electrical contacts actuated by card sensing levers appropriately positioned to sense a particular condition of card feed. Included among these are the jam detection card lever actuated contacts 5, 6 and 27 positioned as indicated in Fig. 2. There are several additional such card lever actuated contacts which for simplicity have not been shown in Fig. 2 but which are located and function briefly as follows: While not shown in Fig. 2, the input card hopper 7 is arranged to receive and hold the major portion of the supply of cards in an upper hopper portion, and there is an upper hopper card level physically located in the side plate of this upper hopper portion near its bottom and having the function of detecting exhaustion of a supply of cards in this hopper portion. The contacts of this upper hopper card level are closed when a supply of cards is present in the upper hopper portion and are open when this supply is exhausted. The hopper 7 also includes a lower hopper portion which receives approximately 100 cards at a time released by an upper hopper card release clutch (not shown). This construction limits the maximum weight of cards on the lowermost card which must be moved by the card picker 11 into the feed rolls 13. A lower hopper card lever contact is physically located in the bottom of the lower hopper and normally functions to actuate the hopper card release clutch when the supply of cards in the lower hopper is nearly exhausted. There is also a card lever actuated contact so positioned in the output card hopper as to detect and indicate by closing of its contacts the fact that sufficient cards have been loaded into the output hopper to fill it to maximum capacity.

In considering the card run in operation, assume that a supply of cards is placed in the upper hopper but that there are no cards as yet in the lower hopper. Under this assumed condition, and referring particularly to Fig. 26a, lower hopper card-lever actuated contacts 900 will be closed and will accordingly apply a positive potential to the input circuit of an inverter 901 to render it conductive and thereupon energize a relay 3. This initial absence of cards in the lower hopper is the normal one prevailing at the initiation of machine operation for the reason that, while the lower hopper demand contacts may be closed, the upper hopper card release clutch 902 cannot yet be energized through these contacts for the reason that a relay 1 is deenergized at this time and its contacts 1–1 accordingly interrupt this energizing circuit. If, however, there should happen to be cards in the lower card hopper at the outset of the card run in operation, the cards in the lower hopper should be manually lifted to enable the card lever contacts 900 to close and energize the relay 3 during the "reset" operation now to be described.

The reset operation is initiated by manually closing the contacts of a reset switch 903 (Fig. 26b) to energize relays V1 and U10. The relay V1 does not have a hold circuit to keep it energized, and accordingly remains energized only so long as the switch 903 is manually actuated. As shown in Fig. 26e, the relay U10 has a hold winding which is energized through the contacts U10–1 of the relay U10, the normally closed contacts TD3–1 of a time delay relay TD3, and the normally closed contacts of a manually actuable stop switch 904. Energization of the relay V1 effects closing of its contacts V1–5 (Fig. 26a) and resulting turn On of a reset trigger 905 through the now closed contacts 3–3 of the relay 3 energized in the manner just mentioned. The relay contacts V1–5 and relay contacts 3–3 also apply a positive potential through an OR diode 906 (Fig. 26c) to turn On a hopper card lever trigger 907, a first jam detection trigger 908, and a second jam detection trigger 909. The contacts last mentioned also apply a potential through an OR diode 910 to turn Off a run trigger 911. The elevated potential now developed in the Off output circuit of the reset trigger 905 is transmitted through a cathode follower 912 to a diode 913a of an AND gate which includes diodes 913b–913d and which when ultimately fully energized in a manner presently to be explained effects turn On of the run trigger 911.

The now closed relay contacts V1–5 and 3–3 earlier mentioned additionally apply a positive potential to a diode 914a (Fig. 26b) of an AND gate which includes a diode 914b which at this time has a positive potential applied to it through the now closed lower hopper card lever contacts 900. The AND gate 914a, 914b being thus fully energized is effective to turn On a no card detection trigger 915 which functions to detect the absence of a card at the first reading station, and also to turn On a no card detection trigger 916 which functions to detect the absence of a card at the second reading station.

Lastly, the now closed contacts V1-5 and 3-3 turn Off a jam detect trigger 918 (Fig. 26c) which is used in terminating the listing machine operation when a card jam is detected during card feed through the machine. The resulting decrease of potential now developed in the output circuit of the jam detect trigger 918 is transmitted through a cathode follower 919 and an OR diode 920 to an inverter 921 to render the latter nonconductive. This results in an elevated potential being developed in the output circuit of the inverter 921, and this elevated potential is applied to the input circuits of parallel connected inverters 922 and 923 to render the latter conductive and thereby energize a relay 2. The relay 2 is energized through a resistor 924 of approximately 2000 ohms value, and a series time-constant circuit comprising a condenser 925 of 0.16 mfd. capacity and a resistor 926 of 600 ohms is connected across the resistor 924 and the winding of relay 2 to maintain the latter energized for a predetermined interval after the inverters 922 and 923 have been rendered nonconductive. Energization of the relay 2 completes a hold circuit (Fig. 26a) for the relay 3 through the contacts 2-6 of the relay 2 and the contacts 3-1 of the relay 3. This completes the reset operation.

The listing machine is now placed in operation by manually closing the contacts of a start switch 928 (Fig. 26b) to energize a relay R1 through the now closed contacts 3-BL of the relay 3 and the now closed contacts U10-2 of the relay U10. The relay R1 is held energized through its contacts R1-1 (Fig. 26e), the normally closed contacts TD3-1 of the time delay relay TD3, and the normally closed contacts of the stop switch 904. Energization of the relay R1 closes a power circuit (not shown) to the motor of the printer unit of the listing machine and a timing cam shift of the latter starts turning. The relay 2 having been energized as previously described, its now closed contacts 2-5 (Fig. 26b) energize a medium duty relay MDR5 having contacts shown in Fig. 26c which energize heavy duty relays HD1 and HD2 through the now closed contacts of relay R1. As also shown in Fig. 26c, the energization of the relays HD1 and HD2 cause their contacts to close and energize the feed drive motor 929 of the listing machine. At the same time, and as shown in Fig. 26e, the relay contacts R1-AU of the now energized relay R1 energize the winding 930 of a time delay relay TD1. After a preselected time delay, the winding 930 effects closure of the relay contacts 931 to energize the relay winding 932 whereupon the relay contacts TD1-BL of this relay transfer to maintain the winding 932 energized through the relay contacts R1-AU.

If the start switch 928 is now again manually closed after the delay provided by the delay relay TD1, relays U9, U7 and R3 (Fig. 26b) are now energized through the now closed contacts TD1-1 of the delay relay TD1, the now closed contacts 3BL of the relay 3, the now closed contacts U10-2 of the relay U10 and the starting switch 928. The relay U9 has no hold circuit and remains energized only so long as the contacts of the start switch 928 are maintained manually closed, but the relay U7 has a hold circuit (Fig. 26e) which extends through its contacts U7-2, the transferred contacts TD1-BL of the delay relay TD1, and the now closed contacts R1-AU of the relay R1. Energization of the relay R3 interrupts at its contacts R3-BU (Fig. 26e) the hold circuit of a relay R2 which includes the contacts R2-AL of the latter and thus effects deenergization of this relay if it was previously energized by a machine stop operation described hereinafter. The function of relay U9 will presently be explained and it will merely be pointed out at this time that this relay is deenergized upon manual release of the start switch 928.

Relay U9 being energized by manually holding closed the start switch 928, its contacts U9-1 apply positive energization to the AND gate diode 913d (Fig. 26a). The circuit 823 from the stop unit 69 (previously described in connection with Fig. 23) is normally negative so that it has no effect when applied to the OR diode 933 (a positive potential impressed on this circuit would turn the run trigger Off), but is applied to an inverter 934 to develop a positive potential in the output circuit of the latter which through a cathode follower 935 impresses a positive potential on the gate diode 913c. At 265° of the printer cycle, a printer start-stop circuit breaker 936 closes its contacts and applies a positive potential to the AND gate diode 913b. All of the diodes 913a-913c now having positive potentials applied to them, the run trigger 911 is turned On. This trigger will remain On until it is turned Off by manual actuation of either the reset switch 903 or the stop switch 904 or by some abnormal operating condition such as any of those described hereinafter.

The elevated potential now developed in the Off output circuit of the run trigger 911 is transmitted through a cathode follower 937 to a diode 938a of an AND gate which also includes diodes 938b-938d. Of the latter diodes, the diode 938b is connected through the contacts 2-1 of the relay 2 to a source of negative potential, but the relay 2 is energized at this time and its contacts 2-1 are open effectively to remove the diode 938b from circuit in this AND gate. The diode 938d has a positive potential applied to it from a cathode follower 939 (Fig. 26c) having an input circuit to which is applied the elevated potential developed at this time in the output circuit of an inverter 940 by reason of the fact that the reduced potential of the On output circuit of the trigger 909 (turned On at this time as previously explained) is applied to the inverter 940 through a cathode follower 941. There is applied to the diode 938c of the AND gate 938a-938d a positive potential from a printer circuit breaker 942, having contacts which close at 110° of the following printer cycle. All of the diodes 938a-938d of this gate being thus positively energized, a positive potential is applied by the gate to a double inverter 943 and the positive potential developed in the output circuit of the latter is transmitted through a cathode follower 944 to a diode 945a of an AND gate 945 and a diode 946a of an AND gate 946. This conditions these two gates to be ready to turn On a station 1 clutch trigger 947 through a cathode follower 948 and to be ready to turn On a station 2 clutch trigger 949 through a cathode follower 950. These triggers are, however, not turned On at this time. It may be noted that the clutch triggers 947 and 949 are normally held Off by the normally elevated potential developed in the output circuit of an inverter 953 and transmitted through a cathode follower 954 and OR diodes 955 and 956 to the Off input circuits of the respective triggers 947 and 949. When, however, the clutch No. 1 printer circuit breaker contacts 942 close at 110° of the printer cycle as just mentioned, they apply a positive potential to the input circuit of the inverter 953 and this removes the hold Off potential applied to the clutch triggers 947 and 949 through the respective OR diodes 955 and 956 so that these triggers are enabled to be turned On when a positive potential is ultimately transmitted by the AND gates 945 and 946.

The clutch triggers 947 and 949 are accordingly ready to be turned On. In the normal running operation of the machine, this occurs when card clutching positive potentials are developed by the card clutching control unit 91 earlier described and are applied through the transmission line conductors L36A and L36B and respective OR diode 957a and 958a to respective diodes 945b and 946b of the gates 945 and 946 thereby causing these gates to translate a positive potential through the respective cathode followers 948 and 950 to turn On their associated clutch triggers 947 and 949. The normal manner by which the clutch triggers 947 and 949 are turned On as just described does not prevail during the card run in operation presently being described for the reason that the card clutching control unit 91 is unable to develop and apply to the line conductors L36A and L36B card clutching potentials until such time as a card has been positioned in the first reading station and the card has been read. Accordingly, during the run in operation, and as will presently become more fully apparent, turn On of the triggers 947 and 949 is accomplished by a forced clutching operation under control of the first station no card detection trigger 915 and the second station no card detection trigger 916. Before considering this forced type of clutch actuation, however, the clutch control effected by the clutch triggers 947 and 949 will first be considered.

When the station No. 1 clutch trigger is turned On as last mentioned, the resulting elevated potential developed in its Off output circuit is transmitted through a cathode follower 959 to the screen electrodes of four gas trigger tubes 960–963. The trigger tubes 961 and 963 have their control electrodes connected to their cathodes so that these tubes become conductive, at 250° of the listing machine cycle when the contacts of respective card-feed circuit breakers 965 and 966 close, and energize a hopper brake solenoid 964 and the first read station brake solenoid 16 thus concurrently releasing the hopper clutch for card feed and releasing the clutch of the first reading station to enable it to perform a feed operation. However the gas trigger tubes 960 and 962, which respectively energize the hopper clutch magnet 12 and the station 1 clutch 19 through the respective circuit breakers 965 and 966, do not become conductive until after a positive potential is applied to their control electrodes at 125° of the cycle by closure of a clutch No. 2 printer circuit breaker 967 (Fig. 26c). When the gas trigger tube 960 becomes thus conductive, it energizes the hopper clutch 12 and effects movement of a card from the card hopper to the first reading station. The gas trigger tube 962 becomes concurrently conductive to energize the clutch 19 of the first reading station and effect reading of any card standing in the reading station at this time followed by transfer of the card from the first reading station to the second reading station.

When the station No. 2 clutch trigger is turned On as last above described, the resulting elevated potential developed in its Off output circuit is transmitted through a cathode follower 967 to the screen electrodes of a gas trigger tube 968 and a gas trigger tube 969. The latter has its control electrode connected to its cathode so that it becomes conductive and energizes the second reading station brake 22 when the contacts of a card-feed circuit breaker 970 close at 250° of the machine cycle. The gas trigger tube 968 has a positive potential applied to it upon closure of the clutch No. 2 printer circuit breaker contacts 967, and thus becomes conductive at 250° of the card-feed machine cycle to energize the second reading station clutch 24 and effect reading of any card standing at that time in the second reading station followed by transfer of the card to the output card hopper.

In regard to the clutch actuations effected by the clutch triggers 947 and 949, it will be recalled from the previous description of the card clutching control unit 91 that the station 1 and station 2 card clutching potentials applied to the respective transmission line conductors L36A and L36B may occur concurrently to effect concurrent turn On of the clutch triggers 947 and 949 (and thereby concurrent transfer of cards through the listing machine) or the transmission line conductor L36B may be alone energized to effect turn On of the clutch trigger 949 prior to that of the clutch trigger 947. The latter operation insures that a card standing in the second reading station is transferred to the output card hopper before the energizaiton of the first reading station clutch, thus avoiding possible card jamming.

During normal card feed operations, the clutching potentials applied to the transmission line conductors L36A and L36B from the card clutching control unit 91 are developed prior to the closure of the clutch No. 1 printer circuit breaker contacts 942 at 110° of the printer cycle. The AND gates 945 and 946 are therefore normally conditioned by these clutching potentials, but are actually opened by the potential of the clutch No. 1 printer circuit breaker contacts 942 translated through the AND gate 938a–938d and the inverter 943 and cathode follower 944. The clutch triggers 947 and 949 are accordingly normally turned On by closure of the printer circuit breaker contacts 942.

Under the starting conditions above assumed, namely a start operation where a supply of cards is initially placed in the card hopper but there are no cards positioned in the first and second reading stations, a no card indication protective control becomes operative due to the absence of a card in the first and second reading stations. This no card detection control is made effective by applying a positive potential at MI0 time to the first row of contacts of both the first station read head 17 and the second station read head 23 as explained above in connection with the read head operation. In the absence of a card positioned in one of these stations in readiness to be read, all of the -12-, -11- and -0- rows of contacts will stand in closed position after the reading operation at that station so that the corresponding -12-, -11- and -0- output line conductors from that read head will all translate the applied MI0 timing pulse. No Hollerith card code used will permit this concurrent -12-, -11- and -0- line energization, so that a concurrent energization of these three lines by the MI0 timing pulse provides a positive indication that no card was read during the preceding card reading operation, i.e., the absence of a card at this read station.

These concurrently translated MI0 pulses of the -12-, -11- and -0- transmission line conductors L6 from the first station read head 17 are applied to an AND gate 972 (Fig. 26a), and the concurrently translated MI0 pulses appearing on the transmission line L16 from the second reading station 23 are applied to an AND gate 973. Any concurrent MI0 pulse energization of the transmission line conductors L6 from the first reading station 17 causes the AND gate 972 to translate the MI0 pulse through a cathode follower 974 and turn On the first station no card detection trigger 915. In similar manner, concurrent energization by an MI0 pulse of the transmission line conductors L16 from the read head 23 of the second station causes the AND gate 973 to translate the MI0 pulse through a cathode follower 975 to turn On the second station no card detection trigger 916. The principal purpose of the no card detection triggers 915 and 916 during normal operation of the listing machine will presently be explained more fully, but they also have the secondary purpose of forced clutching control during the initial machine starting operation presently described. Since under the initial starting conditions above assumed the first and second reading stations will be devoid of cards at the initiation of the machine operation, it will be apparent that the initial machine starting operation will effect turn On of both of the triggers 915 and 916 at the time the first card is moved from the input card hopper toward the first reading station. The elevated potential developed in the Off output circuit of the trigger 915, when it is thus turned On, is translated through a cathode follower 976 to an OR diode 957b (Fig. 26d) to condition the gate 945 to turn On the clutch trigger 947 at the time the clutch No. 1 printer circuit breaker contacts 942 close and cause the gate 938a–938d to transmit a positive potential through the inverter 943 and cathode follower 944.

Thus while the card clutching control unit 91 cannot be effective (in the absence of a card positioned in the first reading station) to develop a clutching potential in its output transmission line conductors L36A and L36B, the turn On of the clutch trigger 947 under control of the no card detection trigger 915 is effective to provide forced clutching of the first reading station and forced clutching of the input card hopper picker knife drive at this time. Although there is no card in the first reading station when this occurs, no harm is done. In similar manner, turn On of the second station no card detection trigger 916 causes the elevated potential in its Off output circuit to be transmitted through a cathode follower 977 and OR diode 958b to condition the gate 946 to turn On the second station clutch trigger 949 when a positive potential is translated by the AND gate 938a–938d upon closure of the clutch No. 1 printer circuit breaker contacts 942 and this effects forced clutching of the second reading station. Although here again there is no card in the second reading station at this time, the forced clutching does no harm. After the initial forced clutching by turn On of the clutching triggers 947 and 949 under control of the no card detection triggers 915 and 916, a card is now positioned in the first reading station in readiness to be read, but no card is yet positioned in the second reading station.

The no card detection triggers 915 and 916 are both automatically reset during the run in operation in the following manner. At 165° of the printer cycle, the contacts of a printer reset circuit breaker 978 (Fig. 26a) close and apply a positive potential to a diode 979a of an AND gate 979 having a diode 979b to which a positive potential is applied through the cathode follower 959 by the On state of the clutch trigger 947. The potential of the printer reset circuit breaker contacts 978 is also applied to a diode 980a of an AND gate 980 which includes a diode 980b to which a positive potential is applied through the cathode follower 967 by the On state of the second station clutch trigger 949. As a result, the AND gate 979 transmits the positive potential of the printer reset circuit breaker 978 to attempt to reset Off the hopper card lever trigger 907 and the card lever trigger 908 and also to reset Off the station 1 no card detection trigger 915. In similar fashion, the AND gate 980 translates the potential applied thereto from the printer reset circuit breaker 978 and this potential tends to reset Off the card lever trigger 909 and resets Off the station 2 no card detection trigger 916. The card lever triggers 907, 908 and 909 are, however, not reset Off by this operation for the reason that these triggers are held On through an OR diode 981 (Fig. 26c) energized through the relay contacts U9-1 which is maintained energized at this time by reason of the fact that the contacts of the start switch 928 are maintained closed manually during the run in interval.

At 200° of the printer cycle, the clutch No. 1 printer circuit breaker contacts 942 open and this closes the AND gate 938a–938d and, through the inverter 943 and cathode follower 944, likewise closes the AND gates 945 and 946. The opening of the printer circuit breaker contacts 942 also removes the positive potential from the input circuit of the inverter 953 with the result that an elevated potential is developed in the output circuit of the latter and is translated through the cathode follower 954 and the diodes 955 and 956 to turn Off and hold Off the clutch triggers 947 and 949. At 205° of the next card-feed machine cycle, the gas trigger reset card-feed cams 965, 966 and 970 open to deenergize the gas trigger tubes 960–963 and 968–969.

The foregoing described run in operation effects movement of a card from the input card hopper to reading position in the first reading station. Upon completion of the first card-feed machine cycle, the first station card-feed circuit breaker 984 (Fig. 26b) in series with a second station card-feed circuit breaker 985 applies a positive potential through the output circuit 32 extending to the timing matrix 30 (Fig. 6) which normally indicates completion of the card reading operation and thereby initiates the electronic check cycle of operation of the timing matrix. This completes the first cycle of the card run in operation and positions a card in the first reading station.

On the second cycle of run in effected by maintaining the start switch 928 manually closed, the first card will be read at the first reading station to furnish the required information by which to effect normal card clutching control of the first reading station through the card clutching control unit 91. However, there was no card positioned in the second reading station at the end of the first run in cycle, so that the read head of the second station stands with all of its contacts closed at the outset of the second cycle of run in. This fact causes the second station no card detection trigger 916 now to be turned On again in the manner above described. This in turn causes turn On of the second station clutch trigger 949 and results in forced clutching in this station but no harm is done since there is no card present at this time in this station. At the end of the second cycle of run in, a card is positioned in both reading stations, and the first card has been read in the first reading station and the information of that card stored in the read head of that station.

During the third cycle of run in effected by maintaining the start switch 928 manually closed, the first card will be read at the second reading station and the following card will be read at the first reading station to furnish the required control information by which to effect normal card clutching control of both reading stations through the card clutching control unit 91. The run in operation is concluded, and normal operation of the listing machine begins so that the start button 928 may be manually released.

The no card detection triggers 915 and 916 perform two functions in addition to the forced clutching operation described in connected with the run in procedure. One of these functions is to exert a control over the operation of the column drive control unit 153 by which to permit continuing column drive control so long as the presence of a card is detected in either or both of the first and second reading stations. Thus as long as the presence of a card is detected in either of the first and second reading stations and either of the no card detection triggers 915 and 916 remains in its Off state, the elevated potentials developed in the On output circuits of the latter are transmitted through respective cathode followers 989 and 990 to respective AND gates 991 and 992. These AND gates are normally conditioned, through the cathode follower 937 by the On state of the run trigger 911, to transmit the positive output potentials of their associated cathode followers 989 and 990 through respective cathode followers 993 and 994 to the respective transmission line conductors L32A and L32C. The latter extend to the column drive control unit 153 to control in the latter AND gates through which column drive triggers are turned On at MI1 time of the electronic check cycle. Since the no card detection test is performed by an MI0 timing pulse as previously explained, either of the triggers 915 and 916 if turned On does so at MI0 time thereupon to close at this time the associated one of the AND gates 991 and 992 and thereby remove the positive potential normally applied through the associated one of the transmission line conductors L32A and L32C to the column drive control unit 153. This occurs at a time preceding MI1 time when the column drive triggers of the latter unit are normally turned On, so that turn On of either one of the triggers 915 and 916 prevents turn On of an associated one of the last mentioned triggers until such time as this no card detection trigger is again reset Off.

One further function of the no card detection triggers 915 and 916 has relation to a card run out operation presently to be described. As the last card of a run is moved from the first reading station to the second reading station, the next reading operation results in the no card detection trigger 915 being turned On by reason of the absence of a card in the first reading station. Since, however, the sequence comparison unit 62 and major-minor control unit 71 continue to function during this interval, a numerical "9" is inserted in the output of the first station read head throughout the comparison interval in order that the units last mentioned shall not find a low numerical sequence and thereby perform undesired machine control functions. To this end, a trigger 995 (Fig. 26b) is turned On by an MI0 pulse and is turned Off again at the end of the comparison interval by an MI21 pulse. While the trigger 995 is turned On, it impresses a positive potential on a diode 996a, of an AND gate 996 through a cathode follower 997 and also impresses a positive potential on the diode 998a of an AND gate 998 through a cathode follower 999. A diode 996b of the AND gate 996 has a positive potential impressed upon it through a cathode follower 976 whenever the no card detection trigger 915 is On, and a diode 998b of the AND gate 998 has a positive potential impressed upon it through the cathode follower 977 whenever the no card detection trigger 916 is On. A diode 996c of the AND gate 996 and a diode 998c of the AND gate 998 have positive potentials impressed upon them through the lower hopper card lever contacts 900 (Fig. 26a) which now close due to exhaustion of the supply of cards in the lower hopper. Accordingly when at the end of a card run the no card detection triggers 915 and 916 are successively turned On, the associated one of the gates 996 and 998 is conditioned to translate through a respective cathode follower 1000 and 1001 to respective output circuits 1002 and 1003 positive potentials which effect the previously mentioned numeric "9" insertion in the read head of that reading station at which the no card detection indication arose.

It will be evident from the foregoing described operations that the printer through its cam contacts 936, 942, 967 and 978 so controls the reader control unit as to initiate each card-feed cycle of operation, and that the reader control unit cam contacts 984 and 985 in turn initiate each cycle of electronic operation. Thus the printer in completing its operating cycle initiates a card-feed cycle of operation and completion of the card-feed cycle initiates an electronic cycle of operation, thereby synchronizing the cyclic operations of the printer, card-feed unit, and electronic unit.

*Card jam detection.*—It is the purpose of the card jam detection circuit to drop relay 2 within a card cycle after sensing a condition that would cause a card jam.

Relay 2 is held energized by the inverters 922 and 923 which are conductive as long as the input potential to the inverter 921 is negative. With all three of the card lever contacts 5, 6 and 27 normally closed, a negative potential is applied to the inverter 921 through OR diodes 1007, 1008 and 1009 from the respective card lever contacts 5, 6 and 27. However, if any one of the card lever contacts 5, 6 or 27 open, the output of the associated OR diode 1007-1009 impresses a positive potential on the input circuit of the inverter 921. When cards are feeding normally through the listing machine, and particularly during their transit between the positions where the cards normally are brought to a halt, all of the card lever contacts 5, 6 and 27 are opened by moving cards during the same interval of time but for slightly different lengths of time. The length of this interval is approximately 28 milliseconds, and in order to keep the relay 2 energized during this interval it has connected in shunt thereto the condenser 925 and the resistor 926 which hold the relay energized for approximately 50 milliseconds after the inverters 922 and 923 have been rendered nonconductive by a positive potential applied to the input circuit of the inverter 921. If at any time during the card run in operation, during a normal card feeding operation, or during the card run out operation hereinafter described one of the card lever contacts 5, 6 or 27 remains open (due to a card positioned under the associated contact lever) longer than 50 milliseconds the relay 2 will become deenergized. This furnishes a first form of jam detection operation.

A second form of jam detection operation impresses closer timing requirements on the feeding of the cards. For each card that is clutched on a given card cycle, one of the three card lever contacts 5, 6 or 27 must have been opened before 210° of the following card-feed machine cycle. If any clutched card is late getting under a card lever, the relay 2 will become deenergized and no further clutching will take place. This is accomplished in the following manner. Associated with the hopper card lever 5, the reading station 1 card lever 6, and the reading station 2 card lever 27 are the three card lever triggers 907, 908 and 909 respectively. When a card lever contact is opened by a clutched card (some time previous to 110° of the machine cycle), a resulting positive potential transmitted through an associated cathode follower 1005 turns the corresponding one of the triggers 907–909 to its On state. If all three of these triggers are turned On by 110° of the machine cycle, an AND gate 1010 is closed by removal of a positive potential applied to the gate diode 1010a by each of a pair of cathode followers 1011 and 1012 and by the cathode follower 941 which receive the decreased On output circuit potential of the respective triggers 907, 908 and 909 in their On state. Further, the absence of a positive potential in the output circuits of the cathode followers 941, 1011 and 1012 causes the inverter 940 and cathode follower 939 to impress a positive potential on the diode 938d (Fig. 26a) to permit the AND gate 938a–938d to remain open and effect normal clutching operation by virtue of the previously described control of the clutching triggers 947 and 949.

In order that the character of this last described second form of jam detection operation may be more fully understood, it will be helpful to consider an illustrative example. Assume that on a given card cycle clutching potentials are received on the transmission line conductors L36A and L36B from the card clutching control unit 91 to effect normal card feed at 165° of the printer cycle. The printer reset circuit breaker contacts 978 close at 165° of the printer cycle, and a positive potential is thereupon transmitted through the AND gate 979 (Fig. 26d) to turn the triggers 907 and 908 Off and a positive potential is also transmitted through the AND gate 980 to turn the trigger 909 Off. Assume further that one of the gas triggers 960 or 961 associated with the hopper clutch 12 or the hopper brake 964 fails to become conductive or the hopper clutch failed to pick a new card from the input card hopper. By 110° of the following card-feed machine cycle, the triggers 908 and 909 would have been turned On by cards in transit actuating the card lever contacts 6 and 27. However, under the assumed conditions a card was not clutched out of the input card hopper so the card lever contacts 5 will remain closed and the trigger 907 will remain in its Off state.

Therefore at 110° of the card-feed machine cycle, the Off state of the trigger 907 will cause an elevated potential to be transmitted through the cathode follower 1011, the inverter 940, and the cathode follower 939 to apply a negative potential on the diode 938d thereby closing the AND gate 938a–938d to prevent further normal clutching operations. Also, since the diode 1010a of the AND gate 1010 now has a positive potential applied to it, the closure of the clutch No. 1 printer circuit breaker contacts 942 will be transmitted through a cathode follower 1014 and the gate 1010 to turn On the jam detection trigger 918. In turn, the elevated potential developed in the Off output circuit of the latter is transmitted by the cathode follower 919 and is applied through the OR diode 920 to the inverter 921 to render the inverters 922 and 923 non-conductive and thereby deenergize relay 2. At the same time a positive potential is transmitted through the cathode follower 919 and a cathode follower 1016 and is applied to a diode 1017a of an AND gate. This potential is also applied through a conductor 1018 to the corresponding AND gate diode of the reader control unit associated with the other card feed (or conversely a potential may be applied from the other reader control unit through the conductor 1018 to the AND gate diode 1017a of the present reader control unit). At 265° of the printer cycle, the printer start-stop contacts 936 close and impress a positive potential on the other diode 1017b of the latter gate, whereupon a positive potential is transmitted by this gate to turn Off the run trigger 911. This closes the AND gate 938a–938d through the cathode follower 937 and prevents further card clutching of the first feed (further clutching of the second card feed through the reader control unit 92' is likewise terminated by turn Off of the run trigger of the latter unit by virtue of the potential impressed, as earlier mentioned, on the conductor 1018).

The principal purpose effected by the operation of the jam detection trigger 918 last described is to deenergize the relay 2 (although the card feed may be terminated by action of either of the reader control units 92 and 92', the relay 2 does not drop out in the reader control unit which did not initiate such termination of the feed). As a result, the hold circuit for the relay 3 is interrupted through the contacts 2–6 of the relay 2 so that the relay 3 also drops out for this reason and by virtue of the fact that under the assumed conditions there are cards in the lower card hopper and the lower card hopper contacts 900 are accordingly open. A relay 1, the function of which will presently be more fully considered, is normally energized by a positive potential applied through the normally closed contacts U8–1 of a stop relay U8, upper hopper card lever contacts 1019 (normally closed when cards are present in the upper card hopper), normally closed stacker card lever card contacts 1020 (which open only when the output card hopper is filled to capacity with cards), the contacts 2–3 of the relay 2, to the input circuit of an inverter 1021. The output potential of the latter is transmitted through a cathode follower 1022 and tandem arranged inverters 1023 and 1024 to energize the relay 1. Thus when the relay 2 is deenergized and opens its contacts 2–3, it deenergizes the relay 1 as soon as a card-feed circuit breaker 1025 or 1026 opens its contacts at 300° or 165° of the machine cycle or upon completion of an MLP operation when the transmission line conductor L36C becomes deenergized or at the end of a paper skip operation when a relay PSR opens its contacts. The relay contacts 2–5 (Fig. 26b) of the relay 2 also open and deenergize the medium duty relay MDR–5 and thereby deenergize the heavy duty relay HD–1 and HD–2 to deenergize the drive motor 929. Lastly the reset trigger 905 (Fig. 26a) is turned Off by closing of the contacts 2–2 of the relay 2.

The reader control unit cannot be reset to resume further operation until the normal starting procedure above described is carried out, and in this case there will normally be cards in the lower card hopper so that its contacts 900 will be open and thereby necessitate that the cards in the lower card hopper be manually lifted while the reset switch 903 is manually closed. This should direct the attention of the operator to the fact that he should check the machine for a possible card jam. When the cards in the lower card hopper are manually lifted and the reset switch 903 is manually closed, the relay 2 is energized, the relay 3 is energized and holds, and a card feed is again ready to run.

*Machine stop—automatic and manual.*—The listing machine is automatically stopped by an orderly stop procedure when the supply of cards in the input card hopper becomes exhausted. The relay 1 plays an important function in this orderly stop procedure. As previously explained, the relay 1 remains energized as long as a positive potential is applied to the input circuit of the inverter 1021. This will normally occur through the normally closed contacts U8–1 of the manual stop relay U8, the upper hopper card lever contacts 1019 which are normally closed when a supply of cards remains in the upper hopper, and the stacker card contacts 1020 which are normally closed until the output card hopper becomes filled with cards. However, a positive voltage may be applied to the inverter 1021 through the contacts 1–5 of the relay 1 and either card-feed circuit breaker contacts 1025 (which close at 210° and open at 300° of the card-feed machine cycle) or card-feed circuit breaker contacts 1026 (which close at 237° of one machine cycle and open at 165° of the following machine cycle). A positive potential may also be applied to the inverter 1021 through the transmission line circuit L36C from the multiline print control unit 129 during the entire interval of a multiline print operation, or through the normally open contacts of a paper skip relay PSR during a prolonged paper skip operation of the printer. It will therefore be apparent that if any of the contacts U8–1, 1019, 1020 or 2–3 become open for any reason, the relay 1 nevertheless remains energized at least until 165° of the card-feed machine cycle (through circuit breaker contacts 1025 and 1026) or until the end of a multiline print operation or the end of a prolonged paper skip operation.

When, however, the positive potential is finally removed from the input circuit of the inverter 1021, the relay 1 becomes deenergized but before its contacts can open the run trigger 911 is turned Off through the contacts 1–4 of the relay 1 by a positive potential transmitted through a cathode follower 1025 from the output circuit of the inverter 1021 and applied to a diode 1026a of an AND gate, the latter having a diode 1026b to which a positive potential is applied at this time through the now closed contacts 978 of the printer reset circuit breaker (closed at 165° of the printer cycle). The same positive potential that is applied to the AND gate diode 1026a to turn Off the run trigger 911 is also applied through a conductor 1027 to turn Off in the same manner the run trigger of the reader control unit 92' is associated with the second card feed.

As described above, turn Off of the run trigger 911 closes down the AND gate 938a–938d to prevent further card feed. If the termination of the card feed was occasioned by the opening of the contacts U8–1 of the manual stop relay U8, the card feed ca nbe started again merely by manually depressing the start switch 928. If the stop was caused by opening of the upper hopper card lever contacts 1019 by exhaustion of the card supply, two alternatives may be desirable. If the operator places an additional supply of cards in the upper hopper, card feed may again be resumed merely by manually closing the start switch 928. On the other hand, if the card feed was terminated by an exhaustion of the card supply at the end of a card run, the start switch 928 must be depressed while all of the cards in the lower card hopper are run out. When there are no cards in the upper card hopper, the upper hopper card release clutch is not energized due to the now open contacts 1–1 of the relay 1. If the termination of card feed was caused by the opening of the stacker card lever contacts 1020 due to the output card hopper being filled with cards, some or all of the cards can be manually removed from the output card hopper, thereby to reclose the contacts 1020 and the run continued merely by manually closing the start switch 928.

Whenever the run trigger 911 turns Off, the resulting elevated potential developed in its On output circuit is transmitted through a cathode follower 1029 to the conductive circuit 295 which extends to the WE6 control circuit of Fig. 11 where it is effective to turn Off and hold Off the trigger 290. This prevents energization of the WE6 relay during each period when the run trigger 911 of the reader control unit is Off, thus insuring that the WE6–1 relay contacts remain closed to continue the hold circuit for the system relays throughout the interval when operations are terminated by the reader control unit.

As shown in Fig. 26b, the relay contacts 1–2 of the relay 1, the contacts 2–2 of relay 2, and the contacts 3–2 of the relay 3 upon closing energize individual indicator lamps of the neon type, thus to provide upon termination of normal card feed operations an indication of which relay or relays have been deenergized in the reader control unit. There is thus furnished an indication of the condition which caused the reader control unit to terminate normal card feeding operations.

The listing machine may be manually stopped by manual actuation of the stop switch 904 to transfer its contacts. This energizes a relay R2 and the stop relay U8. It was previously explained that the contacts U8–1 of the relay U8 upon opening effect deenergization of the relay 1 at 165° of the card-feed machine cycle or at the end of a multiline listing operation or the end of a prolonged paper skip operation. The relay U8 may be held energized, as indicated in Fig. 26e, by either the closed contacts 1030 of the upper hopper card lever (as when a supply of cards is exhausted in the upper hopper) or by stacker card lever contacts 1031 which close when the output card hopper becomes filled with cards. Upon manual release of the stop switch 904, the relay R2 holds through its contacts R2–AL (Fig. 26e), the normally closed contacts R3–BU of the relay R3, the normally closed contacts TD3–1 of a time delay relay TD3, and the normally closed contacts of the stop switch 904. Upon initial pick up of the relay R2, its contacts R2–BU (Fig. 26e) close to energize a time delay relay TD2. The latter includes contacts TD2–BU which close after a delay interval provided by this relay, and thereupon energize a time delay relay TD3. After a time delay interval established by the latter relay, it picks up to open its contacts TD3–1 and thus interrupts the hold circuit for the relays R1, R2 and U10. Deenergization of the relay U10 requires that the start switch 928 be initially manually closed to initiate resumption of machine operation, and the relay R1 upon becoming deenergized interrupts the hold circuit for the relay U7 thereby to deenergize the time delay relay TD1 and thus require a second manual closure of the start switch 928 to complete the starting operation as above described. It may be noted that the relay R1 upon becoming deenergized interrupts the energization of the heavy duty relays HD1 and HD2 (Fig. 26c) and thus deenergizes the drive motor 929.

Digit distributor 104

The digit distributors have a circuit arrangement shown in Fig. 27, and have a normal output plug hub 103N in which there is developed a positive output potential between the end of the electronic print cycle of one card cycle and MI38 time of the electronic print cycle of the following card cycle. This control potential may be used as desired for controlling one or more functions of the listing machine. The digit distributors may, however, be controlled in a manner which will presently be explained to develop an output control potential at its transfer plug hub 103T used also in controlling machine functions. A relatively large number of digit distributors is usually provided for enhanced flexibility of function of the listing machine for numerous and diverse applications.

Each distributor unit includes a gas trigger tube 1032 having its anode energized through an anode load resistor 1033 and the contacts WE8–1 of a relay WE8 from a source of energizing potential. The energization of the relay WE8 is controlled through an inverter 1034 by the Off output circuit potential of a trigger 1035. The latter is turned On by an MI38 timing pulse translated through an And gate 1036 when the latter is conditioned during each electronic print cycle by closure of contacts G4–7 of the print cycle relay G4. The trigger 1035 is turned Off by the next MI111 timing pulse at the end of the electronic print cycle. Thus during the interval of each electronic print cycle extending from MI38 time to MI111 time, the trigger 1035 is On and the relay WE8 is energized to open its contacts WE8–1 and thereby deenergize the gas trigger tube 1032.

At the end of the electronic print cycle when the relay contacts WE8–1 again close, the energizing potential thereupon impressed on the anode of the gas trigger tube 1032 is transmitted through a cathode follower 1037 to the normal output plug hub 103N. The gas trigger tube 1032 may, however, be rendered conductive by applying to its control electrode a positive digit search pulse supplied to the input plug hub 111P and by concurrently applying to its screen electrode through an And gate 1038 a selected MI timing pulse from the timing matrix 30 and a B pulse developed in the output circuit 191 of the latter. These potentials concurrently applied to the control electrode and screen electrode of the gas trigger tube render it conductive to drop its anode potential and thus remove the control potential from the output plug hub 103N while concurrently developing a potential across a resistor 1039 included in the cathode circuit of this tube. The potential thus developed across the resistor 1039 is transmitted through a cathode follower 1040 to the transfer plug hub 103T. Thus a control potential normally appearing in the normal output plug hub 103N is transferred at a selected time to the output transfer plug hub 103T. In this it will be appreciated that the digit distributor shown in Fig. 27 is representative of all such distributors used in the listing machine, that the gas trigger tube of all such distributors is energized through the relay contacts WE8–1, and that a control potential may be applied to the input plug hubs 111P in common to a number of such distributors so that the selected timing pulse applied to the AND gate 1038 selects a particular one of these distributors to accomplish transfer of its output potential from its normal plug hub 103N to its transfer plug hub 103T.

Field selectors 97

The electrical arrangement of each field selector is shown in Fig. 28, and a number of selectors are usually provided for increased utility of the machine in performing numerous types of possible operation. Each includes a pair of vacuum tubes 1041 and 1042 having a common cathode circuit resistor 1043 and having control electrodes biased in common from a source of negative potential and connected to the cycle and normal pick up plug hub 98. The digit pick up plug hub 164 is connected to a second control electrode of the tube 1041, and this control electrode is normally biased from a source of negative potential as shown. The tube 1042 likewise has a second control electrode to which an MI81 timing pulse is applied. Whenever a positive control potential is applied to the cycle and normal pick up plug hub 98, the tube 1041 may be rendered conductive by a concurrently applied control potential to the digit pick up plug hub 164 and upon becoming conductive energizes a relay 1044 which thereupon remains energized by energization of its hold winding through the WE6 hold circuit 294 previously described in connection with Fig. 11. The conductive state of the tube 1041 develops a potential across the cathode resistor 1043 of sufficient magnitude to maintain the vacuum tube 1042 nonconductive.

If, however, the vacuum tube 1041 is not rendered conductive by a potential applied to the plug hub 164, the vacuum tube 1042 becomes conductive if a potential is applied to the pick up plug hub 98 and when the MI81 timing pulse is applied to its control electrode. Upon becoming conductive, the tube 1042 energizes a relay 1045 which also remains energized through its hold winding and the hold circuit 294.

The relay 1045 includes contacts 1045-1 which upon closing connect the common input plug hub 96 to the normal output plug hub 100 of the field selector, and the relay 1044 likewise includes contacts 1044-1 which upon closing connect the common plug hub 96 to the transfer plug hub 163 of this unit.

Both of the tubes 1041 and 1042 are energized from a source of positive potential through the output circuit 287 of the relay WE7 of Fig. 11. It will be recalled from the previous description of the Fig. 11 arrangement that the circuit 287 is energized during each electronic print cycle, so that it is during this cycle that one of the tubes 1041 or 1042 is permitted to become conductive as described.

*Pick-up coupler 109 and automatic character insertion unit 121*

The electrical arrangement of the pick-up coupler 109 and automatic character insertion unit 121 is shown in Fig. 29. The former includes an AND gate 1048 connected to the cycle pick-up plug hub 108 and a character print position plug hub 110. A print position timing pulse applied to the plug hub 110 is transmitted by the gate 1048 to a cathode follower 1049 whenever the cycle pick-up plug hub 108 is energized with a positive potential, and the character position timing pulse thus applied to cathode follower 1049 is transferred by the latter to the character print pick-up plug hub 112 which is plug hub wired as indicated to the character set up plug hubs 113. The latter is plug hub wired to the input plug hubs 115–120 of the automatic character insertion unit 121 upon which the transmission line conductors L30 terminate as shown. The transmission line conductors L30 are biased through resistors 1050 from a source of negative potential, but are elevated to a positive potential by a character print position timing pulse applied to the character set up plug hubs 113 and thereafter applied by plug hub wiring to selected ones of the input plug hubs 115–120. The plug hub wiring shown in Fig. 29 is that employed in inserting an asterisk (having the binary code 11-4-8) as described above in connection with the over-all system of Fig. 4.

While Fig. 29 for simplicity shows provision for automatic insertion of only one character, it will be understood that a plurality of units 121 will usually be provided with each connected to the transmission line conductors L30 as shown and with each energized through a pick-up coupler 109 in the manner shown in Fig. 29.

While specific forms of the invention have been described for purposes of illustration, it is contemplated that numerous changes may be made without departing from the spirit of the invention.

I claim:

1. A business machine comprising, a pair of spaced reading stations each adapted concurrently to read and store all alpha-numeric information code recorded in an individual bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession and for causing said reading stations to read and store successively the same alpha-numeric information recorded in each area of said medium, and means for utilizing the alpha-numeric information stored by a first one of said reading stations and for verifying the accuracy of said utilization by comparative use of the alpha-numeric information stored by the second of said reading stations.

2. A business machine comprising, a pair of spaced reading stations each adapted concurrently to read and store all alpha-numeric information code recorded in an individual bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession during successive operating cycles and for causing said reading stations to read and store successively during said successive cycles the same alpha-numeric information recorded in each area of said medium, and means for utilizing during one of said operating cycles the alpha-numeric information stored by a first of said reading stations and for verifying during the succeeding operating cycle the accuracy of said utilization by comparative use of the alpha-numeric information stored by the second of said reading stations.

3. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means operating in cycles for transporting each of successive recording areas of said record medium from a record source to one of said reading stations during each of individual operating cycles and from said one to the other of said reading stations during the succeeding operating cycle to effect successive reading of said each recording area by said stations, and means for utilizing the alpha-numeric information stored by a first one of said reading stations and for verifying the accuracy of said utilization by comparative use of the alpha-numeric information stored by the second of said reading stations.

4. A business machine comprising: a pair of spaced reading stations each adapted concurrently to read and store all alpha-numeric information code recorded in a bi-dimensional area of a record medium; the code form used in effecting said recording being of a type such that plural code bits are available to represent each individual increment of alpha-numeric information, means having successive transportation cycles during each of which successive recording areas of said record medium are concurrently transported from a record source to a first of said stations, from said first station to the other of said stations, and from said other station to record medium storage; means for initiating each transportation cycle by operation of said reading stations to read and store the alpha-numeric information recorded in recording areas transported to said stations during the preceding transportation cycle; and means for utilizing the alpha-numeric information stored by a first one of said reading stations and for verifying the accuracy of said utilization by comparative use of the alpha-numeric information stored by the second of said reading stations.

5. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession and for causing said reading stations to read and store successively the same alpha-numeric information recorded in each area of said medium, and means for decoding and printing the alpha-numeric information stored by one of said reading stations and for verifying the accuracy of printed alpha-numeric information by utilization of alpha-numeric information stored by the other of said reading stations.

6. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession and for causing said reading stations to read and store successively the same alpha-numeric information recorded in each area of said medium, means responsive to the alpha-numeric information read from a given recording area of the record medium and stored in one reading station for utilizing the stored information while the record medium is in transit to the other of said reading stations, and means responsive to the alpha-numeric information read from said given recording area of the record medium and stored in said other reading station for utilizing the later stored information to verify the accuracy of said first utilization and while the record medium is in transit from said other reading station.

7. A business machine comprising, a pair of spaced reading stations each adapted concurrently to read and store all alpha-numeric information code recorded in an individual bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession and for causing said reading stations to read and store successively the same alpha-numeric information recorded in each area of said medium, and means for sequentially utilizing the alpha-numeric information stored by a first one of said reading stations and for verifying the accuracy of said utilization by sequential comparative use of the alpha-numeric information stored by the second of said stations.

8. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession during successive operating cycles and for causing said reading stations to read and store successively during said successive cycles the same alpha-numeric information recorded in each area of said medium, and means for utilizing during one of said operating cycles the alpha-numeric information stored by a first of said reading stations to effect alpha-numeric information listing and for verifying during the succeeding operating cycle the accuracy of said information listing by comparative use of alpha-numeric information stored by the other of said reading stations.

9. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession during successive operating cycles and for causing said reading stations to read and store successively during said successive cycles the same alpha-numeric information recorded in each area of said medium, and means for sequentially utilizing during one of said operative cycles the alpha-numeric information stored by a first of said reading stations to effect information listing and for verifying during the succeeding operating cycle the accuracy of said information listing by sequential comparative use of alpha-numeric information stored by the other of said reading stations.

10. A business machine comprising, a pair of spaced reading stations each adapted concurrently to read and store all alpha-numeric information code recorded in a bi-dimensional area of a record medium, the code form used in effecting said recording being of a type such that plural code bits are available to represent each individual increment of alpha-numeric information, means having a cyclic operation for transporting said record medium from a source thereof to each of said reading stations in succession during successive operating cycles and for causing said reading stations to read and store successively during said successive cycles the same alpha-numeric information recorded in each area of said medium, means for utilizing during one operative cycle the alpha-numeric information stored by a first of said reading stations and for verifying during the succeeding operating cycle the accuracy of said utilization by comparative use of alpha-numeric information stored by the second of said reading stations, and means for concurrently using during a portion of said succeeding cycle selected information newly stored in said first reading station during said succeeding cycle for selection of a machine control function.

11. A business machine comprising, a pair of spaced reading stations each adapted concurrently to read and store all alpha-numeric information punch recorded in a punched record card, the code form used in effecting said recording being of a type such that plural code bits are available to represent each individual increment of alpha-numeric information, means having a cyclic operation for transporting record cards from an input card source to each of said reading stations in succession and for causing said reading stations to read and store successively the same alpha-numeric information recorded in the same record card, and means operative while each said record card is in transit from said first and from said second stations for utilizing the alpha-numeric information stored by said first reading station and for verifying the accuracy of said utilization by comparative use of the alpha-numeric information stored by said second reading station.

12. A business machine comprising, a pair of spaced reading stations each adapted concurrently to read and store all alpha-numeric information punch recorded in a punched record card, the code form used in effecting said recording being of a type such that plural code bits are available to represent each individual increment of alpha-numeric information, means for transporting successive record cards from an input card source past said reading stations to output card storage while effecting successive reading of each card by said reading stations, and means operative while each said record card is in transit from said first and from said second stations for utilizing the alpha-numeric information stored by said first reading station and for verifying the accuracy of said utilization by comparative use of the alpha-numeric information stored by said second reading station.

13. A business machine comprising: a pair of spaced reading stations each adapted concurrently to read and store all information punch recorded in a punched record card; means for transporting successive record cards from from an input card source past said reading stations to output card storage while effecting successive reading of each card by said reading stations; information storage means; means for transferring to said storage means during one operating cycle the information read and stored from a given card during the preceding cycle by one of said reading stations; and means for utilizing during said one operating cycle, while concurrently reading a succeeding card by said one reading station, the information stored in said storage means and for verifying during the succeeding operating cycle the accuracy of utilization by comparative use of the information read from said given card and stored by the second of said reading stations during said one operating cycle.

14. A business machine comprising: a pair of spaced reading stations each adapted concurrently to read and store all information punch recorded in a punched record card, means for transporting successive record cards from an input card source past said reading stations to output card storage while effecting successive reading of each card by said reading stations; printing means; information storage means; means for transferring to said storage means during one operating cycle the information read and stored from a given card during the preceding cycle by one of said reading stations; and means for utilizing during said one operating cycle, while concurrently reading a succeeding card by said one reading station, the information stored in said storage means to set up said printing means to list said stored information and for verifying during the succeeding operating cycle the accuracy of set up of said printing means by comparative use of the information read from said given card and stored by the second of said recording stations during said one operating cycle.

15. A business machine comprising: a pair of spaced reading stations each adapted concurrently to read and store all information punch recorded in a punched record card, means for transporting successive record cards from an input card source past said reading stations to output card storage while effecting successive reading of each card by said reading stations; information storage means; printing means; means for transferring to said storage means during one operating cycle the information read and stored from a given card during the preceding cycle by one of said reading stations, means for transferring from said storage means to said printing means for print set up during said one operating cycle the information stored in said storage means; and means for verifying during the succeeding operating cycle but before print actuation of said printing means the accuracy of the printing means set up by comparative use of the information read from said given card and stored by the second of said reading stations during said one operating cycle.

16. A business machine comprising, a pair of spaced reading stations each adapted concurrently to read and store all information punch recorded in a punched record card, means for transporting successive record cards from an input card source past said reading stations to output card storage while effecting successive reading of each card by said reading stations, means for utilizing during one operating cycle the information stored by a first of said reading stations during the preceding operating cycle and for thereafter reading and storing the information of a succeeding card, means for verifying during the succeeding operating cycle the accuracy of said utilization by comparative use of the information stored by the second of said reading stations during said one operating cycle, and means for concurrently using during a portion of said succeeding cycle selected information newly stored in said first reading station from said successive card for selection of a machine control function.

17. A business machine comprising, a reading station adapted concurrently to read and store all information code recorded in a bi-dimensional area of a record medium, means operating in cycles to transport said record medium from a source thereof past said reading station and for effecting in transit reading of all control and data alpha-numeric information recorded in each of successive recording areas thereof, and means responsive to control information read and stored by said reading station during one operating cycle for controlling the utilization during at least the succeeding operating cycle of data information read and stored by said reading station during said one operating cycle.

18. A business machine comprising, a reading station adapted concurrently to read and store all information code recorded in a bi-dimensional area of a record medium, means operating in cycles to transport said record medium from a source thereof past said reading station and for effecting in transit reading of all control and data information recorded in each of successive recording areas thereof, and means responsive to control information read and stored by said reading station during each operating cycle for controlling during the succeeding operating cycle a machine operation related to the utilization during said succeeding cycle of data information stored during said each cycle.

19. A business machine comprising, a reading station adapted concurrently to read and store all information code recorded in a bi-dimensional area of a record medium, means operating in cycles to transport said record medium from a source thereof past said reading station and for effecting in transit reading and storage of all control and data information recorded in each of successive recording areas thereof, means responsive to control information read and stored by said reading station during one operating cycle for deriving during the succeeding operating cycle a control effect, and means responsive to said control effect for controlling a machine operation during one or more successive operating cycles including said succeeding operating cycle.

20. A business machine comprising, a reading station adapted concurrently to read and store all information code recorded in a bi-dimensional area of a record medium, means operating in cycles to transport said record medium from a source thereof past said reading station and for effecting in transit reading and storage of all control and data information recorded in each of successive recording areas thereof, means responsive to control information read and stored by said reading station during one operating cycle for deriving during the succeeding operating cycle a control effect, and means responsive to said control effect for selecting a machine function to be performed during at least said succeeding operating cycle.

21. A business machine comprising, a reading station adapted concurrently to read and store all information code recorded in a bi-dimensional area of a record medium, means operating in cycles to transport said record medium from a source thereof past said reading station and for effecting in transit reading of all control and data information recorded in each of successive recording areas thereof, means responsive to control information read and stored by said reading station during one operating cycle for controlling the utilization during the succeeding operating cycle of data information read and stored by said reading station during said one operating cycle, and means additionally responsive to said control information for generating in said succeeding cycle and supplying to said last named means for utilization data information neither read from said record medium nor stored in said reading station.

22. A business machine comprising, a pair of spaced reading stations each adapted concurrently to read and store all information code recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means concurrently responsive to control information read and stored by said reading stations during one operating cycle for controlling during a succeeding operating cycle a machine operation related to the utilization during said succeeding cycle of data information read and stored by said stations during said one operating cycle.

23. A business machine comprising, a pair of spaced reading stations each adapted concurrently to read and store all information recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means for comparing the value of preselected information stored in said stations during each operating cycle to select a machine function to be performed during said each cycle.

24. A business machine comprising, a pair of spaced reading stations each adapted concurrently to read and store all information recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means for comparing the value of preselected information stored in said reading stations during each operating cycle for controlling utilization of information stored in one of said stations.

25. A business machine comprising, a pair of spaced reading stations each adapted concurrently to read and store all information recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means for sequentially comparing the value of preselected information code bits stored in said stations during each operative cycle to select a machine function to be performed during said each cycle.

26. A business machine comprising, a pair of spaced reading stations each adapted concurrently to read and store all information recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means for comparing the value and nature of any inequality of preselected information stored in said stations during each operating cycle to select one of plural selectable machine functions to be performed during said each cycle.

27. A business machine comprising, a pair of spaced reading stations each adapted concurrently to read and store all information recorded in a bi-dimensional area of a record medium, means having a cyclic operation for transporting said record medium from a source thereof to each of said reading stations in succession during successive operating cycles and for causing said reading stations to read and store successively during said successive cycles the same information recorded in each area of said medium, and means for comparing the value of preselected information stored in said stations during each operating cycle and responsive to the time during said comparison of the determination of any inequality of value for selecting one of plural selectable machine functions to be performed during said each cycle.

28. A business machine comprising, two pairs of spaced reading stations of which each station is adapted concurrently to read and store all information code recorded in an individual bi-dimensional area of a record medium, means having a cyclic operation for transporting individual record media during successive operating cycles past individual pairs of said reading stations to effect during each said cycle and by a first station of each pair reading and storage of information recorded in a given area of each media and to effect during a succeeding operating cycle and by the other station of each pair reading and storage of information recorded in said given area of said each media, means for comparing the value of preselected information stored in each pair of stations during each operating cycle for controlling a machine function, and means for comparing the value of information stored in a corresponding station of said pairs thereof during each operating cycle for controlling an additional machine function.

29. A business machine comprising, two pairs of spaced reading stations of which each station is adapted concurrently to read and store all information code recorded in an individual bi-dimensional area of a record medium, means having a cyclic operation for transporting individual record media during successive operating cycles past individual pairs of said reading stations to effect during each said cycle and by a first station of each pair reading and storage of information recorded in a given area of each media and to effect during a succeeding operating cycle and by the other station of each pair reading and storage of information recorded in said given area of said each media, means for comparing sequentially the value of preselected information code bits stored in each pair of stations during each operating cycle for controlling a machine function, and means for comparing sequentially the value of information stored in a corresponding station of each pair thereof during each operating cycle for controlling an additional machine function.

30. A business machine comprising, two pairs of spaced reading stations of which each station is adapted concurrently to read and store all information code recorded in an individual bi-dimensional area of a record medium, means having a cyclic operation for transporting individual record media during successive operating cycles past individual pairs of said reading stations to effect during each said cycle and by a first station of each pair reading and storage of information recorded in a given area of each media and to effect during a succeeding operating cycle and by the other station of each pair reading and storage of information recorded in said given area of said each media, means for comparing the value of preselected information stored in the stations of each pair of thereof during each operating cycle for controlling the utilization of stored information in one station of each said pair during said each cycle, and means for comparing the value of preselected information stored in a corresponding station of the pairs thereof during each said cycle for additionally controlling the utilization of information stored in at least one station during said each operating cycle.

31. A business machine comprising: a pair of spaced reading stations each including a plurality of electrical circuit control devices of which each may be actuated to either of two information storage states and each corresponds to an individual index point of a card having code rows and data columns of index points used to record information, and is actuated by a record sensing device to effect concurrent reading and storage in said control devices of all information recorded on a card; means for transporting record cards past said reading stations and for causing said reading stations to read each card successively; and means operative upon completion of each card reading operation by said stations for utilizing the storage actuated states of said control devices by successive groups thereof corresponding to successive columns of index points of a card.

32. A business machine comprising, a pair of spaced reading stations each including a plurality of electrical circuit control devices of which each may be actuated to either of two information storage states and each corresponds to an individual index point of a card having code rows and data columns of index points used to record information, and is actuated by a record sensing device to effect concurrent reading and storage in said control devices of all information recorded on a card; means for transporting record cards past said reading stations and for causing said reading stations to read each card successively; and means operative upon completion of each card reading operation by said stations for sequentially utilizing the storage actuated states of said control devices by successive groups thereof corresponding to successive columns of index points of a card.

33. A business machine comprising: a pair of spaced reading stations each including a plurality of electrical circuit control devices of which each may be actuated to either of two informations storage states and each corresponds to an individual index point of a card, having code rows and data columns of index points punched to record information, and is actuated by a punched hole sensing device to effect concurrent reading and storage in said control devices of all information punch recorded on a card; means for transporting record cards past said reading stations and for causing said reading stations to read each card successively; and means operative upon completion of each card reading operation by said stations for effecting scanned utilization of the storage actuated states of said control devices by successive groups thereof corresponding to successive columns of index points of a card.

34. A business machine comprising: a pair of spaced reading stations each including a plurality of electrical circuit control devices of which each may be actuated to either of two information storage states and each corresponds to an individual index point of a card, having code rows and data columns of index points punched to record information, and is actuated by a punched hole sensing device to effect concurrent reading and storage in said control devices of all information punch recorded on a card; means for transporting record cards past said reading stations and for causing said reading stations to read each card successively; and means operating upon completion of each card reading operation by said stations for effecting scanned utilization of the storage actuated states of said control devices by successive groups thereof corresponding to successive columns of index points of a card, the scanned utilization by said last named means progressing both by concurrent scanning of the control devices of both of said stations for machine control by comparative information utilization and by the individual scanning of the control devices of one of said stations for recorded information direct utilization and of the other of said stations for verification of the accuracy of utilization of information from said one station.

35. A business machine comprising: a pair of spaced reading stations each including a plurality of electrical circuit control devices of which each may be actuated to either of two information storage states and each corresponds to an individual index point of a card, having code rows and data columns of index points used to record information, and is actuated by a record sensing device to effect concurrent reading and storage in said control devices of all information recorded on a card; means for transporting record cards past said reading stations and for causing said reading stations to read each card successively; means operative upon completion of each card reading operation by said stations for scanning the control devices thereof by successive groups corresponding to successive columns of index points of a card to ascertain the storage actuated states of the control devices of each said group thereof; and means responsive to the ascertained states of each group of control devices for utilizing the information stored thereby and for verifying the accuracy of information utilization.

36. A business machine comprising: a pair of spaced reading stations each including a plurality of electrical circuit control devices of which each may be actuated to either of two information storage states and each corresponds to an individual index point of a card, having code rows and data columns of index points used to record information, and is actuated by a record sensing device to effect concurrent reading and storage in said control devices of all information recorded on a card; means for transporting record cards past said reading stations and for causing said reading stations to read each card successively; means operative upon completion of each card reading operation by said stations for scanning the control devices thereof by successive groups corresponding to successive columns of index points of a card to ascertain the storage actuated states of the control devices of each said group thereof; and means responsive to the ascertained states of each group of control devices in one of said stations for utilizing the information stored thereby and responsive to the ascertained states of each group of control devices in the other of said stations for verifying the accuracy of said information utilization.

37. A business machine comprising: a pair of spaced reading stations each including a plurality of electrical circuit control devices of which each may be actuated to either of two information storage states and each corresponds to an individual index point of a card, having code rows and data columns of index points used to record information, and is actuated by a record sensing device to effect concurrent reading and storage in said control devices of all information recorded on a card; means for transporting record cards past said reading stations and for causing said reading stations to read each card successively; means operative upon completion of each card reading operation by said stations for scanning the control devices thereof by successive groups corresponding to successive columns of index points of a card to ascertain the storage actuated states of the control devices of each said group thereof; means responsive to the ascertained states of preselected groups of control devices in one of said stations for providing selected machine control operations and to the states of preselected other groups of control devices in said one station for utilizing the information stored thereby; and means responsive to the ascertained states of preselected groups of control devices in the other of said stations corresponding to said other preselected groups in said one station for verifying the accuracy of said information utilization.

38. A business machine comprising, a pair of spaced reading stations each including a plurality of electrical circuit control devices of which each may be actuated to either of two information storage states and each corresponds to an individual index point of a card, having code rows and data columns of index points used to record information, and is actuated by a record sensing device to effect concurrent reading and storage in said control devices of all information recorded on a card; means for transporting record cards past said reading stations and for causing said reading stations to read each card successively; means operative upon completion of each card reading operation by said stations for scanning the control devices thereof by successive groups corresponding to successive columns of index points of a card to ascertain the storage actuated states of the control devices of each said group thereof; means responsive to the ascertained states of preselected groups of control devices in one of said stations for providing selected machine control operations, to the ascertained states of corresponding preselected groups of control devices in both of said stations for providing additional machine control operations, and to the ascertained states of additional preselected groups of control devices in said one station for utilizing the information stored thereby; and means responsive to the ascertained states of preselected groups of control devices in the other of said stations corresponding to said additional preselected groups in said one station for verifying the accuracy of said information utilization.

39. A business machine comprising, a pair of spaced reading stations each adapted concurrently to read and store all information code recorded in an individual bi-dimensional area of a stationary record medium, means having a cyclic operation for transporting said record medium from a source thereof to each of said reading stations in succession and for halting said record medium successively in said reading stations while causing said reading stations to read and store successively the same information recorded in each area of said halted medium, a means for utilizing the information stored by a first one of said reading stations and for verifying the accuracy of said utilization by comparative use of the information stored by the second of said reading stations.

40. A business machine comprising, a pair of spaced reading stations each adapted concurrently to read and mechanically to store all information code recorded in an individual bi-dimensional area of a stationary record medium, means having a cyclic operation for transporting said record medium from a source thereof to each of said reading stations in succession and for halting said record medium successively in said reading stations while causing said reading stations to read and store successively the same information recorded in each area of said halted medium, a means for utilizing the information stored by a first one of said reading stations and for verifying the accuracy of said utilization by comparative use of the information stored by the second of said reading stations.

References Cited in the file of this patent

UNITED STATES PATENTS

| | | |
|---|---|---|
| 1,750,191 | Pierce | Mar. 11, 1930 |
| 2,247,914 | Lake | July 1, 1941 |
| 2,359,616 | Bryce | Oct. 3, 1944 |
| 2,573,313 | Dayger | Oct. 30, 1951 |
| 2,540,026 | Daly | Jan. 30, 1951 |
| 2,573,313 | Dayger | Oct. 30, 1951 |
| 2,602,545 | Luhn | July 8, 1952 |
| 2,624,273 | Wheeler | Jan. 6, 1953 |

UNITED STATES PATENT OFFICE
CERTIFICATE OF CORRECTION

Patent No. 2,932,249                                                                  April 12, 1960

Frederic A. Foss

It is hereby certified that error appears in the printed specification of the above numbered patent requiring correction and that the said Letters Patent should read as corrected below.

Column 3, line 20, for "line" read -- lines --; column 22, line 7, for "apear" read -- appear --; column 23, line 39, for "symetrical" read -- symmetrical --; line 53, for "is" read -- as --; column 26, line 38, for "folower" read -- follower --; column 32, line 35, for "in" read -- is --; column 35, line 49, after "13a" insert a closing parenthesis; column 38, line 25, for "stage" read -- stages --; column 42, line 40, for "indiacted" read -- indicated --; column 44, line 43, before "six" insert -- the --; column 45, line 8, for "symbols" read -- symbol --; line 72, for "follower" read -- followers --; column 53, line 29, for "line" read -- lines --; line 56, after "from" insert -- both --; column 58, line 20, for "fuctioned" read -- functioned --; column 72, line 2, for "energizaiton" read -- energization --; column 74, line 40, for "connected" read -- connection --; column 77, line 57, for "relay" read -- relays --; column 78, line 44, strike out "is"; line 50, for "ca nbe" read -- can be --; column 84, line 67, strike out "from", second occurrence; column 88, line 47, after "pair" strike out "of"; column 89, line 15, for "informations" read -- information --; column 92, line 15, list of references cited, for "2,573,313 Dayger---Oct. 30, 1951" read -- 2,536,915 Dayger----Jan. 2, 1951 --.

Signed and sealed this 18th day of April 1961.

(SEAL)
Attest:

ERNEST W. SWIDER                                             DAVID L. LADD
Attesting Officer                                                Commissioner of Patents